(12) United States Patent
Heidenreich et al.

(10) Patent No.: US 8,660,972 B1
(45) Date of Patent: *Feb. 25, 2014

(54) SYSTEM AND METHOD TO PROVIDE A CUSTOMIZED PROBLEM SOLVING ENVIRONMENT FOR THE DEVELOPMENT OF USER THINKING ABOUT AN ARBITRARY PROBLEM

(75) Inventors: James Ralph Heidenreich, Mountain View, CA (US); Linda Shawn Higgins, Mountain View, CA (US)

(73) Assignee: Zxibix, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 13/199,857

(22) Filed: Sep. 12, 2011

Related U.S. Application Data

(63) Continuation-in-part of application No. 12/660,259, filed on Feb. 22, 2010, now Pat. No. 8,019,711, which is a continuation of application No. 11/709,118, filed on Feb. 20, 2007, now Pat. No. 7,685,085, which is a continuation of application No. 11/148,129, filed on Jun. 8, 2005, now Pat. No. 7,260,561, which is a continuation-in-part of application No. 10/705,651, filed on Nov. 10, 2003, now Pat. No. 7,197,488, application No. 13/199,857, which is a continuation-in-part of application No. 12/583,176, filed on Aug. 14, 2009, now Pat. No. 8,019,710, which is a continuation of application No. 11/486,157, filed on Jul. 13, 2006, now Pat. No. 7,577,629, which is a continuation of application No. 10/513,900, filed as application No. PCT/US03/35716 on Nov. 10, 2003, now Pat. No. 7,143,074, application No. 13/199,857, which is a continuation-in-part of application No. 13/068,792, filed on May 21, 2011, now Pat. No. 8,306,927, which is a continuation of application No. 11/985,264, filed on Nov. 13, 2007, now Pat. No. 7,962,433, which is a continuation of application No. 11/435,473, filed on May 17, 2006, now Pat. No. 7,730,009, which is a continuation-in-part of application No. 10/705,654, filed on Nov. 10, 2003, now Pat. No. 7,203,667, application No. 13/199,857, which is a continuation-in-part of application No. 13/068,180, filed on May 4, 2011, which is a continuation-in-part of application No. 12/803,916, filed on Jul. 9, 2010, now Pat. No. 8,027,944, which is a continuation of application No. 11/985,225, filed on (Continued)

(51) Int. Cl.
*G06F 17/00* (2006.01)
*G06N 5/00* (2006.01)

(52) U.S. Cl.
USPC .......................................................... 706/45

(58) Field of Classification Search
USPC .......................................................... 706/45
See application file for complete search history.

(56) References Cited

U.S. PATENT DOCUMENTS

| 5,333,237 A | 7/1994 | Stephanopoulos et al. |
| 5,521,814 A | 5/1996 | Teran et al. |

(Continued)

*Primary Examiner* — Michael B Holmes

(57) ABSTRACT

Preferred embodiments of the invention provide a customized or specialized environment to facilitate customized development of thinking about a problem or inquiry based project.

20 Claims, 75 Drawing Sheets

Related U.S. Application Data

(63) Nov. 13, 2007, now Pat. No. 7,756,806, which is a continuation of application No. 11/805,170, filed on May 22, 2007, now Pat. No. 7,720,780, which is a continuation-in-part of application No. 10/704,897, filed on Nov. 10, 2003, now Pat. No. 7,225,175, said application No. 13/068,180 is a continuation-in-part of application No. 11/980,281, filed on Oct. 29, 2007, now Pat. No. 8,032,470, which is a continuation-in-part of application No. 11/709,118, filed on Feb. 20, 2007, now Pat. No. 7,685,085, which is a continuation of application No. 11/148,129, filed on Jun. 8, 2005, now Pat. No. 7,260,561, which is a continuation-in-part of application No. 10/705,651, filed on Nov. 10, 2003, now Pat. No. 7,197,488, said application No. 11/980,281 is a continuation-in-part of application No. 11/147,874, filed on Jun. 8, 2005, now Pat. No. 7,349,888, which is a continuation-in-part of application No. 10/705,651, filed on Nov. 10, 2003, now Pat. No. 7,197,488, application No. 13/199,857, which is a continuation-in-part of application No. 13/134,675, filed on Jun. 13, 2011, which is a continuation-in-part of application No. 11/980,240, filed on Oct. 30, 2007, now Pat. No. 7,962,430, which is a continuation-in-part of application No. 11/709,118, filed on Feb. 20, 2007, now Pat. No. 7,685,085, which is a continuation of application No. 11/148,129, filed on Jun. 8, 2005, now Pat. No. 7,260,561, which is a continuation-in-part of application No. 10/705,651, filed on Nov. 10, 2003, now Pat. No. 7,197,488, said application No. 11/980,240 is a continuation-in-part of application No. 11/147,874, filed on Jun. 8, 2005, now Pat. No. 7,349,888, which is a continuation-in-part of application No. 10/705,651, filed on Nov. 10, 2003, now Pat. No. 7,197,488, said application No. 11/980,240 is a continuation of application No. 11/805,170, filed on May 22, 2007, now Pat. No. 7,720,780, which is a continuation-in-part of application No. 10/704,897, filed on Nov. 10, 2003, now Pat. No. 7,225,175, said application No. 13/134,675 is a continuation-in-part of application No. 12/462,717, filed on Aug. 6, 2009, now Pat. No. 8,290,888, which is a continuation of application No. 11/710,051, filed on Feb. 22, 2007, now Pat. No. 7,596,537, which is a continuation-in-part of application No. 10/705,654, filed on Nov. 10, 2003, now Pat. No. 7,203,667.

(60) Provisional application No. 60/578,102, filed on Jun. 8, 2004, provisional application No. 60/578,081, filed on Jun. 8, 2004, provisional application No. 60/578,083, filed on Jun. 8, 2004, provisional application No. 60/681,792, filed on May 17, 2005, provisional application No. 60/425,343, filed on Nov. 11, 2002, provisional application No. 60/808,784, filed on May 25, 2006.

(56) References Cited

U.S. PATENT DOCUMENTS

| | | | |
|---|---|---|---|
| 5,572,430 | A | 11/1996 | Akasaka et al. |
| 5,659,668 | A | 8/1997 | Misono et al. |
| 5,671,428 | A | 9/1997 | Muranaga et al. |
| 5,799,293 | A | 8/1998 | Kaepp |
| 5,835,094 | A | 11/1998 | Emel et al. |
| 5,845,270 | A | 12/1998 | Schatz et al. |
| 5,847,709 | A | 12/1998 | Card et al. |
| 5,878,214 | A | 3/1999 | Gilliam et al. |
| 5,940,082 | A | 8/1999 | Brinegar et al. |
| 5,983,194 | A | 11/1999 | Hogge et al. |
| 5,995,951 | A | 11/1999 | Ferguson |
| 6,012,072 | A | 1/2000 | Lucas et al. |
| 6,038,560 | A | 3/2000 | Wical |
| 6,058,387 | A | 5/2000 | Campbell et al. |
| 6,112,209 | A | 8/2000 | Gusack |
| 6,115,642 | A | 9/2000 | Brown et al. |
| 6,121,969 | A | 9/2000 | Jain et al. |
| 6,122,636 | A | 9/2000 | Malloy et al. |
| 6,138,104 | A | 10/2000 | Marchak et al. |
| 6,161,105 | A | 12/2000 | Keighan et al. |
| 6,175,842 | B1 | 1/2001 | Kirk et al. |
| 6,184,885 | B1 | 2/2001 | DeStefano |
| 6,192,354 | B1 | 2/2001 | Bigus et al. |
| 6,212,530 | B1 | 4/2001 | Kadiec |
| 6,219,057 | B1 | 4/2001 | Carey et al. |
| 6,222,547 | B1 | 4/2001 | Schwuttke et al. |
| 6,222,557 | B1 | 4/2001 | Pulley, IV et al. |
| 6,230,066 | B1 | 5/2001 | Sferro et al. |
| 6,233,600 | B1 | 5/2001 | Salas et al. |
| 6,236,994 | B1 | 5/2001 | Swartz et al. |
| 6,240,421 | B1 | 5/2001 | Stolarz |
| 6,246,406 | B1 | 6/2001 | Nielsen et al. |
| 6,253,218 | B1 | 6/2001 | Aoki et al. |
| 6,282,527 | B1 | 8/2001 | Gounares et al. |
| 6,282,546 | B1 | 8/2001 | Gleichauf et al. |
| 6,292,792 | B1 | 9/2001 | Baffes et al. |
| 6,295,513 | B1 | 9/2001 | Thackston |
| 6,298,319 | B1 | 10/2001 | Heile et al. |
| 6,304,259 | B1 | 10/2001 | DeStefano |
| 6,304,861 | B1 | 10/2001 | Ferguson |
| 6,326,988 | B1 | 12/2001 | Gould et al. |
| 6,336,110 | B1 | 1/2002 | Tamura et al. |
| 6,341,291 | B1 | 1/2002 | Bentley et al. |
| 6,353,817 | B1 | 3/2002 | Jacobs et al. |
| 7,349,888 | B1 * | 3/2008 | Heidenreich et al. ........ 706/45 |
| 7,577,630 | B1 * | 8/2009 | Heidenreich et al. ........ 706/45 |
| 7,610,253 | B1 * | 10/2009 | Heidenreich et al. ........ 706/45 |
| 7,949,617 | B1 * | 5/2011 | Higgins et al. ................ 706/11 |
| 8,019,711 | B1 * | 9/2011 | Heidenreich et al. ........ 706/45 |
| 8,290,888 | B1 * | 10/2012 | Heidenreich et al. ........ 706/45 |
| 2001/0028369 | A1 | 10/2001 | Gallo et al. |
| 2002/0016725 | A1 | 2/2002 | Eichstaedt et al. |
| 2002/0019826 | A1 | 2/2002 | Tan |
| 2002/0023176 | A1 | 2/2002 | Kwicinski |
| 2002/0029167 | A1 | 3/2002 | Muller |

* cited by examiner

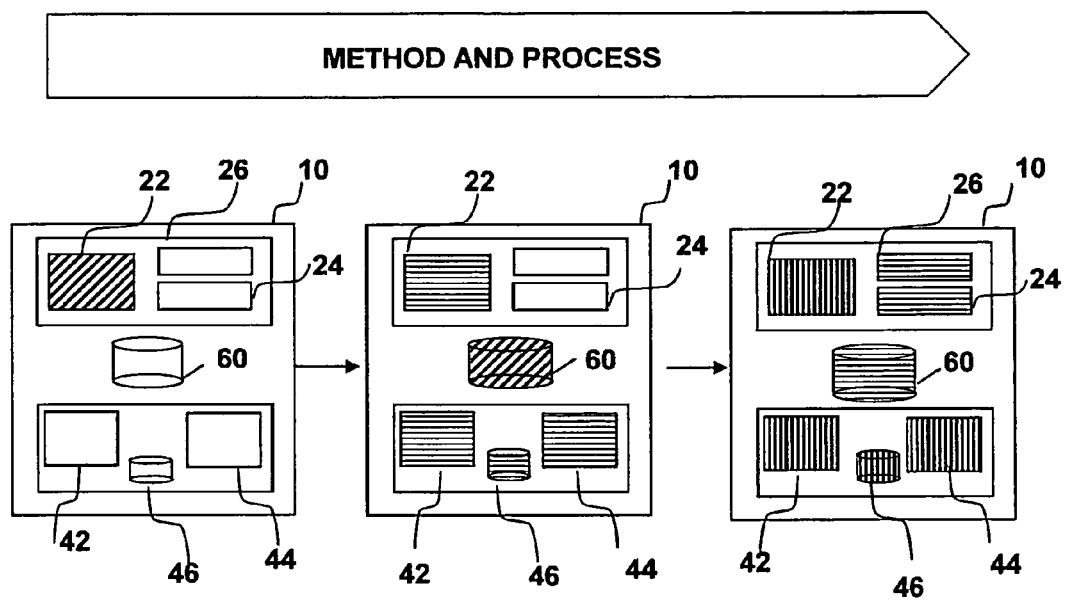

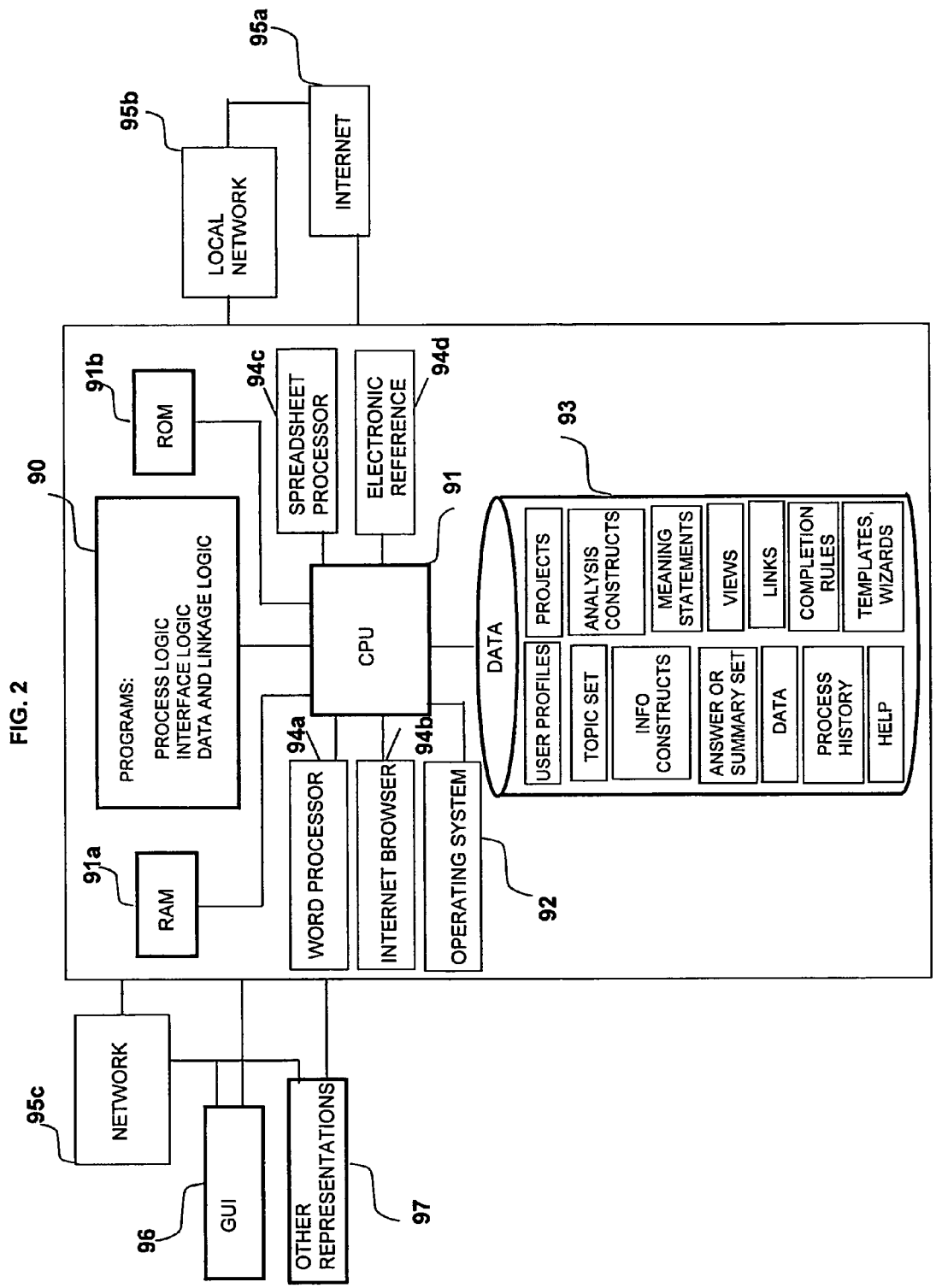

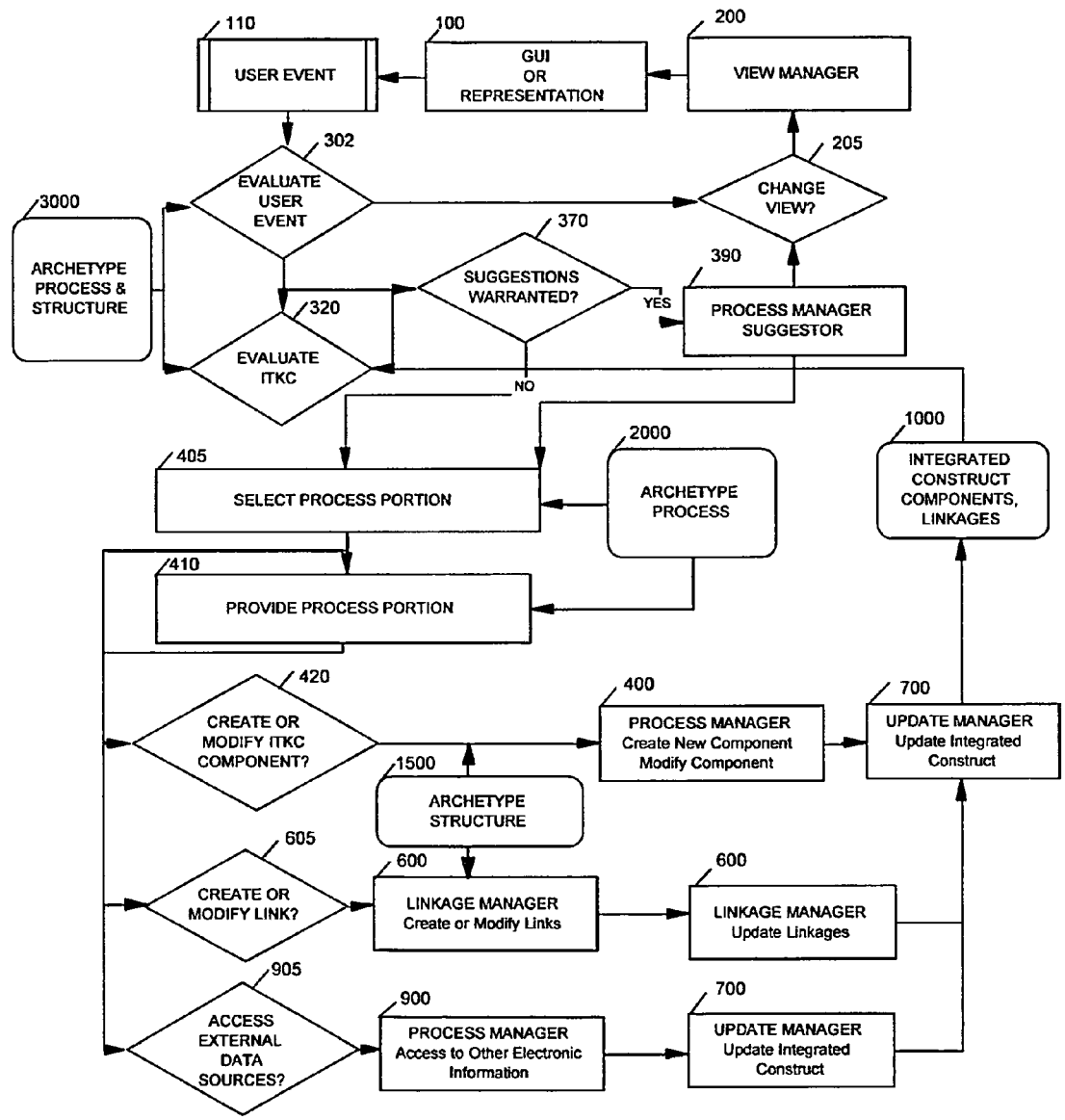

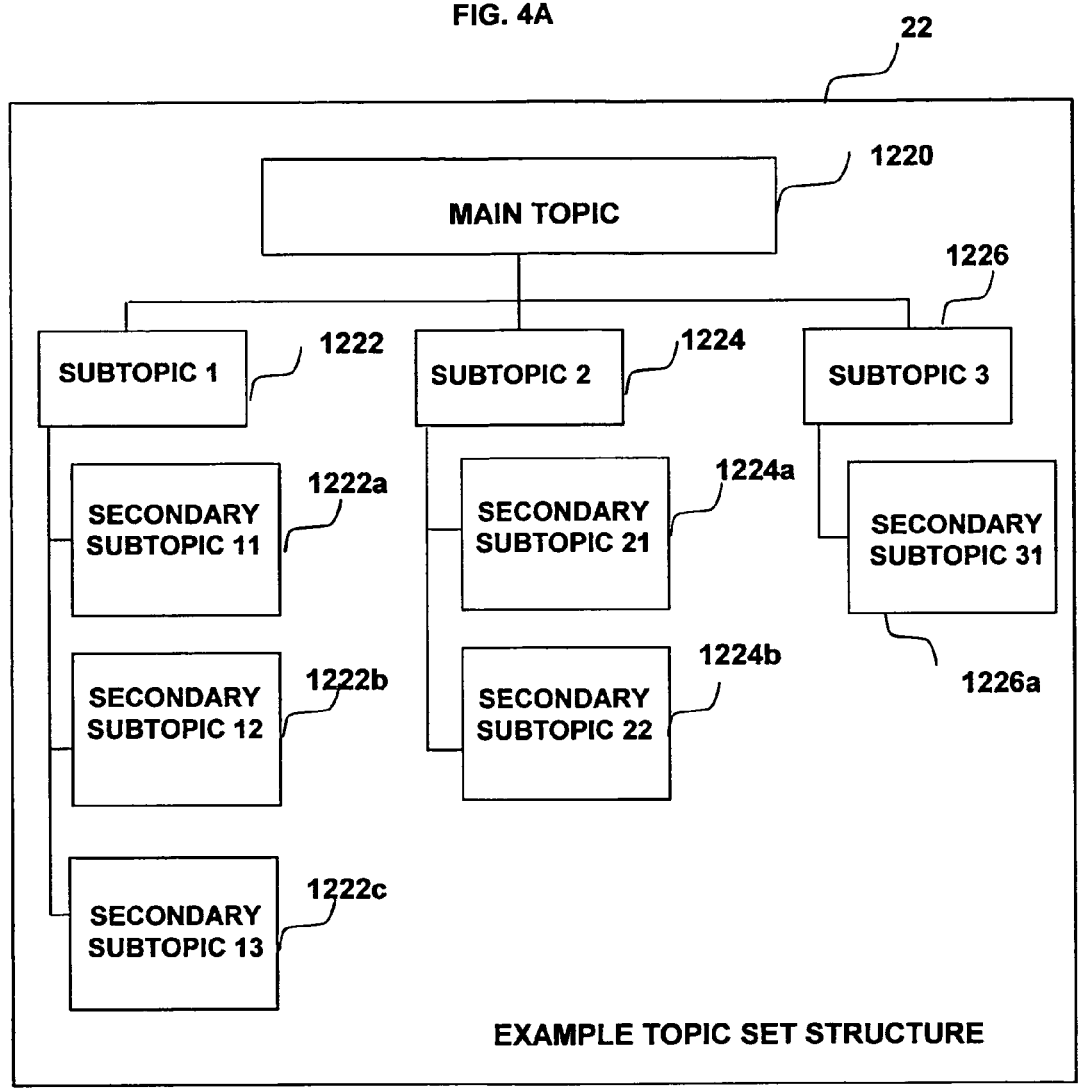

EXAMPLE TOPIC SET STRUCTURE

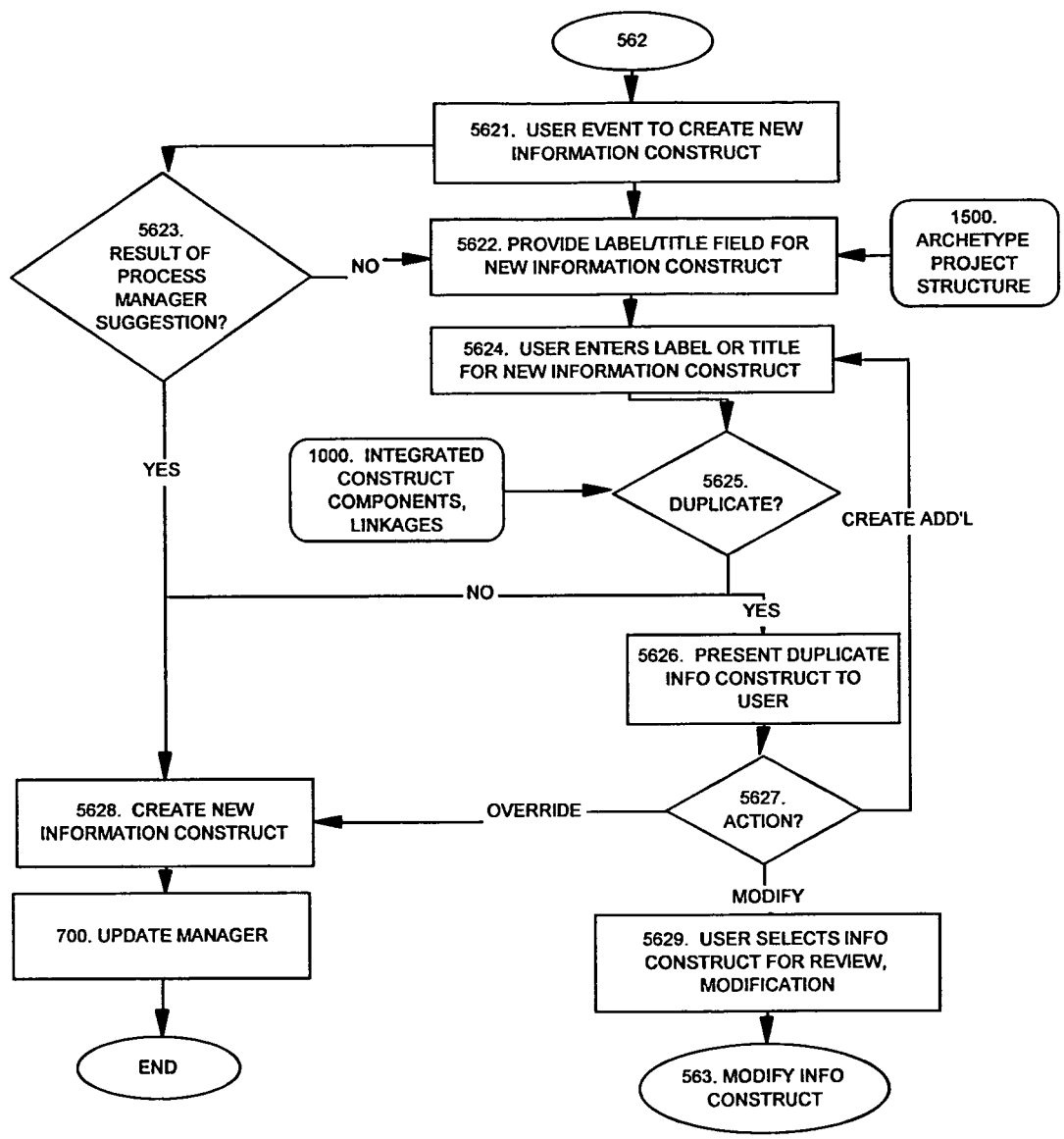

FIG. 5D-20

```
INFORMATION CONSTRUCT LABEL:  [                    ]
INFORMATION CONSTRUCT TYPE:   [ Person ]  | Person  |
                                          | Place   |
                                          | Thing   |
UNFORMATTED INFORMATION ELEMENTS:         | Idea    |
                                          | Event   |
                                          | Custom  |
                                          | Other   |
[                                                  ]

FORMATTED INFORMATION ELEMENTS
NAME:         [                    ]  Text Characters BIRTH DATE:   [          ]   MM/DD/YYYY or YYYY

DEATH DATE:   [          ]   YYYY

BIRTH PLACE:  [          ]
                             Text Characters
BELIEFS:
| BELIEF 1: |
| BELIEF 2: |
| BELIEF 3: |

SELECT TO ADD            | Importance       ▲
ADDITIONAL ELEMENTS:     | Family           |
                         | Accomplishments  |
                         | Background       |
                         | Characteristics  |
                         | Education        |
                         | Custom           |
                         | Other            ▼
```

42b

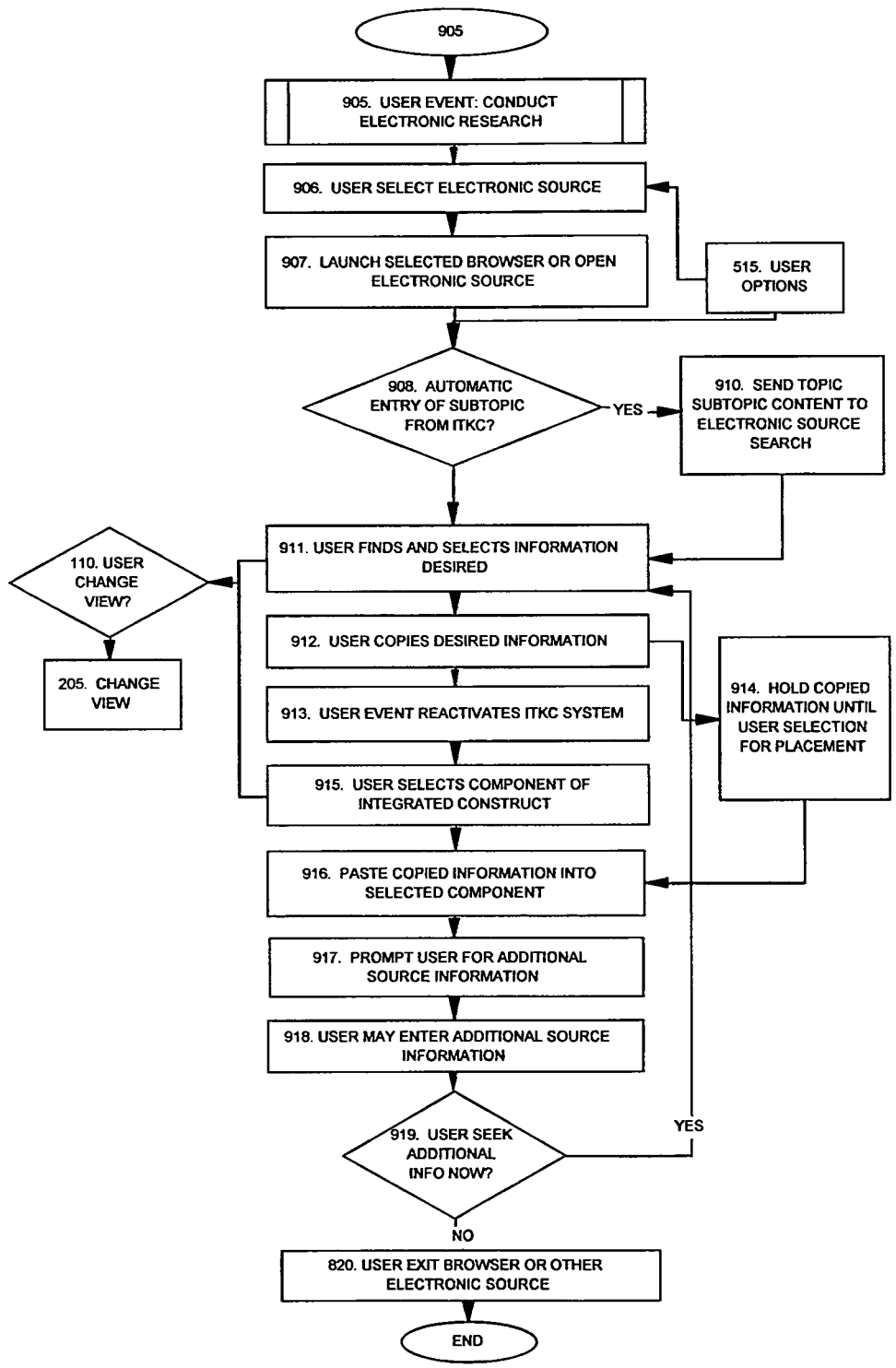

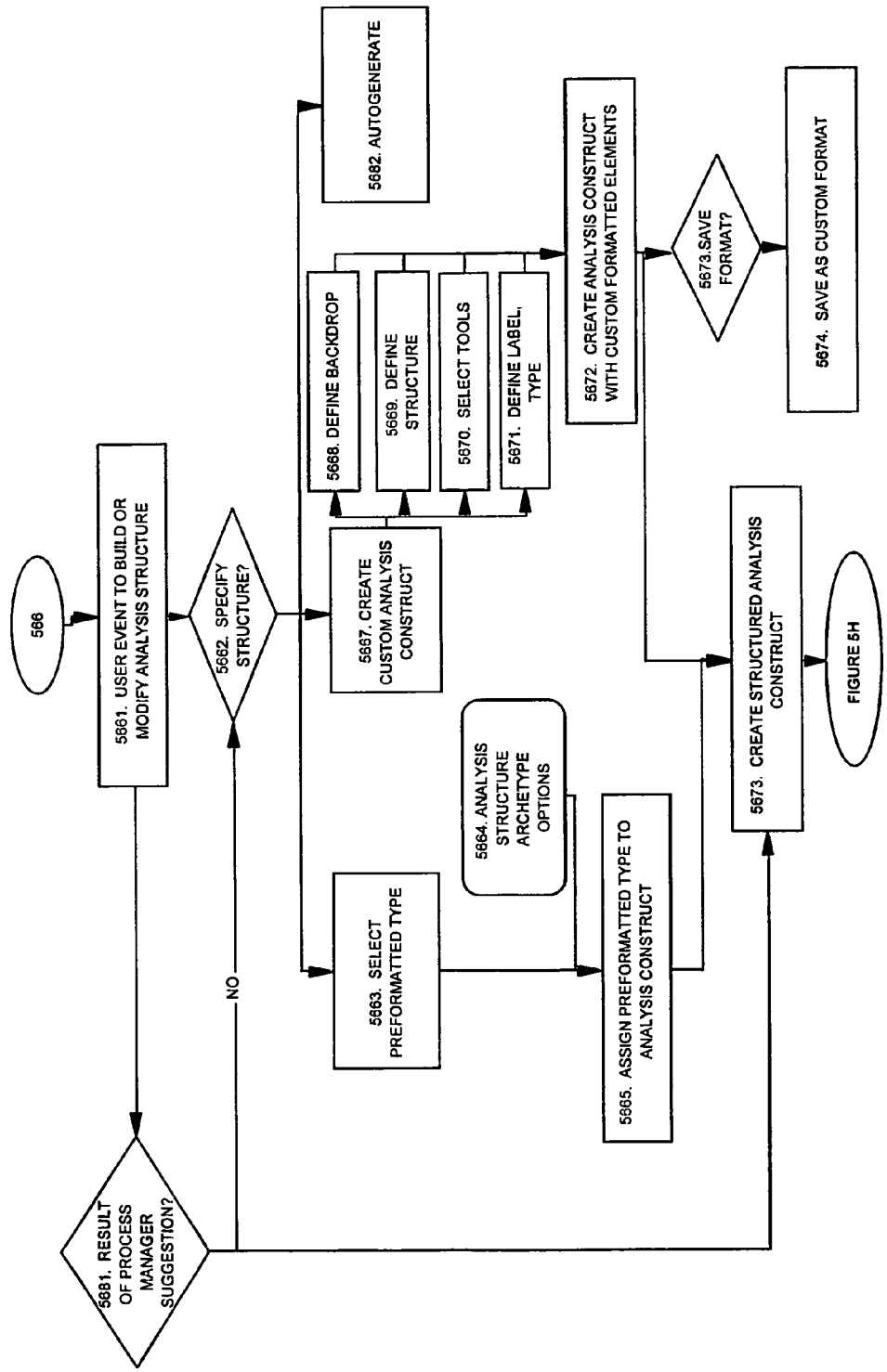

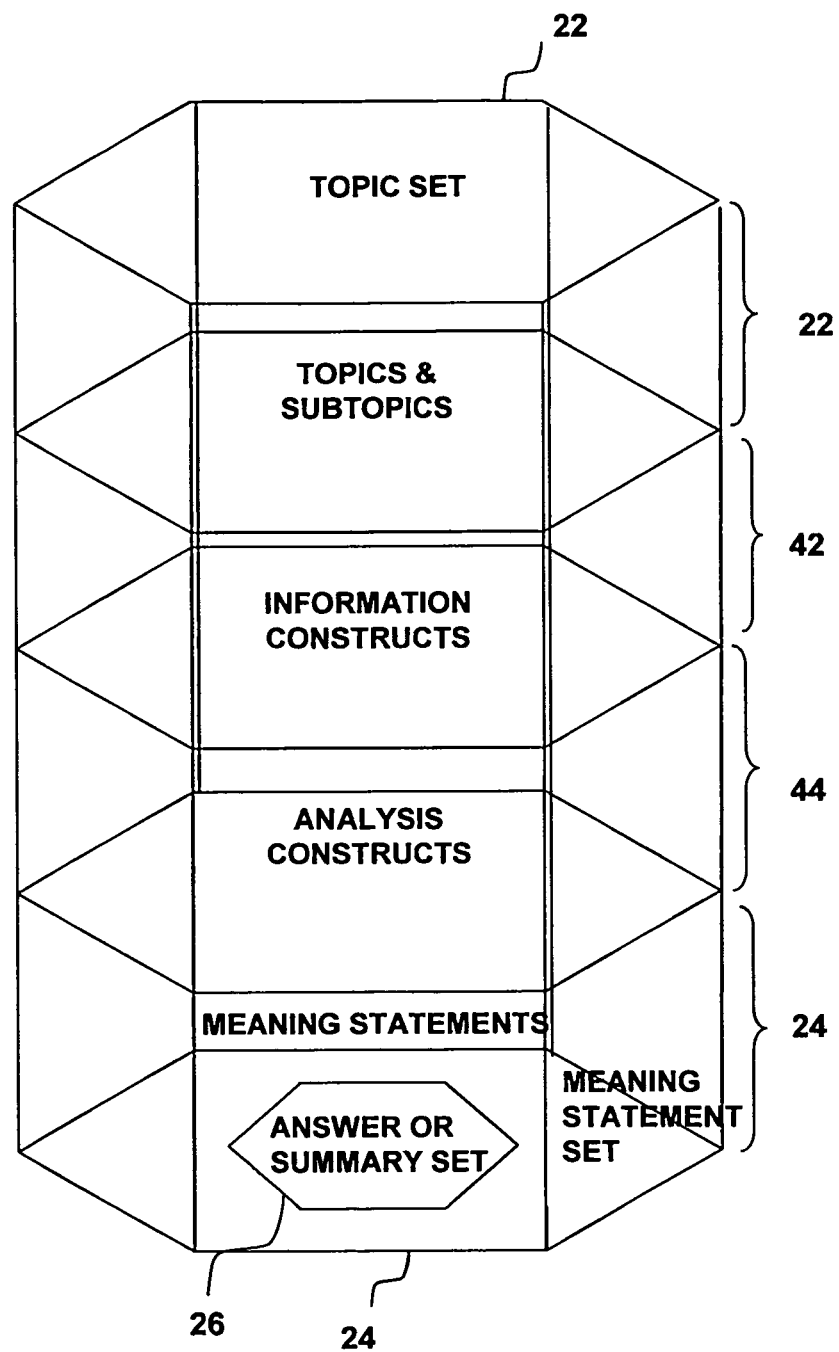

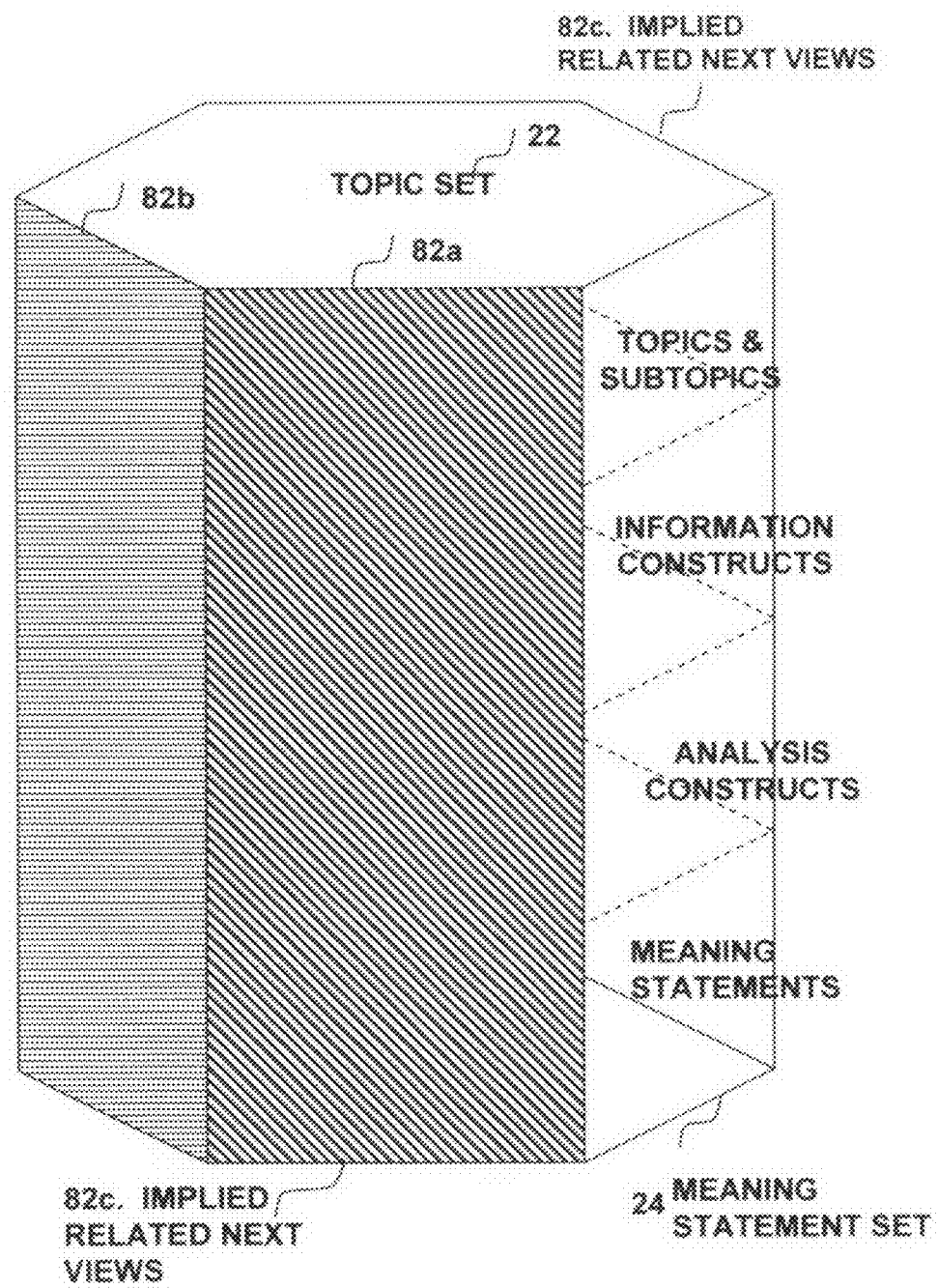

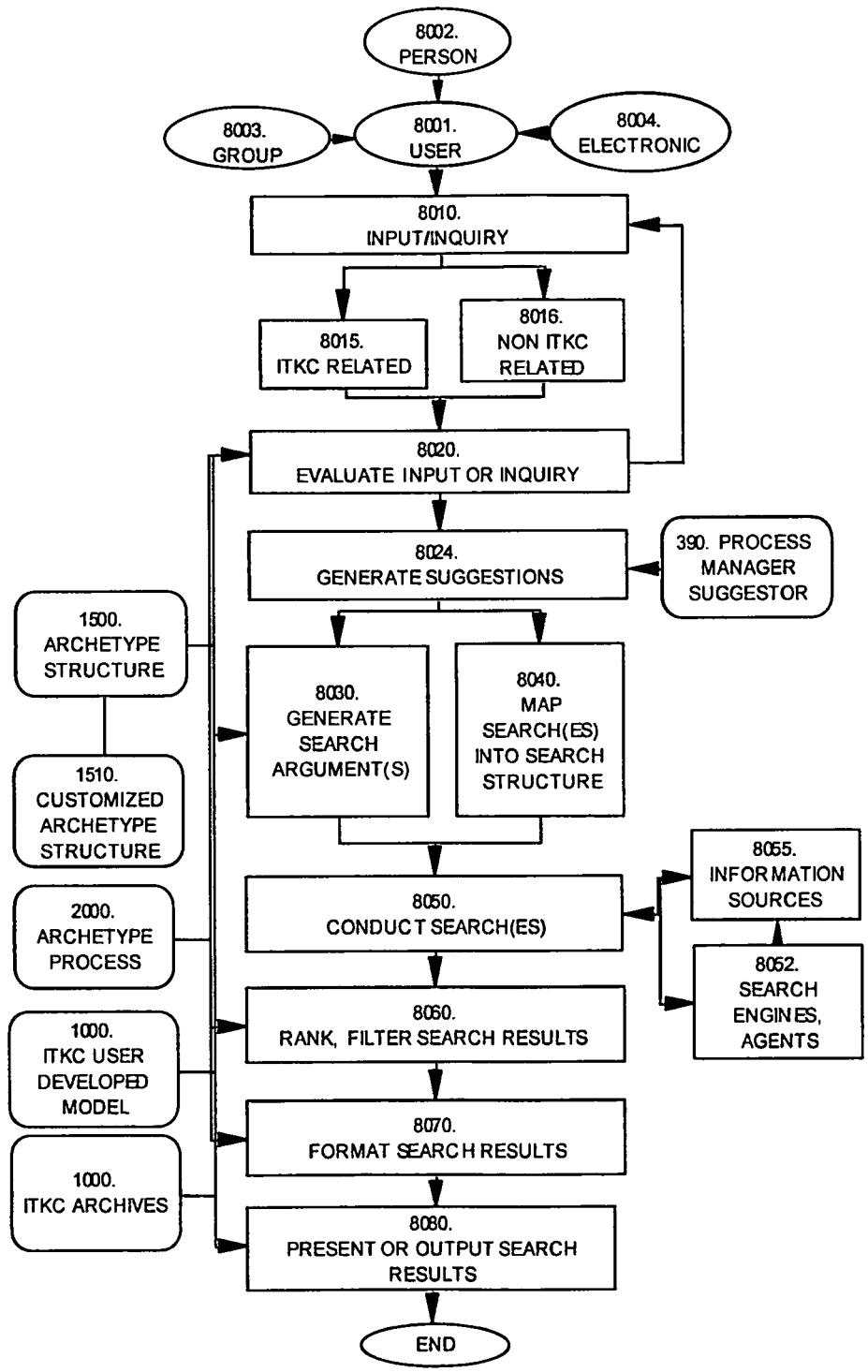

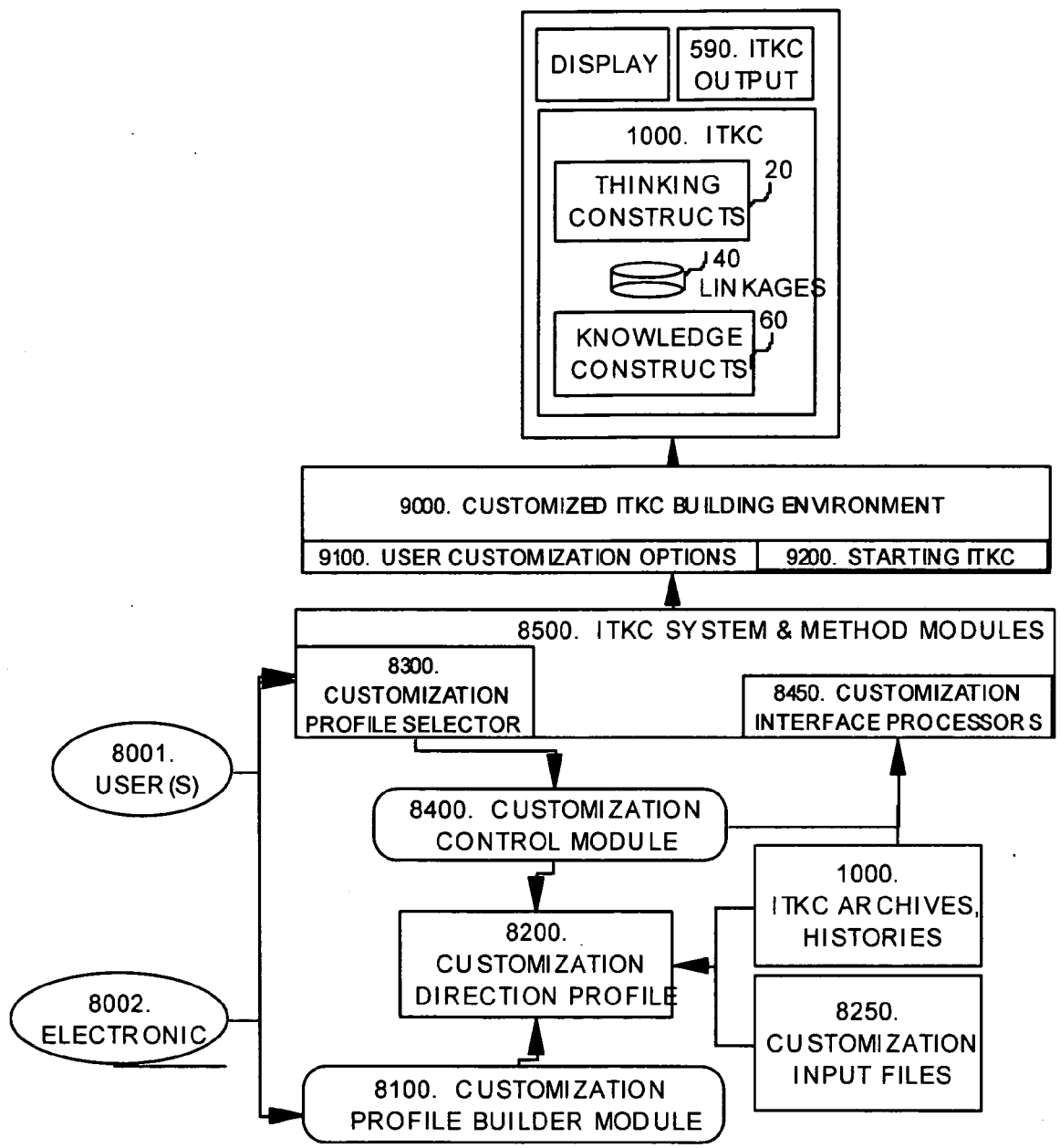

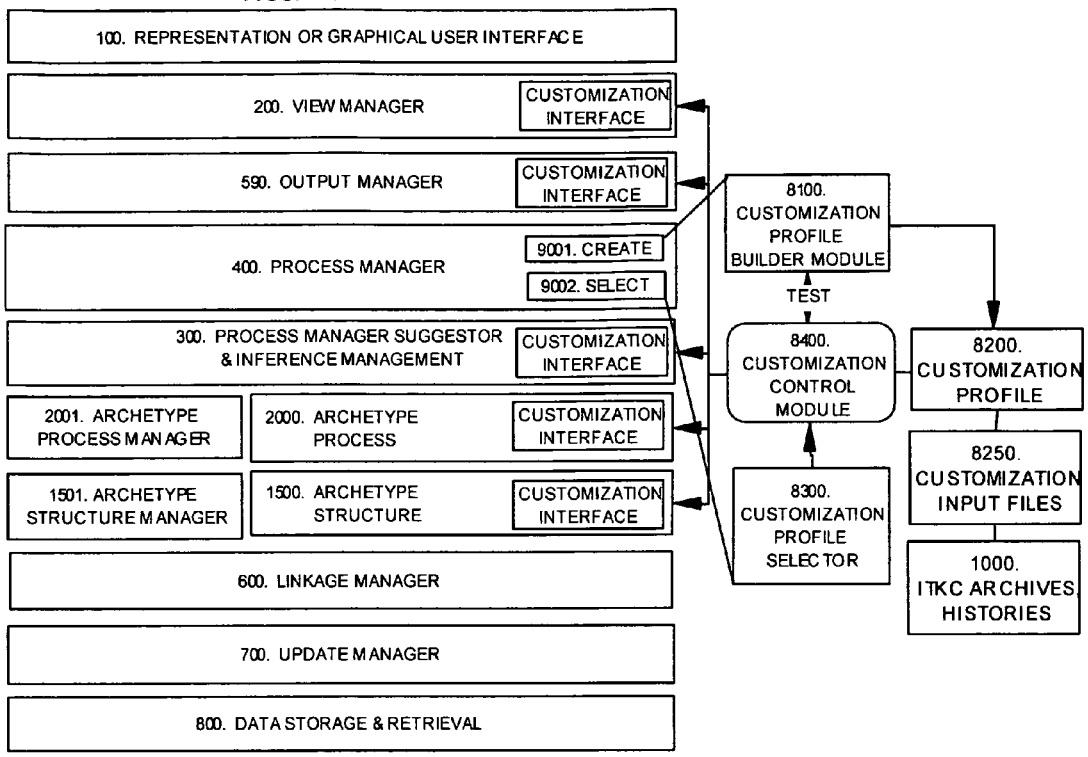

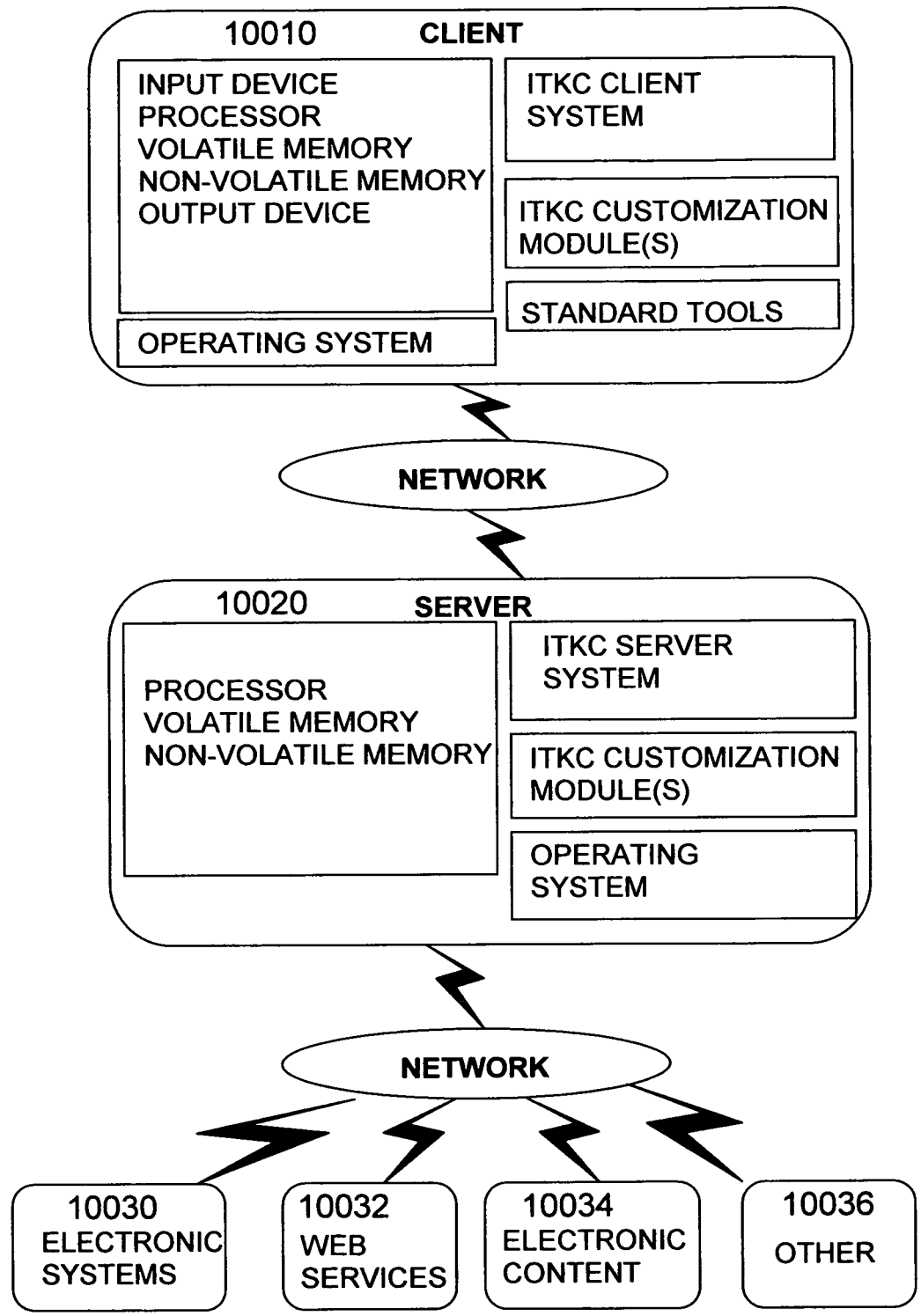

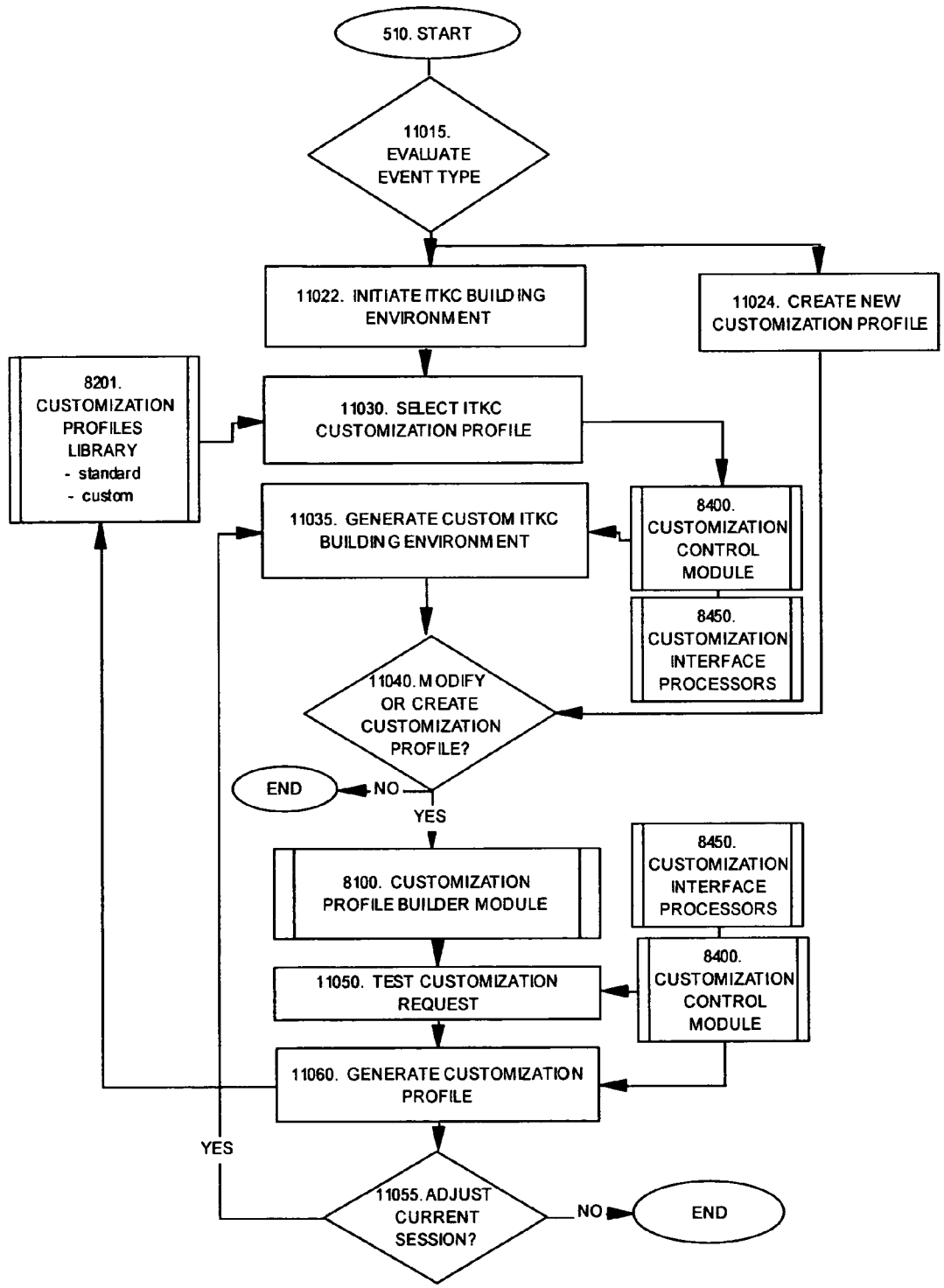

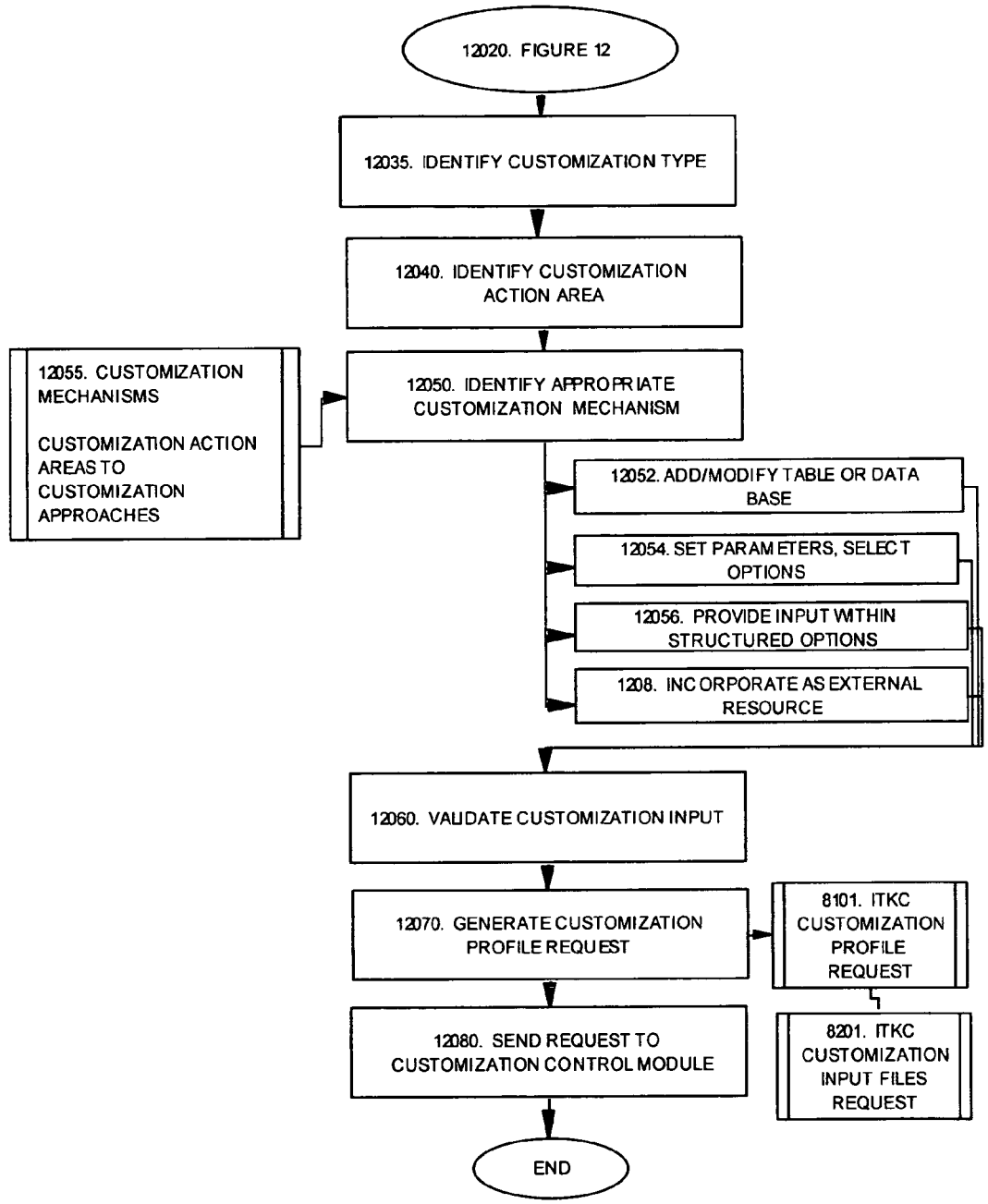

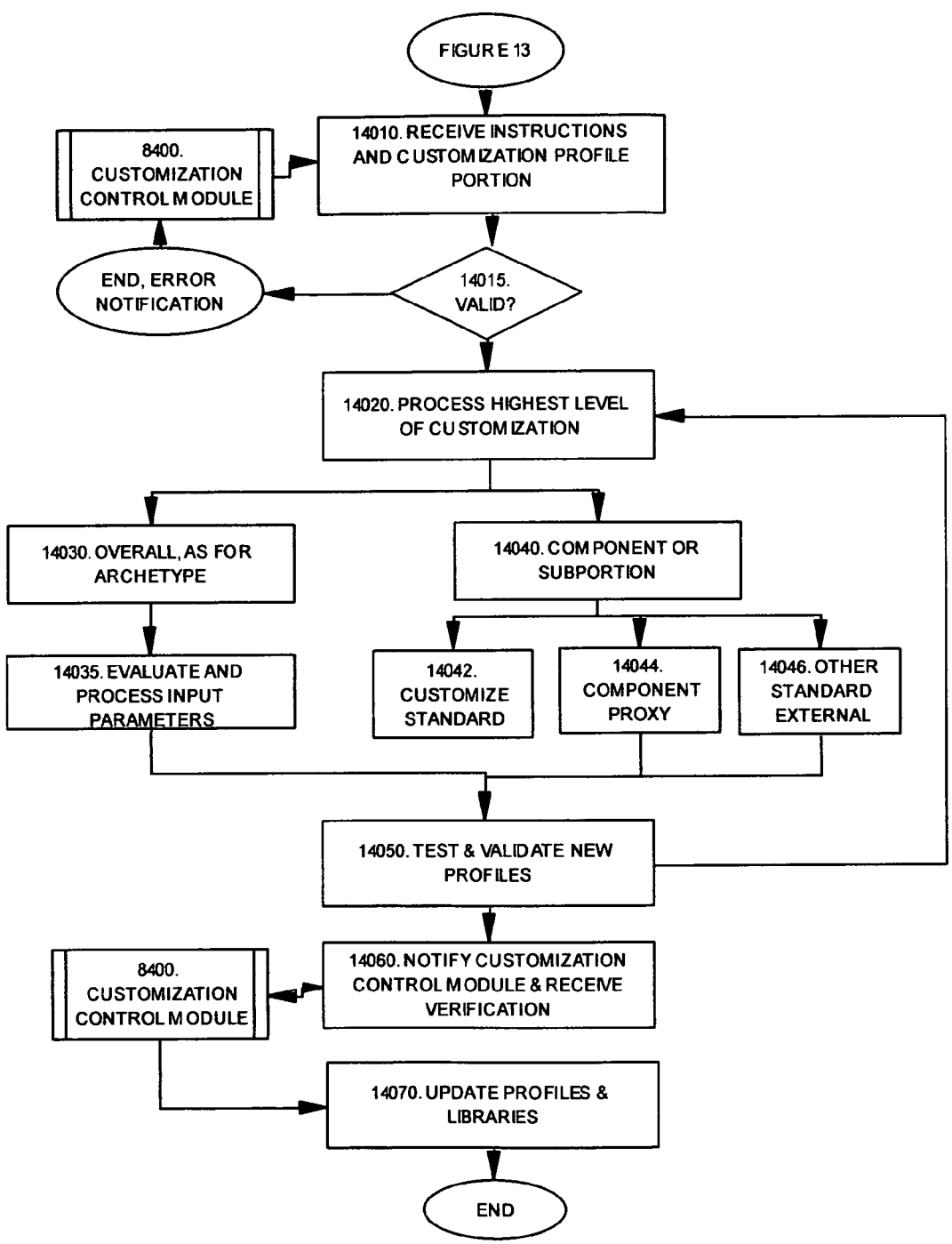

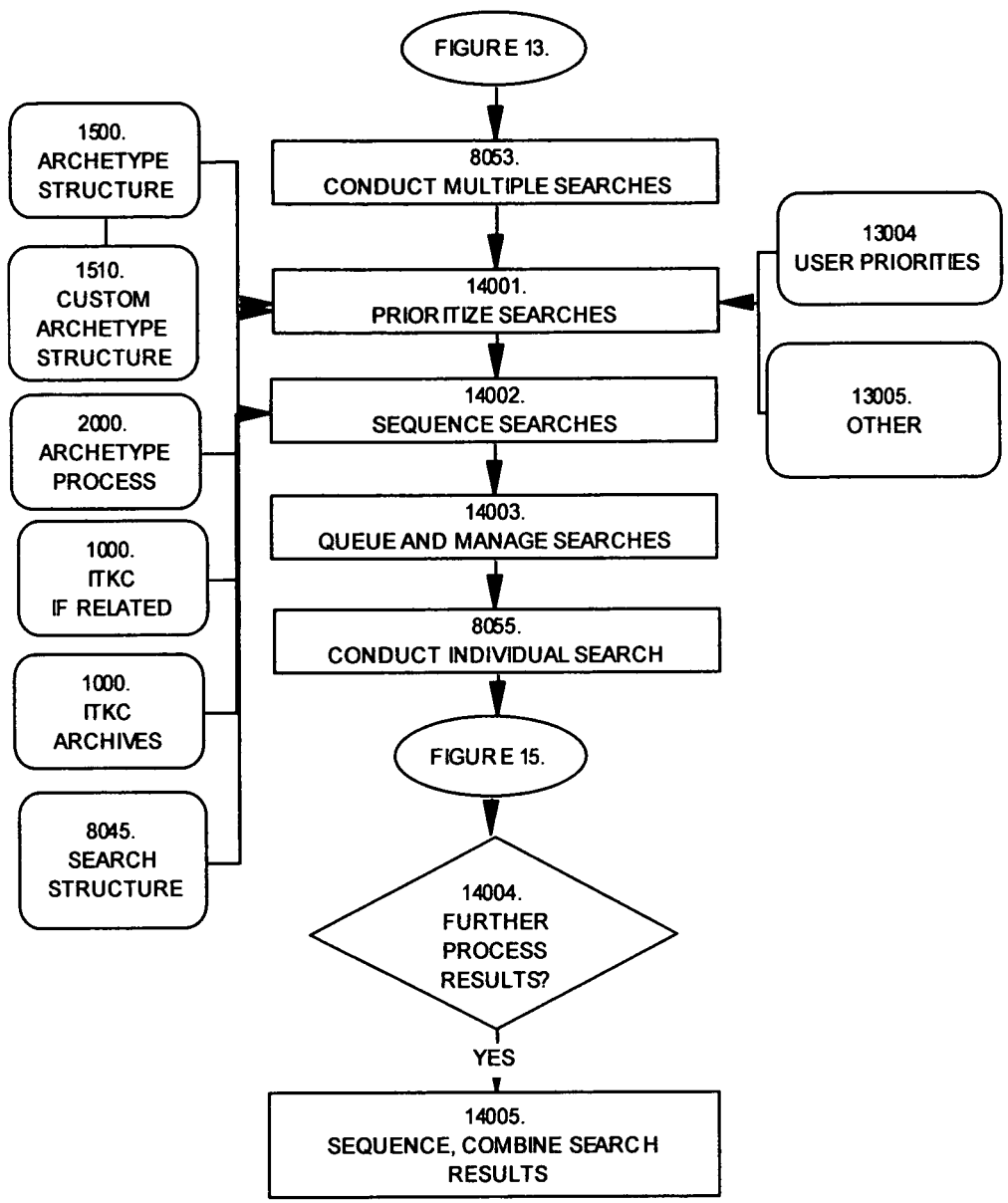

FIGURE 16

Customized ITKC Building Environment Set-Up

Experience Name: [                    ]   Set User Access

Select Customization Basis

Archetype Structure

☐ Thinking Structures

☐ Question or Topic Set
☐ Meaning Set
☐ Answer or Summary Set
☐ Custom

☐ Analysis Constructs

☐ Information Constructs

☐ Custom

☐ Relationships

☐ View Types          ☐ Output Form

Archetype Process

☐ Select Process Portions, Set Parameters

☐ Suggestions On     Off

☐ Custom

☐ Include Information References

☐ External Resource Settings

☐ Starting ITKC

☐ Assignment, Requirements, Directions

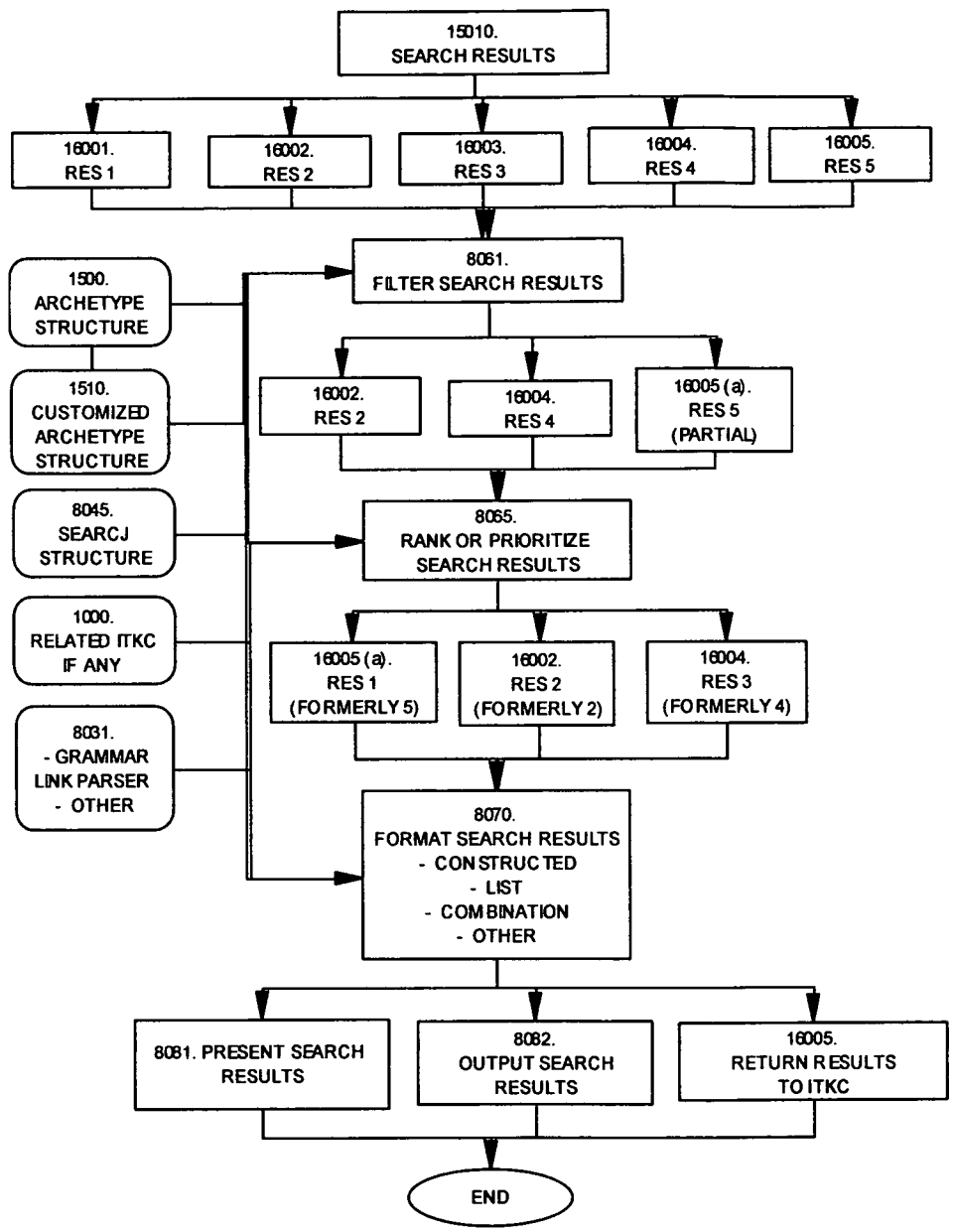

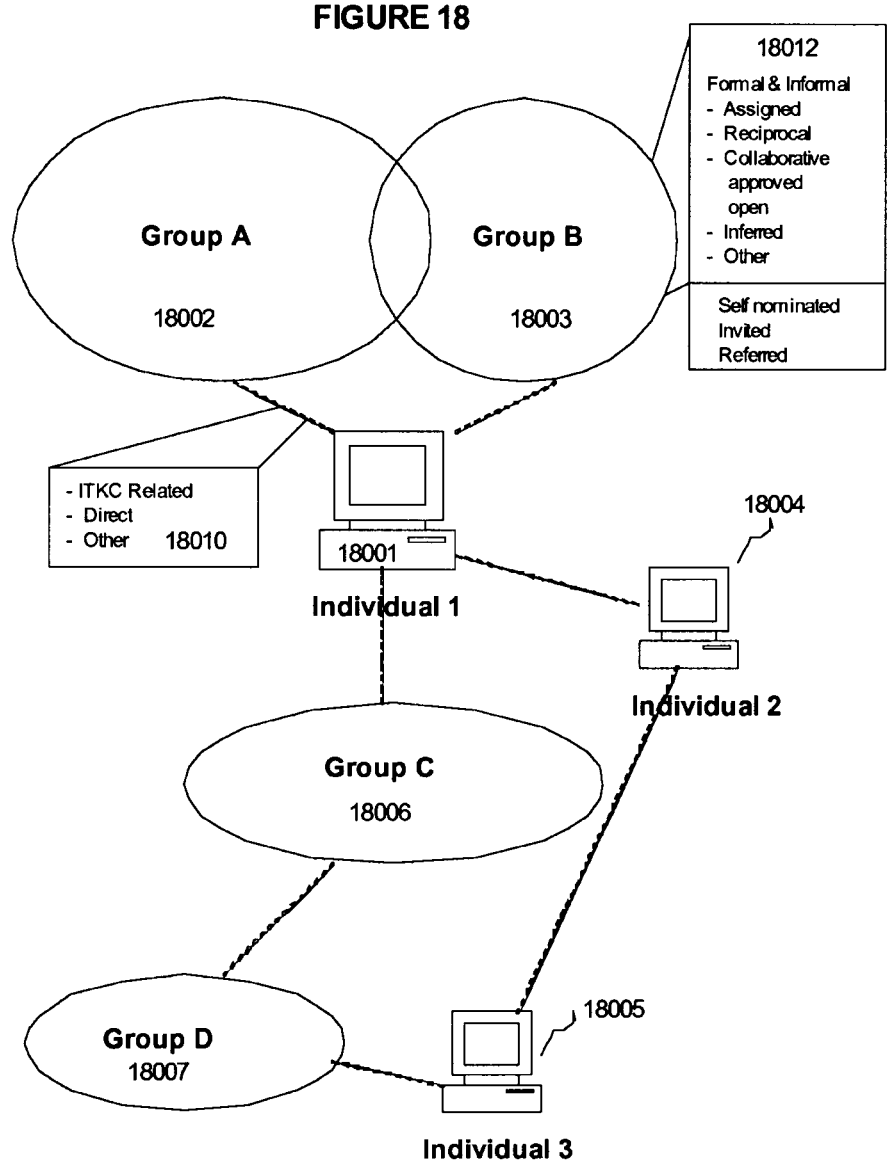

SYSTEM AND METHOD TO PROVIDE A CUSTOMIZED PROBLEM SOLVING ENVIRONMENT FOR THE DEVELOPMENT OF USER THINKING ABOUT AN ARBITRARY PROBLEM

CROSS REFERENCE TO RELATED APPLICATIONS

This application is a continuation-in-part of and claims the benefit of priority under 35 USC 120 to U.S. application Ser. No. 12/660,259, filed Feb. 22, 2010, now U.S. Pat. No. 8,019,711 entitled System and Method to Provide a Customized Problem Solving Environment for the Development of User Thinking About an Arbitrary Problem, incorporated by reference in its entirety herein, which is a continuation of and claims priority under 35 U.S.C. §120 to U.S. patent application Ser. No. 11/709,118, filed Feb. 20, 2007, now U.S. Pat. No. 7,685,085, entitled System and Method to Facilitate User Thinking About an Arbitrary Problem with Output and Interfaces to External Components and Resources, which is incorporated by reference in its entirety herein, which is a continuation of and claims priority under 35 USC §120 to U.S. patent application Ser. No. 11/148,129, filed Jun. 8, 2005 now U.S. Pat. No. 7,260,561, entitled System and Method to Facilitate User Thinking About an Arbitrary Problem with Output and Interfaces to External Components and Resources, which is incorporated herein by reference in its entirety, which claims the benefit of priority under 35 USC 119(e) to U.S. Provisional Applications Nos. 60/578,102, 60/578,081 and 60/578,083 filed on Jun. 8, 2004, incorporated by reference, and which also is a continuation-in-part of and claims priority to U.S. application Ser. No. 10/705,651, now U.S. Pat. No. 7,197,488, entitled System and Method for Facilitating and Evaluating User Thinking About an Arbitrary Problem Using an Archetype Structure, filed on Nov. 10, 2003, which is incorporated by reference in its entirety herein. This application is a continuation in part of and claims the benefit of priority under 35 USC 120 to U.S. application Ser. No. 12/660,259, filed Feb. 22, 2010, now U.S. Pat. No. 8,019,711, entitled System and Method to Provide a Customized Problem Solving Environment for the Development of User Thinking about an Aribitrary Problem, incorporated by reference in its entirety herein, which is a continuation of U.S. application Ser. No. 11/709,118 (as described above) now U.S. Pat. No. 7,685,085, incorporated by reference in its entirety herein, entitled System and Method to Facilitate User Thinking About an Arbitrary Problem with Output and Interfaces to External Components and Resources, which is also related to U.S. patent application Ser. No. 11/147,874, now U.S. Pat. No. 7,349,888, filed on Jun. 8, 2005, entitled System and Method to Customize the Facilitation of Development of User Thinking About and Documenting of an Arbitrary Problem, incorporated therein by reference in its entirety, and incorporated in Ser. No. 12/660,259 and Ser. No. 11/709,118, and this application by reference in its entirety, which claims the benefit of priority to U.S. Provisional Nos. 60/578,102, 60/578,081 and 60/578,083 filed on Jun. 8, 2004, and which is a continuation in part of and claims the benefit of priority to U.S. application Ser. No. 10/705,651, now U.S. Pat. No. 7,197,488, entitled System and Method for Facilitating and Evaluating User Thinking About an Arbitrary Problem Using an Archetype Structure, filed on Nov. 10, 2003, which is incorporated by reference in its entirety herein.

This application is a continuation-in-part of and claims the benefit of priority under 35 USC 120 to U.S. application Ser. No. 12/583,176, filed Aug. 14, 2009, entitled Computer Implemented System and Method for Facilitating and Evaluating User Thinking about an Arbitrary Problem, now U.S. Pat. No. 8,019,710, which is a continuation of and claims priority under 35 USC 120 to U.S. patent application Ser. No. 11/486,157 entitled Computer Implemented System and Method for Facilitating and Evaluating User Thinking about an Arbitrary Problem, filed on Jul. 13, 2006, now U.S. Pat. No. 7,577,629 which is incorporated herein, and which is a continuation of and claims priority under 35 USC 120 to U.S. patent application Ser. No. 10/513,900 filed on Nov. 9, 2004, entitled System and Method of Facilitating and Evaluating User Thinking About an Arbitrary Problem, now U.S. Pat. No. 7,143,074, which was the National Stage of and which claims the benefit of priority to International Application No. PCT/US03/35716 filed Nov. 10, 2003, which claims the benefit of priority to U.S. Provisional Application No. 60/425,343, filed Nov. 11, 2002, entitled "Integrated Thinking and Knowledge Construct, and Building and Viewing Method and System for Same," incorporated by reference.

This application is a continuation in part of and claims the benefit of priority under 35 USC §120 to U.S. patent application Ser. No. 13/068,792, filed May 21, 2011, now U.S. Pat. No. 8,306,927, entitled Systems and Methods for Archetype Enabled Research and Search, incorporated by reference in its entirety herein, which is a continuation of and claims the benefit of priority under 35 USC §120 to U.S. patent application Ser. No. 11/985,264, entitled Systems and Methods for Facilitating User Thinking About an Arbitrary Problem with Archetype Enabled Search, filed on Nov. 13, 2007, now U.S. Pat. No. 7,962,433, which is incorporated by reference in its entirety herein, and which is a continuation of and claims the benefit of priority under 35 USC §120 to U.S. patent application Ser. No. 11/435,473, entitled Systems and Methods for Archetype Enabled Research and Search, filed on May 17, 2006, now U.S. Pat. No. 7,730,009, which is incorporated by reference in its entirety herein, and which claims the benefit of priority under 35 U.S.C. 119(e) to U.S. Provisional Application No. 60/681,792, filed on May 17, 2005, which is herein incorporated by reference, and which is a continuation-in-part and claims priority under 35 USC §120 to U.S. patent application Ser. No. 10/705,654, filed on Nov. 10, 2003, entitled System and Method of Facilitating and Evaluating User Thinking About an Arbitrary Problem Using an Archetype Process, now U.S. Pat. No. 7,203,667, which is incorporated by reference, and which claims the benefit of priority under 35 USC 119(e) to U.S. Provisional Application 60/425,343, filed Nov. 11, 2002, entitled "Integrated Thinking and Knowledge Construct, and Building and Viewing Method and System for Same," incorporated by reference.

This application is a continuation in part of and claims the benefit of priority under 35 USC §120 to U.S. patent application Ser. No. 13/068,180, filed May 4, 2011, System and Method to Facilitate and Document User Thinking About an Arbitrary Problem with Collaboration System, incorporated by reference in its entirety herein, which is a continuation-in-part of and claims priority under 35 USC §120 to U.S. application Ser. No. 12/803,916, filed Jul. 9, 2010, entitled System and Method for Facilitating Collaboration and Related Multiple User Thinking and Cooperation Regarding an Arbitrary Problem, now U.S. Pat. No. 8,027,944, incorporated by reference herein in its entirety, which is a continuation of and claims the benefit of priority under 35 USC §120 to U.S. application Ser. No. 11/985,225, now U.S. Pat. No. 7,756,806, filed Nov. 13, 2007, entitled System and Method for Facilitating Collaboration and Related Multiple User Thinking and Cooperation Regarding an Arbitrary Problem, which is incorporated by reference in its entirety herein, which is a continuation of and claims the benefit of priority under 35 USC §120 to U.S. application Ser. No. 11/805,170, filed May 22, 2007, now U.S. Pat. No. 7,720,780, entitled System and Method for Facilitating Collaboration and Multiple User Thinking and Cooperation Regarding an Arbitrary Problem, which is incorporated by reference in its entirety herein, which claims the benefit of priority under 35 USC 119(e) of U.S. Provisional Application 60/808,784, filed on May 25, 2006, and which is a continuation-in-part of and claims priority under 35 USC §120 to U.S. application Ser. No. 10/704,897, now U.S. Pat. No. 7,225,175, filed on Nov. 10, 2003, entitled System and Method to Facilitate and Evaluate User Thinking About an Arbitrary Problem Using Visual Feedback, which is incorporated by reference in its entirety, which claims the benefit of priority under 35 USC 119(e) to U.S. Provisional Application 60/425,343, filed Nov. 11, 2002, entitled "Integrated Thinking and Knowledge Construct, and Building and Viewing Method and System for Same," incorporated by reference in its entirety. This application is a continuation in part of U.S. application Ser. No. 13/068,180, filed May 4, 2011, entitled System and Method to Facilitate and Document User Thinking About an Arbitrary Problem with Collaboration System, incorporated by reference in its entirety herein, which is also a continuation in part of and claims the benefit of priority under 35 U.S.C. §120 to U.S. application Ser. No. 11/980,281, entitled System and Method to Facilitate User Thinking About an Arbitrary Problem with Collaboration or Social Networking System, filed Oct. 29, 2007, now U.S. Pat. No. 8,032,470 and incorporated by reference herein in its entirety, which is a continuation-in-part of and claims the benefit of priority under 35 U.S.C. §120 to U.S. patent application Ser. No. 11/709,118, filed on Feb. 20, 2007, now U.S. Pat. No. 7,685,085, entitled System and Method to Facilitate User Thinking About an Arbitrary Problem with Output and Interfaces to External Components and Resources, which is incorporated herein by reference in its entirety, which is a continuation of and claims priority under 35 USC §120 to U.S. patent application Ser. No. 11/148,129, filed Jun. 8, 2005, now U.S. Pat. No. 7,260,561, entitled System and Method to Facilitate User Thinking About an Arbitrary Problem with Output and Interfaces to External Components and Resources, which is incorporated herein by reference in its entirety, which claims priority under 35 USC 119(e) to U.S. Provisional Patent Application Nos. 60/578,102, 60/578,081 and 60/578,083 filed on Jun. 8, 2004; and which is a continuation-in-part and claims priority under 35 U.S.C. §120 to U.S. patent application Ser. No. 10/705,651, now U.S. Pat. No. 7,197,488, filed on Nov. 10, 2003, entitled System and Method for Facilitating and Evaluating User Thinking About an Arbitrary Problem Using an Archetype Structure, which is incorporated by reference in its entirety herein. This application is a continuation in part of U.S. application Ser. No. 13/068,180, filed May 4, 2011, incorporated by reference in its entirety herein, which is also a continuation in part of and claims the benefit of priority under 35 U.S.C. §120 to U.S. application Ser. No. 11/980,281, filed on Oct. 29, 2007, now U.S. Pat. No. 8,032,470, entitled System and Method to Facilitate User Thinking About an Arbitrary Problem with Collaboration or Social Networking System, incorporated by reference in its entirety herein, which is also a continuation-in-part of and claims the benefit of priority under 35 USC §120 to U.S. patent application Ser. No. 11/147,874 filed Jun. 8, 2005, now U.S. Pat. No. 7,349,888, entitled System and Method to Customize the Facilitation of Development of User Thinking About and Documenting of an Arbitrary Problem, which is incorporated by reference in its entirety herein, which claims priority under 35 USC 119(e) to U.S. Provisional Patent Application Nos. 60/578,102, 60/578,081 and 60/578,083, filed on Jun. 8, 2004, which are incorporated herein by reference in their entirety; and which is a continuation-in-part of and claims priority under USC §120 to U.S. patent application Ser. No. 10/705,651, entitled System and Method for Facilitating and Evaluating User Thinking About an Arbitrary Problem Using an Archetype Structure, now U.S. Pat. No. 7,197,488, filed on Nov. 10, 2003, which is incorporated by reference in its entirety herein.

This application is a continuation in part of and claims the benefit of priority under 35 USC 120 to U.S. application Ser. No. 13/134,675, filed Jun. 13, 2011, incorporated by reference in its entirety herein, which is a continuation in part of and claims the benefit of priority under 35 USC 120 to U.S. application Ser. No. 11/980,240, filed Oct. 30, 2007, entitled Systems and Methods for Facilitating User Thinking About an Arbitrary Problem with Additional Search Capabilities, now U.S. Pat. No. 7,962,430, which is incorporated by reference in its entirety herein, which is a continuation-in-part of and claims the benefit of priority under 35 U.S.C. §120 to U.S. patent application Ser. No. 11/709,118, filed on Feb. 20, 2007, now U.S. Pat. No. 7,685,085, entitled System and Method to Facilitate User Thinking About an Arbitrary Problem with Output and Interfaces to External Components and Resources, which is incorporated herein by reference in its entirety, which is a continuation of and claims priority under 35 USC §120 to U.S. patent application Ser. No. 11/148,129, filed Jun. 8, 2005, now U.S. Pat. No. 7,260,561 entitled System and Method to Facilitate User Thinking About an Arbitrary Problem with Output and Interfaces to External Components and Resources, which is incorporated herein by reference in its entirety, which claims priority under 35 USC 119(e) to U.S. Provisional Patent Application Nos. 60/578, 102, 60/578,081 and 60/578,083, filed on Jun. 8, 2004, incorporated herein by reference in their entirety; and which is a continuation-in-part and claims priority under 35 U.S.C. §120 to U.S. patent application Ser. No. 10/705,651, now U.S. Pat. No. 7,197,488, filed on Nov. 10, 2003, entitled System and Method for Facilitating and Evaluating User Thinking About an Arbitrary Problem Using an Archetype Structure, which is incorporated by reference in its entirety herein. application Ser. No. 13/134,675 of which this application is a continuation in part, incorporated by reference in its entirety herein, is a continuation in part of application Ser. No. 11/980,240, filed Oct. 30, 2007, now U.S. Pat. No. 7,962,430, entitled Systems and Methods for Facilitating User Thinking About an Arbitrary Problem with Additional Search Capabilities, incorporated by reference herein, which is also a continuation-in-part of and claims the benefit of priority under 35 USC §120 to U.S. patent application Ser. No. 11/147,874 filed Jun. 8, 2005, now U.S. Pat. No. 7,349,888, entitled System and Method to Customize the Facilitation of Development of User Thinking About and Documenting of an Arbitrary Problem, which is incorporated by reference in its entirety herein, which claims priority under 35 USC 119(e) to U.S. Provisional Patent Application Nos. 60/578,102, 60/578,081 and 60/578,083, filed on Jun. 8, 2004, incorporated herein by reference in their entirety; and which is a continuation-in-part of and claims priority under USC §120 to U.S. patent application Ser. No. 10/705,651, entitled System and Method for Facilitating and Evaluating User Thinking About an Arbitrary Problem Using an Archetype Structure, now U.S. Pat. No. 7,197,488, filed on Nov. 10, 2003, which is incorporated by reference in its entirety herein. application Ser. No. 11/980,240, filed Oct. 30, 2007 now U.S. Pat. No. 7,962,430, entitled Systems and Methods for Facilitating User Thinking About an Arbitrary Problem with Additional Search Capabilities, incorporated by reference herein is also related to U.S. application Ser. No. 11/805,170, filed May 22, 2007, now U.S. Pat. No. 7,720,780, entitled System and Method for Facilitating Collaboration and Related Multiple User Thinking and Cooperation Regarding an Arbitrary Problem, incorporated by reference in its entirety herein (and which claims priority under USC 119(e) to U.S. Provisional No. 60/808,784, filed on May 25, 2006, entitled Method and System for Facilitating Collaboration or Related Individual Problem Solving Cooperation Regarding an Arbitrary Problem), which is a continuation-in-part of and claims priority under 35 USC §120 to U.S. application Ser. No. 10/704,897, now U.S. Pat. No. 7,225,175, filed on Nov. 10, 2003, entitled System and Method of Facilitating and Evaluating User Thinking About an Arbitrary Problem Using Visual Feedback, which is incorporated by reference in its entirety, which claims the benefit of priority under 35 USC 119(e) to U.S. Provisional Application 60/425,343, filed Nov. 11, 2002, entitled "Integrated Thinking and Knowledge Construct, and Building and Viewing Method and System for Same," incorporated by reference. application Ser. No. 13/134,675 (of which this application Ser. No. 13/199,857 is a continuation-in-part) incorporated by reference in its entirety herein, is also a continuation-in-part of and claims the benefit of priority under 35 USC §120 to application Ser. No. 12/462,717, filed Aug. 6, 2009, now U.S. Pat. No. 8,290,888, entitled System and Method of Facilitating and Evaluating User Thinking about an Arbitrary Problem using an Archetype Process, incorporated by reference in its entirety herein, which is also a continuation of and claims the benefit of priority under 35 USC §120 to U.S. patent application Ser. No. 11/710,051, now U.S. Pat. No. 7,596,537, entitled System and Method to Facilitate and Evaluate User Thinking about an Arbitrary Problem using an Archetype Process, incorporated by reference in its entirety herein, which claims priority under 35 USC 119(e) to U.S. Provisional Patent Application Nos. 60/578,102, 60/578,081 and 60/578,083, filed on Jun. 8, 2004, incorporated herein by reference in their entirety; and which is a continuation-in-part of and claims priority under USC §120 to U.S. patent application Ser. No. 10/705,654, entitled System and Method of Facilitating and Evaluating User Thinking About an Arbitrary Problem Using an Archetype Process, now U.S. Pat. No. 7,203,667, filed on Nov. 10, 2003. which is incorporated by reference in its entirety herein, and which claims the benefit of priority under 35 USC 119(e) to US Provisional Application 60/425,343, filed Nov. 11, 2002, entitled "Integrated Thinking and Knowledge Construct, and Building and Viewing Method and System for Same," incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to systems and methods of facilitating and evaluating user thinking about an arbitrary problem.

BACKGROUND

It is widely recognized that good problem solving and thinking skills need to be learned and supported. The availability of computers and electronic information bring an opportunity to support this need. There is today no approach that teaches and supports creating problem solving and thinking as a whole, integrated discipline, including the evolution of the person's understanding of the problem, exercising of logic and judgment, development of knowledge and ideas, and the mastery of a comprehensive answer.

Today, the teaching of problem solving and thinking and related topics occurs as a result of many disparate activities. But these exercises are mostly taught separately and independently, and are unpredictable in their results. Whether an individual or a team becomes "end to end" problem solvers— capable of defining a problem, finding and researching information, developing their own understanding, defining alternatives and eventually an answer supported by their work—is uncertain.

Computer and information technology support of problem solving and thinking is fractured and focuses primarily on information handling activities. Separate and independent software programs support search and retrieval, information manipulation and management, information presentation and communication, and others. While this may be comfortable for many adults, little computer support exists for "thinking" and analysis logic particularly for the more qualitative topics that predominate. There are not software enabled processes that help guide good thinking, address the complexity of today's problems and information intensity and diversity of today's problems, and do so in way that balances generalizable and specialized or customized capabilities. There are also not software tools or products that do so for collaborative or other multi-user situations.

There is a need for a software tool that enables and supports a comprehensive problem solving and thinking process, especially in information intensive situations. There is a further need for a software tool that does so in a manner which allows for the customization of the environment provided to the user, especially to provide for more specialized, customized or content specific problem solving within the larger and more generalizable thinking and problem solving method and system. There is a further need for a software tool and approaches that support problem solving and take advantage of the standards and common approaches that increasingly and easily allow the incorporation of external resources and software components and modules to interact with and utilize one another. Given the vast amount of information available today, there is a further need for a software tool that provides for customized support for a user's information-intensive problem solving and thinking process, while also providing additional search capabilities in a manner that improves both the productivity and the quality of the work.

SUMMARY OF THE INVENTION

The invention provides systems and methods to facilitate user thinking about and documenting of thinking about an arbitrary problem. The system and methods are applicable for multiple users or teams, and for use by individuals or other electronic systems or resources. Some embodiments of the system and method provide the ability to customize the facilitation environment and the resulting models.

BRIEF DESCRIPTION OF THE FIGURES

FIG. 1B is a schematic diagram of an example development path for an integrated thinking and knowledge construct.

FIG. 2 is a schematic diagram of one example computing implementation environment for one embodiment.

FIG. 3A is a flowchart showing the general interaction of the architecture modules of one embodiment.

FIG. 3B-10 is an additional flowchart further related to the transactions and functions associated with one embodiment of the process manager suggestor.

FIG. 3C-10 is a flowchart providing further detail regarding one embodiment of the example view and representation manager module.

FIG. 3C-20 is a flowchart providing further detail regarding optimization by one embodiment of the view and representation manager.

FIG. 4A is an example structure for a topic set as a thinking structure of an integrated construct of one embodiment.

FIG. 4A-10 is an example of one embodiment of a topic set, specifically a topic set created for a history assignment in an educational setting.

FIG. 5 is a flow diagram of one embodiment of the method and process provided through the archetype process.

FIG. 5B-10 is an example embodiment of categories of model topics of questions of one embodiment of the topic assistance tool.

FIG. 5B-20 is an example embodiment of the subcategories of model topics or questions of one embodiment of the topic assistance tool.

FIG. 5B-30 is an example embodiment of model subtopics of one embodiment.

FIG. 5B-40 is an example embodiment of model secondary subtopics of one embodiment of the present invention.

FIG. 5C is a flowchart of transactions related to one embodiment of creating a new information construct.

FIG. 5D-10 is an example of an unformatted entry approach for the information construct of one embodiment.

FIG. 5D-20 is an example of formatted entry approach for the information construct of one embodiment.

FIG. 5E is a flow chart of transactions related to one embodiment of acquiring information through an Internet browser or other electronic source.

FIG. 5G is a flowchart of transactions related to one embodiment of formatting an analysis construct.

FIG. 5H-10 is an example of relationships between an analysis construct and information constructs of one embodiment.

FIG. 5H-20 is an example of a partially completed analysis construct work space of one embodiment.

FIG. 5H-30 is another example of a completed analysis construct.

FIG. 6 is a schematic diagram of an example of one embodiment of regions that may be used in representing an integrated thinking and knowledge construct and the associated method and process.

FIG. 6B is a schematic depiction of one example embodiment of regions as representational areas in one 3-D embodiment.

FIG. 6D is a schematic depiction of one example embodiment of "slices" as a means of providing representations in one 3-D embodiment.

FIG. 7 is a flow chart of the views provided by one embodiment of the present invention and example navigational paths between these views.

FIG. 8 is a schematic representation of one embodiment of the customization modules in relation to the ITKC system and method.

FIG. 8S is a schematic of high level processing flows relative to additional search capabilities.

FIG. 9 is a diagram of one embodiment of customization modules and their relationship to the ITKC system and method, building environment, and ITKC.

FIG. 9A is a further diagram of one embodiment of customization modules and their relationship to representative architectural modules of the ITKC system and method.

FIG. 10 is an example of one embodiment of the technical architecture supporting the invention.

FIG. 11 is an overview of one embodiment of customization related processing that may be performed by the customization modules and the ITKC system and method.

FIG. 11S is a further schematic diagram showing one embodiment of representative processing flows which may be utilized to accomplish additional search-related capabilities.

FIG. 12 is an example flow chart of representative processes and functions provided by one embodiment of the customization profile builder or similar module.

FIG. 12A is a continuation of an example flow chart of representative processes and functions provided by one embodiment of the customization profile builder or similar module.

FIG. 12S is a further schematic diagram showing one embodiment of representative processing flows which may be utilized to accomplish additional search-related capabilities.

FIG. 13 is a flow chart of representative processes and functions provided by one embodiment of the customization control module or similar module.

FIG. 13S is a further schematic diagram showing one embodiment of representative processing flows which may be utilized to accomplish additional search-related capabilities.

FIG. 14 is a flow chart of representative processes and functions provided by one embodiment of a customization interface processor or similar module.

FIG. 14S is a further schematic diagram showing one embodiment of representative processing flows which may be utilized to accomplish additional search-related capabilities.

FIG. 15 is a further flow chart of representative processes and functions provided by one embodiment of a customization interface processor or similar profile.

FIG. 15S is a further schematic diagram showing one embodiment of representative processing flows which may be utilized to accomplish additional search-related capabilities.

FIG. 16 is one embodiment of a set of representative user prompts to facilitate customization query and response.

FIG. 16S is a further schematic diagram showing one embodiment of representative processing flows which may be utilized to accomplish additional search-related capabilities.

FIG. 17 is a flow chart of one embodiment of representative processes and functions related to ITKC output management and the customization of ITKC output forms.

FIG. 18 is a schematic representation of one embodiment of a resulting user and group network via the system and method.

FIG. 20 is a schematic diagram showing processing flows relative to a personalized automatic updating module.

DETAILED DESCRIPTION OF THE INVENTION

Figure 1:
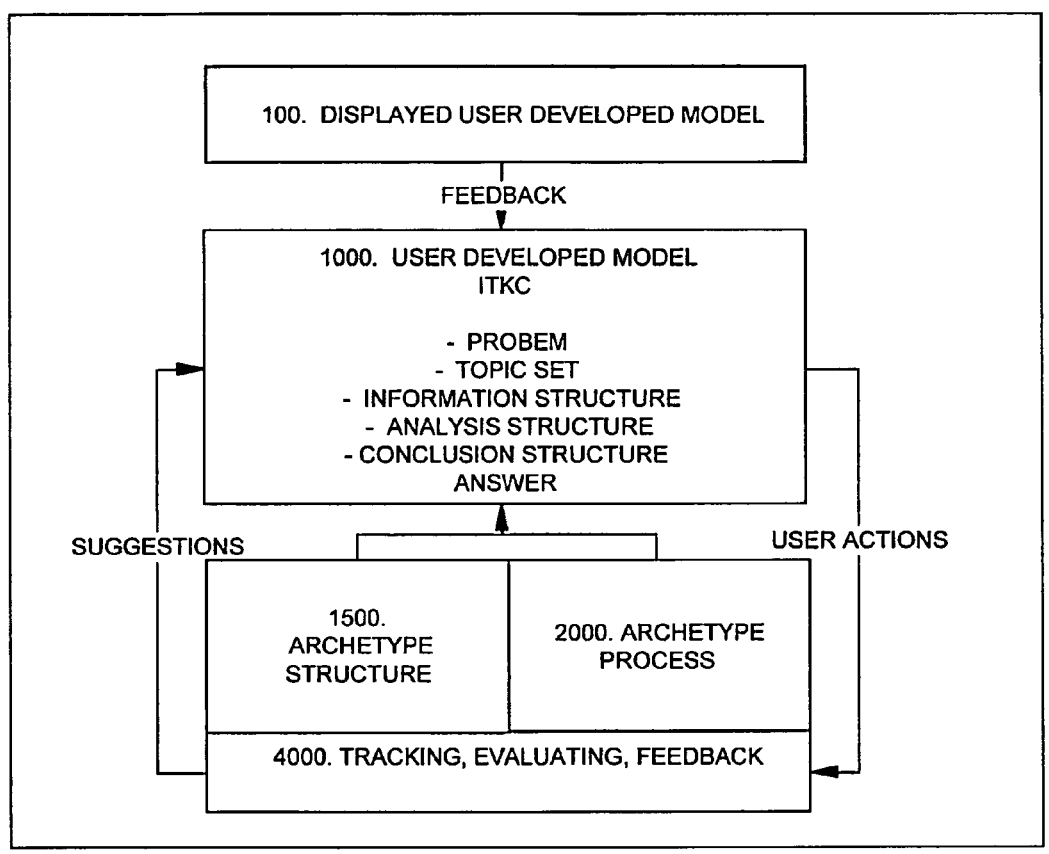
FIG. 1 is a conceptual depiction of the preferred embodiment.

The system provides a software tool to evaluate, facilitate and convey user thinking. In preferred embodiments, the tool begins with a base-line structure in which to address an arbitrary problem. At its simplest, this structure includes the idea of specifying and inter-relating the problem or topic to be addressed, specifying a proposed conclusion to the problem, and specifying knowledge. The tool provides various user mechanisms for the user to develop their thinking. The tool provides the ability to populate various structures with various specifications of topics, conclusions, and knowledge, and their interrelationships. More significantly, the tool provides intelligence to the process and the structure of the user's work. The tool monitors and tracks the interactions of the user to determine whether the user's approach or process toward addressing the problem might benefit with certain specific suggestions to aid the user's development or thinking. In addition, the tool monitors the structure of the user's thinking to determine whether the user's problem definition, knowledge, and proposed conclusion and underlying thinking is well-founded in a structural and in some cases, logical sense. To do the former, the tool tracks the specific interactions of the user to monitor things like interactions spent specifying details and collecting data vs. developing conclusions. To do the latter, the tool analyzes the structure of the user's presently proposed conclusion, for example, analyzing whether it is supported by knowledge. In preferred embodiments, the former and latter are implemented with rules-based inference engines to make suggested actions for the user, in a variety of ways.

The tool provides an ability to encapsulate or contain the state of thinking and development in an entity called an ITKC. This entity integrates the topic, conclusion and knowledge, and the tool conveys this integrated state preferably using a visual, physical metaphor such as a three dimensional object, although 2 dimensional embodiments may also be used. The tool inherently contains an exemplary ITKC, and in some sense this is a core, exemplary or archetype structure for an arbitrary problem. The tool uses the archetype problem solution structure and the archetype or preferred process as the basis for providing guidance to the user in their development of their thinking, and in response their actions. Initially, the user is provided with a starting point for their project that in a preferred embodiment is undeveloped other than to model that an exemplary structure includes at least a topic, conclusion, and knowledge area. A more specific starting point for user development may be provided, for example, a super-user, teacher or other source may provide more specific structure to the problem and perhaps some initial content or the like to provide a more specific ITKC starting point. The user then may further develop this provided initial ITKC in the process of their thinking evolution. As they add structures, content and relationships to their thinking, their personal ITKC will correspondingly modify.

The tools to track user interactions and make suggestions combine with the interrelated visual feedback views to in effect guide the user in an archetype process for developing their thinking about an arbitrary problem. By this it is meant, a model or exemplary process or way to approach the problem procedurally. Since the user will develop their ITKC, the applicable archetype problem solution structure and applicable portions of the exemplary process will change in relation to the present ITKC (i.e., model or exemplary structure will depend on the user's current ITKC to which it is compared). Thus, the applicable archetype structure and exemplary process are in some sense dynamic. In addition, the archetype process is state dependent, meaning the process suggestions made and monitored will depend on the state of the user's actual processing and interactions.

The tool thus facilitates an exemplary process for accomplishing sound thinking and knowledge development about arbitrary problems and provides the user with the ability to develop their own thinking and knowledge about the problem through the development an ITKC or integrated thinking and knowledge construct. The archetype process and structure facilitate the user from conception of the problem (or question, issue, subject, topic, or area of interest) through the creation and viewing of a summary understanding, answer or other result. For purposes of this application, the terms ITKC, "integrated thinking and knowledge construct," "thinking and knowledge construct," "integrated knowledge and thinking construct," "knowledge and thinking construct" and "integrated construct" are used interchangeably.

Referring now to the Figures, in FIG. 1, in a preferred embodiment, the tool provides (i) an archetype structure (block 1500) which provides components and options for creating, structuring, developing, and relating the set of components a user may employ in developing their thinking and knowledge about an arbitrary problem; (ii) the user developed model or ITKC, indicated in block 1000, which is comprised of user selected and developed thinking and knowledge structures and encapsulates the relationships and process history conducted by the user; (iii) an archetype process, as indicated in block 2000, for thinking about and solving arbitrary problems, which enables and helps guide the user in their work; (iv) tracking, evaluating, and inference modules which monitor and evaluate the user's actions against archetype or exemplary structure and process rules, and make suggestions to the user accordingly; and (v) an ongoing representation of the user's developed model or ITKC, as indicated in block 100, against various views that convey archetype structure and process, as well as potential natural next thinking and working steps, and therefore provide ongoing coaching to the user through visual feedback.

The user developed model is referred to herein as an ITKC or Integrated Thinking and Knowledge Construct. It should be understood that the use of the word construct is employed to convey both (i) a component that is constructed and evident to the user, and (ii) the underlying data storage and retrieval requirements for achieving the described component or components and parts (see additional description below regarding options which may be employed in the data structure and implementation approach). In a preferred embodiment, the user developed model can subsequently be tracked and evaluated against archetype structural expectations by the tool, including but not limited to items such as the types of components selected, the prevalence of components selected, the completeness of components used at various stages in the development of the ITKC (in terms of content, structure, and linkages) and others. The user process can similarly be tracked and evaluated against the archetype process rules, including but not limited to items such as what portions of process the user elects to try or use, the user's response history to suggestions made by the system, and the user's selection and use of various views which constitute thinking subsets. As described elsewhere herein, in a preferred embodiment, such tracking is used for direct feedback to the user, the generation of suggestions, and various reporting and tracking activities for the primary user and potentially for users like teachers.

Figure 1A:
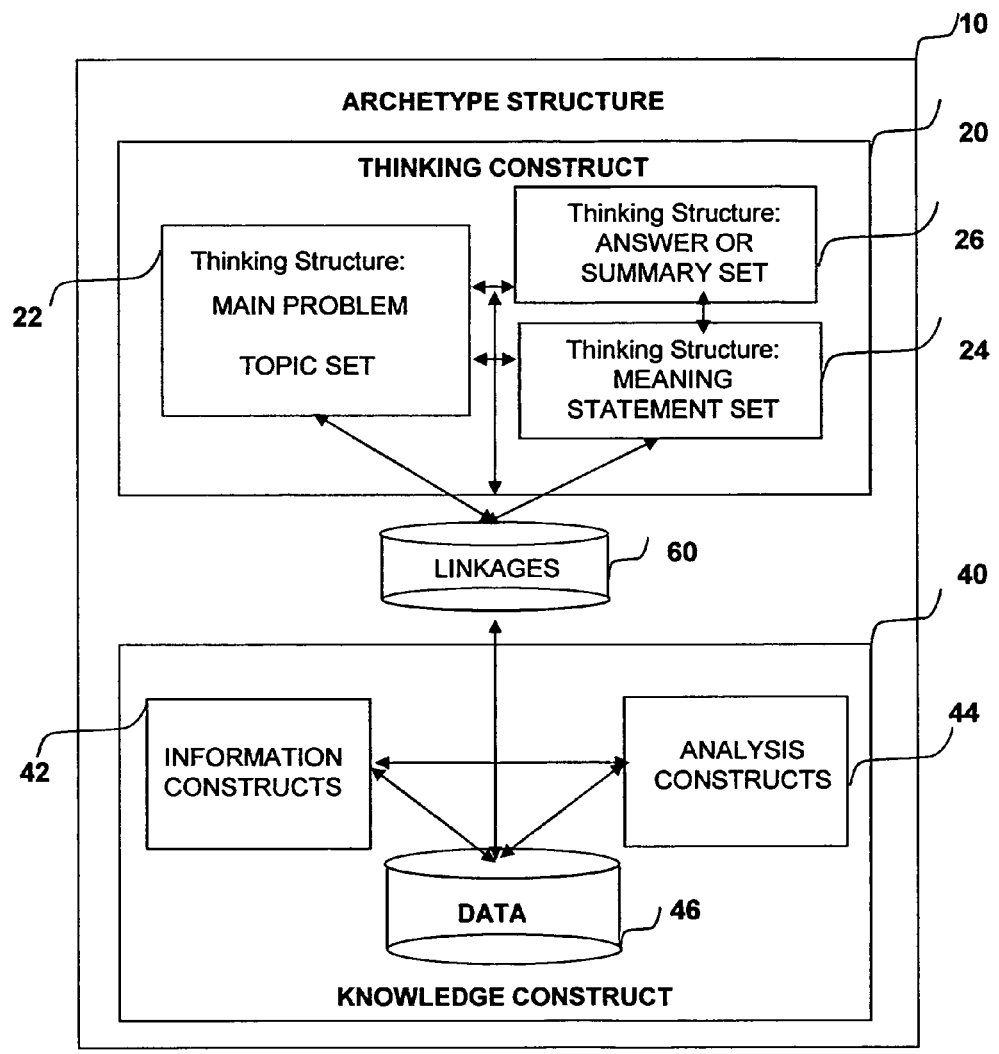
FIG. 1A is a schematic diagram of an overview of one embodiment of groups of components of the archetype structure.

In one preferred embodiment, as shown in FIG. 1A, the archetype structure for an arbitrary problem 10 may include a thinking construct 20 and a knowledge construct 40 which may each include a plurality of components. The groups of components of the thinking construct 20 preferably include a number of thinking structures which in a preferred embodiment may include: (i) a topic set 22 for defining and maintaining the definition of the subject, topic, questions, problem, issue, area of interest or other suitable descriptions of the project, and preferably including both a main topic or problem and one or more subtopics; (ii) a meaning statement set 24 for developing and maintaining the user's perspectives regarding the data and/or analysis including one or more but not limited to: conclusions, observations, hypotheses, theories, summary statements, perspectives, ideas, or any similar items; and (iii) an answer or summary set 26 for developing and maintaining the highest level answer or summary viewpoint of the results attained relating to the project. In a preferred embodiment, the components of the knowledge construct 40 may generally include: (i) information constructs 42 for creating, organizing, and maintaining data and information elements regarding the project, including structured and unstructured formats; (ii) analysis constructs 44 for developing or associating a plurality of analyses regarding the project, which may be based on data, information elements and/or information constructs created with via this invention or gathered from other electronic sources and associated with the integrated construct, and for maintaining the analytical components in structured and/or unstructured formats; and (iii) portions of data 46 which are not structured according to information constructs or analysis constructs, but which are associated with the integrated construct. The integrated construct further includes the linkages or relationships 60 that may exist or be created among and between any of these individual components and groups of components. In certain cases, the preferred embodiment provides one or more links automatically in response to user actions as the user proceeds through the various stages of development of the integrated construct. As discussed below, these links help the user understand and document the relationship between various construct knowledge or thinking components.

For simplicity purposes, this application primarily refers to the building, creation, use and sharing of a single ITKC or integrated construct, although it should be appreciated that the preferred embodiment is preferably operable to enable one or more users to create one or more integrated constructs, which may be standalone or related to one another. It should also be appreciated that a user may include one person or a group of people.

The integrated construct or ITKC which is built by the user can be associated with or contain as little information as the title or label the user assigns to the integrated construct. The integrated construct can be associated with or contain one, some or none of the component types enabled to the user by the preferred embodiment. The integrated construct can also contain or be associated with a one, none or a plurality of empty, partially completed, or completed components, as described below. The output of the preferred embodiment may be electronic or paper based. The method and system also enables users to include electronic information from other standard computerized tools and information formats such as images and documents that may be copied and pasted into or otherwise associated with portions of the integrated construct.

The archetype structure and method and process of the preferred embodiment are preferably modular in their embodiment to enable the use of individual or subset combinations of components in the progressive building of the integrated construct, and the corresponding associated portions of method and process. The method and components provided by the preferred embodiment are based on the understanding of experts in completing information intensive development, thinking and knowledge development about arbitrary problems. The method and system preferably includes guidance for the user as the user proceeds in the creation of the integrated construct, through the options and tools that are provided to the user, through tracking user actions and providing suggestions to the user, and through the design of the visual feedback representations, work spaces and navigation provided to the user. The method and process can be used or implemented in a linear fashion, but are preferably modular to enable creation of the components or the use of the archetype process in a non-linear fashion thereby supporting different individual thinking and problem solving styles, and different kinds and complexities of problems or topics, as discussed further below.

The representations and user interfaces provided by the preferred embodiment offer several distinct advantages, including but not limited to the following: (i) the design of the one or more two-dimensional or preferably three dimensional representations depict the development of an ITKC and help guide and provide access for the user to the associated archetype process and archetype structure; (ii) in the three-dimensional form, the display and manipulation of the integrated construct behaves as though it were a physical three dimensional object, in that the integrated construct can be rotated, flipped, turned, zoomed in on and zoomed out on; (iii) each two or three dimensional representation of the total integrated construct represents the whole thinking for a user about a problem or project, with parts that have meaning in relation to that whole, and the relationships are made readily apparent; (iv) the representations provided by the preferred embodiment are in and of themselves a form of guidance, as they differentiate types of thinking work, provide meaningful workspaces for working on their problem from different vantage points, and suggest by their visual and place relationships and specific design where the user is in relation to the archetype process and structure, and next steps the user might want to consider (as discussed below).

Order of Work and Thinking in the Construction of the Integrated Construct

Figure 1C:
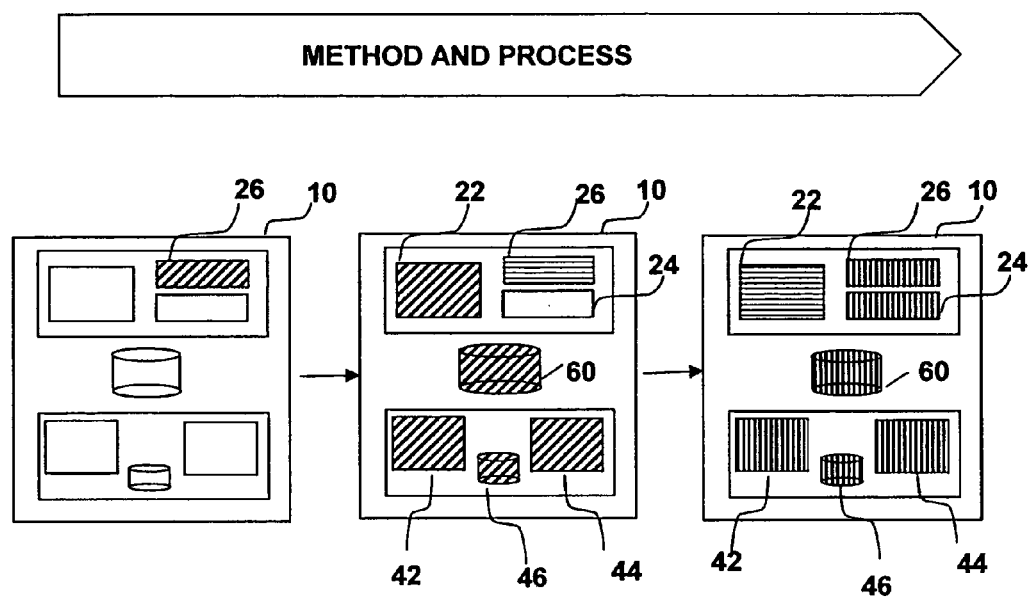
FIG. 1C is a schematic diagram of an example alternative development path for an integrated thinking and knowledge construct.
Figure 1D:
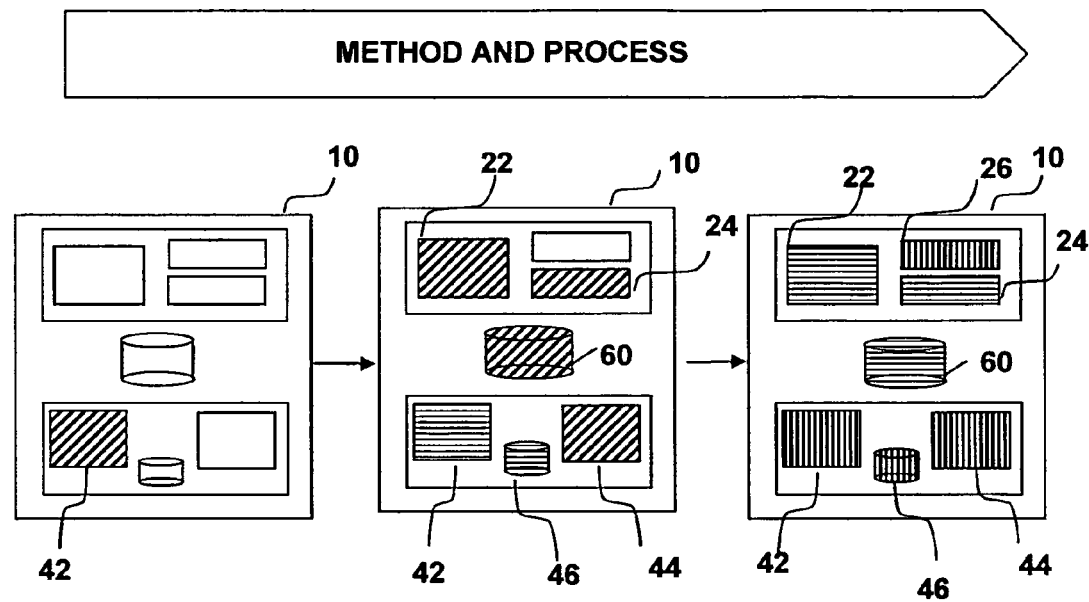
FIG. 1D is a schematic diagram of another example alternative development path for an integrated thinking and knowledge construct.

The preferred embodiment facilitates the development of an integrated construct through a plurality of different paths, according to the user's preferred thinking and problem solving approaches, the nature and complexity of the problem being addressed, and other determinants. Referring now to FIGS. 1B, 1C and 1D, the order in which problems or inquiry based projects may be completed and the integrated constructs and their various components are built and used can vary widely. The starting point, for instance, as shown schematically in FIG. 1B, may be defining the topic set 22 by inputting or defining an issue, question or problem and its descriptors, with subsequent focus on developing data 46 and information constructs 42 and analysis constructs 44 and finally in developing views on an answer or summary view 26 (as would be the case in conducting most independent student projects or research papers). Alternatively, as schematically shown in FIG. 1C, the starting point may be an answer or summary set 26 by inputting a single or set of alternative answers, hypotheses, or summary views 26, for example, with subsequent activities focusing on collecting and analyzing information in data 46, information constructs 42 and/or analysis constructs 44, the clarification of topics or questions 22 relevant to the alternative answers or views, and so on (as would often be the case with adults who are deliberating between alternative answers to a problem or have a hypothesis that is to be tested and proved; this is also the general process for the scientific method). Similarly, as schematically shown in FIG. 1D, the starting point may be a set of information constructs 42 which includes a set of information that has been previously gathered, that are to be interpreted, with subsequent focus on the meaning statements 24 and analysis constructs 44 that may be developed based on such information (as might be the case in educational settings and activities around a set of content, for example). It should be appreciated that a plurality of paths and a plurality of orders of use of the components as well as choice of the component types that may comprise an integrated construct are all in accordance with the preferred embodiment. The modularity and flexibility of the method and process that facilitates the flexibility in paths for integrated construct development provides a significant advantage.

It should thus be appreciated that the preferred embodiment preferably provides certain visual and general method of stability or familiarity to the user from the very outset of the definition of an arbitrary problem through the completion of an integrated construct.

The preferred embodiment thus provides guidance while also providing flexibility in the approach to problems and inquiry based projects, enabling the user to address an inquiry based project in a natural, progressive way.

Applications of the Integrated Construct

The archetype structure and process that provides for the ability to develop integrated constructs and the associated process, method and system of the preferred embodiment can be employed in a wide variety of different circumstances. As discussed above, one of the most prevalent uses is likely to be in supporting a user faced with a problem or similar project that may generally involve one, some or all of the following: (i) some degree of defining one or more problems, issues, questions or other area of interest; (ii) gathering, organizing and depicting information and/or preparing understanding or analysis about that problem, issue, question or area of interest; (iii) determining and developing the user's own understanding, perspectives and/or opinion about that problem, issue, topic, question, or area of interest and the knowledge they have developed; (iv) constructing meaning about the problem, issue, topic or area of interest, and/or adding the user's own thinking, which may include the user's creative thoughts, theories, conclusions, and/or perspectives or other similar items; (v) determining some kind of culminating answer or summary view for their project or problem; (vi) evaluating progress and adjusting their approach along the way, evaluating that the results are sound and follow principles of good thinking and problem solving; (vii) portraying or otherwise communicating the user's results in completed form and/or while in process. Although the preferred embodiment supports the totality of activities involved in such arbitrary problems or inquiry based projects, the preferred embodiment can be used effectively to support and enable any one, some or all of these activities in absence of a complete process for an arbitrary problem or inquiry based project or for any subset of combination of these activities.

The preferred embodiment may be used in learning environments (such as primary or secondary schools, colleges and universities) as well as in commercial environments (such as corporations, partnerships and other businesses) and non-commercial environments (such as in home or personal projects). In a preferred embodiment, the archetype process and structure can be used in almost any understanding and/or problem solving or opinion situation, in place of a text paper, an electronic presentation, or a web site.

Certain Advantages of Preferred Embodiments of the Invention

The preferred embodiment can be employed in many different circumstances and by many different types of users. This enables better transfer of learning of thinking skills across problems or projects for a single user, and sharing such learning across users.

Another advantage of the preferred embodiment is that the archetype process and structure provide a modular approach that enable the user to navigate flexibly across the components of the integrated construct and the steps of the process and method, including a plurality of different entry points. Different thinking and problem solving styles can be supported, and yet still benefit from the guidance and tracking abilities of the tool.

While the preferred embodiment provides for support of a wide range of types and complexities of problems, issues and topics from definition of a topic of interest through creation and depiction of the summary understanding, solution or result, the steps and components of the preferred embodiment can be used individually or in subset combinations thereof.

The preferred embodiment enables the visualization and feedback of developing and completed thinking and knowledge about a problem not only for the immediate user, but the ITKC can be shared with other users.

Other advantages of the preferred embodiment include, but are not limited to the following: (i) the scope of the archetype structure and process may include and integrate not only data and information or knowledge related to a problem, but importantly, how the user chooses to define the problem, question or topic they are trying to solve and the meaning, viewpoint or answer the user chooses to create from the information and analyses the user collects and/or creates; (ii) the ITKC that the user develops is an ongoing detailed and high level, highly related construction that encapsulates their thinking and knowledge work and can therefore be tracked and used as the basis for guidance; (iii) the preferred embodiment provides the ability to create, manage, view, and maintain components and simple and complex linkages between the components as the integrated construct is developed, both vertically (such as in levels of detail) and horizontally (such as in informational relationships); (iv) the archetype structure and representations may differentiate classes of types of thinking and knowledge related work into a set of identifiable regions which focus on the particular thinking or knowledge activity; (v); (vi) the representations may provide a way of abstracting away from the detailed content and linkages during appropriate thinking and knowledge activities, while still providing access to detail as desired; (vii) the representations may provide optimal combinations of components for different work activities with their associated method and process, and may use visual representations and other methods to provide the user with suggestions on next steps or views, and others as evident elsewhere herein.

Implementation Approach

One embodiment within a computer environment is depicted in FIG. 2, with elements of this embodiment generally including: (i) a set of computer software programs 90 resident on or operating through a computer processor 91*a* and 91*h*; (ii) a suitable form of data storage and management 93 capable of facilitating the storage and retrieval of multiple components of the integrated construct, any associated linkages, as well as process history, user profiles, and specific ITKC component content and characteristics; (iii) a graphical user interface 96 or other suitable representation mechanism or form 97, whether directly connected to a CPU 91 or working through a network 95*c* to access a remote CPU 91 or other display mechanism of some kind; and (iv) likely access to other electronic information sources such as the Internet 95*a* and other electronic sources, whether resident on the same CPU as indicated in block 94*d*, as the programs or accessible via a local or other network 95*h*. The preferred embodiment may also co-reside with other standard tools, such as a word processor 94*a*, a spreadsheet processor 94*c*, and Internet browser 94*b* and other such tools. As stated below, the preferred embodiment may be resident on a local CPU 91 or accessible remotely over local networks 95*b* or the Internet block 95*a*. As also described more fully below, the embodiments are not limited by type of operating system, 92.

Figure 3:
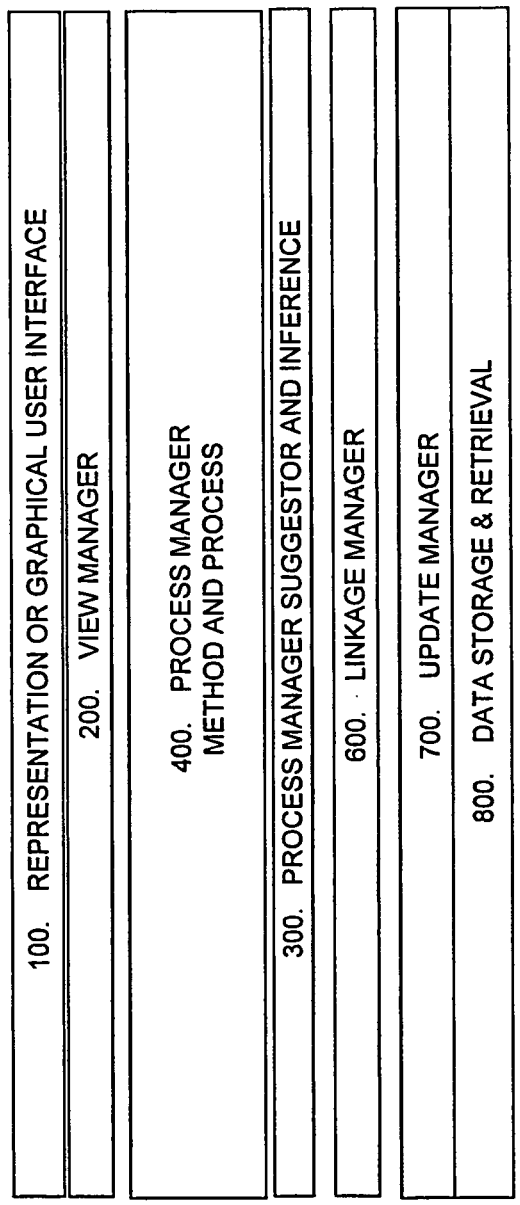
FIG. 3 is a schematic diagram of an example architecture for one embodiment.

FIG. 3 depicts one example architecture for one embodiment is operable to provide the logic, method and process, capabilities and components, and representations for one or more users. In this embodiment, the architecture software modules represented in FIG. 3 interact to provide the functionality described herein, and which in one embodiment generally include: (i) a representation or graphical user interface 100; (ii) a view manager 200 or like module(s) which facilitates the representations or graphical user interface, the status of their evolving ITKC and portions of associated process and content being presented to the user, (iii) a process manager suggestor 300 which utilizes the archetype structure and process to provide help and guides to the user; (iv) a process manager 400 or like module which facilitates the user in constructing their ITKC based on and guided by the archetype structure; iv) a linkage manager 600 or like module which updates linkages among and between the components of the integrated construct and groups of components, in some cases automatically and in other cases in response to user actions; (vi) an update manager 700 or like module which updates the content and structure of the integrated construct in response to user actions; and (vii) the content of the integrated construct and its associated structure or formats, stored in a suitable form of data storage and retrieval mechanisms 800. These general software architectural modules are described in greater detail following the description of the method and process of the invention provided below.

It should be appreciated that the specific embodiment may be operative in a plurality of electronic and computerized environments, as described more fully below. It should further be appreciated that the precise boundaries of computer programs or other implementation mechanisms can differ from those represented in the general software architecture depicted in FIG. 3 and still be in accordance with the preferred embodiment. It should further be appreciated that although the embodiments rendered in FIG. 2 and in FIG. 3 show a division between process and data, a preferred embodiment of the present invention is be object oriented or at the least highly based on object oriented design principles. The modularity of the method and process and its correspondence in structure to the components of the integrated construct lend themselves readily to object oriented implementation.

The storage and management of the data/information and structural relationships that comprise the integrated construct can be created and accomplished through the use of a plurality of alternative, readily available mechanisms and approaches. It should be appreciated that a plurality of different data storage formats and associated creation mechanisms may be used to facilitate the process and integrated construct in accordance with the present invention. Given the general purpose and nature of the invention, the optimal implementation mechanisms for data storage and creation will differ according to the amount and complexity of the information, as well as the size and complexity of knowledge and thinking constructs being included in or associated with the integrated construct. These options will be readily apparent to those skilled in the art. One of the advantages of the integrated construct's architecture is that the process and construct can be implemented over a broad range of project complexities and broad range of amounts of data/information while still utilizing the same general user components, process, tools, regions, methods, and to a great extent, interface or representations.

The interface representation, process, method, and underlying logic and information architecture for the integrated construct do not employ assumptions about the underlying operating system. In one computerized embodiment, the present invention may be implemented using one or more computer programs, each of which executes under the control of an operating system, such as Windows, OS2, DOS, ADC, UNIX, MAC OS and others, and causes the computer to perform the desired functions as described herein. Using the present specifications, the invention may be implemented as a machine, process, or article of manufacture by using standard programming and/or engineering techniques to produce software, firmware, hardware and any combination thereof.

Generally, in the computerized embodiment, the computer programs and/or operating system are tangibly embodied in a computer readable device or media, such as memory, data storage devices, and/or data communication devices, thereby making a computer program product or article of manufacture according to the present invention, which may encompass a computer program accessible from any suitable computer or electronic readable device or media. The present invention can similarly be implemented with a plurality of configurations and devices.

Moreover, in the computerized embodiment, the computer programs and operating system are generally comprised of instructions which, when read and executed by computers, cause the computers to perform the steps necessary to implement and/or use the present invention. Under control of the operating system, the computer programs may be loaded from memory, data storage devices, and/or data communication devices into the memories of the computers for use during actual operations. The present invention can thus be implemented in a local or remote processing environment, including use of a single computer, servers, the Internet or other forms of networked processing and communication. It should be appreciated that many modifications can be made to this implementation configuration in accordance with the present invention.

Media Types

The present invention facilitates the incorporation of a plurality of media types in each of its components and activities, including but not limited to alphanumeric characters, images, graphics, video, quantitative sets, three dimensional renderings, etc. It is common in the art of manually or paper based inquiry based projects to incorporate and use any or all of these information or media types, and it is similarly common in the art of computer programming, data delivered via the Internet and other electronic based information to incorporate a plurality of different information or media types. It should therefore be appreciated that the present invention is not intended to exclude any media type from the description, but rather to incorporate the plurality of media types common in the forms described above and likely to be incorporated into such forms over time.

User Interaction

In one embodiment of the present invention, user interaction with the system is accomplished through the manipulation of one or more user interaction, interface or input devices, such as a computer mouse, trackball, keyboard, touch pad, touch screen or stylus. Actions by a user with one or more of these interaction devices may cause a plurality of results, including but not limited to: (i) movement of a visual marker (e.g., pointer or cursor) across or on a representation provided by the system such as on a suitable display device; (ii) changes in the representations provided by the invention; or (iii) indication by the user that a component available to the user is to be selected for further action in some manner. Throughout the description of the detailed method, process, and system of the present invention, reference is made to user interactions such as these. "Selection" as used herein is intended to convey any suitable electronic means by which a user can indicate that the user wishes to initiate the relevant action associated with that selection. Similarly, movements by the user within and across the representations provided by the system are described as a way to change position and therefore access the relevant aspects of the method and system, or to change views of the integrated construct, its components or the regions or cognitive regions of the integrated construct as described herein. Such event handling approaches are well known to those skilled in the art. It should be appreciated that the use of other user interaction devices that result in similar inputs or cues to the system of the present invention may be used in accordance with the present invention. For example, user interaction can be accomplished through voice activation mechanisms, or through prompting from electronic transactions from other sources that result in an electronic signal to the system that is the functional equivalent of either entry through user interaction devices such as a keyboard or a mouse.

Display Devices

In the preferred embodiment of the present invention, the system displays a plurality of representations that may be provided on one or more of a plurality of devices. The present invention contemplates the display on one or more of a variety of suitable of display devices or displays. The present invention can be embodied through any suitable device that generally provides the functional equivalent of the computer screen or projected screen, hologram, or other electronic projection, as well as via paper or other media type. An alternative embodiment of the present invention provides for printing or otherwise displays portions of or the totality of the integrated construct and representations of the in-process or completed region views onto paper or other non-electronic media. Another embodiment of the present invention provides for the construction of a physical construct, with the ability to place, arrange or associate the information associated with each of the components of the integrated construct on or to a physical structure (as might be done, for example, on a physical exhibit).

Potential Components of the Integrated Construct in One Embodiment

A key enabler to the preferred embodiment is the archetype structure for the content created and associated with accomplishing an inquiry based project, preferably made up of both thinking and knowledge constructs. The component classes or types that make up the archetype structure are provided for the user to create, select, edit and link in the building of their ITKC. Linkages and relationships between components may be created directly by the user or automatically by the system, as described more fully below. In a preferred embodiment, the creation of components by the user creates subsequent thinking subset structures and workspaces customized to facilitate focus and thinking on meaningful subsets of the project and at a plurality of levels of detail. The following describes in greater detail examples of components of the archetype structure that may be used to comprise a user's thinking and knowledge construct, or ITKC as originally depicted generally in FIG. 1A. The manner in which the archetype structure is subsequently used to evaluate and further guide the user is described in a later section herein.

In a preferred embodiment, types of components are synonymous with classes, as the archetype structure lends itself easily to object oriented implementation, although such implementation is not required.

Thinking Constructs in one preferred embodiment are made up of a Topic Set, (including a Main Topic or Problem and subtopics), a Meaning Statement Set, and an Answer or Summary View.

Topic Set

Referring again to FIG. 1, one of the thinking structures that may be used as a part of a thinking construct includes the topic set 22, which may be used to define the scope of the problem, question, issue, subject or topic or area of interest intended for pursuit by the user. Components of the topic set may include items such as one or more topics, subjects, questions, problems, issues, areas of interest or any suitable other way of defining an area of interest. Components of the topic set may exist in a plurality of information media forms, including but not limited to text statements, drawings, images, or other commonly used or suitable information media forms or formats.

Figures 4, 4A, 5, 6, 7, 8, 9, 10:
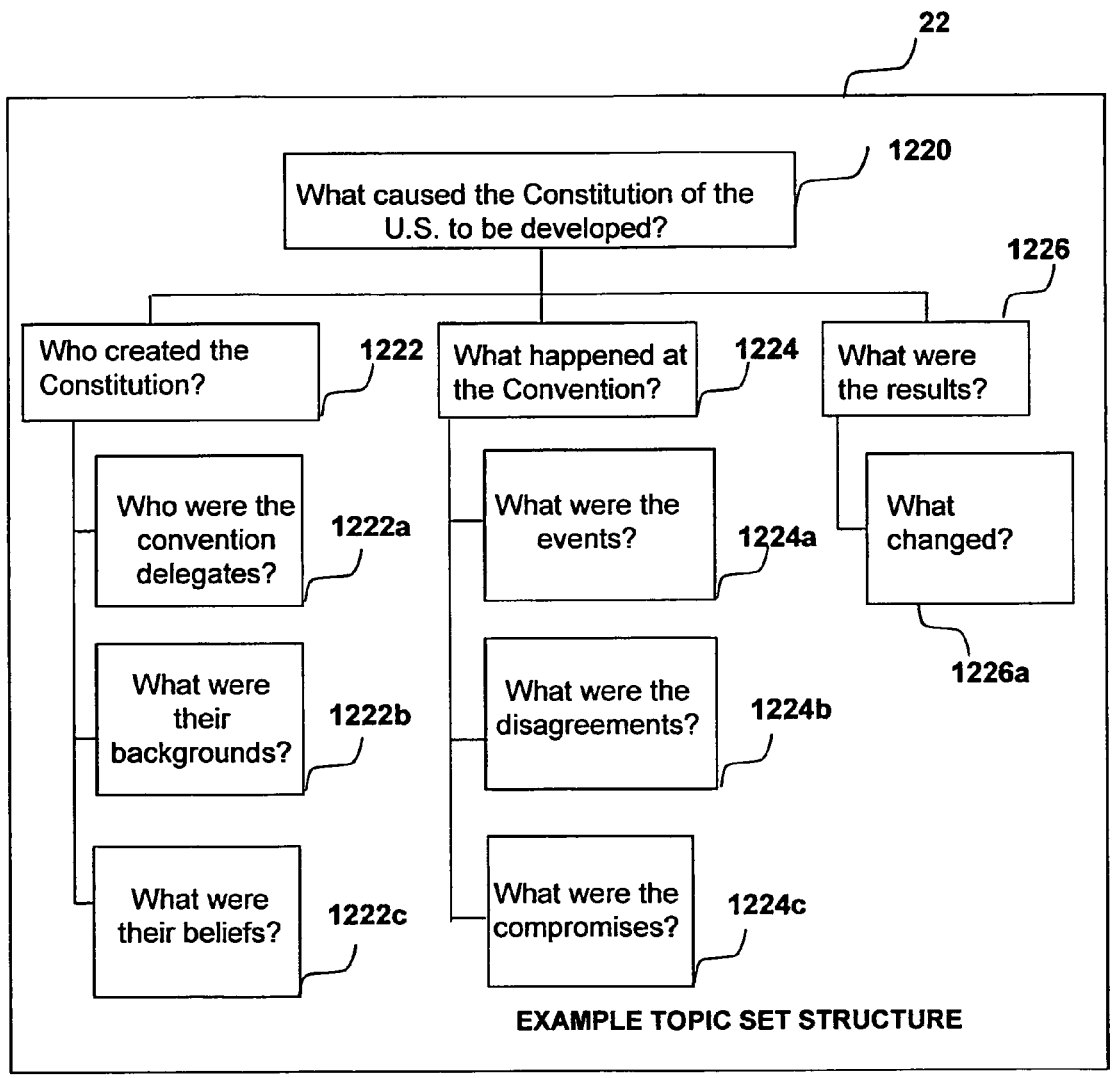

FIG. 4A generally illustrates an example structure of a topic set 22. In this preferred embodiment, the topic set of an integrated construct includes at least one statement of main topic 1220, generally representing the highest level or summary topic, subject, question, problem or issue intended to be included in the integrated construct (for example, in an educational context, the main topic might be "What caused the development of the Constitution?"). The topic set may also include one or more subtopics 1222, 1224 and 1226 that are labeled Subtopics 1, 2 and 3 in FIG. 4A. Subtopics may be defined in order to partition or otherwise further elaborate the topic, subject, question, problem or issue of interest into smaller, more targeted or defined topics, subjects, questions, or issues of interest (for example, continuing in an education context, subtopics might include "Who created the Constitution?", and "What events led up to the Constitution?"). The subtopics associated with a main topic may also take on a plurality of information forms.

Referring again to FIG. 4A, in a preferred embodiment, subtopics may be further associated with one or more secondary subtopics such as secondary sub-topics 1222a, 1222b, 1222c, 1224a, 1224b, and 1226a respectively. These subtopics may provide a lower level of partitioning or other further elaboration of the subtopic, sub-question, sub-problem, sub-issue or sub-area of interest. For example, the subtopic "Who created the Constitution?" might be further partitioned or elaborated through two additional secondary subtopics, such as "Who were the Convention delegates?" and "What were their beliefs?" The secondary subtopics associated with any subtopic may again be comprised of information in any form: textual, drawing, video, image, graphic, etc. A secondary subtopic may be linked to more than one subtopic. Although the most often utilized linking is likely to be that of subdividing into greater detail or parts, the preferred embodiment also allows for the identification of other kinds of linkages across and among subtopics. It should be appreciated that the number of levels provided for the topic set may be varied and will generally be limited only by the processing robustness of the technology and data storage platforms on which the present invention is implemented.

FIG. 4A-10 illustrates an example of a topic set, in this case created for a history project for an educational assignment. The present invention generally provides several representation choices, described more fully below. One preferred embodiment of the present invention also provides assistance in the form of a topic or question help tool, described in greater detail as a part of the method and process description below.

The topic set 22 is preferably available throughout the process and method of the present invention for viewing, editing, adding to or deleting topics, subtopics, and/or secondary subtopics. This enables the user to for instance add additional relevant questions after the user is further along in the user's thinking process and investigation on the project. Linkages among and between components within the topic set are managed and can be changed, via the link or linkage manager 600 generally illustrated in FIG. 3 and described below. For example, secondary subtopics that are associated with a subtopic can subsequently be changed or moved to be linked to a different subtopic. Similarly, secondary subtopics can be changed or moved to become higher level subtopics, associated then with the main topic, if the user desires to do so. It should also be appreciated that other components of the integrated construct may be linked to components of the topic set and then available for viewing and editing accordingly, as will be described more fully in the detailed description of the method and process set forth below. In a preferred embodiment, topics, questions, issues or other areas of interest defined in the Topic Set also provide the basis for one form of subsetting the project into meaningful subsets for work and consideration by the user (as described more fully below).

In one embodiment, the archetype structure provides for more than one topic set for the same problem, as in providing alternative means of subsetting or elaborating the problem of concern.

Information Constructs

Referring back to FIG. 1, in a preferred embodiment, information constructs 42 provide a way for the user to create, organize, group, format, and reference the collection of information or data that the user chooses to enter, create, or associate with their project and the integrated construct. In the educational project "What caused the Constitution?" for example, the user may wish to create information constructs for some of the key framers (James Madison, George Washington), the Constitution, the key parts of the Federal government (the Legislative, Executive, and Judicial branches perhaps) and state government. Information constructs in the invention may be formatted with specific elements, partially formatted, of highly unstructured (as in including or being associated with just a block of text for example).

In a preferred embodiment, an information construct 42 may be made up of a large amount of information and/or high number of information elements, or may include as little information as the title, label or number assigned to it by the user. Reference points from other integrated construct components to information constructs 42 may be provided to the information construct in at least two ways including but not limited to: (a) to the information construct as a whole; and/or (b) to the information elements or groups of information elements associated with the information construct.

Figure 4B:
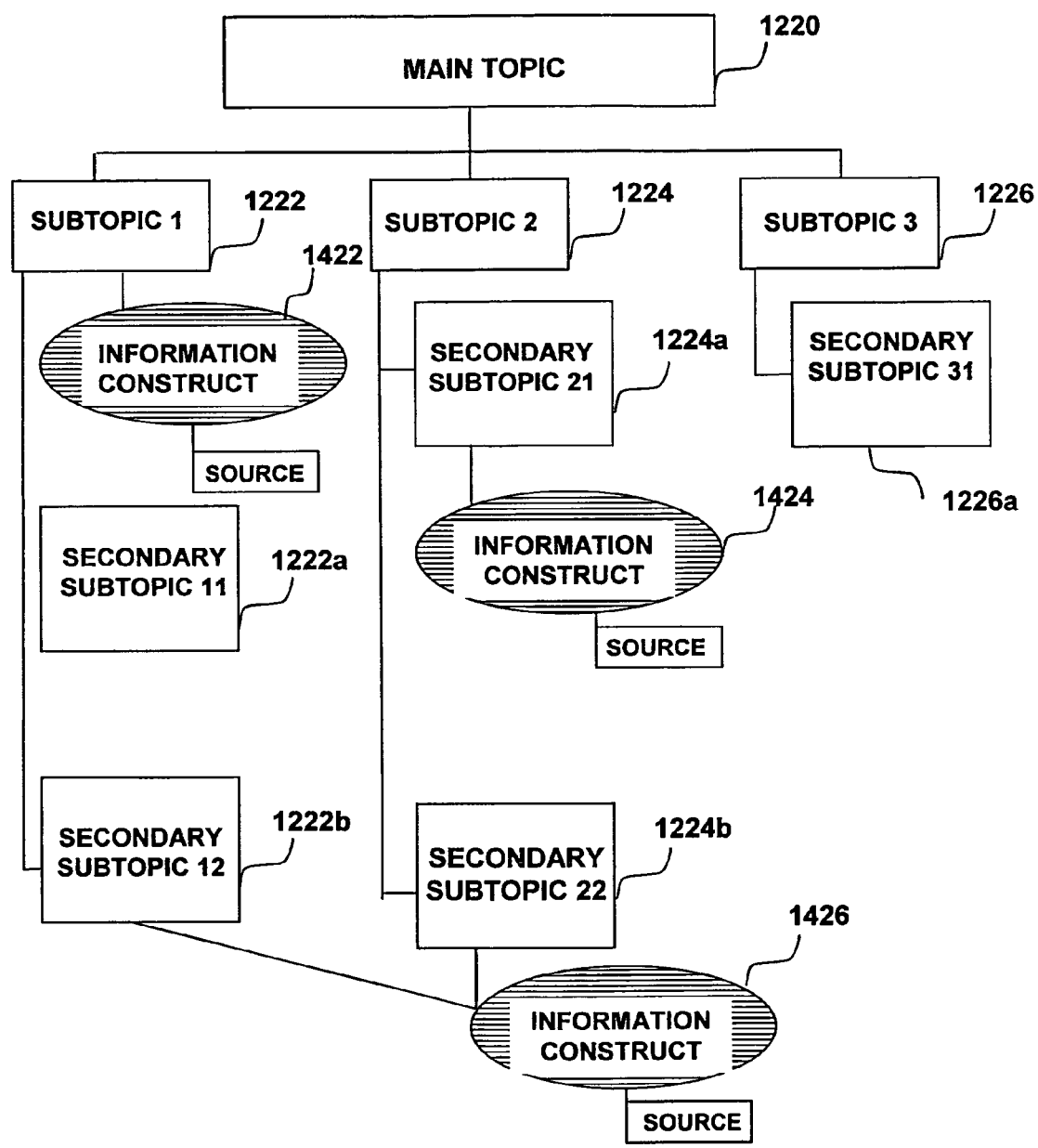
FIG. 4B is an example of the addition of information constructs to an integrated construct of one embodiment, in the case in which a topic set has been previously defined.

FIG. 4B generally illustrates an example of the addition of an information construct such as 1422, 1424 or 1426 to an integrated construct 10, specifically in the case where a topic set 22 has been defined. An information construct may be defined uniquely in the integrated construct with a label, number or title. The title, number or label for the information construct may serve as a reference point to the collection of information or data elements that are to be associated with the unique label or title.

In a preferred embodiment, information constructs 42 generally may be unformatted, fully formatted or partially formatted in their form. Unformatted information constructs provide the ability to add text, drawings, and/or other portions of information to be stored and associated with the title or label given uniquely to the information construct, and therefore available to the user and for linkage or use with other information construct or integrated construct components. An example of one embodiment of the entry of an unformatted information construct 1422*a* is shown in FIG. 4D-10. As specified elsewhere herein, the information or data may include a plurality of media forms when included in or associated with information constructs.

The preferred embodiment may facilitates the assignment or association of information constructs with one or a number of subclasses or types. In one embodiment of the present invention, information constructs may be classified as "People," "Places," "Things," "Media," "Ideas," "Events," "Issues" and "Other." The present invention also generally facilitates the creation of user specified, customized classes or types of information constructs. In the preferred embodiment, the assignment of information constructs to class types is not required. Information constructs can be seen and manipulated at a plurality of levels of detail, including but not limited to the detailed level, the summary level and at an overall title or symbolic or icon level via the present invention. The method and system also provides the ability to link and reference information constructs from the appropriate internal fields of other information constructs, and to define the nature of those relationships (for example, the person information construct "James Madison" having a birthplace element that is associated with the place information construct "Virginia").

The present invention facilitates the user associating and labeling information constructs as belonging to a similar category or group; information constructs may be associated with more than one group at the same time or in the same project. For example, information constructs of the type "People" might be grouped according to categories such as "Political Leaders," "Explorers" and "Artists." In a preferred embodiment, the present invention provides for the creation of groups of information constructs, the labeling or naming or titling of such groups, and the inclusion of descriptive or explanatory information to describe or otherwise explain the nature or definition of the group. Once created in the preferred embodiment, groups also behave and may be treated by the user similarly to information constructs in their own right. For example, the user can add information to the group—in formatted, unformatted or a combination form; groups can be linked or otherwise associated with topics, meaning statements, and other Integrated Construct components; groups can be associated with or otherwise linked with Analysis Constructs.

The present invention in a preferred embodiment facilitates the visual distinction of different types or classes of information constructs in the display or representations of the integrated construct, such as through the use of different colors, icon designs, and/or shapes. In one embodiment, different colors and intensities of representation are used to depict the user's rating of the importance of the different information constructs. It should also be appreciated that different visual solutions may be used to differentiate the type or class of information construct in accordance with the present invention.

In one preferred embodiment, the method and system of the present invention provides a number of available formats to assist the user in structuring information elements of a particular subclass or type. An example of such a structured format 42*b* is illustrated in FIG. 5D-20. Structured formats provided for information elements are generally associated with unique labels and a defined field or data type. For example, the information construct type "People" may include optional use of structured fields or data elements such as birth date. If selected to be associated with a particular information construct, the structured element format may become an empty data field associated with the information construct's label, and ready for receiving or otherwise being associated with information either via direct input by the user, or through other data entry mechanisms as described in the detailed method and process section below.

Information Constructs may be linked or associated with one another in a variety of ways, including but not limited to: 1.) the association of one information construct as a whole with another information construct as a whole (for example, that the Information Construct James Madison, of type Person, helped create the Information Construct The Constitution, of type Thing or Media Thing); 2.) the association of a field that has been associated with or made a part of an Information Construct with another Information Construct (for example, that the Information Construct James Madison's, of type Person, birthplace—a field—was the Information Construct Virginia, of type Place). Additional links can be created between Information Constructs by the user to represent other relationships, either using labels for relationship types that are provided by the invention, or by entering their own custom labels (see later descriptions included in this document regarding links). For example, the Information Construct James Madison might be linked or related to the Information Construct Benjamin Franklin and labeled with the indication that they are "alike" in some way. Such links may also include internal data available to the user, such as in the user describing how the Information Constructs described above are "alike." The resulting linkages or associations made with an Information Construct (and potentially made at different points of use and from different views as the user uses the invention) may then be represented to the user for review, editing, adding, in a representation such as shown in FIG. 7D, which shows an example of one embodiment of a linkage view for the information construct James Madison, 42.

In a preferred embodiment, the present invention allows a user to change such formatting of an Information Construct over time. For example, a user may initially create a Person Information Construct, labeled James Madison, but have no additional information they wish to add to that Information Construct at the time they create the construct. Once created, the Information Construct (even in its "empty" form) may be associated or otherwise linked to other Integrated Construct Components (such as topics, meaning statements, analysis constructs, and others). Subsequently, the user may find some research information—perhaps over the Internet (as described more fully elsewhere herein) that he/she wants to associate with the James Madison Information Construct. Using the methods described later in this document, the user can select some such information and associate with the "empty" James Madison Information Construct, either as a section of text without further formatting, or by creating an element or field associated with the Information Construct and then associating the information with that element or field (such as Accomplishments, for example). Similarly, subsequently the user may decide that they wish to format the information additionally, instead of just having the text associated with a field or element label such as Accomplishments. The user may subsequently decide they wish to create fields or elements separately for Career and Publications, for example, and may do so with the present invention at any time during the life of the Information Construct. Elements, fields or sub areas of information associated with an Information Construct may be created by selecting from the predefined set provided by the present invention, or by creating custom elements, fields, or sub areas. The user may also subsequently format a field that was text, for example, as a date.

In one preferred embodiment of the invention, information constructs may all have one or more common fields, such a separate field, element or information sub area for the inclusion of the user's opinion of the importance of the information construct, in light of the project, and for a summary story about the information Construct. In another embodiment of the invention, the user is provided with options to add required or standard fields, elements or sub areas to the different Information Constructs they will be creating in their project.

The robustness and flexibility of Information Constructs provided by the present invention make them a valuable set of components, not only as part of an integrated construct, but also in conjunction with subsets of the total integrated construct, Analysis Constructs Referring back to FIG. 1, analysis constructs 44 are one component type provided by the archetype structure that generally enable useful views of information and constructed understanding which may provide a basis for the user to discern meaning. For example, in the educational project "What caused the development of the Constitution?", analysis constructs might be created which included a sequence of events, a comparison of the beliefs of the different framers of the Constitution, or a visual depiction of the members who were Federalists vs. Antifederalists. Analysis constructs 44 may be developed based on previously created information constructs 42 and data 46, and may also be created based on new user's actions and not directly connected to previously created information constructs 42 or data 46. Analysis constructs may also be created and linked or otherwise referenced to other standard electronic analysis forms, such as spreadsheets.

Like information constructs, the present invention provides that analysis constructs may be defined by a unique label or title, which may be in a variety of different information media forms, including but not limited to textual characters, images, graphics or any other suitable media type. Once created, an analysis construct preferably provides a workspace for the user, which may contain text, drawings, images or a plurality of information media forms. It should be appreciated that analysis constructs as described herein include both the provisioning of an interactive workspace for the user and the storage of the information components and relationships that must be stored to enable the user to retrieve and subsequently view or edit the analysis construct.

Analysis constructs 44 may generally work as components within the larger integrated construct 10 structure. As such, analysis constructs may be labeled, referenced, and linked to the other components of the integrated construct, such as elements of the topic set 22, meaning statement set 24, and answer or summary set 26. Analysis constructs can also provide value to the user as standalone information subsets, or as constructs associated with information constructs (whether formatted or unformatted). Like information constructs, analysis constructs may also be unformatted, fully formatted or partially formatted.

Figure 4C:
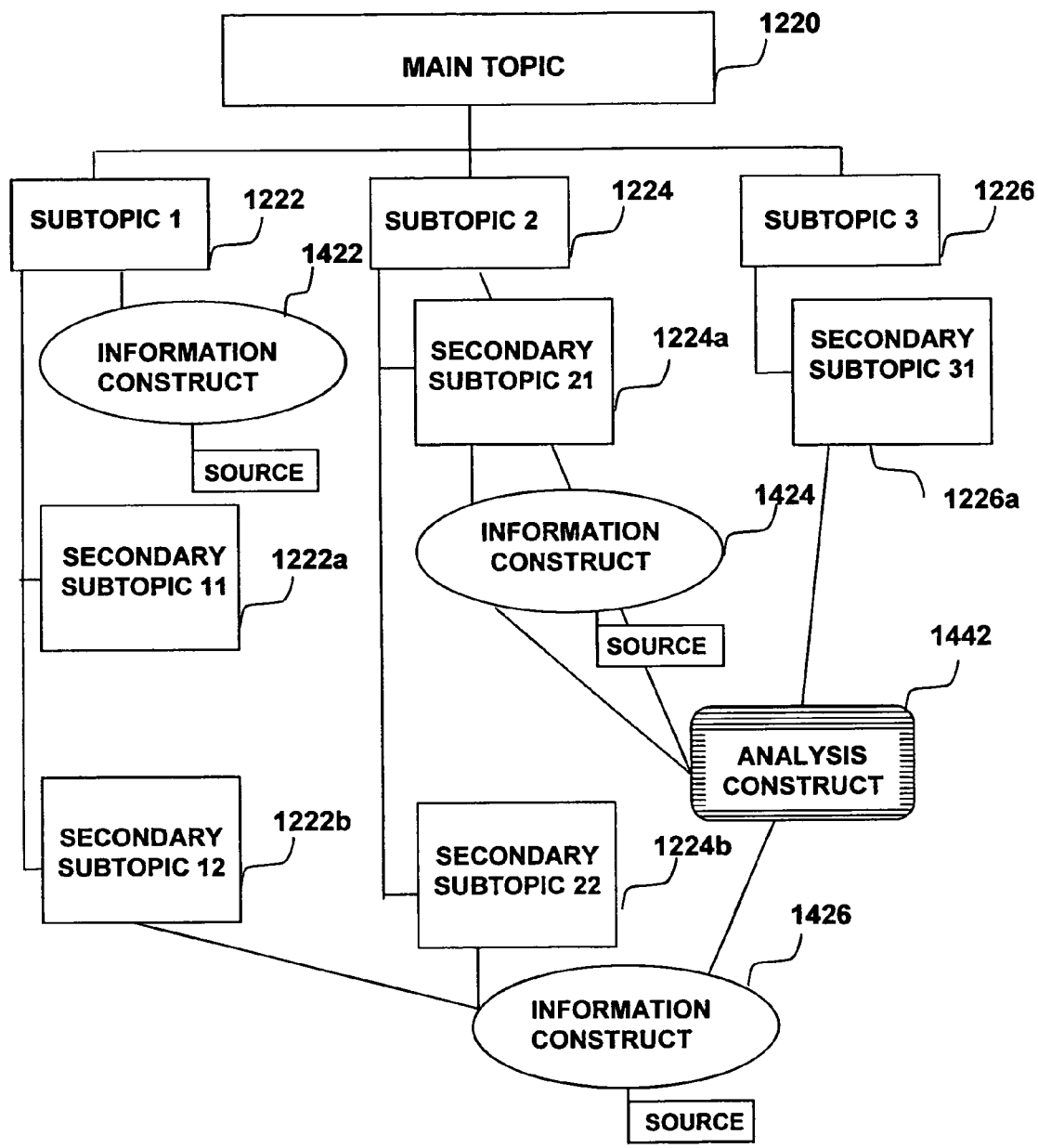
FIG. 4C is an example of the addition of an analysis construct to an integrated construct of one embodiment, in the case in which a topic set and certain information constructs have been previously defined.

FIG. 4C depicts an example of the addition of an analysis construct 1442 to an integrated construct, specifically in the case in which a topic set 22 and certain information constructs 1422, 1424 and 1426 have been defined previously for the integrated construct.

Referring again to FIG. 1, analysis constructs 44 may reference the information constructs and/or information elements. Analysis constructs 44 may show relationships between and among the information constructs 42, whether formatted, partially formatted, or unformatted, as previously described. These relationships may be based upon and built out of several different approaches by the user including, for example: (a) based on the contents of one or more information elements associated with a particular information construct 42; (b) relationships between information constructs 42 either perceived by the user or automatically defined within the integrated construct 10; and/or (c) the judgment of the user regarding the information elements within the information constructs 42, or any combination thereof. Analysis Constructs may also be created without any reference to prior created information constructs. As described more fully in the method and process later in this document, the user may create an Analysis Construct without reference to Information Constructs, either through the use of Unstructured Notes, or through the direct creation of an Analysis Construct using the drawing, text, image, and video import capabilities associated with the Analysis Construct. For example, a user may choose to draw the relationships he or she has been seeing in the information collected, or sketch a diagram of a hypothetical causation relationship freehand, as opposed to using the preformatted Analysis Constructs or specific references to the Information Constructs themselves.

FIG. 5H-10 generally depicts examples of relationships that may be defined in one embodiment of the present invention between analysis constructs 44a and information constructs 1422, 1424, 1426, and 1428 in an integrated construct.

In a preferred embodiment, analysis constructs 44 may be used in conjunction with information constructs 42 and unstructured data 46 to comprise the knowledge construct 40 portion of the integrated construct 10. Capabilities of analysis constructs in a preferred embodiment may generally include for example, but not limited to, the following abilities: (a) analysis constructs may reference, link and display information construct labels and/or icons or summary depictions in order to enable views and create understanding across individual information constructs, while still maintaining links to the detail within those information constructs for access by the user when desired; (b) analysis constructs may reference, link to and display information elements from within information constructs with similar access to related detail information; (c) analysis constructs may generate analysis construct views or portions of analysis construct views based on the contents of the information elements associated with specific Information constructs (as in the construction of a timeline from date elements within information constructs); (d) analysis constructs may enable the user to create a depiction of their understanding freeform, through text, drawings, graphics, images or other media forms (as in drawing the causal relationships between concepts or issues they have identified in their project); and, as described previously, (e) analysis constructs may provide visual representations and/or reference links to analyses created with other software or electronic capabilities, including but not limited to spreadsheets, graphs, images, and others.

FIG. 5H-20 illustrates an example of a partially completed workspace 44b for an analysis construct. In this particular embodiment, the analysis construct 44b provides a view of understanding of information across different information constructs, as depicted in the "event" icons and labels shown on FIG. 5H-20. The present invention enables the user to create a particular analysis view across multiple information constructs. At the same time, any detail information elements associated with each of the information constructs may be available to the user by selecting the individual information construct and having the view manager (see FIG. 3) display the detailed information elements for the selected information construct.

In one preferred embodiment, analysis constructs may also include fields such as a field associated with each unique analysis construct for the creation and entry by the user of an observational or summary statement about the analysis construct. This observational or summary statement field is generally preferably textual, but may also be comprised of a plurality of information media forms. An example of such an observational field is show in FIG. 5H-20, which is an example of a partially completed analysis construct. In one preferred embodiment, observations that are entered associated with an analysis construct are then later made available to the user in a combined view as basis for creating higher-level meaning (see later descriptions of method and process and representations).

In one embodiment, the present invention provides for the ability to save formats created for analysis constructs for future use. For example, the format illustrated in FIG. 5H-30 may be saved as "history timeline." In this way, a user can create new analysis constructs with new content and less work than the original analysis construct. In one preferred embodiment, the method, process and system provide a set of preformatted analysis constructs as models to choose from for the user.

For example, in one embodiment, the present invention provides preformatted analysis constructs for sequence, timeline, qualitative comparison and contrast, quantitative comparison, categorization analysis, family tree, and causation analysis. It should be readily apparent that additional preformatted analysis constructs are obvious extensions and well within the scope and intent of the present invention, especially if they share the same general fields and capabilities and relationships with respect to information constructs as described herein.

For preformatted analysis constructs (whether provided as standard with the method and process of the invention, or created as custom and saved by the user), the preferred embodiment provides the additional ability to automatically generate analysis constructs based on the data contained in or associated with information constructs and/or their fields or elements. For example, if information constructs have been created with fields or elements of type "date" associated with them, then the user is able to select those dates and automatically generate a timeline for their review. Similarly, if information constructs have been created with commonly defined fields or elements, then the user is able to select those commonly defined fields or elements and automatically generate a compare and contrast analysis construct. Once generated, the user is able to decide about the generated analysis construct whether to "keep as is," "modify" or "delete" the analysis construct.

In a preferred embodiment, analysis constructs as a type of component or class generally include 1.) a title, number, label or other identifier and 2.) an observational or other summary field or fields; 3.) a backdrop visual and/or overall structure for the analysis construct; and then may include any or all of the following: 4.) a structure for the inclusion of information constructs and/or information elements, 5) visual and/or data references to whole information constructs, summary views of the selected information constructs, and/or the elements or fields associated with Information Constructs; 6.) the inclusion of tools provided specifically by the present invention, as described further elsewhere herein, 7.) unstructured information notes; 8.) the creation of drawing, links with or without labels or other visual depictions by the user, and/or 9.) drawings, text, images or videos included with the analysis construct as provided by the user, and others.

In the preferred embodiment, the archetype structure provides for the ability to create analysis constructs that include references to other software tools.

Meaning Statement Set

Referring back to FIG. 1, the preferred embodiment facilitates the creation of a meaning statement set 24, preferably as a portion of the thinking construct 20 of a completed inquiry project and integrated construct 10. The meaning statement set 24 generally includes the collection of statements or other informational depictions and their relationships to one another and to other project components, as created by the user to represent understanding, meaning and judgment about the knowledge construct components, whether in the form of a hypothesis, idea or a fully formed set of conclusions or understanding. Continuing the example for the project "What caused the development of the Constitution?", meaning statements might include items like "Framers had some very different beliefs" and "Big states and little states wanted different approaches." Meaning statements can be developed at different levels of specificity and abstraction, and the present invention assists in building higher levels of meaning from lower level, or more specific statements of meaning (as described further in the method and process and representations for the system).

In one embodiment, individual meaning statements as a type or class of component available to the ITKC are generally uniquely identified by their contents. In one embodiment of the present invention, meaning statements may be assigned a unique number identifier and/or a reference as well. Although one embodiment of the present invention includes meaning statements made up of textual characters, the method and system of the present invention also facilitates the use of drawings, images, and a plurality of other media forms as meaning statements.

In a preferred embodiment, the method and system provide that meaning statements may exist independently as a part of an integrated construct (i.e., not linked to any other components or group of components of the integrated construct), or may be linked to any one or more or all of the components of the integrated construct. Links among meaning statements and between meaning statements and other components of the integrated construct may be added, changed, or deleted using the method and system of the preferred embodiment.

Figure 4D:
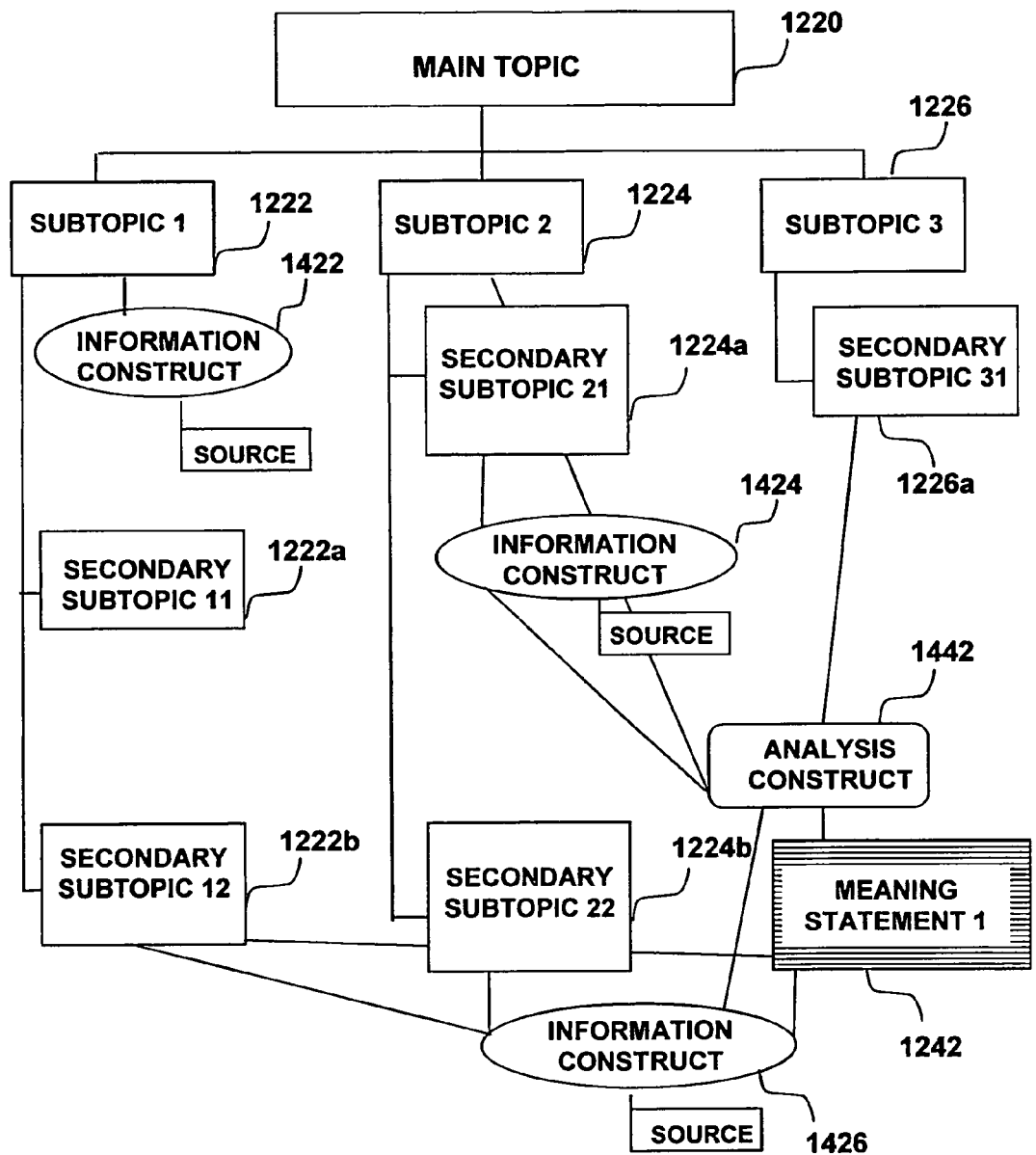
FIG. 4D is an example of the addition of a meaning statement to an integrated construct of one embodiment, in the case in which a topic set, certain information constructs, and an analysis construct have been previously defined.

In one embodiment, meaning statements may be assigned a relationship to one another, including but not limited to supporting, contradicting and others. Meaning statements may also be assigned a lateral relationship to one another. FIG. 4D illustrates an example of one embodiment of the relationships inherent in the addition of a meaning statement 1242 to an integrated construct, specifically in the case in which a topic set 22, some information constructs 1422, 1424, and 1426, and an analysis construct 1442 have been defined for the integrated construct previously. In one embodiment, the relationships between a meaning statement and another type of component of an integrated construct may similarly be constructed and labeled as to its type. For example, a meaning statement may be linked to an analysis construct (or to a portion of an analysis construct) with a link indicating that the meaning statement is "supported by" the analysis construct. Similarly, a meaning statement may be linked to an information construct or a portion of an information construct with a link indicating that the meaning statement is "not supported by" or "is contradicted by" the information construct or portion of the information construct. In one embodiment, the present invention provides the user with a number of pre-defined link types for their selection and use, included but not limited to link types such as "supports", "contradicts", "is related to", and others. In one preferred embodiment, the present invention also provides the user the capability to define their own label for the link. Meaning statements may be linked to one another in hierarchical, lateral or other relationships and also labeled. One preferred embodiment facilitates the linking of multiple meaning statements to one another at least partially through hierarchical relationships, to allow the building up of lower level, more specific meaning statements to higher level, more comprehensive meaning statements, eventually in support of the chosen answer for the project.

As discussed below, in one preferred embodiment, in the case of the use of multiple or alternative answers, one integrated construct may have multiple sets of meaning statements. These multiple sets of meaning statements may be related to the respective alternative answers, regardless of the stage of completion of the answer. The present invention also provides the user with the ability to create multiple meaning statement sets as a means of creating alternative "views of meaning" across the same or similar sets of knowledge components. Alternative or multiple sets of meaning statements associated with the same integrated construct may have all, some, or none of the same meaning statements and linkages associated with them. Similarly, alternative or multiple sets of meaning statements associated with the same integrated construct may have all, some or none of the same information constructs, analysis constructs, and topics associated with them.

In one preferred embodiment, the creation of meaning statements provides one means for the system to subset the project as a whole into meaningful subsets, for work and consideration by the user. Such a subset or individual meaning statement "view" is more fully described later in the representation discussion. In a preferred embodiment, the present invention also provides for a view of all meaning statements with their associated supporting observations, importance statements, or other supporting links to knowledge constructs such as information constructs and/or analysis constructs.

Answer or Summary Set

Referring back to FIG. 1, the preferred embodiment facilitates the development of the answer or summary component or answer or summary set 26 of the integrated construct 10, that is preferably a portion of the thinking construct 20 of an integrated construct. The answer or summary set 26 may be made up of textual characters, and/or a drawing, image, graphic, diagram, or a plurality of other information media forms. The answer or summary set 26 is preferably linked to the main topic of the integrated construct, especially in a completed construct. The answer or summary set 26 preferably may be linked via the link manager to meaning statements 24. In one embodiment of the present invention, links between the answer or summary set and meaning statements set can be labeled and categorized, including but not limited to such relationships as supportive or consistent with the answer or summary, or refuting or being inconsistent with the answer or summary set. The answer or summary set may similarly be linked via the link manager to information constructs 42, analysis constructs 44, unstructured data 46 or any other component that may be associated with the integrated construct 10.

One embodiment of the present invention provides for the creation of the answer or summary set 26 which may include one or more answers or summaries, such as with alternative answers or summaries under consideration by the user, which may be associated at the same time to the same integrated construct 10. Similarly, in this embodiment of the present invention, the linkages 60 between the multiple answers or summary and meaning statements or other components can differ, according to the specific answer or summary being linked. For example, answer "A" may have links to meaning statements "A," "B" and "C," while answer "B" may have links to meaning statement "B," "D" and "E."

The answer or summary set is preferably available to the user throughout the course of the use of the present invention in developing and editing an integrated construct, and may therefore be changed or added to in the course of the project. This enables users to develop initial answers and refine those answers as the user's work On the project proceeds. Such actions may be included as the present invention documents and tracks the user's thinking processes, and subsequently makes such tracking available.

In one preferred embodiment, the answer or summary set may also be associated with a definition by the user of the goals, requirements, or characteristics regarding what is important that the answer or summary Set achieve. These goals, requirements, characteristics or other description of what the answer or summary set should be like are similarly available to the user throughout the course of the project for adding, editing, or deleting.

One Embodiment of Software Architecture

In one embodiment, the general modules of the software architecture as depicted in FIG. 3 of one preferred embodiment interact with one another in a manner as depicted generally in FIG. 3A. Referring to FIG. 3A, the archetype process and system of the present invention facilitate the process and present options to users in the form of views and available portions of method or functions. In a preferred embodiment, such representation may take the form of a graphical user interface, as indicated in block 100. Users may generally select among available options as presented in the views, and signal an action to the present invention through a plurality of interaction devices and approaches as described above and indicated in block 110. In the preferred embodiment, the process manager evaluates the user event, as shown in block 302, and may respond in a number of ways, based on an evaluation of the action taken by the user, the history of user actions, archetype process and structure inference and completion rules, as indicated in block 3000, status of the integrated construct at the time, as evaluated in block 320, the specific portion of process being conducted by the user as indicated by their placement in the system at the time, and other relevant factors. Options for response to a user event block 110 following evaluation block 302 may include, but are not limited to the following: (i) change and re-optimize the view as indicated in block 205 and facilitated then by the view manager 200 or similar module; (ii) suggest one or more actions or alternative actions to the user based on the evaluation of the event (block 302) and ITKC status (block 320) as indicated in block 390 and then represented to the user through the View Manager, block 200; (iii) create a new component in content and/or structure as indicated in block 420 and facilitated by the process manager 400 or similar module; (iv) modify or delete an existing component both with regard to content and/or structure as indicated by block 420 and facilitated by the process manager 400 or similar module and update manager 700 or similar module; (v) create new or modify existing (automated or user created) linkages between or among components as indicated by block 605 and facilitated by the linkage manager 600 or similar module; and (vi) access and associate external data or informational sources as indicated by block 905 and facilitated by external electronic sources and the update manager or similar module 700, which may then be followed by additional user events such as creating new component, or modifying components as indicated in block 420

In this application, the aforementioned software architecture is provided as one embodiment of the general modules that may be used to implement and provide the present invention. It should be readily appreciated, however, that many alternatives in the definition, boundaries and structure of the software modules used to accomplish the capabilities and functionality of the present invention could be utilized in accordance with the present invention.

Returning again to the overall software architecture of one embodiment of the present invention as depicted in FIG. 3, the general modules of the architecture of one embodiment are described in greater detail below. The description of the Process Manager and the method and process of the present invention is below, followed by further description of the other software architecture modules of one embodiment, and later a description of a set of representations that provide the method and process to the user in one embodiment.

Process Manager: Method and Process

Returning again to FIG. 3, the process manager 300 or similar modules facilitate the archetype process. Referring to FIG. 3A, the process manager (blocks 300, 400 and further detailed in additional charts using the 500's series) evaluates the user event (block 302) and accordingly provides a response to the user that facilitates the method and process of the present invention, whether to change the view through the view manager (block 205), provide a suggestion to the user through the process manager suggestor (block 390), provide and allow the user to select among process portions being provided in the present view (block 405), whether the user chooses to access process portions such as assistance tools or others, (block 410), or to create or modify an ITKC component (block 420), create or modify a link through the linkage manager (block 600) or access external electronic information sources (block 800). The process manager further evaluates the user event (block 302) and the status of the ITKC components and structure (block 320), and determines if suggestions are warranted (block 370) based on a number of evaluation and inference approaches, including the archetype process and structure (block 3000) described in further detail below. In conjunction with the guiding nature of the design of the representations and views provided by the present invention, the process manager thus facilitates a guided process for the user which emulates the thinking and working methods used by expert problem solvers with regard to arbitrary problems and inquiry based projects and responds to user's actions throughout the course of the project. In one preferred embodiment, the user has the choice of (i) ignoring the suggestion(s) made by the process manager, (ii) acting on the specific suggestion, or (iii) saving the suggestion for future consideration.

Figure 3B:
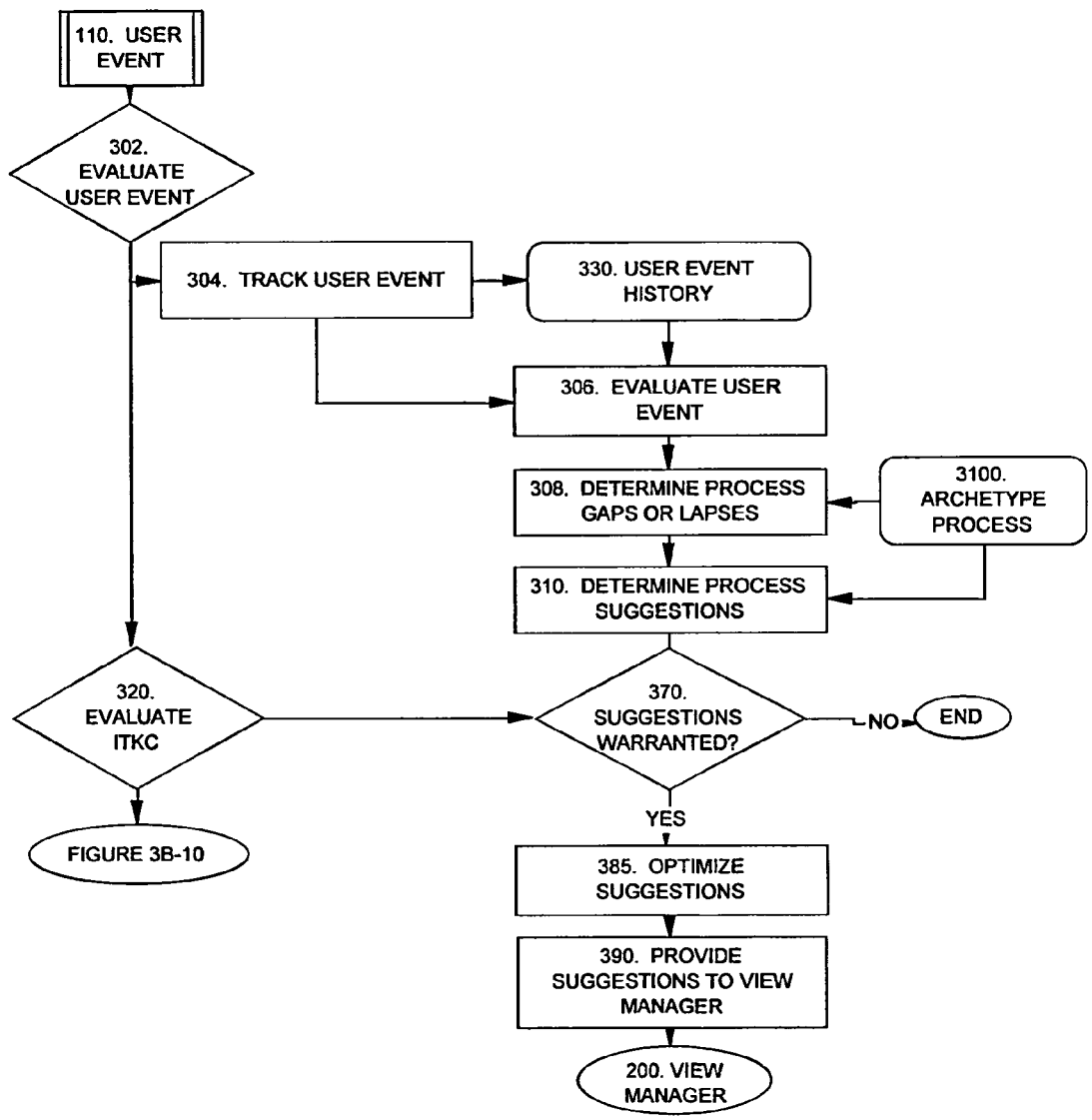
FIG. 3B is a flowchart further related to the transactions and functions associated with one embodiment of the process manager suggestor.
Figures 3, 3B, 4, 5, 6, 7, 8, 9, 10:
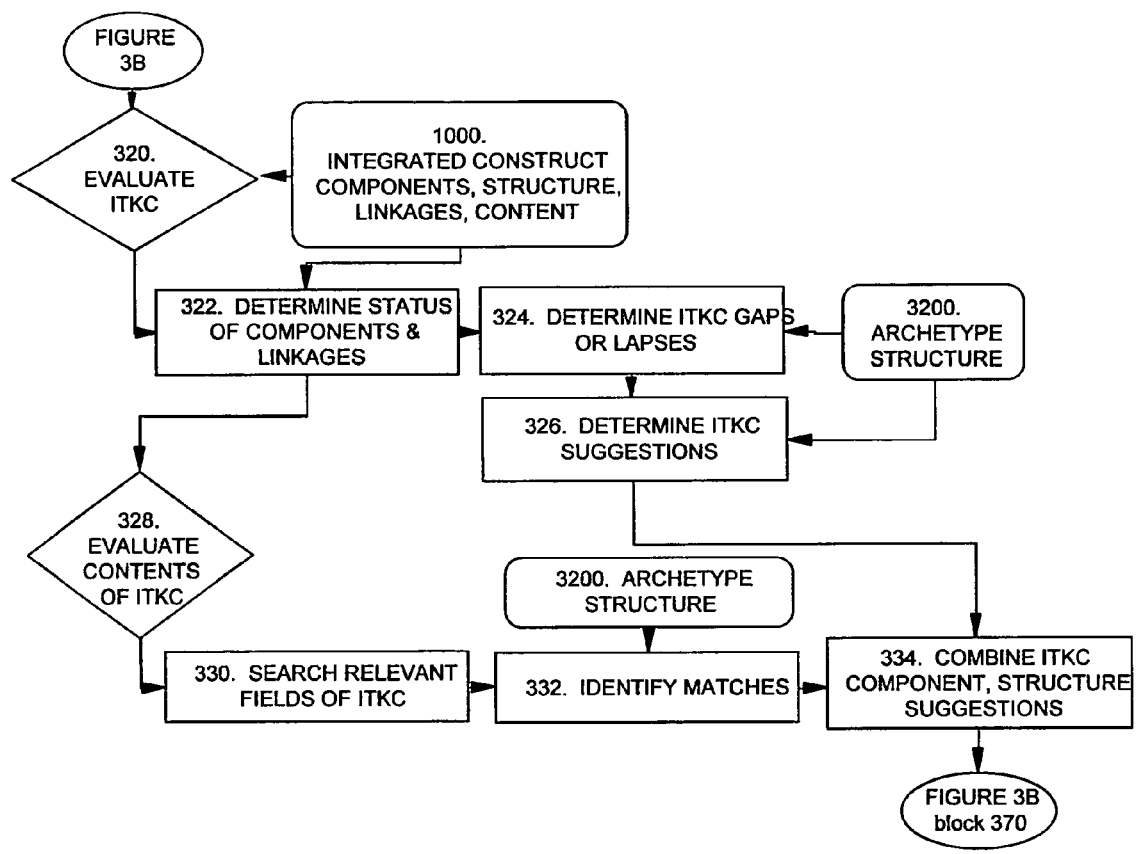

The portions of the archetype process can be used individually, as a total set, or in any subset combination, depending upon the user's needs for a particular project. Portions of the integrated construct method and process include the following major components that are shown in FIG. 5. In one embodiment, the method and process provided by the archetype process generally include the following thinking and working functions: (i) project initiation as indicated by block 510; (ii) definition of project goals and problem as indicated by block 520; (iii) definition of and revision of project structures, being structures for thinking and working as indicated by block 540; (iv) determining and revising a project plan and to do list as indicated by block 535 (v) evaluating progress and deciding what thinking and knowledge work to do next, as indicated in block 550; (vi) selecting the appropriate subset for thinking and working, as indicated in block 555; (vii) conducting research and gathering information, as indicated in block 560; (viii) organizing information, especially through constructing, formatting and/or acquiring information for information constructs to be included in the integrated construct for the project as indicated by block 562: (ix) developing and associating analyses to the project, and defining and constructing analysis constructs to be included in the integrated construct for the project as indicated by block 564; (x) developing conclusions and meaning, especially through defining and constructing the set of meaning statements to be included in the integrated construct as indicated by block 570; (xi) developing and constructing the overall answer or summary set or portion of the integrated construct for the project as indicated by block 580; (xii) evaluating whether the answer or summary set is complete, and has met the goals and answered or solved the original problem as indicated by block 585; and (xiii) creating and formatting the presentational version of the project results, as indicated by block 590. Throughout process portions (i) to (xiii), the linkage manager defines and manages linkages among and between the components of the integrated construct, as described more fully in the discussion of the linkage manager (as indicated by block 600 on FIG. 3A) below.

FIG. 5 depicts example navigation paths that generally may be provided between the major method and process work portions of the archetype process. Referring to FIG. 5, the process in one embodiment is preferably modular and generally enables multiple starting or entry points, and flexible iteration or mobility between the intermediate process portions within general guiding approaches facilitated by the archetype process. In a preferred embodiment, the archetype provides guidance to the user according to approaches preferred by expert problem solvers, but also generally enable navigation between many of the process portions. In a preferred embodiment, the ability to navigate to portions of process which are deemed less immediately related to the current process portion for the user are made available in less easily visible or accessible ways, such as through the use of a drop down menu, or visually depicted in a more removed location, as described more fully in the view description, as one means to help guide the user along the preferred navigational paths. The system generally also provides the ability to move between levels of detail within and between the process steps, as described herein. It should be appreciated that the method and process functions may be performed at additional points in the overall process in accordance with the present invention.

In a preferred embodiment, portions of the archetype process and methods may be provided and differentiated to the user in several ways, including but not limited to: (i) through the view which is presented and which may focus the user on a portion of the process or a specific type of thinking and knowledge work they have selected or has been suggested by the process manager, based on the archetype process or archetype structure, that needs to be done; (ii) through the set of interrelated views which are presented and which provide to the user access to portions of process and/or methods in useful combinations with portions of the content and structure of the integrated construct, as described more fully below (iii) through the overall visual map or overview of the project that is provided by the system and which helps indicate to the user the degree of completeness and which types of thinking or problem solving approaches have been used or accessed vs. those which have not been used or accessed, (iv) direct suggestions to the user, as described more fully below, and others. In one embodiment, some portions of process and methods may be encapsulated and presented to the user as a software "tool," or subset of method and functionality, as in a tool to construct new information constructs, a tool to construct new analysis constructs, a tool to provide help and suggestions regarding the selection and construction of the topic set. It should be readily appreciated that providing the same functionality in different encapsulations or boundaries for such logic is in accordance with the present invention.

Process Manager Guidance of User Interaction and ITKC Development

The preferred embodiment provides an approach to guiding the thinking and knowledge activities for a user to develop their thinking about an arbitrary problem through evaluating the user's actions and progress, and determining suggestions based on the archetype structure and archetype process. The present invention's visual depiction of the archetype project structure (representing content, structure, relationships, and thinking and working process) and the more detailed thinking modes or views provided by the present invention provide ongoing guidance and feedback to the user regarding the portions of thinking process they have done and should consider doing, as described more fully below. In addition, as shown in FIG. 3B, the process manager evaluates the user event (block 302), tracks the user event (block 304) to update the user history (block 330) and determines the process step and work underway by the user by evaluating the event, block 306. The process manager suggestor then determines if there are identifiable process gaps or lapses that have occurred (and especially changed with the last user event) by applying the archetype process rules in block 3100, to the current user event and situation. Specifically, the process manager may evaluate the specific working views being used by the user, the assistance tools being accessed, and the amount of interaction and time being spent in various regions or subsets of their ITKC. Such evaluation might determine, for example, that the user has not been focusing on the problem according to a subtopic specific view yet, or is using the question help tool but without results. Referring further to block 310 in FIG. 3B, the archetype process inference rules are also used as the basis for determining suggestions that might be made to assist the user, in areas that are not strictly gaps or lapses, but rather point out possible next steps.

Continuing with FIG. 3B, the process manager in a preferred embodiment also evaluates the ITKC under construction by the user (block 320 and described in further detail below), based on the archetype structure inference engine, and any suggestions so determined are combined with those defined based on the archetype process evaluation and inferences, as shown in step 370. In a preferred embodiment, the system also checks for secondary or combination impacts based on the two sources of evaluation and both archetype process and archetype structure. For example, if the archetype structure evaluation determines that the user has primarily been building meaning statements but they are not well supported by information or analysis, then the archetype process may need to also determine whether they have in fact been searching electronic sources yet. In a preferred embodiment, after suggestions are appropriately combined as indicated in block 370 in FIG. 3B, then the process manager suggestor may optimize the suggestions, as indicated in block 385 through ordering and prioritizing algorithms that may be related to the user event that has occurred, the status of the ITKC and other factors. In block 390, the process manager suggestor provides the suggestions to the view manager and the suggestions are provided to the user appropriately.

The inferences and rules used by the archetype process and the archetype structure to identify suggestions for users are different based upon the system's assessment of the current stage or phase of the ITKC.

Referring to FIG. 3B-10, the process by which the user's ITKC is evaluated against the archetype structure is now described. As a consequence of a user event, the process manager suggestor in block 322 FIG. 3B-10, evaluates the status of the ITKC components and linkages, with regard to the components that have been selected and included by the user, the level of structure of those components, the amount of information in the components, and their relationship with one another. In FIG. 3B-10, block 324, the process manager suggestor then applies the archetype structure inference and completion rules, in block 3200, in order to identify gaps or lapses in the ITKC the user has built so far, as indicated in block 324. For example, the process manager suggestor may determine that certain subtopics are as yet without information, or that some meaning statements are better supported by knowledge constructs than others. Following the identification of lapses, the process manager suggestor similarly applies the archetype structure inferences and completion rules in order to identify suggestions that may be made to assist the user, as indicated in block 326. Such suggestions may be based not only on the inferences associated with the core or macro archetype structure, but significantly on applying rules based on the actions and selections that have been taken by the user thus far. For example, if a user has identified that they are working on a sequence in a project, and many of their information constructs contain dates, then the archetype structure inferences may identify the suggestion that the user try a timeline. In both the application of the archetype process and the archetype structure, the preferred embodiment incorporates a dynamic application of rules and inferences in response to decisions and choices made by the user (or choices made by another user such as a teacher, as defined elsewhere herein). These customized or dynamically applied inferences are therefore in addition to inferences and rules that may apply throughout the course of the project.

Continuing with FIG. 3B-10, the process manager suggestor lastly in a preferred embodiment will search and evaluate relevant fields of the ITKC, preferably beginning with those that have most recently changed and the fields that are most closely related to those changed fields, as indicated in block 330. In one embodiment, the process manager suggestor searches for content specific matches to a set of archetype structure inferences that are content based. For example, the process suggestor manager may search topic fields for phrases that the archetype structure identifies as having relationships to other archetype components. Specific examples are described below. As with the other archetype evaluations, as shown in block 332, in this embodiment, if the process manager suggestor identifies matches to encoded relationships, then the archetype structure inferences in block 3200 will identify a potential suggestion to be made to the user. For example, if the topic the user has entered is "What caused the development of the Constitution?", the process manager suggestor might suggest the user consider a timeline. As with the other archetype suggestions, the process manager then combines suggestions or lapses determined through content evaluation with thine determined about structure through the archetype structure evaluation, as indicated in block 334.

In one embodiment, suggestions determined by the process manager may include but not be limited to suggestions regarding: 1.) specific types of components or advances in components the user may want to consider adding next; 2) other views and therefore other thinking or work foci that the user may want to select next; 3.) one or more information constructs, analysis constructs, topics/questions, meaning statements, or answer(s) which the user may want to revisit and review, 3.) linkages or relationships which the user may want to add, revisit and review; 4.) specific activities that the user may want to consider next, such as additional research, revisiting and revising their questions/topics, reviewing data they have collected so far, and others. In one embodiment of the present invention, the user is also able to add their own general rules or principles regarding the process they believe works best for them, in one example as thinking prompters, as described below.

In a preferred embodiment, the Process Manager may utilize a number of approaches to accomplish these evaluations and determine if one or more suggestions should be made to the user. It should be readily appreciated that an approach for determining guidance that may be useful in one type of ITKC component or thinking and knowledge activity may be employed in other types of components or activities as well. Further examples of types of inferences that may be made by the process manager suggestor in one embodiment may include the following:

1.) The process manager may determine suggestions based on comparing the existence, number, and linkages of components of the ITKC constructed by the user to those expected or desired for the archetype or exemplary structure. For example, an exemplary project may be expected to have meaning statements that are supported by one or more knowledge constructs (whether analysis constructs, information constructs, or unformatted information). In this embodiment, a meaning statement that has no knowledge construct support linked to it at the time may be evaluated by the process manager as an indication of work yet to be done by the user. Additional examples of such gaps between an exemplary project and a project as completed by the user may include items such as: topics that have little or no information or knowledge linked to them, and others. In this embodiment, the present invention's definition of the exemplary or archetype taxonomy of a inquiry based project provides a basis for gap analysis to the ITKC being developed by the user that would not be possible without such an archetype.

2.) The process manager suggestor may evaluate the user event history. For example, if most user events have been occurring in the research and data gathering regions of the system, or if the user has focused primarily on a topic by topic view and has not yet looked at the meaning that has been developing, the present invention may suggest the user "go to" the complementary or so far little used views or regions next. In one embodiment of the invention, the process manager provides a user such as a teacher with the ability to set parameters for how much emphasis the student should place on different thinking and knowledge activities and views, or how much time is to be spent accordingly, as discussed elsewhere herein.

3.) In one embodiment, the process manager may determine suggestions based on evaluating information entered by the user into the ITKC, and use of project component and relationship rules. For example, in one embodiment, the present invention may evaluate the text entered by the user into the main topic structure (for example, "What caused the development of the Constitution?" and may suggest a subtopic "What events led up to the Constitution?"

4.) In one embodiment, the process manager may determine suggestions based on identifying patterns within similar types of constructs. In one embodiment, the process manager may for example, examine and use the occurrence of patterns such as the same phrase multiple times in unstructured data notes as the basis to suggest to the user to create an information construct or grouping of the unstructured information for that phrase.

5.) Referring to block 350, in one embodiment, the process manager may determine suggestions for transitive relationships between information constructs, meaning statements, and any ITKC component which may be so logically related. For example, if information construct A has been designated through a labeled link as "like" another information construct B, and information construct B has been similarly designated by the user as "like" a third information construct C, then the process manager may prompt the user whether information construct A is also "like" information construct C. Such labeled links may also be used by the process manager to suggest other components to the user.

6.) Providing of thinking and working prompts or suggestions that are related to the specific portion of work being conducted by the user. For example, in one embodiment, the present invention preferably includes a set of thinking prompts for each analysis construct provided by the invention, to assist the user in making meaning from the analysis construct. For example, the timeline might include the availability of thinking prompters like "What things were going on at the same time?" In one embodiment of the present invention, a user is able to add their own thinking prompts to components or views for future use.

It should be appreciated that the fact that the present invention provides a common taxonomy for components and structure of an ITKC, together with a modular but guided thinking and working process, in conjunction with the use of semantic and other methods readily understood by those skilled in the art, may be used to provide a rich set of suggesting abilities in the present invention. It should also be appreciated that such evaluating and guiding approaches may be used in combination with one another, and that the addition of similar types of inference and suggesting abilities does not depart from the scope and intent of the present invention.

Returning to FIG. 3B, block 304, in one embodiment, the process manager tracks and evaluates actions taken by the user, and updates the history of user events as indicated in block 330. In one embodiment, the user event history may include some, all or any of the following: the user actions taken (which may be measured both in terms of interactions and in terms of time spent), the view and/or component the user had active in their display at the time those actions were taken, the recent history of any suggestions that may have been offered by the process manager, the user response to such suggestions, the status of the integrated construct content and linkages at the time, and other relevant tracking data. As the integrated construct is likely to be constructed during multiple use sessions, the user event history may also differentiate such user history for specific use sessions, including the tracking of date and time spent by the user. In one embodiment, the user event history tracks time duration between specific actions, as well as time spent on each view and/or component. In one embodiment, changes in the content of the integrated construct are also tracked as part of the user history. It should be appreciated that any action and change made with regard to user actions and/or the content, linkages or structure of the integrated construct may be tracked, evaluated, applied against project completion rules, and subsequently made available for reporting and review in accordance with the present invention.

In one embodiment of the present invention, the process manager stores "snapshots" of the integrated construct as part of the project user history. For example, a "snapshot" of the integrated construct—including its content, structure, and linkages—may be taken and stored at the end of each use session. In an alternative embodiment, the project assigner (such as a teacher) or the user may select how often and under what circumstances they wish to "snapshot" their integrated construct. For example, a teacher may want the integrated construct "snapshot" view taken every half hour or every hour during the student's project. The ability to compile and store a "snapshot" of the integrated construct is made meaningful at least in part because the component types of the integrated construct differentiate thinking and knowledge content and activity types. In one embodiment, the series of "snapshots" of the integrated construct provide another mechanism by which the thinking and work processes used in the completion of a project may be tracked, mapped, and made available for further consideration of how the user works or should work best.

In this manner, the Process Manager acts as an expert system component of the present invention, orchestrating a dialogue and providing suggestions to the user about the generalized inquiry project and problem solving process.

The following generally describes a course activity through the method and process of the present invention, as facilitated by the archetype process. This method and process description provides a delineation of functionality generally provided by the present invention, in conjunction with the views and representations which are the primary mechanisms for delivering the functionality, which are described in further detail later. The following description of the steps or portions of the method and process components of the present invention is provided in a logically linear fashion. However, it should be appreciated that one advantage of the present invention is that the user can navigate across and between the portions of the method and process flexibly, and through a plurality of paths, as indicated above with respect to FIGS. 1A, 1B, and 1C, within the guided approaches provided by the representations and process manager suggestions and other approaches, as described elsewhere herein.

In the following description, the terms "project" and "integrated construct" may be used interchangeably.

Method and Process: Project Initiation and Defining Integrated Construct Title or Label Referring to FIG. 5, specifically block 510, in order to use the method and process of the present invention and initiate an integrated construct, the present invention may prompt the user for the user name or identifier. If the user has previously defined a user name or identifier in the system, the user may type in the name or identifier, and is subsequently asked for their password in order to access the system and any previously created or saved files. If the user has never set up a user name or identifier before, or wishes to define a separate user account for any reason, then the system may provide a function to enter a new user name or identifier and password for a new account. The methods and technical approaches for implementing such a "sign on" can be conventional. Similarly, any suitable approach which provides for the identification and recognition of users and their associated integrated constructs in a manner which provides protection (when desired) and access to the integrated constructs previously created by any user, and which subsequently facilitates the use of the method and system of the present invention may be employed in accordance with the present invention.

In one embodiment, once a user has successfully entered the system, the present invention may prompt the user with a number of optional functions such as: (i) creating a new project/integrated construct (ii) reviewing and/or subsequently editing an existing project/integrated construct; or (iii) reviewing integrated constructs saved for access by the user but originally created by other users, and others. In one embodiment of the present invention, suitable presentational indications may be made for the integrated constructs or projects that are currently under construction as well as those that are completed. In another embodiment, projects already completed may be grouped or categorized and Subsequently labeled.

In one embodiment, an integrated construct is generally initiated upon the assignment of a title, label or other unique identifier for the project. If the user enters a title label that has been entered previously, the present invention may identify the previously entered integrated construct and prompt the user whether to overwrite the previously existing project, or provide a different title label to create a new project. Similarly, if the main topic statement that is entered is identical to a main topic previously created, the present invention may identify the previously created main topic and prompts the user with a number of options such as the option to: (i) overwrite the previously created integrated construct and main topic; (ii) create a new integrated construct with the same main topic; and (iii) create a new integrated construct and a new main topic. Selection of these options, prompted by the process manager and displayed by the view manager, is accomplished more specifically through the user interaction mechanisms described in greater detail in other sections herein.

Upon entering a title or label for the new integrated construct, a unique reference for a new integrated construct is preferably created, and can subsequently be displayed or depicted according to the representational approaches described more fully herein. Access attributed to this unique identifier includes the underlying content and structure of the new integrated construct in its respective stage of completion, including any linkages among or between the components of the integrated construct, and the appropriate representation thereof. In a preferred embodiment, representation of a newly created integrated construct may include delineation of regions or components of the integrated construct which have been created or which are inferred as needed by the present invention based on the archetype structure and/or archetype process but are in the project's earliest stages void of content, but may still be visible and accessible to the user (as described elsewhere herein).

In one embodiment, as for a teacher's user, the present invention may also allow a user to define guidelines or parameters for the project, which may include but not be limited to items such as the number of specific components (such as topics, information constructs, analysis constructs, etc.), the types of specific components (such as types of information constructs, for example), the characteristics of specific components (such as formatted vs. unformatted, or including certain fields, or having at least a certain number of levels, for example), and other characteristics. In addition to such parameters, a preferred embodiment allows another user, such as a teacher, to provide content specific starting points for the ITKC, and the setting of rules for the archetype process or structure.

Figure 5:
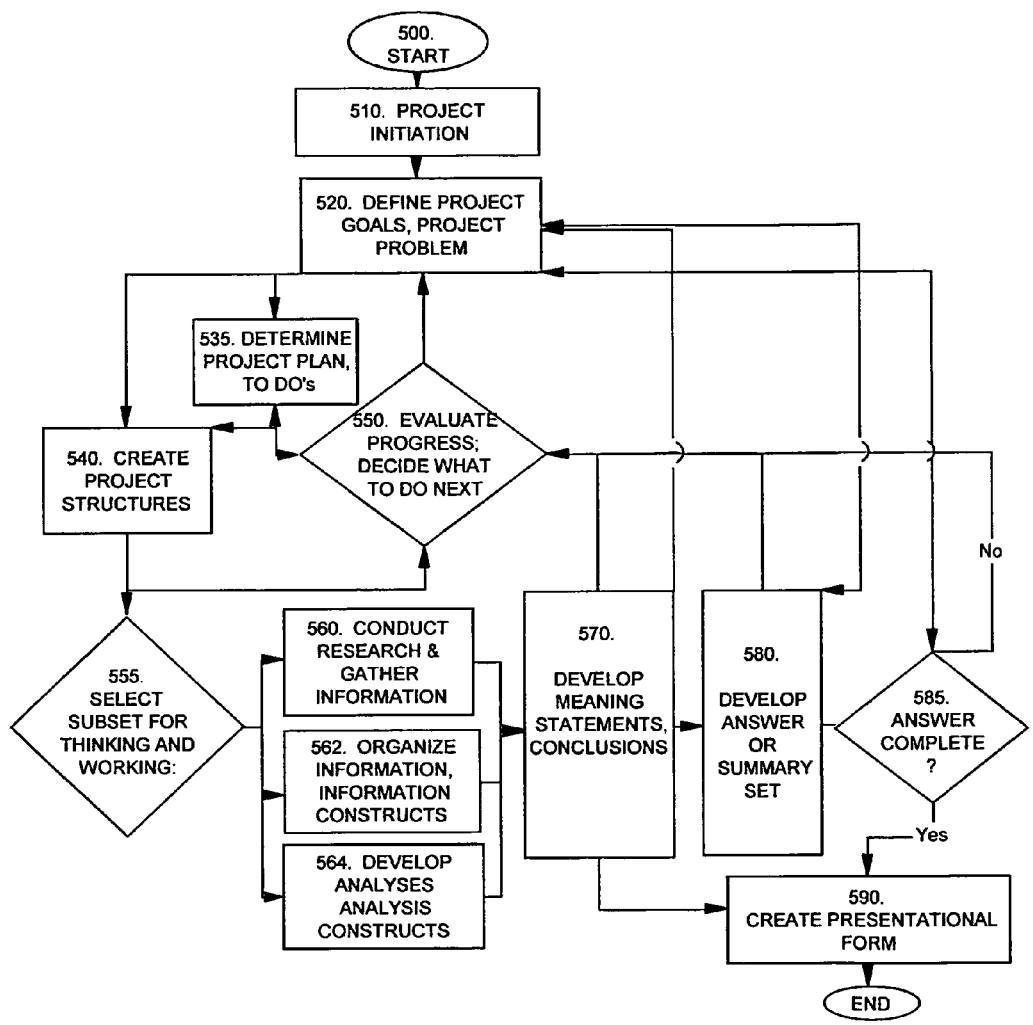
Figure 5A:
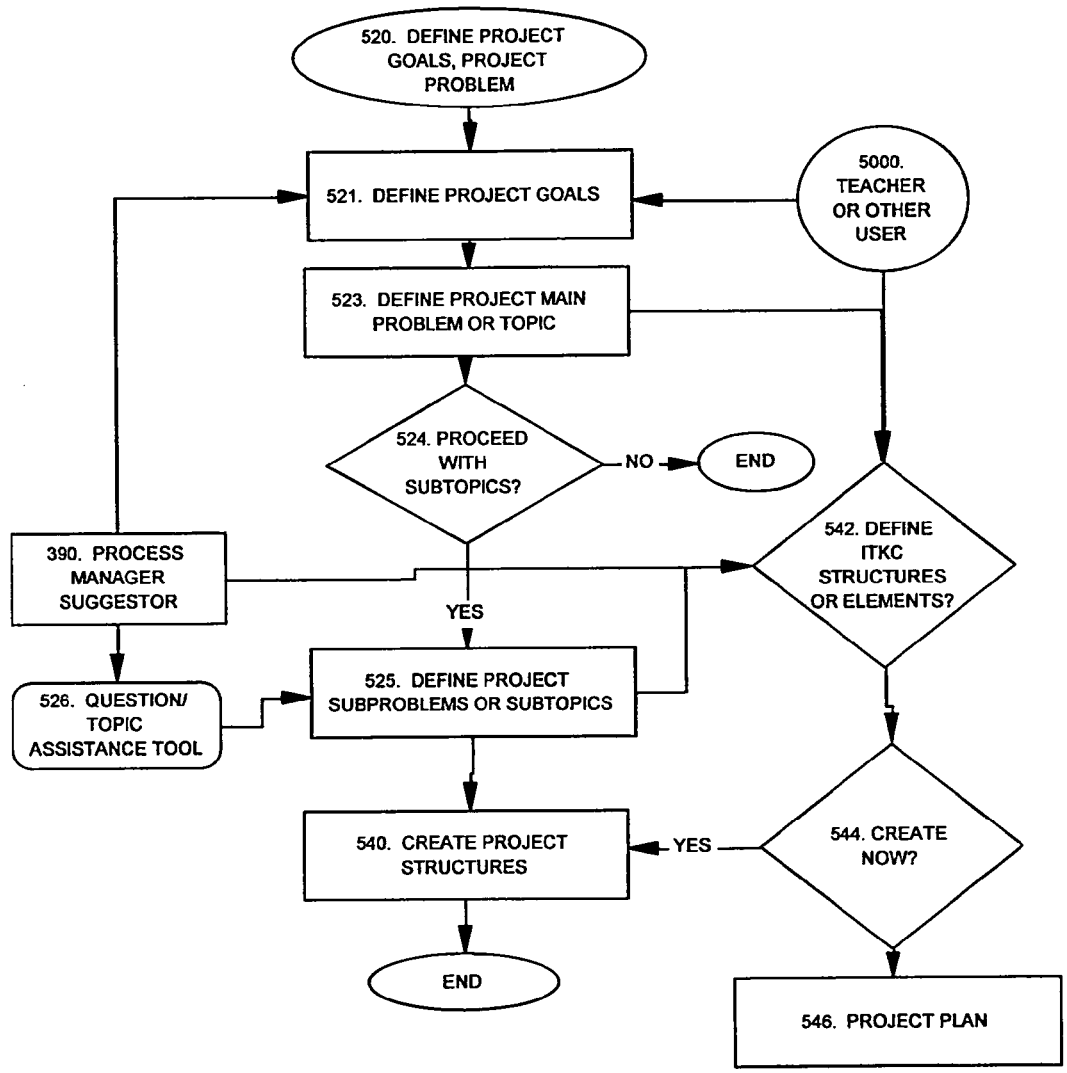
FIG. 5A is a flow chart showing additional detail regarding defining the project initiation, goal and problem definition.

In one embodiment of the present invention, a user has the ability to make only portions of the method and process and integrated construct available for a project, as might be done by a teacher in order to teach certain thinking or knowledge related skills to students, or as might be done for simple projects. For example, a teacher or other project assigner may wish to have students or other users focus only on portions of the total method and process and capabilities of the present invention. In a preferred embodiment, the project assigner can set up parameters that are later available to the project participant or user, such as project goals, project start date, project end date, and the like. Also in a preferred embodiment, the project assigner may also "turn on" or "turn off" various parts of the archetype for the duration of the project assignment. For example, a teacher may want students to create only a timeline in a particular project as their analysis construct. One preferred embodiment of the present invention includes an electronic, searchable list of all state educational standards for use by teachers in assigning projects. It should be appreciated that a number of different approaches may be used to structure and assign the project without departing from the scope of the present invention. FIG. 5A indicates the input that a teacher or other source may have on the parameters and initial content for an ITKC in block 5000.

Method and Process: Definition of Project Goals and Project Problem

Referring to FIG. 5, specifically block 520, the archetype process in a preferred embodiment facilitates the user in defining and revising the project goals and problem or topic definition for the project, as detailed more fully in FIG. 5A. Referring to FIG. 5A, block 521, in a preferred embodiment, the process manager facilitates the user preferably in further defining the project by entering a main problem or topic (for example, in an educational setting, the main topic or problem might be "What caused the development of the Constitution?"), which can be in the form of a topic statement, a problem statement, a question, a subject, an issue, or any suitable definition of an area of interest for the user as noted in the definition of the integrated construct components discussed above. The main topic may be in any suitable media form. Referring to block 524 in FIG. 5A, subsequent to the creation of a title or label and main topic for the integrated construct, the process manager, together with the view manager, provides for choice by the user, as indicated. If the user is ready to proceed with defining subtopics, (or sub-problem statements, sub-questions, sub-subjects, sub-issues or any other subdivision categorization of the area of interest) in the integrated construct, the user may choose to proceed with the process outlined below. For example, for the main topic "What caused the Constitution?", the user might define subtopics like "Who created the Constitution?", "What is the Constitution?", "What events led up to the development of the Constitution?" or others, in one embodiment according to the process set forth below. If not, the definition of the problem ends. In addition, in a preferred embodiment, the process manager may provide at the same time for the user to document or enter notes, drawings or graphics or other media as their initial thoughts on knowledge and information. In one embodiment, these unstructured workspaces are labeled to be attributed to starting views on current knowledge of the user, and starting views on needs for additional knowledge or analysis. Referring to block 542 in FIG. 5A, the process manager in one embodiment also provides for the rapid ability for the user to indicate that other project structures are to be included in the project (for example, if the user in defining subtopics or the main topic determines that a timeline is appropriate to use in their project, they can select one in block 542, and it is created according to block 540 as an "empty" knowledge construct for future work). As defined elsewhere in this document, in one embodiment, the process manager may also make such suggestions to the user both with regard to specific subtopics, other project structures that should be included, and others. Subsequent to the creation of a title or label and main topic for the integrated construct, the process manager of the present invention may preferably provide four additional options to the user, which include but may not be limited to (as described in further detail below): (a) to enter initial comments or a drawing into the main answer or summary view component of the integrated construct; (b (d) to navigate to and proceed with functions associated with the project plan and to do's list. However, the method and process provide for the navigation to and choice of other components of the method, process, and associated integrated construct components if desired by the user, although the archetype process and navigational paths encourage the user in the more closely related activities as described here.

Referring to FIG. 5A, if the user selects the option to enter subdivisions or other elaboration of the main topic, the process manager in block 525 may provide Options including the following: (i) creating fields for and entering information into a plurality of subdivisions of the main topic, and subdividing and linking them appropriately in a customized fashion directly; and/or (ii) use of the topic/question help assistance portion or tool as indicated in block 526 (and which is a subset of the total process manager suggestion capability as defined more fully elsewhere herein) which is available to assist users in defining and revising the topic set, in order to define subdivisions or further elaboration of the main topic and subsequent subtopics. In a preferred embodiment, subtopics may be entered as text statements, and may also take the form of a drawing, image or any other standard or suitable information form, with or without the inclusion of additional text annotation. Using the link manager, links and associations between and across levels and individual subtopics may be created, including but not limited to the level and relationship of the subtopics to the main topic and to each other. In a preferred embodiment, multiple levels of subtopics can be entered and appropriately linked.

Figure 5B:
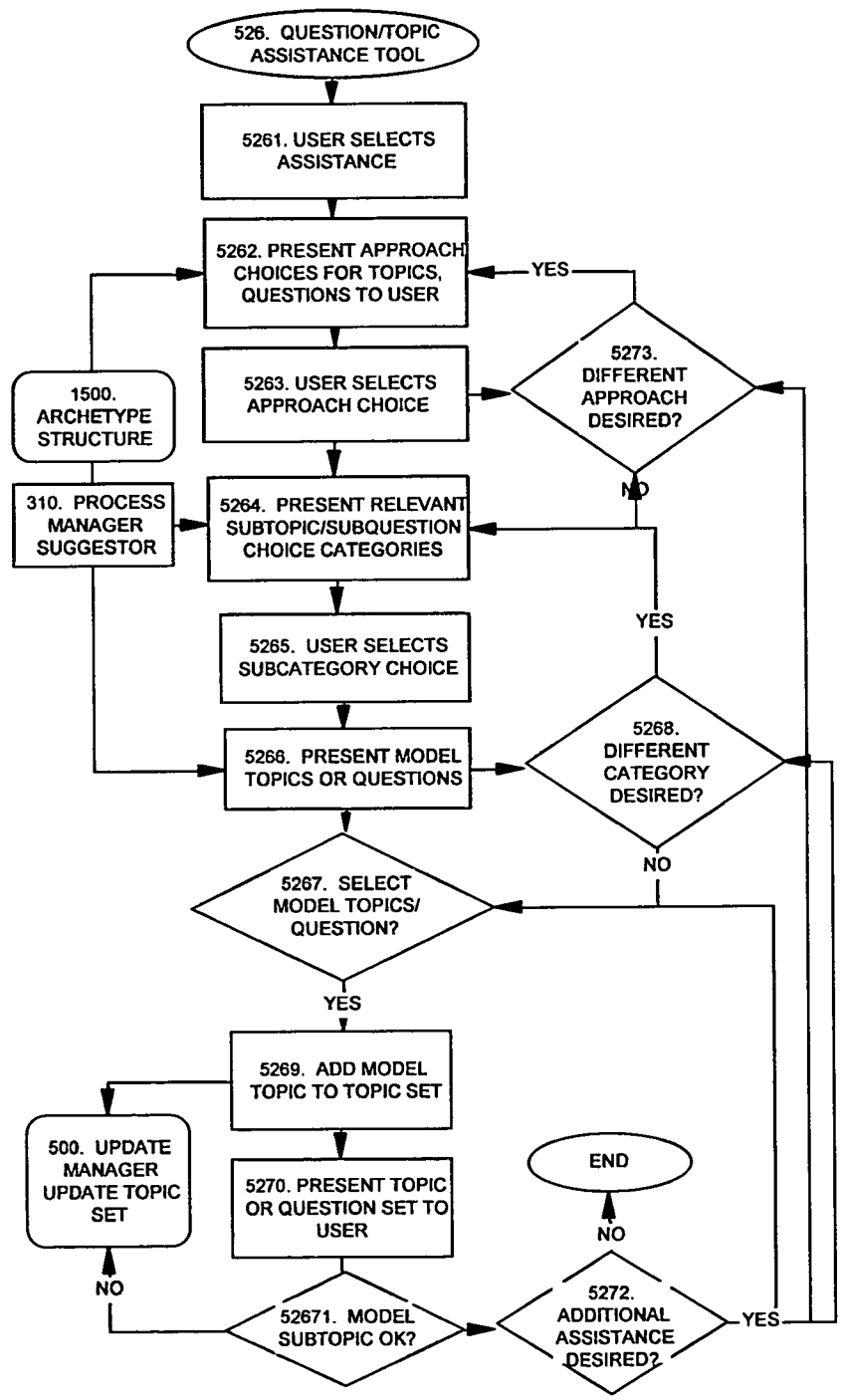
FIG. 5B is a flow chart showing additional detail regarding one embodiment of the question and topic assistance tool.
Figures 5, 5B, 6, 7, 8, 9, 10:
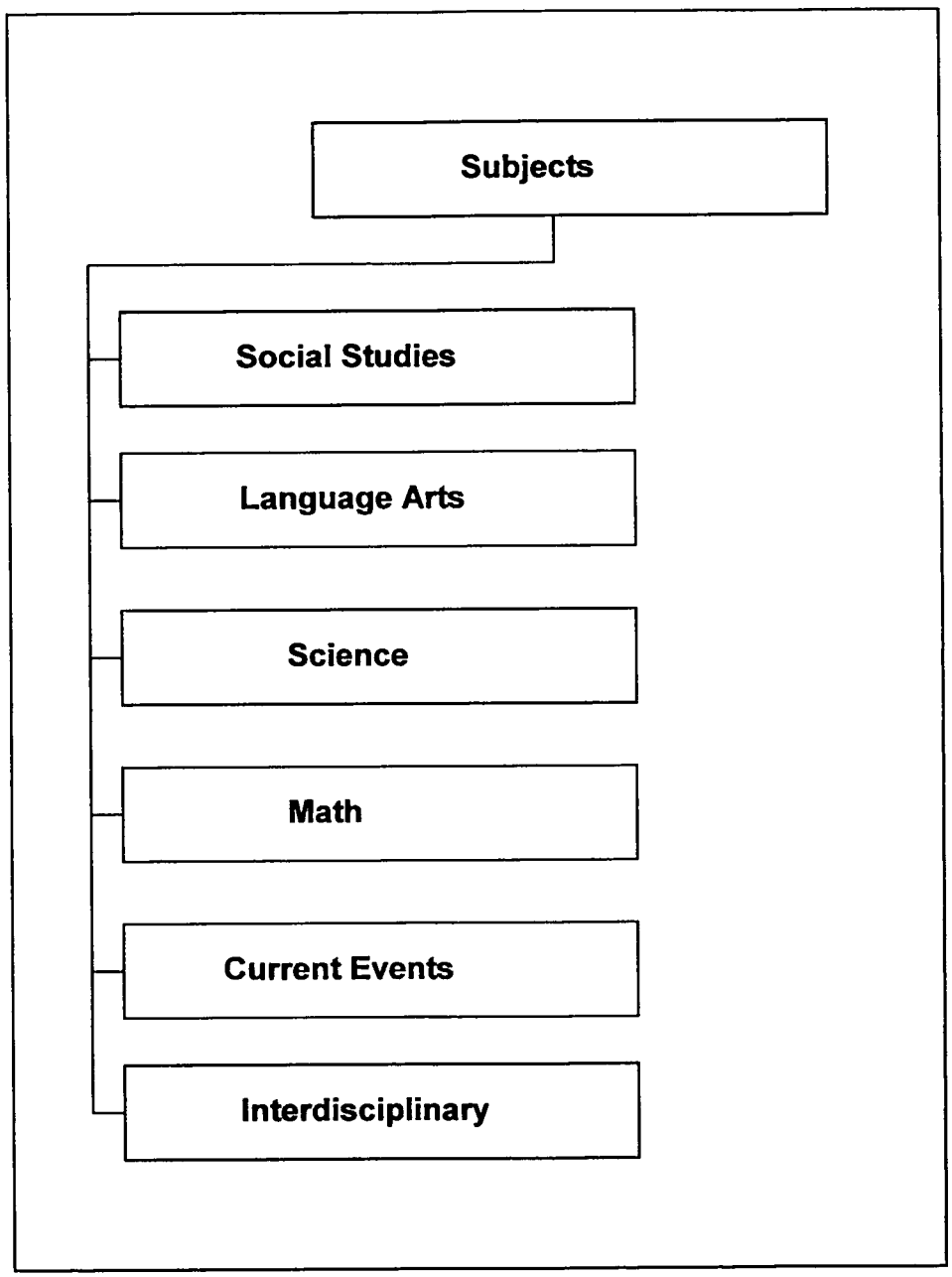
Figures 5, 5B, 6, 7, 8, 9, 10, 11, 12, 13, 14, 15, 16, 17, 18, 19, 20:
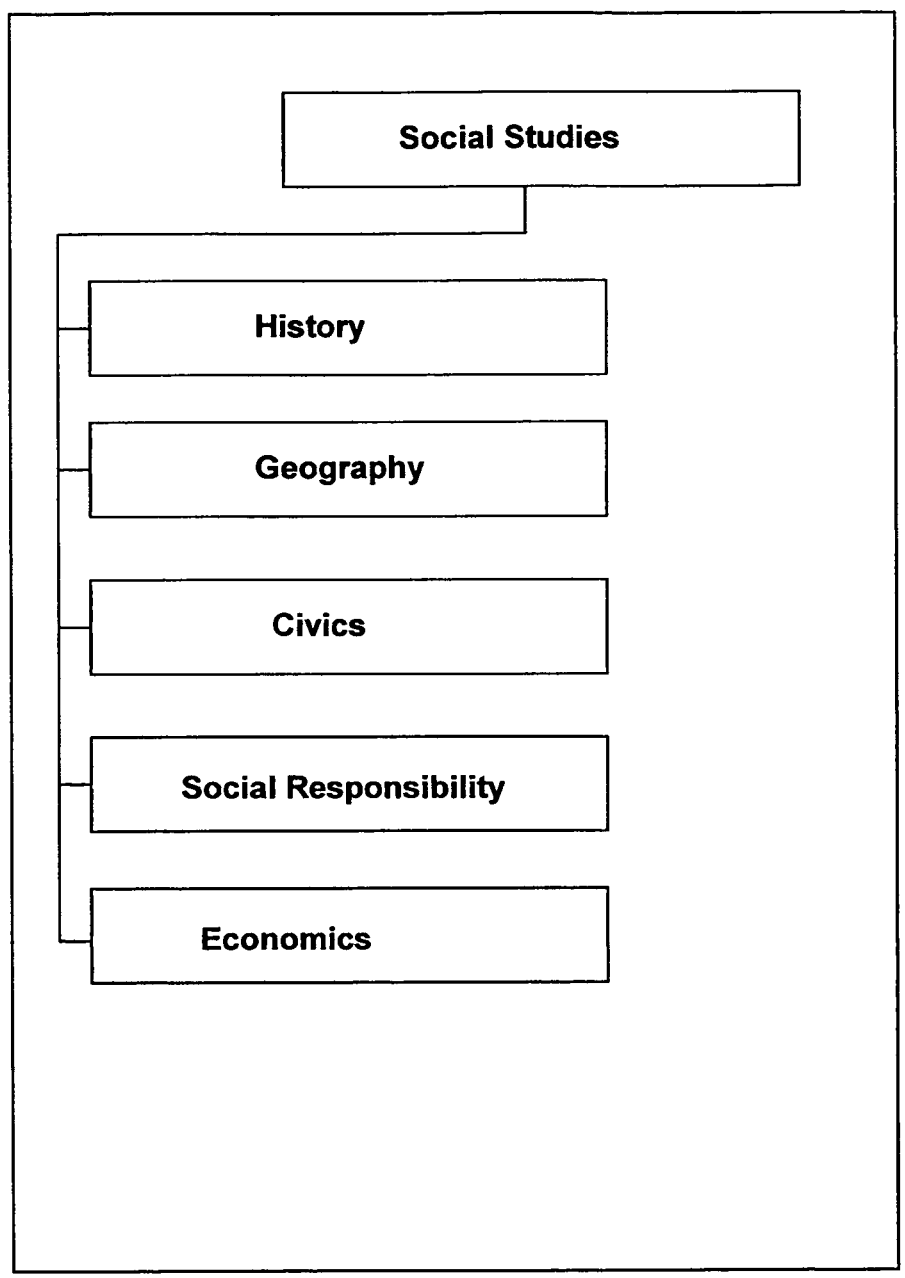
Figures 5, 5B, 6, 7, 8, 9, 10, 11, 12, 13, 14, 15, 16, 17, 18, 19, 20, 21, 22, 23, 24, 25, 26, 27, 28, 29, 30:
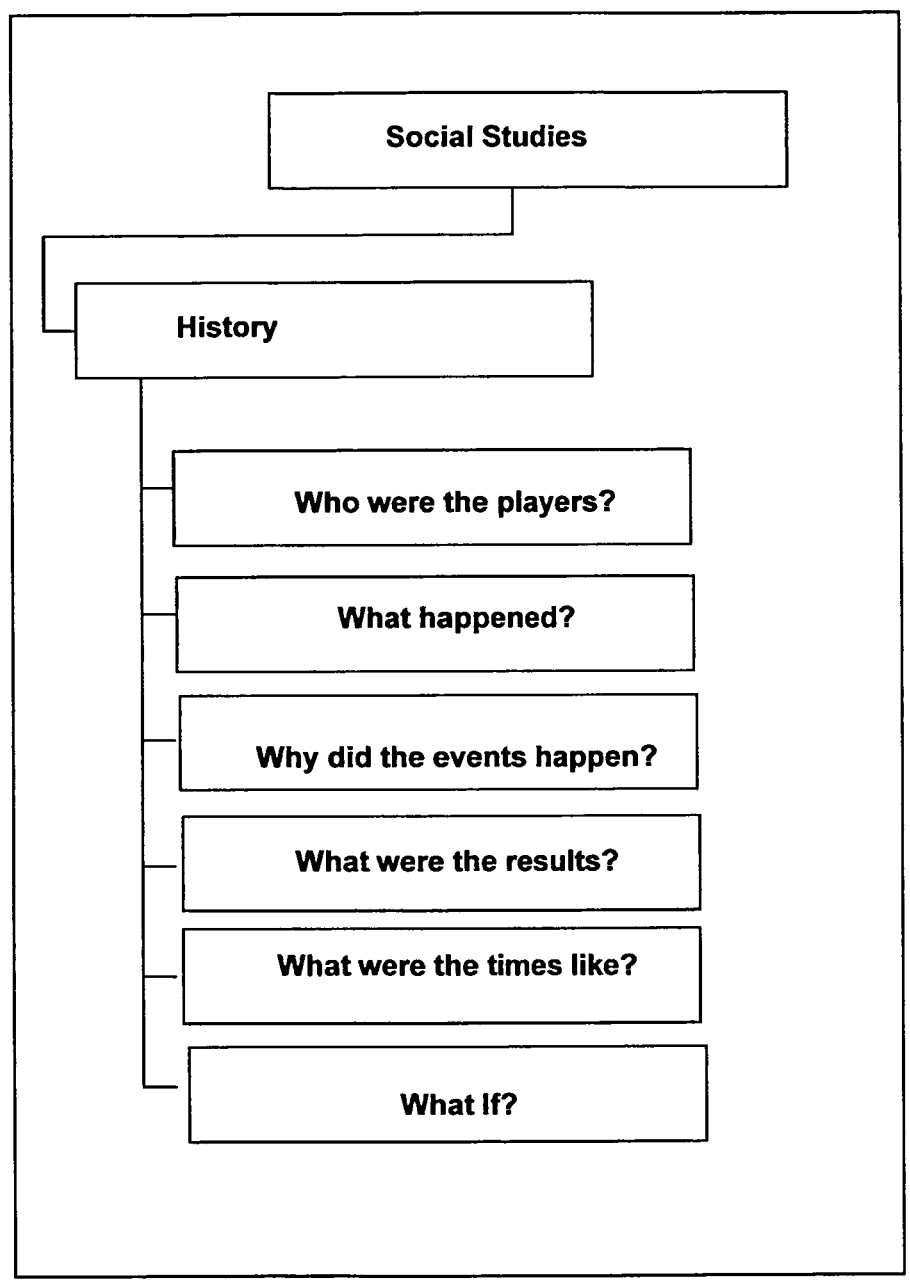
Figures 5, 5B, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40:
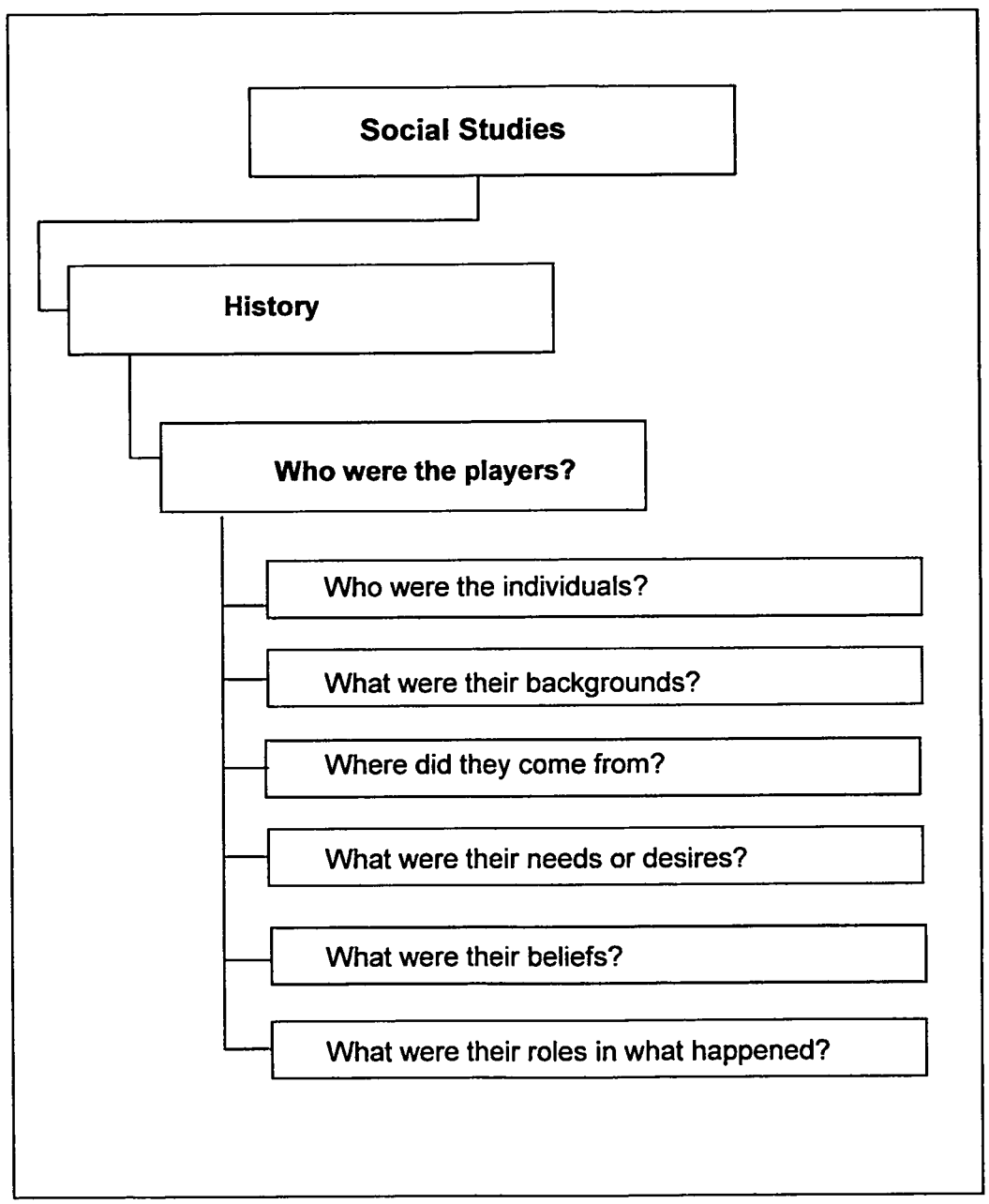

FIG. 5B illustrates a flow chart for transactions associated with one embodiment of an additional topic/question assistance method and process portion or tool provided by as one portion of suggestions by the process manager suggestor in one preferred embodiment. As illustrated in FIG. 5B, in one embodiment, the present invention may display through the view manager the highest level of optional topic/question approach choices to the user available for such topic set assistance in block 5262 (such as by problem type, by academic subject, and others). In one embodiment, choosing a category or choice will generally lead to the ability to review samples of topics and topic structures and potential selection of the components of the sample topic structures for the user to associate with or input into the integrated construct, as described more fully below.

The following discussion refers to FIG. 5B unless otherwise noted. As shown in block 5264, the user may be presented with categories or classes of model topics, questions or problem statements for selection (for example, classes of subjects). An example of these topic/question approach choices or categories is shown generally in FIG. 5B-10, depicted in outline form. Upon the selection of the desired category by the user, shown in block 5265, the process and system in one embodiment may also present subcategories that are available to the user related to the category that has been chosen. An example of the use of such subcategories is shown in FIG. 5B-20. It should be appreciated that a plurality of levels of categories could be so used and be in accordance with the invention. In a preferred embodiment, as described elsewhere, herein, the process manager may also "jump" to a suggested question or topic, either through navigating the user directly to a lower level choice, or by presenting the subtopic suggestion to the user directly, or others. Continuing with FIG. 5B, block 5266, following the selection by the user of a subcategory, in one embodiment, the topic/question assistance portion or tool may provide a set of model topics or questions to the user. An example of one embodiment of such model topics is shown in FIG. 5B-30, and an additional example embodiment of such model topics is shown in FIG. 5B-32. Following selection by the user of a model topic, in block 5268, the topic/question assistance portion or tool may provide a set of model subtopics for the user. One embodiment for the presentation of model subtopics for the user are shown in FIG. 5B-40. It should be appreciated, however, that modifications to the exact format or appearance of model topics and model questions can be made in accordance with the present invention. It should further be appreciated that the function of providing topic/question/problem assistance in this manner can be implemented in a variety of different forms with regard to the information provided at each node of the model structures, in text, or in text supplemented with images, drawings, charts, or audio support. It should also be appreciated that although the example provided herein deals with a category, a subcategory, and then specific model topics, questions, or problem statements associated with that subcategory, additional levels of subcategories may be provided and selected and navigated in a manner similar to the manner illustrated herein in accordance with the present invention and the role of the categories, sub-categories and model topics, questions or problem statements within the larger system as a whole.

Options provided to the user by the process manager from such a display of model subtopics include, but are not limited to the following: (a) selecting the model topics, questions or problem statements individually (or as sets) "as is" for inclusion within the topic structure of their integrated construct (as indicated in block 5269 in FIG. 5B); (b) selecting the model, topics, questions, or problem statements and subsequently editing those statements as they see fit, according to standard editing techniques, for inclusion within the topic structure of their integrated construct; or (c) proceeding with entering subtopics directly, without referencing or using the model subtopics, questions, or problem statements offered by the system. If the user desires to include a model topic (question, problem, subject or issue statement) offered by the topic/question help tool, the user generally indicates their "selection" of the model topic. The selected model topic is placed into or associated with the topic set of the integrated construct currently under construction, indicated by block 5269 and the update manager block 500. The user is free to either leave the model topic "as is" or edit the model topic as they see fit. The method, process and system of the present invention enable the user to review and subsequently edit their topic structure throughout the course of their project as they wish. It should be appreciated that the Process Manager of the present invention may track and respond to actions by the user with regard to the topic set, such as prompting the user if the user indicates the desire to delete a topic or question that has knowledge constructs associated with it, as to whether the user wishes to delete the associated knowledge constructs as well, or leave them as part of the integrated construct, or associate them with a new or alternative topic or question, and other actions.

FIG. 4A-10 is an example of topic set for an example project, "What caused the Constitution?"

Referring to FIG. 5 block 535, in one embodiment, the process manager's facilitation of a user's or users' definition of a problem or main topic in block 520 results in the creation of a project structure, namely the creation of a topic set. In a preferred embodiment, the topic set may therefore be the first project structure of the archetype structure to be created, and serves as a means to subset the project into meaningful portions for thinking and knowledge work.

Referring to FIG. 5, block 535, the process manager in one embodiment provides for the creation of a project plan for the project being initiated. As used herein, the project plan may be facilitated by the present invention in a number of different forms, from very unstructured notes and/or drawings, to a more formalized plan for activities that the user believes needs to be done. In one preferred embodiment, the creation of any project structures is then indicated in and added automatically to the project planning view for the user. In one preferred embodiment of the present invention, the project plan is available to the user throughout the course of the project development. As described further below, in a preferred embodiment, various views prompt the user for additional notes regarding items to consider doing next or in future, or items or additional notes on other questions they have defined. In a preferred embodiment of the present invention, the process manager collects such notes together and provides them to the user as input to development of a project plan.

In one embodiment, the present invention may provide a number of model projects or templates from which the user can select in order to structure their project initially. Selecting such model projects or templates allows for the creation of a skeleton project in a quick start fashion, and may include a plurality of components, such as starting topics, starting information constructs, starting analysis constructs, skeleton or starting meaning statements or alternative answers, as well as starting or suggestions for activities. In one embodiment of this capability, the present invention may provide suggestions and options for project components and activities in response to the selection of characteristics or goals for the project by the user. In another embodiment, the present invention provides for model ITKC's for projects depending upon their problem or project type. It should be appreciated that the design of the archetype structure and archetype process lend themselves ready to additional methods of creating starting points for projects, and that these are within the scope of the present invention.

Referring again to FIG. 5 block 550, the process manager together with the view manager provides ongoing mechanisms and in some cases suggestions to the user or users regarding evaluating the ITKC's progress and the user's actions and deciding what to do next (as described in greater detail elsewhere herein). Such evaluation, together with the ability to easily subset the thinking and knowledge work according to approaches and combinations used by expert problem solvers, provide an ongoing ability to develop the thinking and knowledge associated with the problem not possible otherwise.

Referring again to FIG. 5, in block 555, the process manager facilitates and guides the user in selecting the appropriate subset for thinking and working on the project at various times through the course of the project's development.

Method and Process: Editing the Integrated Construct

Referring to FIG. 3A, in a preferred embodiment, the process manager provides the user with the ability to generally review and modify all components that are in existence at that time part of an integrated construct. In one embodiment, as described more fully elsewhere herein, the process manager through the view manager may facilitate such modification by being selected in a suitable view provided to the user in which they appear. In one embodiment of the present invention, the selection of the integrated construct component occurs through placing the computer mouse in a position to cause the pointer to appear over the icon or high level representation of the component on the representation. In one embodiment, the user then double clicks the icon or high level representation for the integrated construct component, and is presented with access to the detail of the contents, structure, linkages and label for that component. In one embodiment, one interaction with regard to a icon or highest level representation of a component (such as a double click of a mouse) may present a summary set of information about that component, while a second interaction may provide a lower, more detailed level of information about that component. In another embodiment, a left click on a mouse might present a summary view of a component while a right click might present a linkage view of that component. Views and representations are described more fully in the last section of this document. In this embodiment, elements associated with the selected component are then generally editable, through a commonly accepted mechanism for interacting with computer software, as long as such elements or the information constructs have not previously been designated as "protected In some instances, as described elsewhere herein, and indicated by block 370 of FIG. 3A, the process manager may make specific suggestions to the user related to modifying components.

Referring again to FIG. 5, the process manager in a preferred embodiment facilitates the user in conducting research and gathering information to be associated with their project and integrated construct (block 560), as well as organizing the data and information (chiefly through the creation of information constructs) as indicated in block 562, and/or developing or associating analyses with the project and integrated constructs (chiefly through the creation and association of analysis constructs) as indicated by block 564.

The functions to conduct research, organize information and create, information constructs and develop analyses and analysis constructs into or to be associated with the integrated construct, are in a preferred embodiment encouraged and made available from a plurality of different method and process and subset view points within the process and system, as indicated by block 555. In a preferred embodiment, the process manager may facilitate the user in conducting research and developing knowledge constructs from a number of different thinking foci, including but not limited to, for example: while focusing on an individual topic or subtopic, while focusing on the development of the set or a particular analysis construct, while focusing on a specific meaning statement, and others. As an example, the process and system facilitates the user to gather information through research, and add, edit, or delete knowledge constructs (i.e., information constructs and information elements and/or or analysis constructs) to be associated with the integrated construct from the workspace shown on the example representation layout depicted in FIG. 7A, example embodiment of a 3-D individual subtopic view. A specific example of one embodiment of this individual subtopic representation view is provided in FIG. 7A-10.

Figure 7:
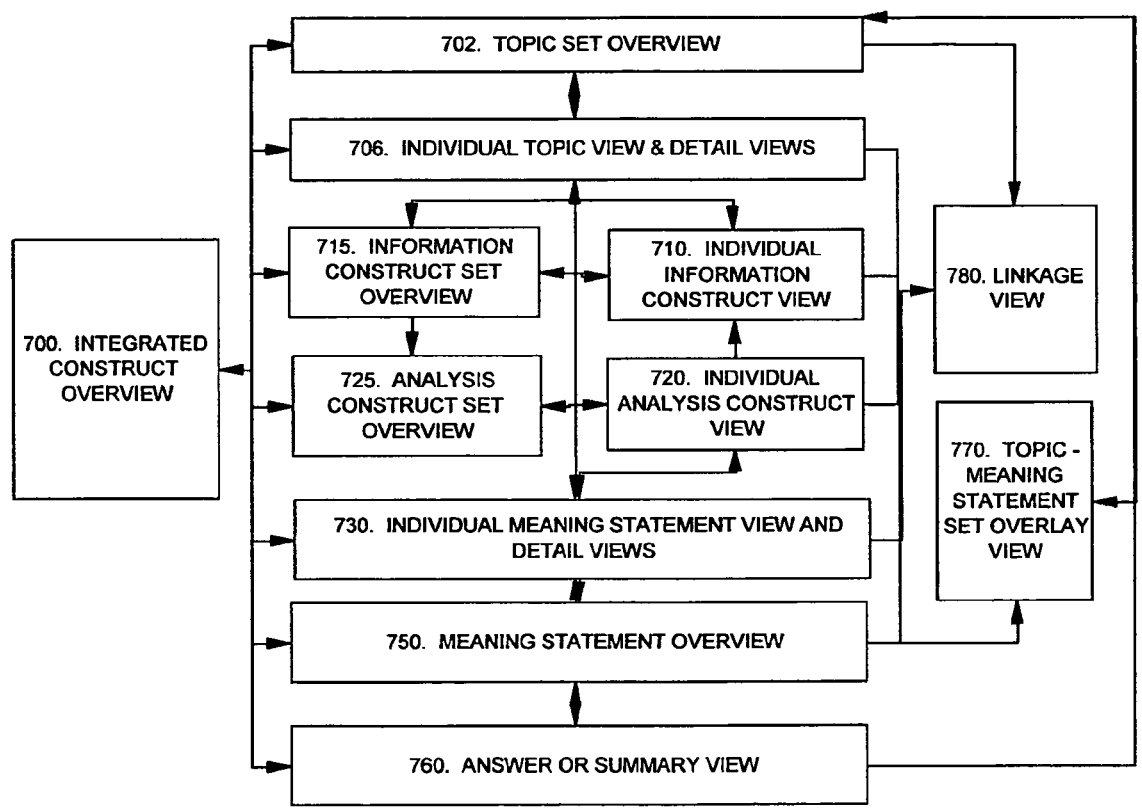
Figure 7A:
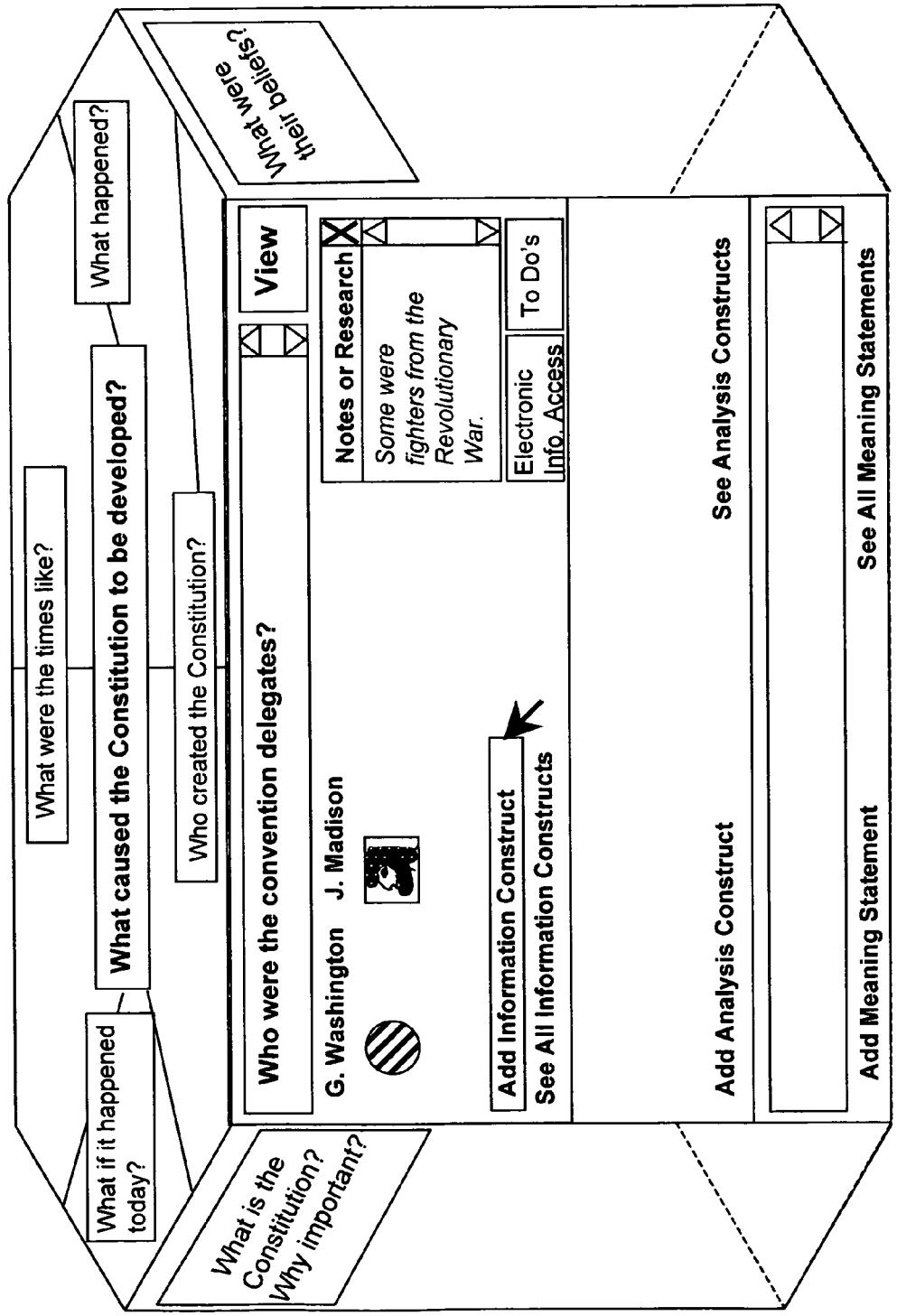
FIG. 7A is an example of one embodiment of a representation focused on a subtopic in one 3 dimensional representation form.
Figure 7B:
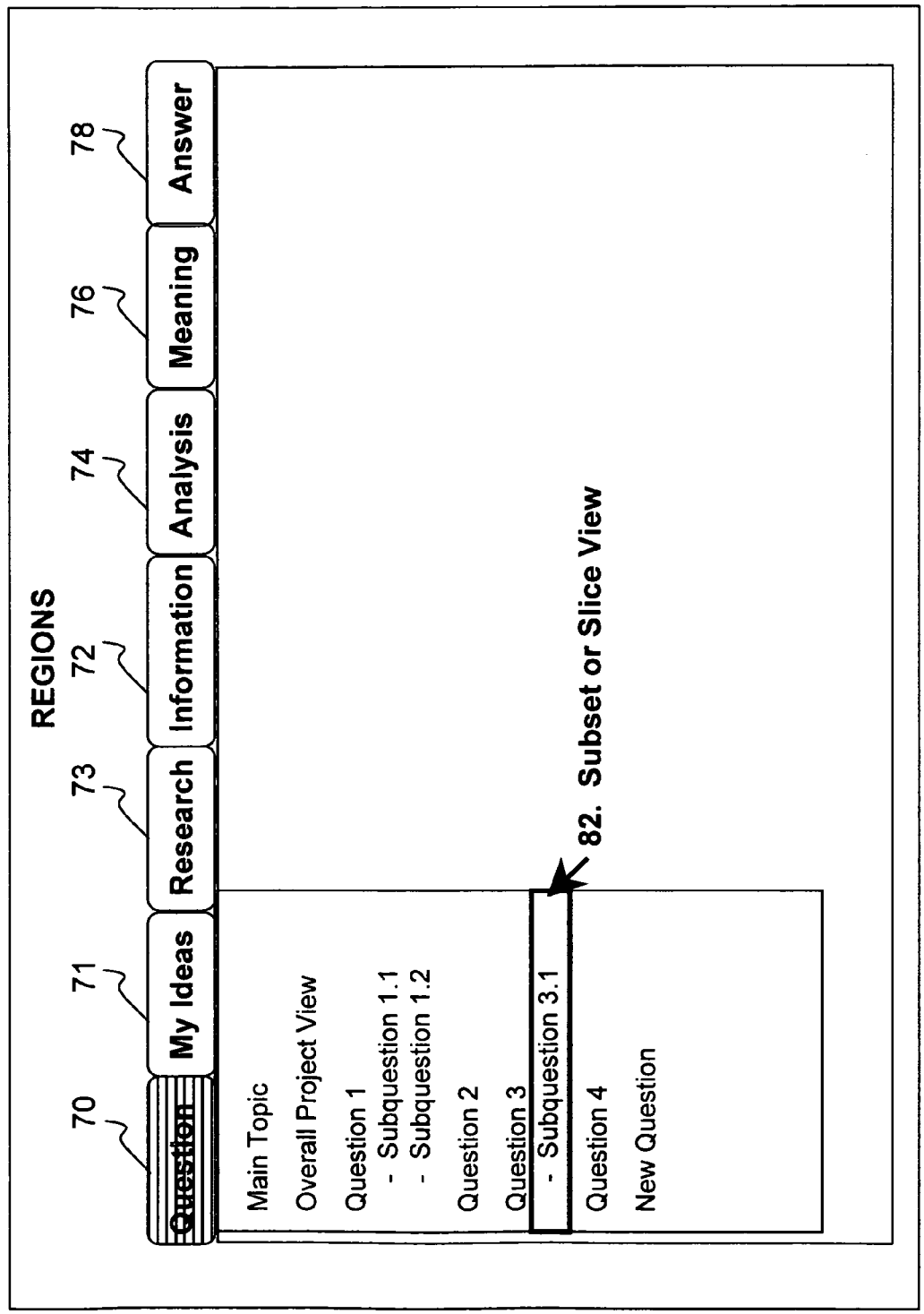
FIG. 7B is a schematic illustrating an example of a 2 dimensional embodiment of regions and subset or slice views.

In one such embodiment, for example, with the topic, problem or question of interest visibly apparent as shown for example in FIG. 7A, the process manager focuses the user on a particular subtopic, and encourages the user to conduct knowledge development activities accordingly, including but not limited to: (i) the user can access electronic information sources, as described below, while focusing on the particular subtopic; (ii) the user can peruse and edit the knowledge constructs which are already associated with that topic, problem, or question, according to any of a number of commonly accepted editing techniques and described more fully below; (iii) the can also choose to enter data and information items into a new or an existing knowledge construct, directly and/or from other available electronic information sources or data provided via networks, including but not limited to the Internet or an Intranet; (iii) the user can choose to create a new knowledge construct to be associated with the particular subtopic selected; and (iv) the user is encouraged by the process manager to develop meaning statements focused on the subtopic selected at that point in time, and others. These individual knowledge building functions are described more fully below.

Figure 7C:
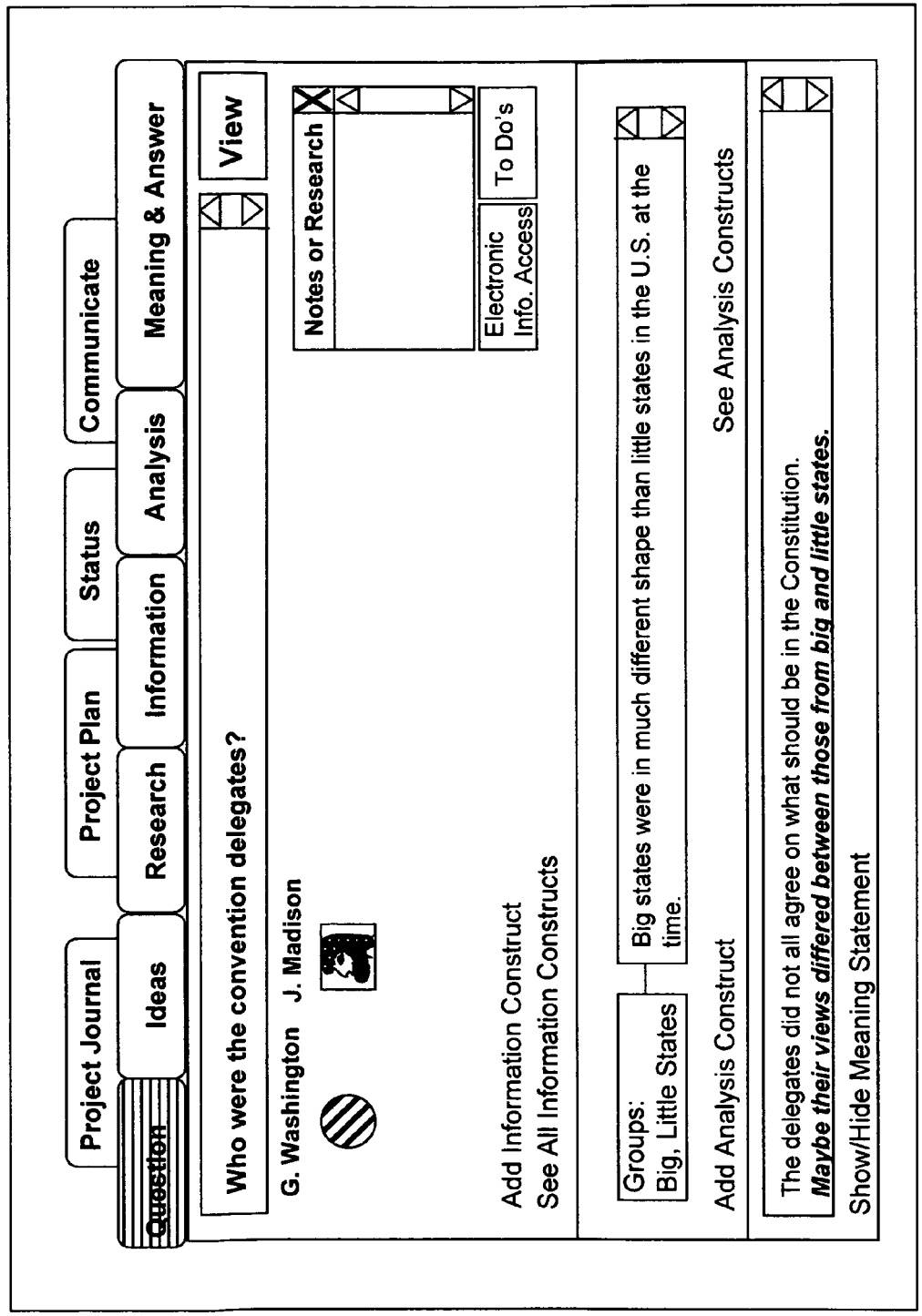
FIG. 7C is an example of one representation in a 2 dimensional embodiment, focused on an individual subtopic view.
Figure 7D:
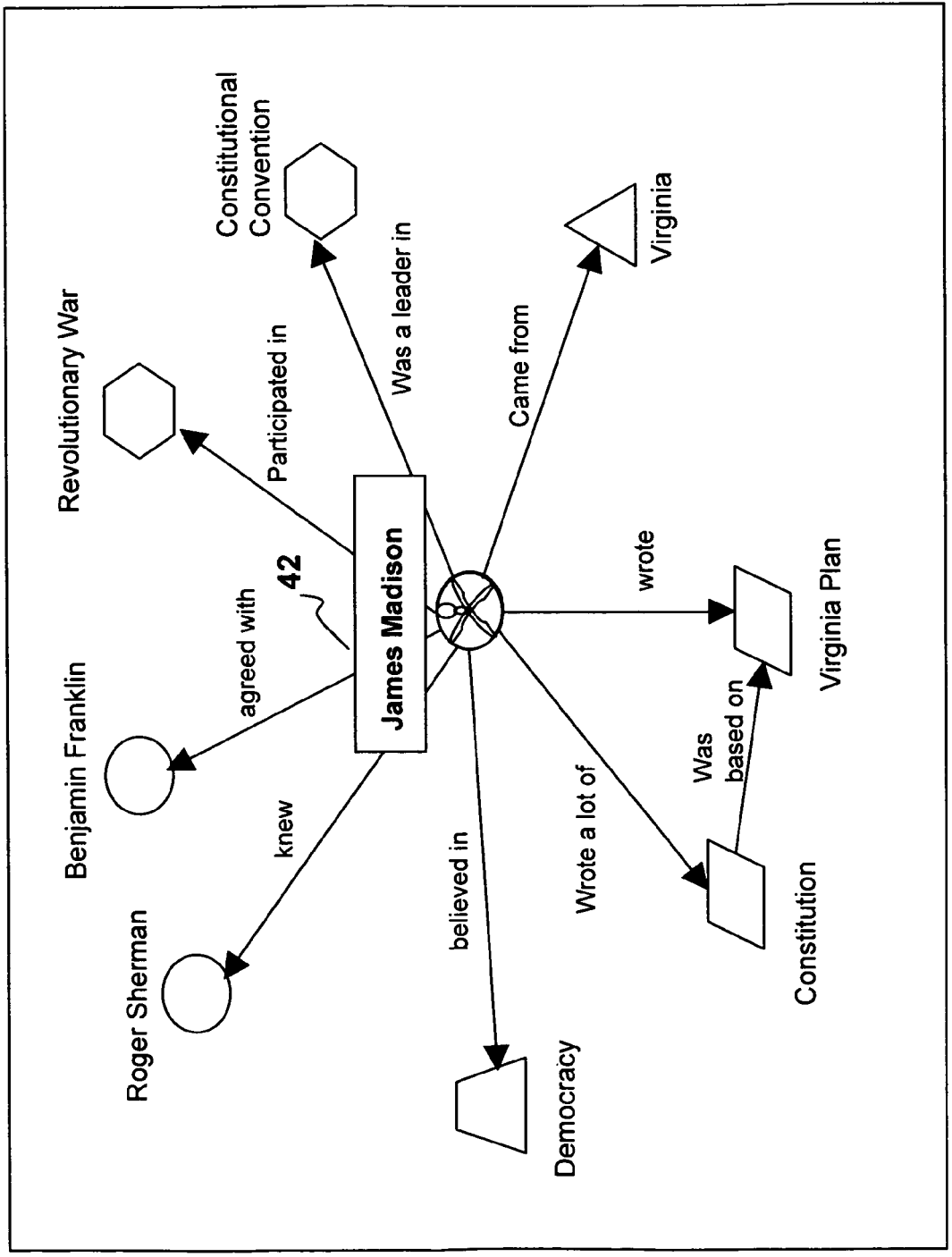
FIG. 7D is an example of one representation of an embodiment of a linkage view, specifically focused on a person information construct.

Similarly, as a further example of block 555 in FIG. 5, the process manager may suggest or the user may choose to work on their integrated construct content and to add or edit knowledge constructs from the reference point shown on the example representation illustrated in FIG. 7C, an example embodiment of a 3-D individual meaning statement representation or view. The process and system also enable the user to add or edit knowledge constructs from the reference point of working on an individual information construct or analysis construct and its associated content—or an the set of information constructs or analysis constructs—as also described in a later section.

Method and Process: Direct Entry of Information

Referring back to FIG. 5, as a part of block 560, in one embodiment, the present invention facilitates the user directly entering or associating data or information items with a component of the integrated construct using an input device. In one embodiment of the present invention, the input device is a computer keyboard. However, it should be appreciated that the entry of alphanumerical characters, numbers, symbols, drawings, etc. can be similarly achieved through other specific data entry mechanisms in accordance with the present invention (as described herein regarding user interaction approaches).

In one embodiment, as depicted in FIG. 3A block 302, the system monitors the user's position relative to the representation being provided. When the user selects a displayed portion or component of the integrated construct, the process manager generally provides the detailed view of the selected component or portion, via the view manager. The representation then generally enables the user to enter information into the fields or entry space as provided for the selected components and/or adjust the format of the information. The information being entered may be generally in the form of alphanumeric characters, a drawing, or graphic depiction (in addition to the many forms of information that may be associated with or entered into the integrated construct as described above). Information previously entered and generally associated with the selected integrated construct component generally is subsequently made available for editing, additions, or deletion, as described above. In one preferred embodiment, the process and system of the present invention also allows for the entry by the user of information into a data storage area which may not be associated with any specific component of the integrated construct, but rather is to be associated with the integrated construct as a whole, primarily in the form of an unstructured information construct. Any information so entered or edited may be subsequently associated with previously or newly created labels or titles of components or information elements.

Method and Process: Entry of Information from Other Electronic Sources

Referring again to FIG. 5E, block 905, the process manager in one preferred embodiment facilitates access to and copying of or referencing to information from any source which allows such copying or associating to be accomplished, and in any suitable media form of electronic information. Referring to FIG. 5E, which illustrates the general process for transactions associated with acquiring information from other electronic sources, in one embodiment of the present invention, the process manager detects the event of the user selection of the function to conduct electronic research as indicated in block 905. Alternatively, the user may leave the present invention and independently launch a browser or open another electronic information source, and the process manager will facilitate the adding or associating of electronic content in a manner which is the same in FIG. 5E for steps 910 through 920. Upon detection of the event in block FIG. 5E 905, the process manager may generally suspend or otherwise hold the functions of the process and system of the present invention underway at that time, and provide the user with the ability to or otherwise allows the user to either launch the Internet browser or open the other external electronic information source. In one embodiment, the selection of the browser or other electronic source is determined by user options associated with project initiation and setup (as for example, in the setting of the default or preferred browser, or the preselection of specific electronic sources, as might be done by a teacher in assigning a project), as indicated in FIG. 5E block 515. In one embodiment, the present invention provides a button or other suitable device to the user specifically to initiate the use of other electronic information sources, as indicated in FIG. 5E, block 907. For purposes of illustration, the following description focuses on the acquisition of information via an Internet browser. However, it should be appreciated that the process for including information from other electronic sources that allow such access and use are accomplished in generally a similar manner.

Continuing with FIG. 5E, in block 908, the process manager may prompt the user with whether the user wishes to automatically enter a particular subtopic or main topic into the target information source's search field (and this may be specified in advance as part of user options block 515, as described above). If such automatic entry is desired, the process manager sends the subtopic or topic content to the electronic search field, as indicated by FIG. 5E block 808. If not, in one embodiment, upon launch of an Internet browser (or similar launch or opening of an available electronic information source), the Internet browser may be made visible and actionable to the user, along with the representation selected at that time of regions and components of the integrated construct. Access to several functions associated with the method and process of the present invention are preferably available generally at the same time that perusal of the electronic information as noted above occurs.

Referring to FIG. 5E, in one embodiment, the process manager or similar module monitors inputs from the user concerning placement on the computer screen or other display device. In one embodiment, the process manager may provide to the user the ability to send a transaction or message from the present invention to launch an Internet browser or otherwise open or launch another source of electronic information. In another embodiment, the process manager tracks the location of the mouse pointer or cursor on or in the representation or display, and notifies the process manager whether the user is positioned and activated within the representation of the present invention, or is currently positioned outside of the representation of the present invention. In one embodiment, if the cursor or other display mechanism has left the representation of the present invention and is positioned and activated generally on or over the Internet browser or other electronic information source shown concurrently as described above, the process manager generally may complete any transactions currently underway in the integrated construct system, and may suspend or otherwise holds activity within the integrated construct system, and waits until the cursor or other display and interaction mechanism is once again activated over or in the representation area being taken for display of the present invention before initiating further action. The methods for evaluating the position of a cursor, mouse pointer or other similar marker mechanism relative to a screen or other display device, and monitoring the interaction of the user with regard to becoming active on or in different areas shown in the representation are well known to those skilled in the art, and can be accomplished by a plurality of approaches in accordance with the present invention. In addition, many approaches could accomplish the accessibility of the ITKC to the Internet or similar sources and still be in accordance with the present invention.

Once launched or opened, as indicated in FIG. 5E block 910, in one embodiment, the Internet browser programs or electronic source programs may generally respond to and control the user's interaction with the browser or electronic source program. In one embodiment, as the user views and interacts with the Internet browser or other similarly provided electronic information set, the Internet browser or other electronic information programs control and enable the user in searching for, finding, and reviewing information of interest. In this embodiment, the ability to copy electronic information in the form of text, images, graphs, videos, or other standard forms is similar to that possible through other widely available and well understood approaches.

One embodiment of adding electronic information to the integrated construct with the present invention includes the following: referring to FIG. 5E block 911, using the functions provided by the Internet browser of choice, the user uses the mouse pointer, cursor or other interaction mechanism to select and highlight a section of text, image, or any other standard form of electronic information within the Internet browser or other electronic information source. The user may then use the functionality readily available in the Internet browser (or many electronic information sources today) to copy the selected information from the Internet browser or other electronic information source as indicated in FIG. 5E block 912. The user may then move the cursor or other interaction mechanism from the space that has been allocated for the representation of the Internet browser (or other electronic information source) to the representation space of the present invention, as indicated in FIG. block 913. In one embodiment of the present invention, the user may then provide a reactivation input to the view and/or process manager, as indicated by FIG. 5E block 913, which may be a click of the computer mouse to signal the user has selected a position within the integrated construct representation space. Continuing with this illustration, in FIG. 5E block 915 the process manager in one embodiment facilitates the user in selecting an available component of the integrated construct as it exists and is displayed at that time or the user may select the function to create a new component of the integrated construct through mechanisms described elsewhere herein. As indicated in FIG. 5E block 916, in one embodiment, the user may then paste the previously copied information or information element into or to be otherwise associated with the selected component of the integrated construct. Alternatively, in one embodiment, the user may create a new component of the integrated construct, as described elsewhere in this document, and then paste the previously copied information into or to be associated with the newly created component of the integrated construct. It should be appreciated that the precise mechanism for accomplishing this copying and pasting can be achieved through a plurality of approaches, and that any such suitable mechanisms can be used in accordance with the present invention.

In one embodiment, upon pasting the previously copied electronic information into or to be associated with the desired component of the integrated construct, the process manager is notified by the transaction that completes the paste that such an entry has occurred. Referring to FIG. 5E block 917, the process manager may in one embodiment generally monitor that an "entry" has occurred, and prompts the user to enter information regarding the source of the electronic information that has just been copied. In one embodiment of the present invention, the process manager or other similar module may provide the web address that was active at the time the information was copied as the starting point. In another embodiment, the process manager may also provide the user through the view manager with the ability to enter additional information regarding the source of the copied information. In one preferred embodiment, such source information is thereafter associated with the information that has been so acquired for the integrated construct.

In one embodiment, the process manager may provide a field to accommodate the entry of additional information regarding the title and bibliographic information regarding the information item that has been entered. In a preferred embodiment, the process manager may also provide a field in which the user can enter additional notes about the source. In another embodiment, the process manager may also provide the user with an ability to evaluate the source used for the information. In one embodiment of the present invention, the user may also be provided with a number of criteria and the ability to enter a ranking associated with each of these criteria. In another embodiment of the present invention, the user may also be provided with a field or fields in which to enter comments about their evaluation of the source for the copied information. It should be appreciated that a number of data formats may be provided to the user with regard to adding information regarding the source for the copied information in accordance with the present invention. When the user has completed the user's desired amount of entering of information or comments regarding the source used for the copied information, the user generally enters an input to the process manager that the user has completed entering the additional information about the source for this entry and evaluation session. Referring to FIG. 5E block 919, in a preferred embodiment, the user may then continue with further information searching and retrieval, or resume other process portions of the present invention.

In one preferred embodiment, the process manager also evaluates the amount of information being copied from an open source and provides a warning to the user when the amount exceeds copyright limits.

Referring to FIG. 5E, as shown in block 110 and block 205, in one preferred embodiment, throughout the course of searching, locating, and retrieving or copying any desired electronic information, the process manager provides the ability to the user to change the view which is currently displayed by the present invention, as described more fully in a later section of the document.

Method and Process: Creating a New Unformatted Information Construct

Referring to FIG. 5, the process manager and archetype process facilitates the organizing of information through the definition, population, and revision of information constructs as indicated in block 562. Referring to FIG. 5C, which illustrates one embodiment of the creation of a new information construct. Referring to FIG. 5C, when the user selects the option to create a new information construct block 5621, the process manager or similar module may prompt the user for a name or title to assign to that new information construct as indicated in block 5622, and provide a field into which the user can enter an alphanumeric character string, drawing, or picture to represent the label or title to be associated with the information item within the integrated construct. The entry of information and interaction by the user may occur using any suitable entry mechanism.

In a preferred embodiment, if the user event is in response to a suggestion that has been made by the process manager, as indicated in block 5623, then the process manager creates the new information construct as specified by the process manager suggestions, as indicated in block 5628. In one embodiment, the user is provided the opportunity to accept or decline this new suggested information construct in an additional verification event.

Continuing with FIG. 5C, if the user event is not the result of response to a process manager suggestion, in one embodiment, the process manager generally evaluates that a new label or title has been entered for an information construct, and checks to see whether an identical label for an information construct has been created previously, as indicated in block 5625. If there is a match between a previously created label and a new label for the same class of information construct, the process manager generally informs the user that an identical match has been found, and prompts for whether the user wants to edit the existing information construct, overwrite the existing information construct, or change the label to be assigned to the new information construct, as indicated in block 5627. In this embodiment, if there is no duplicate information construct determined by the process manager, the process manager creates a new information construct, in block 5628 and updates the data bases accordingly through the update manager, block 700.

Figure 5D:
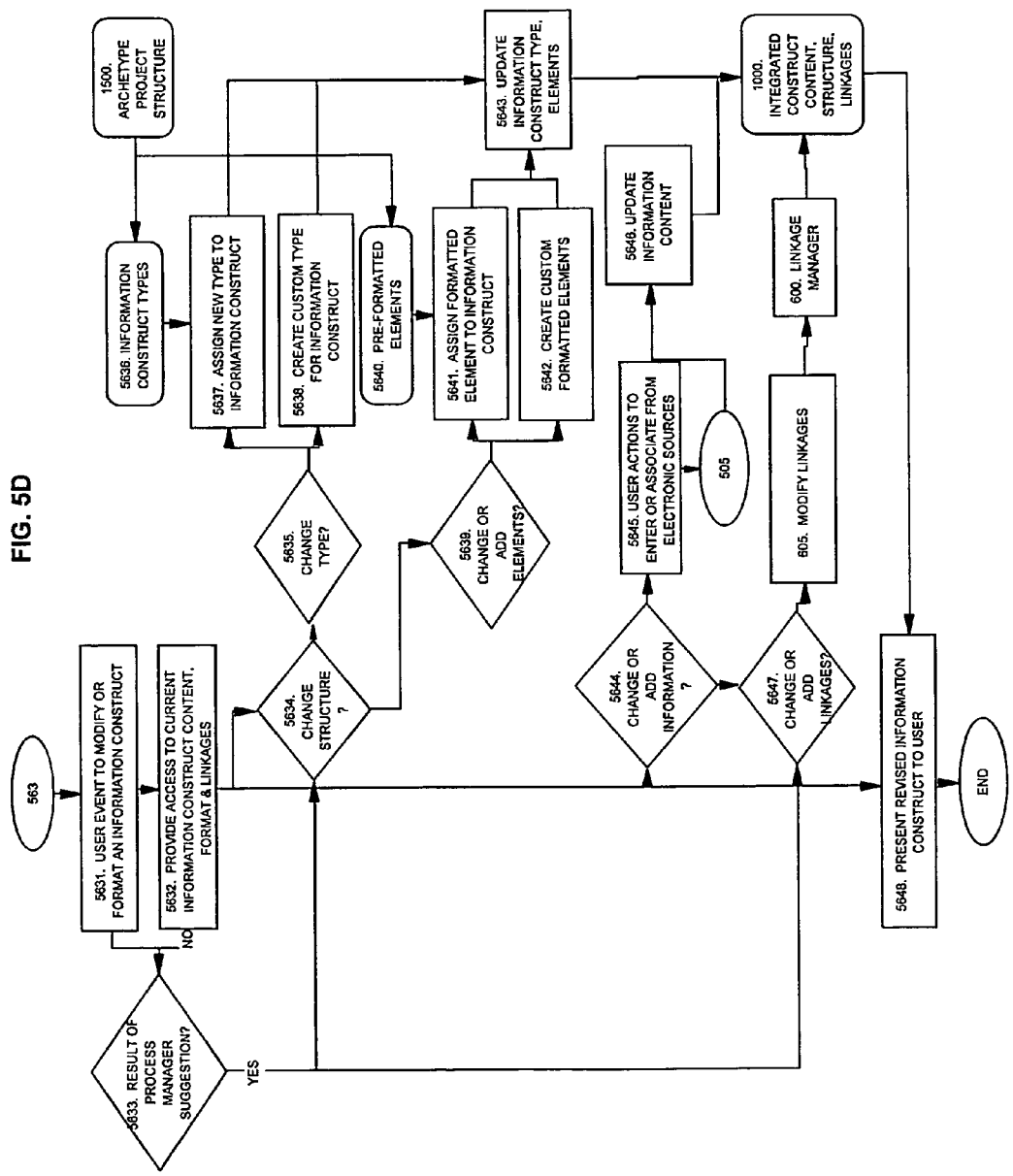
FIG. 5D is a flowchart of transactions related to one embodiment of formatting or modifying an information construct.
Figures 5, 5D, 6, 7, 8, 9, 10:
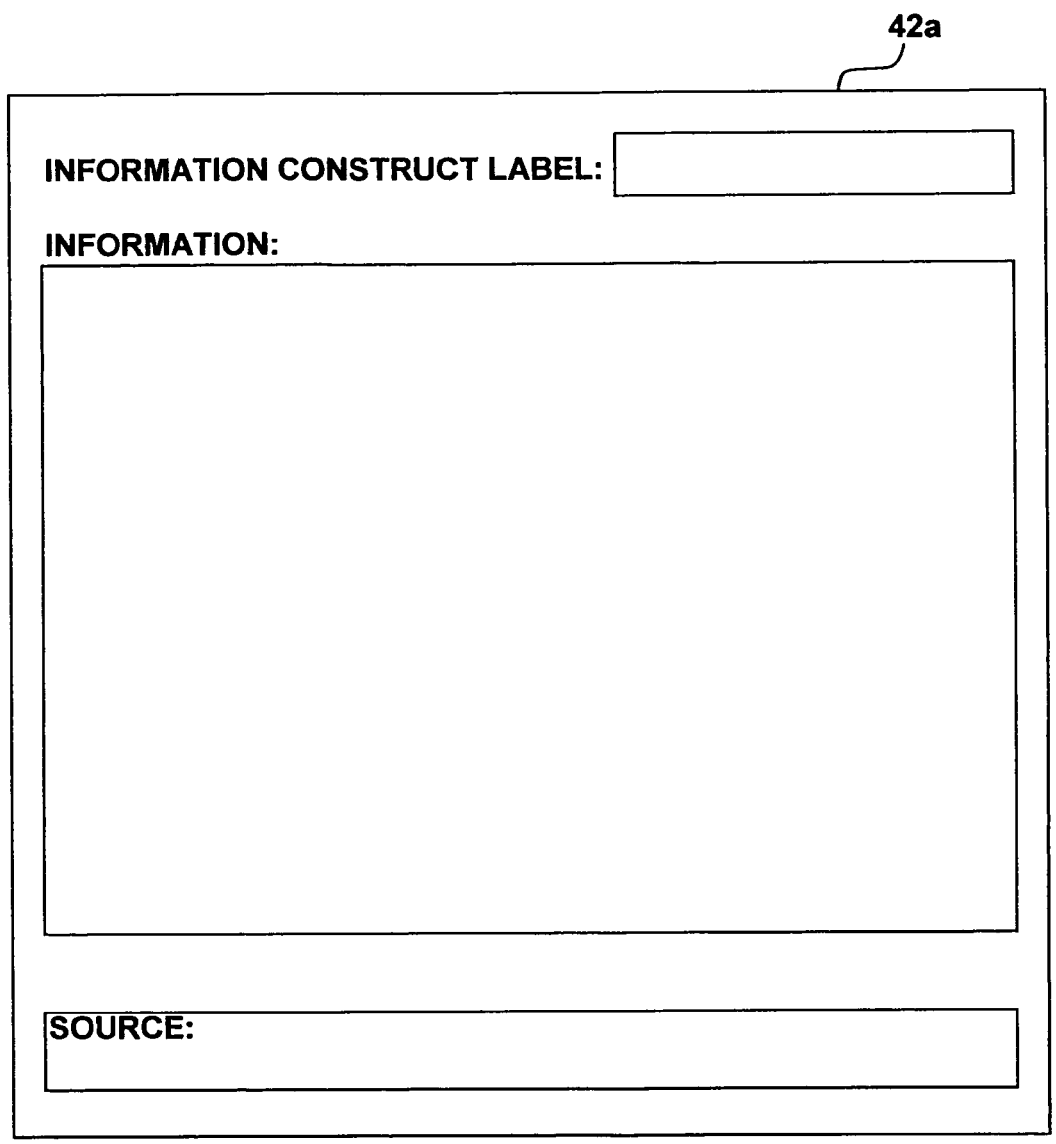

Referring now to FIG. 5D block 5635, in one embodiment of the present invention, the process manager may prompt the user, through the representation provided by the view manager, for the structure and content for the information construct the user desires to create. For a new, unstructured information construct, the process manager facilitates essentially the same capabilities to the user as described for modifying an information construct as described below.

Method and Process: Formatting an Information Construct

Referring to FIG. 5D, In one preferred embodiment, the process manager provides a plurality of types of information constructs available to the user, including but not limited to the following: People, Places, Things, Media, Ideas, Events, and Issues, available for choice by the user as indicated in block 5637. In a preferred embodiment, the process manager also provides the ability for the user to create custom types as indicated by block 5638, allowing the user to create a new category or type, assign user's own label and provide a description of the type). In a preferred embodiment, the process manager also provides the user with the ability to relate information elements to their custom information construct type. In a preferred embodiment, the process manager does not require the assignment of type, but provides for information constructs that are untyped (providing an unstructured note like information storage capability). In a preferred embodiment, any information construct custom type created by the user is subsequently available for use as a type. Upon selection of one of the types of information constructs provided, the user may then be presented with several options, including the option to utilize preformatted elements as part of the information construct as indicated in block 5641, create new custom formatted elements as indicated in block 5642 or the option to structure the information construct as unformatted, freeform data. If the user chooses to structure the information construct as unformatted data, the workspace and associated storage provided to the user and to be associated with the unique information construct label facilitates the inclusion of textual characters, drawings, and also for the insertion or copying and pasting of images, graphs, video, textual characters, or drawings as noted in the description of data entry and data types described elsewhere herein. Referring again to FIG. 5D, the process manager also provides the user the ability to enter or change information associated with the information construct, as indicated in block 5644 and described in further detail herein. An example of one embodiment of the entry of an unformatted information construct is shown in FIG. 5D-10. The amount of information allowed to be included and associated with any information component label will generally vary with the precise implementation of the present invention, including the complexity and scope of the project and integrated construct chosen to be developed by the user, as well as with regard to the processing power of the device on which the present invention operates, and the robustness of the data storage and retrieval mechanisms employed. As stated above, one of the benefits of the present invention is that it provides thinking and knowledge component structures and formats which are and can be generally common or similar across very different levels of complexity of the integrated construct and information, and in the associated technology employed in any specific implementation circumstance.

As also generally indicated by block 5639 of FIG. 5D, in the course of the user working on their project, the present invention in one embodiment may also subsequently provide the ability to add or delete additional formats to the information elements associated with an information construct throughout the use of the method and system. As many or as few of the formatted information elements as the user chooses can generally be associated with a particular information construct. In a preferred embodiment, as indicated in block 5642, the present invention provides for the ability of the user to create custom information elements, with a label and an assigned type, and other characteristics. In a preferred embodiment, custom created information elements are made available to the user for reuse. It should be appreciated that any specific implementation of the present invention may make some limiting choices regarding amount of information to be associated with an information construct, depending upon the processing capabilities of the technology and data storage and retrieval mechanisms to be used, and the target user audience. For example, in one educational embodiment, the amount of information allowed for any one information construct may be limited or otherwise evaluated and flagged to the user as questionable.

The following is a detailed illustration of one embodiment of this aspect of the present invention. Upon creating a new information construct (or selecting an existing information construct), in a preferred embodiment, the assignment of a type by the user to the information construct may be monitored. Based on the type selected, the user may be provided with the ability to select among preformatted information elements to associate with the information construct being created or edited, as indicated in block 5641. For example, if the information construct "James Madison" is identified by the user as being of the type "Person," then the preformatted information elements associated with the class of information constructs known as "People" may be provided. An example of one embodiment is shown in FIG. 5D-20, and for a "Person" information construct preformatted information elements may include for example: birth date, death date, birth place, importance, fun facts, quotes, beliefs, accomplishments, education, family, characteristics, etc. The system may provide the user with the ability to select from among these preformatted information elements. Selection of formats for information elements by the user may be tracked, and the selected information elements may then be associated with the respective information construct label, and made available as data entry fields to the user. Some of the formatted information elements may be highly structured, such as birth date and death date. Other formatted information elements may be subsets of information storage and work space which will allow the same variety of information forms as the unformatted information component, but may be designated under a sub-label associated with the label for the information component for example, "beliefs" may provide a space for information entry but allows significant freedom by the user in the structure or format of what information they choose to add or enter.

The present invention therefore may include the provisioning of formats for information elements associated with a plurality of categories or classes of information constructs which may then be provided in representations of the present invention as subsequent data entry and storage fields. The user may also be provided with the ability to create their own classes of information constructs and associated labeled, formatted elements for their later use.

Further referring to FIG. 5D block 5639, the process manager may enable the user to edit a previously unformatted information construct and add generally any or all of the structured formats to the information elements that may be associated with an information construct. The options and choices available to the user are generally the same or similar as those described above.

In one embodiment, if the user selects the option to add formatted elements to an existing information construct, as indicated in block 5639 FIG. 5D the present invention may provide the ability for the user to "cut and paste" or "copy and paste" information from the general, unformatted workspace associated with the information construct, or from a different formatted element, and place the information into a formatted information element, whether newly or previously associated with the information construct. In another embodiment, the present invention may enable the user to highlight or otherwise mark a section of information. A highlighted portion may also be associated with an information element format. The newly created formatted information element is generally then subsequently associated with the information construct and unique information construct's label, as described above.

As an illustration, if an unformatted information construct labeled "George Washington" has been created, and the user subsequently enters or acquires information to be associated with the "George Washington" information construct, the present invention may allow the user to later add a structured information element such as "birth date" to the "George Washington" construct, and associate a portion of the previously entered information with the structured element "birth date." The information may be associated with the structured element "birth date" via a number of mechanisms which may include but not be limited to methods such as: (i) cutting and pasting information from unstructured data previously associated with the "George Washington" construct through direct entry as described above; (ii) copying and pasting information from other electronic sources, as described earlier herein; (iii) highlighting or otherwise marking a section of information and associating it with a format for an information element and (iv) copying and pasting or cutting and pasting information from formatted or unformatted information elements associated with other integrated construct components created previously by the user.

As a result, in a preferred embodiment, an information construct associated with a unique label can then be associated with formatted, structured information elements and unformatted information, or a combination of structured and unstructured information. In a preferred embodiment, an information construct can also be associated with either a great deal of information, and a high number of labeled information elements, or may exist as being associated with very little information as little as the label that uniquely identifies it.

Method and Process: Creating a New Analysis Construct

Referring back to FIG. 5, as generally indicated in block 564, the method and system of the present invention preferably provides for the creation and editing of analysis constructs as one component type of the overall integrated construct, specifically as one type of knowledge construct. For example, for the educational project "What caused the development of the Constitution?", analysis constructs created by the user might include a timeline of events leading up to the Constitution's ratification, a comparison of the beliefs of diffeivot framers, and others. (See also description of analysis construct included as part of the description of the integrated construct, included herein).

As detailed in the definition of an analysis construct included above, in a preferred embodiment, an analysis construct as implemented by the system can include any information media form. In a preferred embodiment, analysis constructs may contain or be associated with at least one field that may be a common part of all analysis constructs such as a field for entering observations or comments about the analysis construct as a whole. In a preferred embodiment, this observational or comment field which may be associated with analysis constructs may be alphanumeric, or contain an image, drawing, graphic or other media form as herein described.

In a plurality of representation views of the integrated construct and at a plurality of points in the method and process of the present invention, the process manager may provide the user with the ability to create new analysis constructs, to view existing analysis constructs, and edit those constructs, as described elsewhere herein.

Figure 5F:
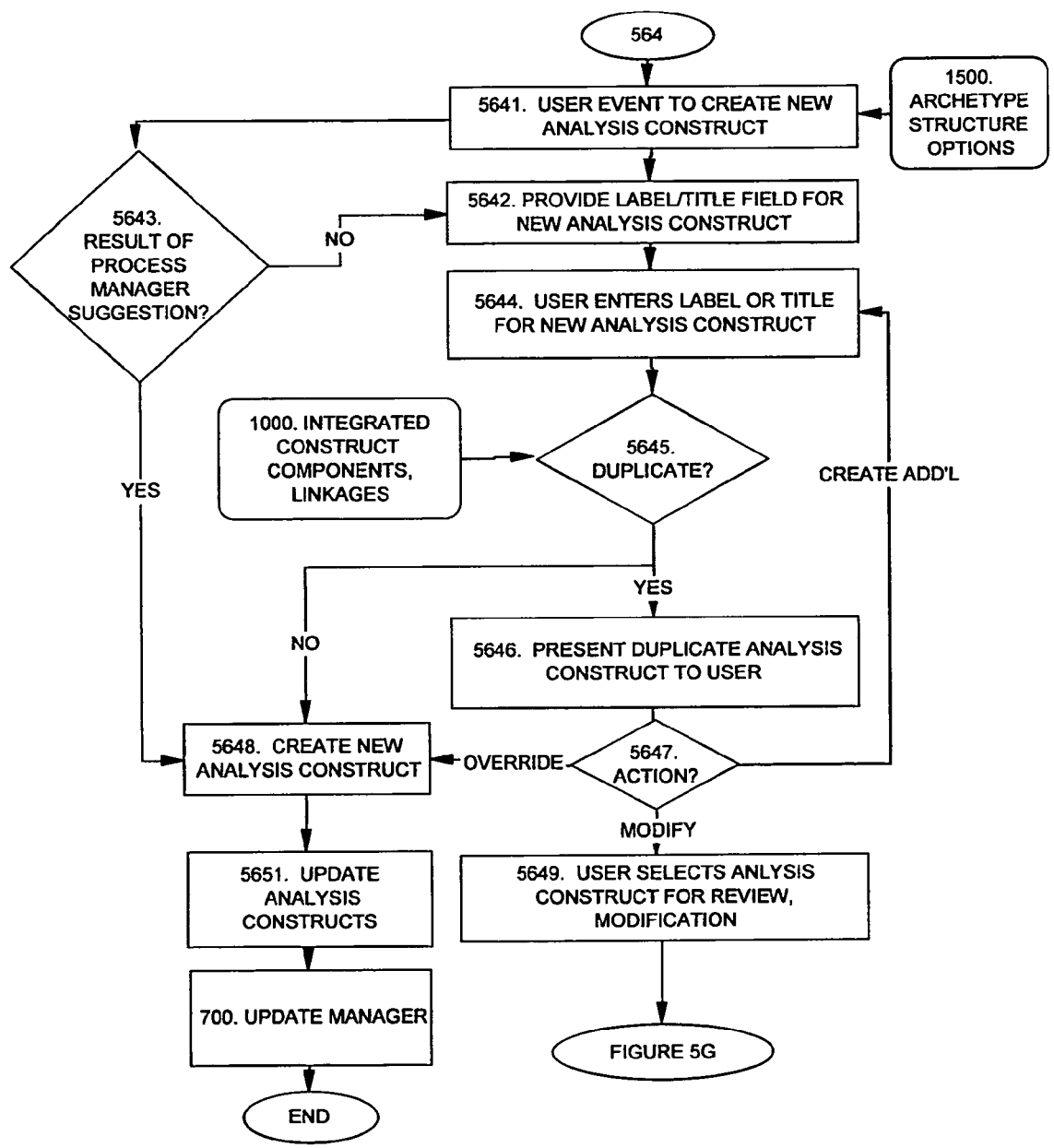
FIG. 5F is a flowchart of transactions related to one embodiment of creating a new analysis construct.

Referring to FIG. 5F, which illustrates one embodiment of the process for creating a new analysis construct, the user may select the option to create a new analysis construct. If not already provided in the representation in use at the time, the process manager may provide a list or other like representation of the analysis constructs and/or analysis construct types that have been created previously for the integrated construct or are otherwise made available to the user for inclusion by the present invention. In another embodiment of the present invention, the process manager may allow for the presentation of a list of analysis constructs and/or preformatted analysis construct types that have been created previously for other integrated constructs as well. As indicated in block 5642 of FIG. 5F, in one embodiment the process manager may provide the user with a field in which to enter a label or title for the new analysis construct. As with the label or title for information constructs, in one embodiment, the label or title for an analysis construct may be a set of alphanumeric characters, a drawing or any other information media form. In one embodiment of the present invention, the process manager and update manager may also assign a unique numeric identifier to the new analysis construct.

Referring again to FIG. 5F, n one embodiment of the present invention, upon the user entering a title or label for the new analysis construct (block 5644), the contents of the title or label for the new analysis construct may be checked for a match against the title of labels associated with previously defined analysis constructs (block 5645). In one embodiment, if the contents of the new analysis construct label or title matches with the contents of the label or title for a previously created analysis construct, the user may be prompted with the a number of options, including but not limited to the following: (i) edit or change the existing analysis construct referred to by the label or title that has been entered (block 5649); (ii) overwrite or replace the existing analysis construct with the new analysis construct (block 5648); or (iii) change the label or title that has been entered for a new analysis construct to a different label or title (block 5644).

As indicated by block 5648, in one preferred embodiment, once the user has entered a new unique label or title for a new analysis construct, the system generally creates a reference for the new analysis construct. Thereafter, in that embodiment, the label or title of the new analysis construct may generally be available to be used as a reference point for several functions such as for the user. (i) o access the content associated with the new analysis construct and/or its associated observational comment field; (ii) to add to, edit or delete the content associated with the new analysis construct and/or its observational comment field; (iii) to add, delete or edit the relationships between the analysis construct and information constructs, information elements or unstructured information, and/or (iv) to link the analysis construct to other integrated construct components such as meaning statements and subtopics, or other such functions.

Method and Process: Adding Structure and Content to a New or Existing Analysis Construct As further generally illustrated in FIG. 5G, once the process manager has facilitated the user in creating an analysis construct, the method and system of the present invention provide several ways for the user to structure or build the analysis construct and add or associate content to the analysis construct. As indicated in block 5681, if the user event is in response to a suggestion that has been made by the process manager, then the process manager in a preferred embodiment may create the analysis construct structure, as well as add any suggested information constructs or other content, and modify any suggested linkages accordingly. In one embodiment, the process manager presents each of the suggested substeps to the user for confirmation before proceeding. Referring again to FIG. 5G, in one preferred embodiment, the process manager provides the user with several options for formatting the structure of the analysis construct. As indicated in block 5663, the process manager may provide the user with a set of preformatted analysis types, indicated in block 5664. In this embodiment, if the user selects one of the preformatted analysis construct types, the process manager assigns the selected type to the analysis construct, as indicated in block 5665 and the resulting analysis construct structure in block 5674. The present invention may provide a plurality of analysis construct types to the user, which may include but not be limited to a sequence builder analysis construct, a timeline analysis construct, a qualitative comparison and contrast analysis construct, a cycle analysis construct, a freeform drawing and diagramming analysis construct and others. In one embodiment, the present invention may provide multiple versions or forms of any given analysis construct type.

Referring again to FIG. 5G, in one embodiment of the present invention, the process manager also provides the user with the ability to create custom analysis constructs, as indicated in block 5667. In one embodiment, the process manager provides the ability to define a backdrop or visual context for the analysis construct, as indicated in block 5668, a structure for the inclusion and relationships of information constructs and information elements (block 5669), the inclusion of one, any or all of a set of tools provided by the process manager (block 5670) as described more fully below, and the assignment of a label or title to the analysis construct, and if desired, a description of the analysis construct's characteristics and use. Based on these selections and actions, in one embodiment, the process manager then creates a custom analysis construct (block 5672) and may ask the user whether the user wants to save the format for future use. In one embodiment, any such saved custom analysis construct is available for future use. Referring again to block 5670, the process manager provides in one embodiment for the user to choose to include any or all of a number of tools as part of their custom analysis construct, including but not limited to: (i) a timeline bar tool, which can be placed as part of an analysis construct and provide the ability to set timeframes and intervals and serve as the basis for visual mapping of information constructs or data at the appropriate time position for the time data element included; (ii) a linking tool, which can be placed as part of a custom analysis construct and provides for the user to define and label links between information constructs, information elements, or other visual or diagramming components; (iii) a drawing and diagramming tool; (iv) a calculating tool, and others.

Continuing with FIG. 5G, block 5673, the process manager therefore creates the structured analysis construct object as defined by the user or based on a process manager suggestion above.

Figure 5H:
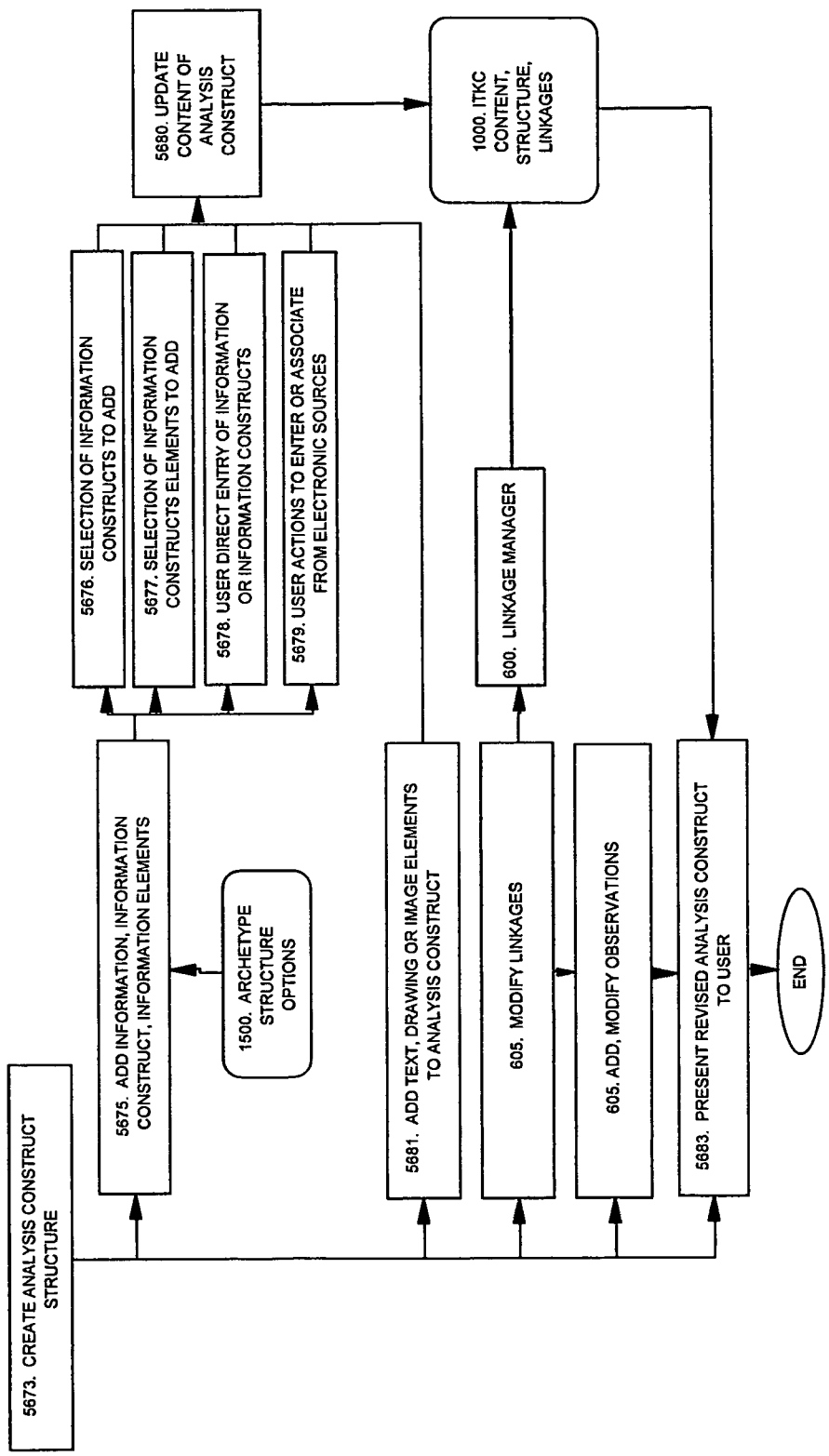
FIG. 5H is a flowchart of transactions related to one embodiment of adding elements to an analysis construct.
Figures 5, 5H, 6, 7, 8, 9, 10:
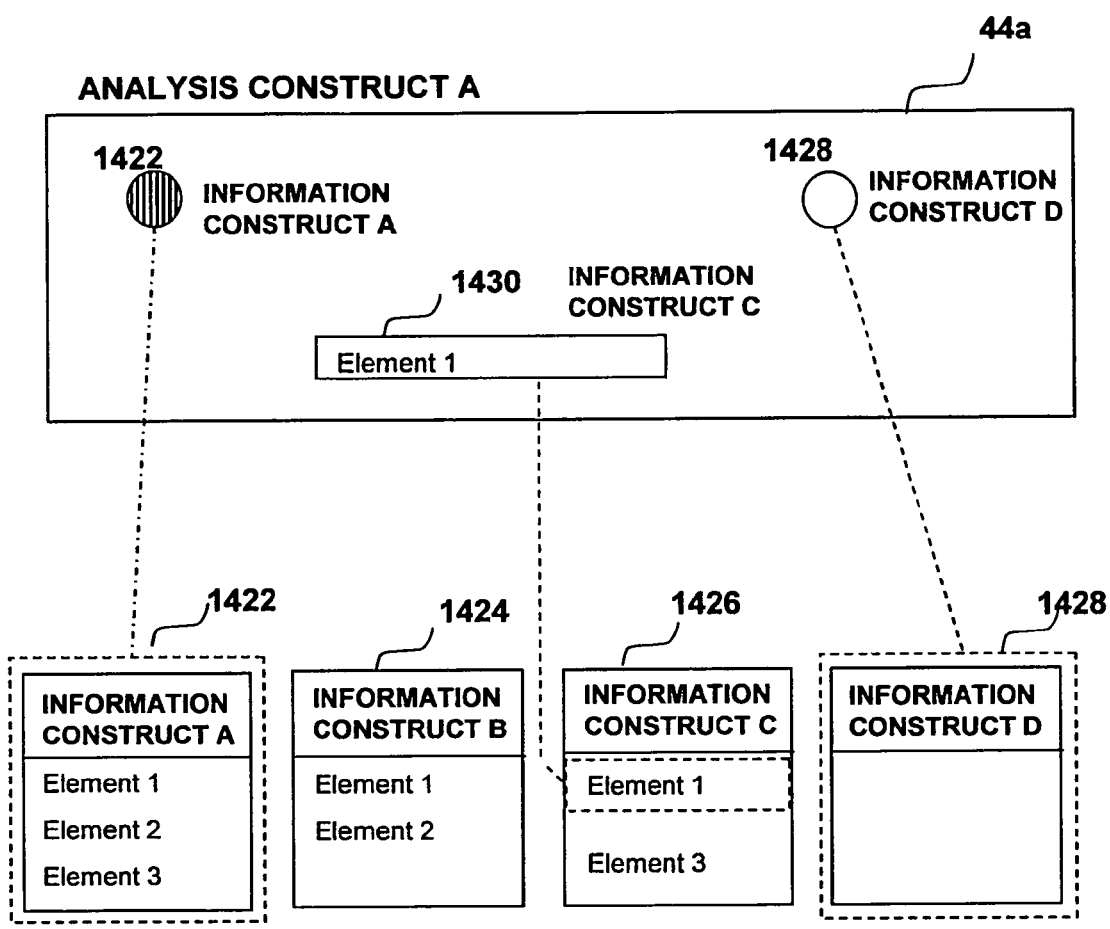
Figures 5, 5H, 6, 7, 8, 9, 10, 11, 12, 13, 14, 15, 16, 17, 18, 19, 20:
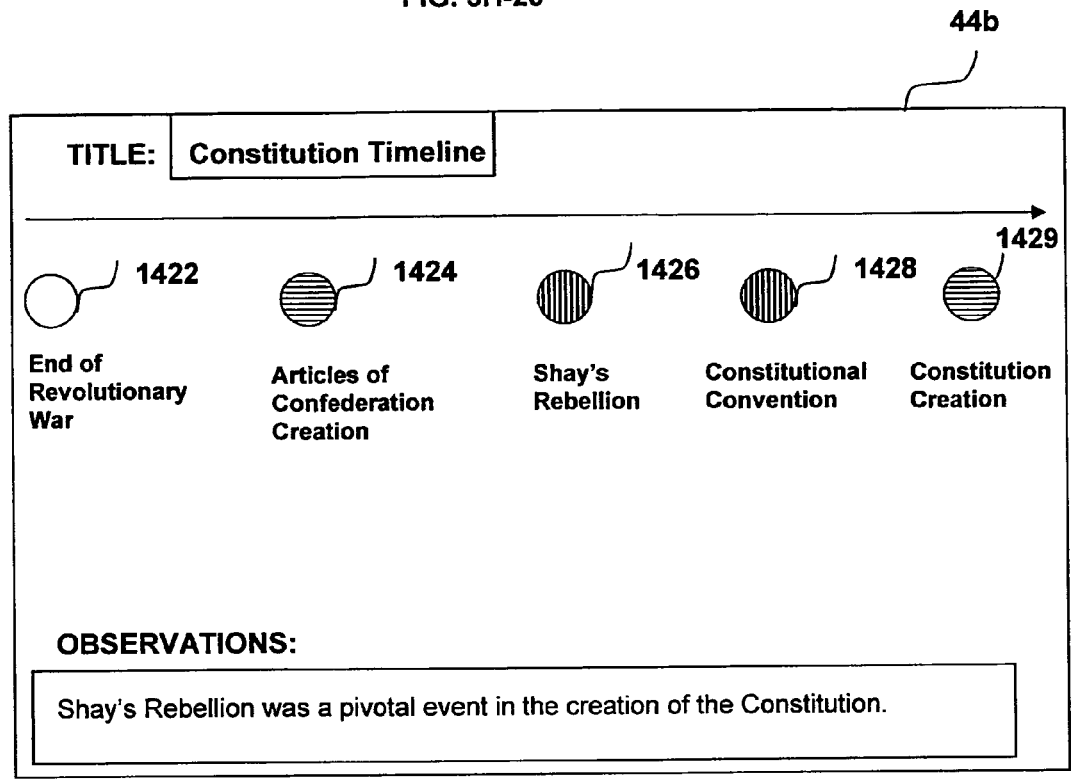
Figures 5, 5H, 6, 7, 8, 9, 10, 11, 12, 13, 14, 15, 16, 17, 18, 19, 20, 21, 22, 23, 24, 25, 26, 27, 28, 29, 30:
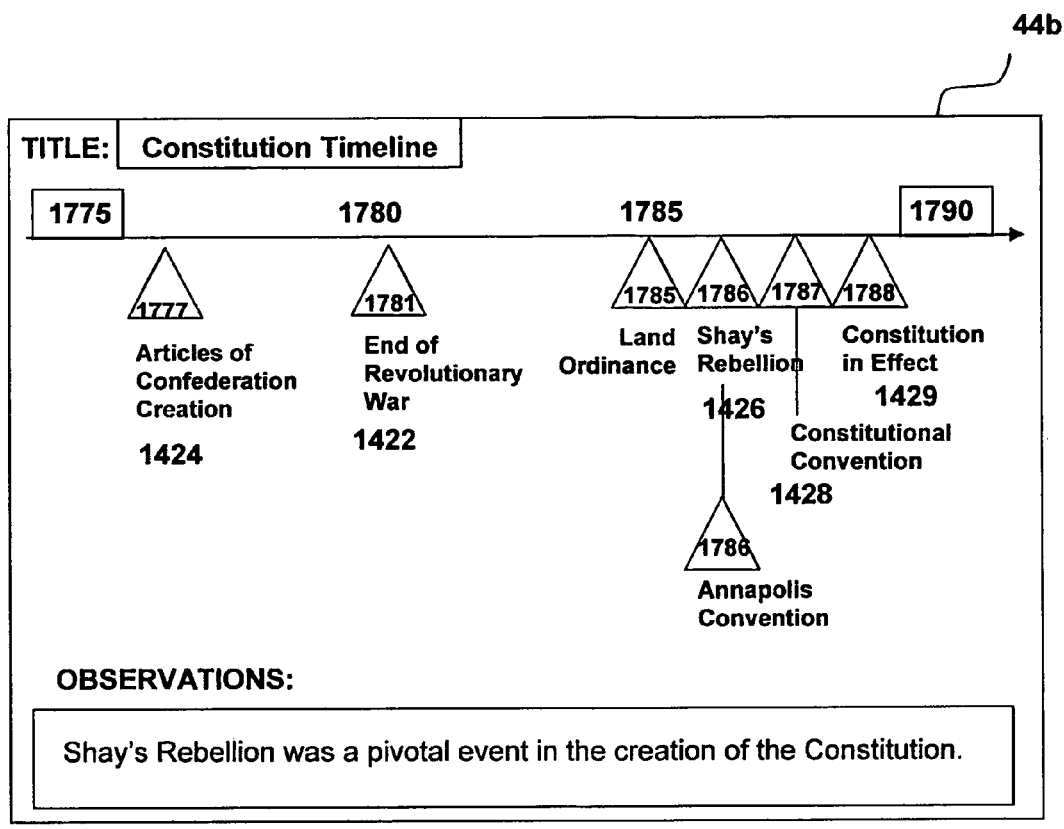

Referring then to FIG. 5H, block 5675, in one embodiment of the present invention, the process manager provides for several options for the user to add information, information constructs, and information elements to an analysis construct. In one embodiment, these options may include but are not limited to the following: (i), adding or associating links to information constructs in block 5676 and/or information elements in block 5677, to be referenced in or associated with the analysis constructs, alone or in combination with the other options below; (ii) adding or associating analysis content previously created in other analysis software programs which allow the copying and pasting, or referencing or access to other analysis software programs; and (iii) adding information directly to be associated with the analysis construct or creating new information constructs, in block 5678, and/or (iv) entering or associating information gathered electronically with the analysis construct, as indicated in block 5679 and described more fully elsewhere herein.

In one embodiment of the present invention, when a user selects an analysis construct to add or edit the content associated with that analysis construct, the user is presented with a workspace associated with the analysis construct. In one embodiment, the analysis construct workspace generally provides the ability to the user to add alphanumeric characters, drawing FIG.s and/or graphic representations, as well as include or associate images, video or other information forms with the analysis constructs. The representation of the analysis construct workspace preferably includes access to the observational comment field associated with the analysis construct, an optional but common field across all analysis constructs. An example of a partially completed analysis construct of an integrated construct workspace is shown in FIG. 5H-20.

In one embodiment, as shown in FIG. 5H-10, the process manager may provide the user the ability to add to or associate with the analysis construct references to the information constructs that have been created. The result may be a visible representation within the analysis construct workspace that such a reference and link has been made. The user can generally place these references to information constructs in any position on the analysis construct workspace while still providing for access to such items as the title of the analysis construct and any additional comment fields.

In one embodiment of the present invention, there are at least two types of links or associations provided for the user to associate information constructs to analysis constructs, as illustrated in FIG. 5D-10 included herein and facilitated by the linkage manager. The first type may include creating a link to/from an analysis construct to/from the label or title or representative icon of an information construct as a whole. In this manner, the reference from the analysis construct is construed as reference to the entire information construct as a whole, via the reference to the label or title of the information construct. In one embodiment of the present invention, references between an analysis construct and an information construct may be depicted in representations of the present invention by several visual mechanisms, such as by the display of a title, label or icon associated with the information construct. A second type of reference between an analysis construct and an information construct may include creating a link to an analysis construct to/from an information element within an information construct. In a preferred embodiment, the linkage manager maintains and provides the data regarding the contents of the information element and the title or label or other reference to the information construct with which the information element is associated, with both available for inclusion visibly in the analysis construct. It should be appreciated that these two links forms are representative of links between information constructs and analysis constructs, and that additional forms of links may be provided in accordance with the present invention.

In one preferred embodiment, any information element so referenced, linked or included in or associated with the analysis construct is based on the content associated with the information construct at the time the analysis construct is viewed. In this manner, any updating or changes to information constructs and their respective elements are automatically also reflected in their representation and reference with regard to analysis constructs.

Method and Process: Creating a Meaning Statement Set

Referring back to FIG. 5, as generally indicated by block 570, the process manager in a preferred embodiment facilitates the user's development and revision of a set of thinking structures which comprise the thinking construct of the integrated construct, and which provide meaningful thinking and working subsets to the user. As described earlier, in a preferred embodiment, these may include, for example, a set of meaning statements for inclusion with the integrated construct. The set of meaning statements may be void in an integrated construct, may be one or may include a plurality of meaning statements and/or sub-meaning statements. As discussed earlier, in one embodiment, meaning statements are most likely to be text, but may also be created in the form of a drawing, image, diagram, or other suitable information form. Characteristics of meaning statements are generally discussed in an earlier section.

In the preferred embodiment, meaning statements may be linked to the answer or summary set, in order to indicate the logical support of the answer or summary set by some portion of the meaning statements. In another preferred embodiment, meaning statements that are linked via the link manager to the answer or summary set may also include additional designations, such as "supports," "contradicts" or others.

As shown in FIG. 5, the work process step represented by block 570 includes defining, populating or revising a meaning statement set that can occur in a plurality of points within the overall process. FIG. 5E-10 depicts an example meaning statement set.

In one embodiment, the process manager encourages the user to create new meaning statements at key points in the overall process, in a number of different portions of method and process. For example, the process manager provides the user with a placeholder for the creation of meaning statements that acts as a reminder and encourager to do so, in a number of different portions of the overall archetype process, including but not limited to: while working on an individual subtopic or topic and constructing relevant knowledge constructs, while working on the set of analysis and/or information constructs, while working on a particular analysis construct, and others. In one preferred embodiment, the present invention facilitates the user in the creation of meaning statements and meaning statement relationships in several ways, including but not limited to: (i) through the encouragement and prompting to develop meaning statements while the user is thinking and/or working in any individual component or particular subset view; (ii) through encouragement and prompting to consider and develop meaning statements and meaning statements relationships as a set across all or a substantial subset of the rest of the integrated construct components, and through thinking prompts provided by the process suggestor. It is an advantage of the present invention that the user is also provided a portion of method and process in which the collection of the observations and meaning statements (associated with analysis constructs, subtopics, and other meaning statements) are made available to the user as a set, hiding the underlying data and analysis details from which the meaning statements were derived, while still making the details accessible to the user (through mechanisms described elsewhere herein). It is a further advantage of the present invention that the user is provided with the ability to quickly and easily access the supporting (or conflicting) knowledge constructs and the associated subtopics, if any, from such a combined meaning statement view.

As discussed elsewhere with respect to the process manager suggestion process, in one embodiment, the process manager may access the contents and/or the labeled and structural relationships across meaning statements, and provide suggestions to the user. In one embodiment, the process manager may evaluate the contents and relationships of meaning statements and make suggestions regarding reclustering or regrouping meaning statements, suggestions regarding additional analysis constructs that may be considered, and/or identify meaning statements that are not well supported by the knowledge constructs at the time.

Method and Process: Creating an Answer or Summary Set

Referring back to FIG. 5, as generally indicated by block 580, in one embodiment, the present invention provides the user with the ability to enter or depict an overall answer or summary set for the integrated construct and its project. The overall answer or summary set may be created in a plurality of information media forms, including but not limited to text, drawings, diagrams, images, graphics, charts, etc., preferably including at least some text explanation as well. In one embodiment, the process manager may allow the user to include an analysis construct as part of the overall answer or summary, preferably along with explanatory text.

In one embodiment, the process manager facilitates the user thinking about and capturing their initial, developing and eventually final thoughts regarding what the answer or highest level summary understanding, opinion, or recommendation is for the project. The method and process step of creating an answer or summary set for the integrated construct may be accessed and accomplished by the user at generally any time after the initiation of the project. In one preferred embodiment, the answer or summary for the integrated construct is linked to the main topic, issue, question (or other designation by the user of a subject area of interest).

In another embodiment, the link between main topic and answer or summary set is created automatically by the present invention when the user enters any information into the answer or summary set construct. In another preferred embodiment, the process manager facilitates and encourages the user to link the answer or summary to meaning statements. In a preferred embodiment, the meaning statements may also be designated regarding the nature of their relationship to the answer or summary set, including relationships such as "supports," "contradicts" and others. The answer or summary for the integrated construct may be edited and changed throughout the development, editing, and viewing of the overall integrated construct.

From certain representations of the integrated construct (as described in the representation description below), the user may select the visual area associated with the answer or summary set for the integrated construct. Alternatively, the process manager may suggest that the user access the answer or summary set for the integrated construct at various points throughout the overall method and process. For example, if the user has created a high number of information constructs and/or analysis constructs and/or observational comments associated with analysis constructs, but has not yet created an answer or summary set, the process manager may suggest that the user try taking a guess at the overall answer or summary set.

If the user has previously entered or created a portion of content (such as text, drawing, image, and/or other information media forms) to be associated with the answer or summary set of the integrated construct, that portion of content is displayed, and is available to the user for editing, additions, or deleting, according to the user interaction mechanisms defined previously in this document. The main topic as previously entered or created by the user may also be represented. If the user has not previously entered or created a portion of content to be associated with the answer or summary of the integrated construct, then the view manager may represent an empty answer or summary component to the user when this component of the integrated construct is represented In one embodiment of the present invention, the process manager provides the user with the option to create more than one answer or summary for the integrated construct, intended as potential alternative answers or summaries. In this embodiment, with the current representation of the answer or summary being represented to the user, the user can choose to add an additional or alternative answer or summary to be associated with the integrated construct. If an additional or alternative answer or summary is so chosen by the user, a second or additional answer or summary workspace may be provided to be associated subsequently with the integrated construct. The process manager may also prompt the user to label, name, title or number the alternative answers or summary sets. Using the linkage manager, the user may then be provided with the ability to develop a second set of links between the alternative answer or summary set and the other components of the integrated construct, such as topics, information constructs, analysis constructs, and/or meaning statements. The linkage manager generally also allows the user to change links from the topic set, the meaning statement set and any linked information constructs or analysis constructs to/from the alternative answers or summary sets being developed.

In one embodiment of the present invention, the user is provided with the option to create and enter their opinion into evaluative fields with the answer or summary for the integrated construct. These evaluative fields may include a number of annotations for the evaluation of alternative answer or alternative summary sets, including for example such annotation as "pros" and "cons" for each alternative answer or summary, and/or a numeric or qualitative rating according to a plurality of dimensions to indicate the user's degree of satisfaction with any one alternative answer at a point in time. In a preferred embodiment, such evaluation is accomplished with access also to any goal statements or requirements or similar descriptions that the user entered as part of the problem definition during the course of the project.

In one embodiment, the process manager may provide suggestions regarding thinking prompts to be considered in the development of an answer or summary statement, based on various inferences, as indicated elsewhere herein. In another embodiment, the process manager may provide a subset of interactive suggestions for thinking prompts.

Link Manager

Referring to FIG. 3A, block 605, a preferred embodiment of the tool provides for a Linkage Manager or similar module, for creating, changing, maintaining, and representing multiple links that may be developed among and between selected or generally all of the components of the integrated construct. Such links may be simple or complex. Such links may be created or changed by a number of mechanisms, including but not limited to: (i) a specific user request or action (either in response to a suggestion from the process manager or initiated by the user alone), and (ii) created or suggested automatically by the present invention. The links generally represent relationships between different components of the integrated construct that are user or method and system created. The present invention also generally facilitates the selective or continual changing or updating of those links, and the addition of new links. FIGS. 4A through 4E show an example of links that may evolve between and among components of an integrated construct as generally provided by the present invention. FIG. 7A is a representation of an example of a linkage view, showing an example of content specific links supported and enabled by the archetype process and structure, as described above.

As shown in FIG. 3, the link or linkage manager or similar module generally creates, monitors changes to, maintains and in some cases suggests or automatically creates links between and among the components or elements of the components of the integrated construct. In one embodiment, the link manager generally also creates, tracks, and manages links between components of any integrated construct, and other integrated constructs or electronic content. For example, the link manager provides for the inclusion of a link to a publicly available web site on the Internet, associated with a component of an integrated construct. In another embodiment, the present invention may also provide for links between multiple integrated constructs or components of multiple integrated constructs, components of multiple integrated constructs, or elements of components of multiple integrated constructs, or any combination thereof. In one embodiment, such integrated constructs and components and elements of integrated constructs may reside locally and/or remotely, on the same processor, on different processors, or on geographically dispersed processors.

Links may be created and edited between and among integrated construct components in at least two ways including but not limited to: (i) links which are specified through user actions generally according to the interaction methods and approaches described above; and (ii) links which may be suggested to the user or provided automatically by the method and system of the present invention, and which may be available to the user to change or delete if desired, as described below. It should be appreciated that numerous alternative methods or technology approaches can be used to accomplish the creation, tracking, maintenance and representation of links among and between components of the integrated construct in accordance with the present invention. In addition, as stated in other portions of this application, it is likely that the optimal choice for technology and data storage approach, for example, will be dependent upon the complexity of the integrated construct itself, and the volume of the information to be included in the components of the integrated construct.

In the integrated construct of the present invention, links between or among components may be used to indicate an association or relationship between those components. A plurality of suitable links may be provided in accordance with the present invention. Examples of the types of links that may be provided include but are not limited to: (i) hierarchical links; (ii) lateral links; and (iii) unspecified links. Each of these is discussed further below.

One link type which may be provided by the present invention includes hierarchical relationships, including but not limited to relationships such as (a) higher level and more detailed, or a whole and parts (examples of which include topics, subtopics, and secondary subtopics, or meaning statements and secondary meaning statements); and (b) supportive of or contradicting with (examples of which include answer or summary and meaning statements, or meaning statements and secondary meaning statements).

Another link type which may be provided by the present invention includes lateral relationships, including but not limited to relationships such as: (a) associative relationships (examples of which may include topics and information constructs, topics and analysis constructs, topics and meaning statements, information constructs and sources); (b) content relationships (examples of which include information elements within an information construct and a particular analysis construct, meaning statements to meaning statements, information constructs to information constructs, analysis constructs to analysis constructs); and (c) logic relationships (examples of which may include information constructs to information constructs, meaning statements to meaning statements, topics to subtopics, subtopics to subtopics, information constructs to analysis constructs).

A further link type that may be provided by the present invention may include one or more unspecified linking relationships. Similarly, the present invention may include the ability to specify that a link is likely to exist between any two components or the contents of any components without specifying the type of link at that time. In one embodiment of the present invention, this type of link is labeled as "undetermined," "unknown," "is related to" or provided any other suitable or user defined label. In view of the nature of the components of the integrated construct, it should be appreciated that any suitable further or additional linkage relationships which can be defined among or between groups of components or individual components (i.e., group to group, individual to individual, individual to group, and group to individual) of the integrated construct can be employed in accordance with the present invention.

In conjunction with specifying that a link exists between or among different components of an integrated construct, the present invention may provide the user with the ability to designate a label or type to the link. In one embodiment, the specification of the type to be associated with a link is provided as a field into which a user can input a text, graphic, or drawing designation as a label for the link. This enables the user to explain why the user believes a relationship exists and to define the nature of the relationship between two or more components and thus the purpose of the link. This is one of the functions that also allows the present invention to track and document the user's thinking. The user can subsequently change or add to the links or the reasons associated with the links and therefore this linking assists in enabling the present invention to track and document the user's thinking process. The present invention may in one embodiment save subsequently changed links to track and allow the user and others to see how the user's thinking process progressed, as it does with other integrated construct components. This may allow another person such as (i) a teacher to see the links created by the user and why the user created such links, or (ii) a person or team to share their reasoning and thinking in a project with another person or team. Such sharing can help the user in refining and developing the user's thinking processes. Such tracking may also provide the user with an ability to review their own patterns of thinking and linking in the course of completing their project.

In another embodiment, the user can specify the nature of any link by the designation of an arrow-like direction (either direction or a two-way relationship). In yet another embodiment of the present invention, the specification of the type to be associated with a link may be accomplished by the present invention providing a menu of link types from which to choose. It should be appreciated that there are a plurality of approaches to accomplishing the user's ability to indicate a type or nature of the relationship to be associated with a link between or among components of the integrated construct that could be used in accordance with the present invention.

The present invention provides for some linkages between and among components of the integrated construct that may be provided automatically. For example, in one embodiment, the present invention may provide for the automatic creation of links between components based upon the characteristics of the representation or view the user is using at the time a new component is created. For example, if a user is using a representation of a specific topic view at the time the user creates a new information construct, then the present invention may automatically specify a link between the information construct and the specific topic that was the focus of the view at the time of the information construct's creation. Similarly, for example, if a user is using a representation of a specific analysis construct at the time that an information construct is created, the present invention may automatically link the information construct to the analysis construct and suggest to the user that they specify how the information construct is related to the analysis construct, or delete such a recommended link. Such automatic linking makes the process of creating and managing relationships across project components—which can become very complex—significantly easier and more productive for the user.

In yet another example of automatic linkages that may be provided by the present invention, the present invention may provide secondary associations to the user, based on primary associations. For example, in one embodiment of the present invention, if a component of the integrated construct "A" has a relationship with another component "B" and component "B" has a relationship with component "C," then the present invention may provide the link "A has a relationship with C" as a suggestion or automatically. The archetype process may also show this secondary relationship to the user and ask whether the user wants this secondary relationship to be retained or not.

In the preferred embodiment, such automatically generated or suggested linkages do not detract from the ability of the user to then link the newly created components to other components (or in other views). By providing these and other automatic linkages or linkage suggestions, however, the present invention reduces the users effort at creating and managing such linkages and increases the probability that meaningful linkages will be created and maintained. The system may also allow the user to override any such linkages suggested or created automatically by the present invention.

View and Representation Manager

Referring now to FIG. 3, one embodiment of the view and representation manager of block 200 is described and depicted in further detail in flowcharts in FIGS. 3C, 3D-10 and 3C-20. In a preferred embodiment, the present invention includes a view and representation manager which is operable to provide to the user different representations which provide the portions of archetype process, and the associated portions or totality of the integrated construct, its content, structure, linkages as it develops. In the description that follows, a distinction is intended between "views" provided by the present invention (being combinations of portions of method and process and the content, structure, and linkages of the integrated construct so as to provide meaningful thinking and working sets) and "representations" provided (being the visual and interactive provisioning of the views to the user or users, in a plurality of visual and interactive forms). In the following description, the software module(s) that accomplish these capabilities is termed "view and representation manager" but may be referred to as "view manager" as shorthand in the description that follows. Views and representations may be changed in response to user inputs and actions, as described in greater detail below. In one embodiment, different views or representations may also be suggested by the process manager to the user, as a means of guiding the user's thinking and work, based upon the evaluation of the user's current view, activities and content progress in the integrated construct, project completion rules, and other items as described herein.

The views and representations provided by the present invention through the view and representation manager generally provide the user with several advantages, including but not limited to the following: (i) the representations accomplish guidance and feedback to the user by providing a meaningful subset of their content associated with their integrated construct and also the portions of method and process that the user is likely to want to use or may want to consider using, according to exemplary project approaches, with those portions of content; (ii) the views represent the user's ITKC and activities in various ways against the expectations of the archetype process and structure, to various degrees, as a means of providing coaching and feedback; (iii) the views and representations enable a user to work on an integrated construct from a plurality of viewpoints with easy navigation between these viewpoints, in a way which allows the user to follow their own instincts and thoughts regarding what type of thinking or knowledge work they should pursue next (such as working on an integrated construct from the perspective of "what questions was I trying to answer?" and then switching to "what do I think the answer might be?") without having to do additional work to reconstitute the project's information; (iv) the present invention provides useful views and representation of focused thinking and/or knowledge activity type—(for example, focusing on the definition of the problem through a set of topics, focusing on analysis, or others), and useful "slices" or other subsets of combinations of the components of the integrated construct (such as the "slice" view of a particular subtopic and its associated components and method and process) which generally correspond to a natural thinking or knowledge related work process, and in so doing provide a way of guiding working on a potentially complex integrated construct and the archetype process, by subsetting the integrated construct and the appropriate portions of method and process into meaningful thinking and working views; (v) in one preferred embodiment, the views and representations may provide visualization of what next thinking and work steps are likely to be useful for the user to pursue, through a number of different approaches, such as by placing the visual depiction of the "visible next views" associated with the related work activity in proximity or otherwise visible or easily accessible from the current working view for the user, and by depicting gaps to the user, (vi) the views and representations provide a context for work by the user that in a preferred embodiment may allow the present invention to determine links that should be made automatically between components of the integrated construct, as described more fully in the discussion of the linkage manager, and others.

A later section describes examples of the views and representation types which may be provided by the present invention in one or several embodiments. In the description provided herein, reference is primarily made to replacing a current in-use view with a different view, primarily in response to user actions and requests and evaluation and optimization by the view manager and suggestions by the process manager or similar module. However, it should be readily appreciated that allowing a user to have multiple views or representations as provided by the invention visible and/or accessible at generally the same time is in accordance with the present invention.

Figure 6:
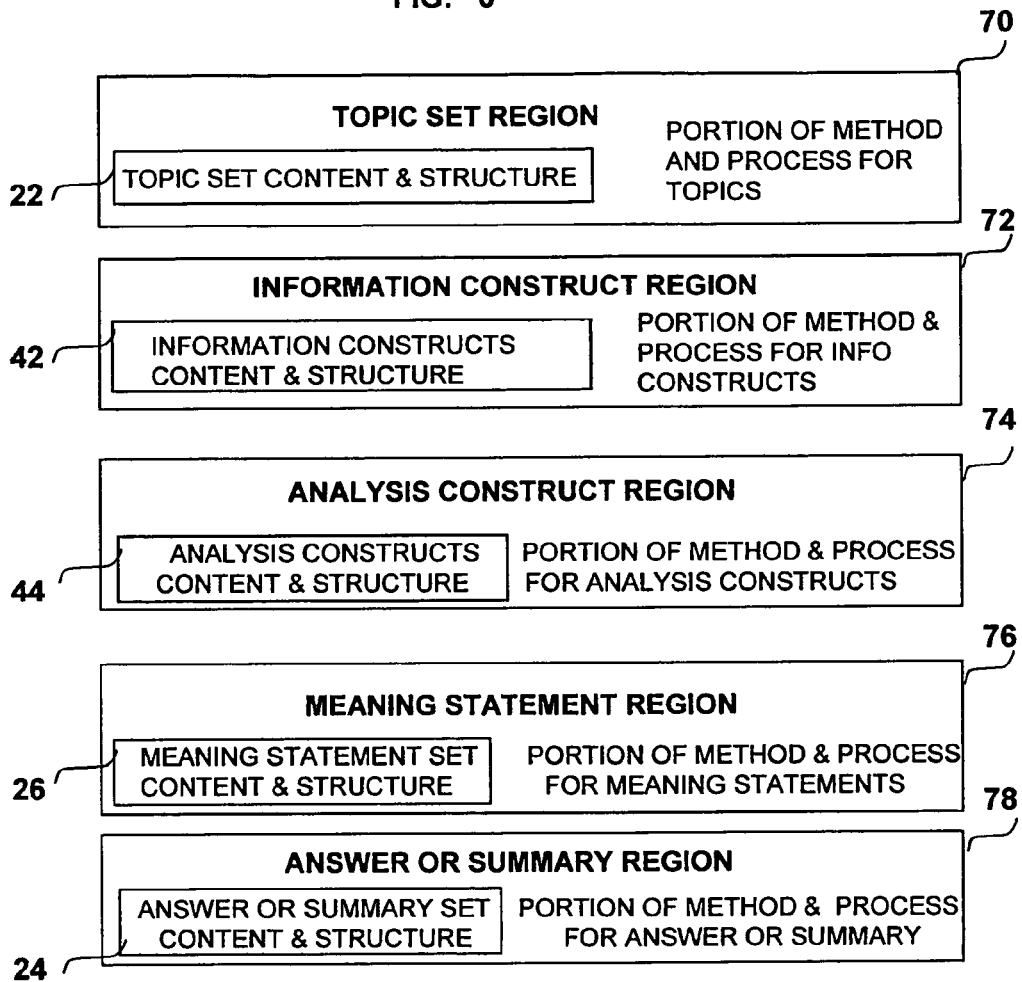
Figure 6A:
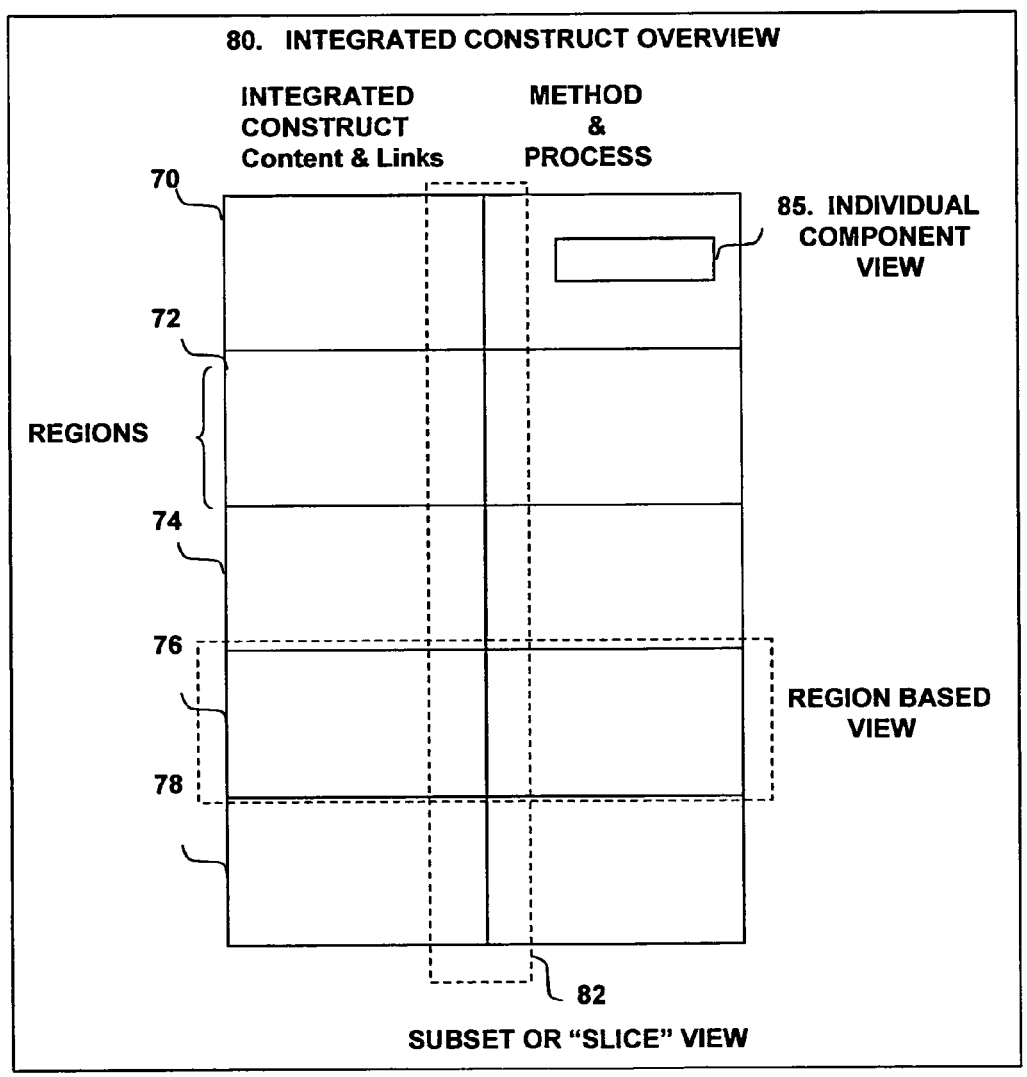
FIG. 6A is a schematic view of example types of views or representations that may be provided by one embodiment of the present invention, being shown as regions and slices as well as the overall and individual component views.

Referring to FIG. 6A, a schematic of some categories of view types provided by a preferred embodiment, representations or views provided by the present invention in one embodiment may for example provide views of at least these general types, including both global representation and navigation approaches, and local or focused representation and navigation approaches. For example, referring to FIG. 6A, in one embodiment, global views may include but not be limited to: (i) views of the total integrated construct, conveyed against archetype expectations to varying degrees and levels of detail, as indicated by block 80; (ii) views which subset the total ITKC into visually distinctive regions and/or which may show the level of activity or work conducted and/or components constructed in those regions and/or slices. Examples of local navigation view types provided by one embodiment may include: (i) views of a region, being a similar type of archetype thinking or knowledge work process portion and the associated thinking or knowledge components as depicted in blocks 70, 72, 74, 76, and 78 in FIG. 6A (such as a topic set); (ii) views of a slice or subset of the integrated construct and its associated method and process, as indicated by block 82 in FIG. 6A, being a useful, generally filtered or subsetted combination of some of the components of the integrated construct and their associated portions of method and process of the present invention (for example, a meaning statement and its associated knowledge constructs), (iii) views of individual ITKC components, such as an individual information construct, as indicated by block 85 in FIG. 6A, (vi) views of sets of ITKC components, such as a set or sets of information constructs, analysis constructs, and others. Views and representations of one preferred embodiment are later described more specifically. t. It should be appreciated that different audiences may desire or respond better to somewhat different depictions or forms of these views, such as due to age or specific application differences. For example, the specific rendition of the interface for a ten-year-old user in an educational setting is likely to differ from the rendition of the interface for an adult problem solver, although the basic functionality may be very similar, and the general work steps and associated views may be generally similar. Given the general purpose nature of the integrated construct and its associated method and system, it is further expected that new or adjusted forms of representation of the integrated construct contents and their associated method and process may similarly be defined in accordance with the present invention.

Figure 3C:
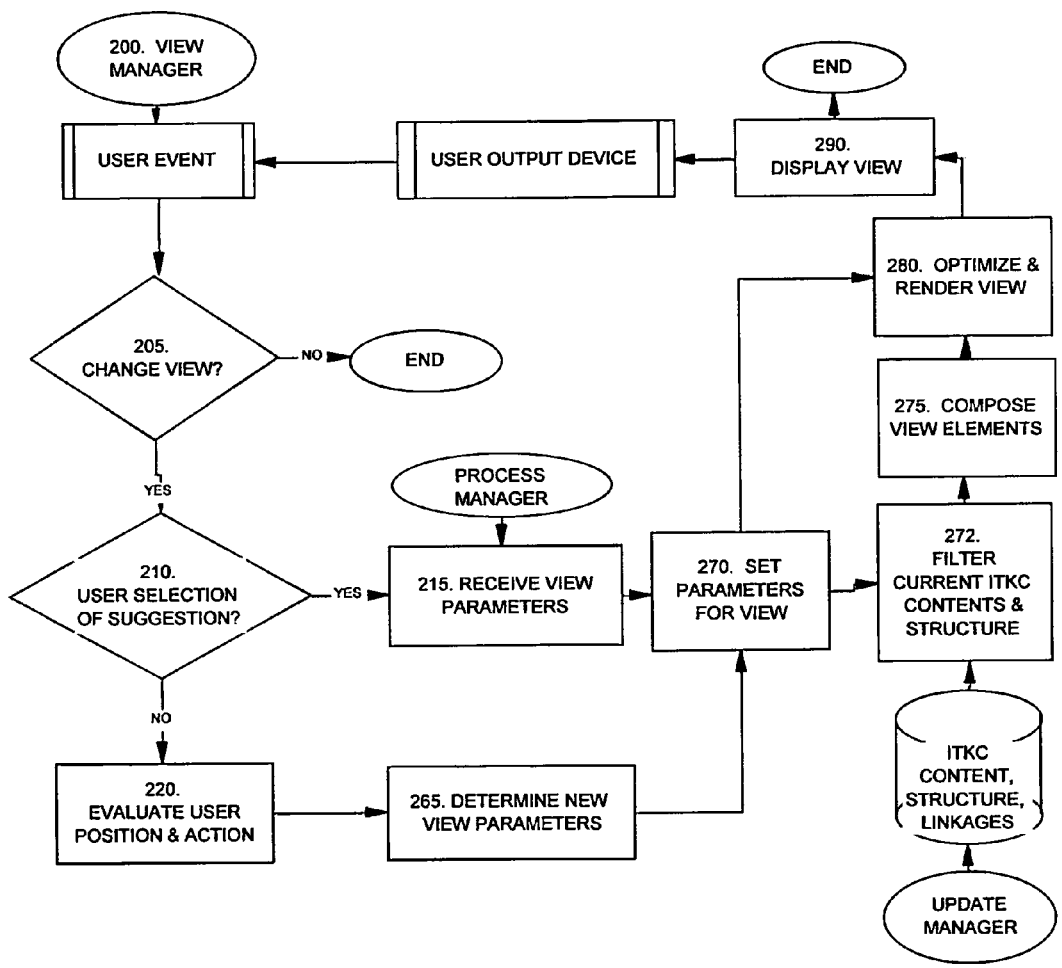
FIG. 3C is a flowchart of transactions related to the general functions of the example software module view and representation manager.
Figures 3, 3C, 4, 5, 6, 7, 8, 9, 10:
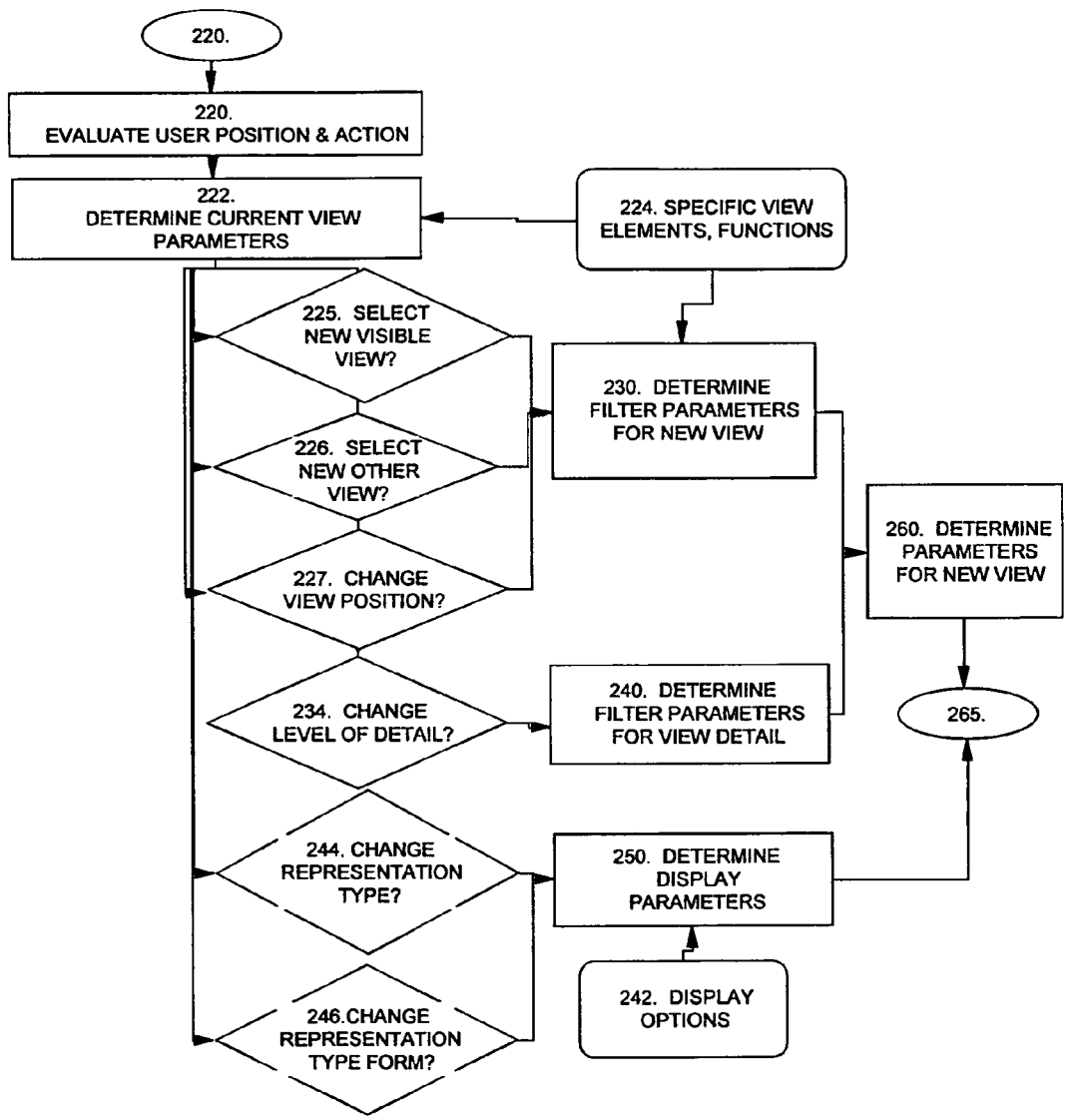

As described elsewhere herein, the views and representations provided by the present invention are not dependent upon operating system, hardware, data storage and management mechanisms, nor are they dependent upon the specific programming techniques employed for their implementation or specific transactions used to accomplish the representations and their associated functionality. The views provided by the present invention largely provide the function, value and advantage inherent in the present invention largely regardless of the technical approach taken for their implementation. It is most likely that the processing capabilities of the technology used for implementation may affect the precise form and approach used to represent the view to the user (for example, using 3D images in environments with low computer processing power, as opposed to complex, fully functioning 3D rendering of the structure for the representation), as opposed to the nature of the view elements, content, and method and process to be used. The representations may also be provided in a plurality of forms, including but not limited to electronic display and printed paper or other outputs. Referring to FIG. 3C, the view and representation manager monitors user events and determines whether the user event indicates a desired change in view, as indicated by block 205. In one embodiment of the present invention, the primary user interaction device is a computer mouse, which may move a cursor or other marker on a computer screen to indicate the location of the user's activity, and a keyboard. Alternatively, in this embodiment, the view and representation manager may also monitor the placement and level of activity associated with a computer cursor placed in a position on or within the representation or view using directional or other keys on a computer keyboard. In addition, as described above, a plurality of user interaction devices may be used, including but not limited to touch screens, voice activation, stylus pen, or other interaction mechanisms. Also, as described previously, the display device may be a plurality of display devices and mechanisms. In one embodiment, indicators to the view manager that a changed view is desired may include the selection by the user of: a component visible in the current view, subset of a current view, visible next view, selection of different level of detail, a different view from the ITKC overview, a different view from a drop down menu, and others as described elsewhere herein. If no change in view is indicated as shown in block 205 FIG. 3C, no further action is taken.

Referring again to FIG. 3C, the view and representation manager in one embodiment determines in block 210 whether the user's selection of a new view is in response to a suggestion that has been provided by the process manager. If so, the view manager receives input regarding the recommended view parameters in block 215 from the process manager, which set the parameters for the view manager in block 270 as the basis for later filtering the contents, structure, linkages and method and process to be provided (block 272), composition of the appropriate view elements (block 275) and view optimization and rendering (block 290). Referring again to FIG. 3C block 210, in one embodiment, if the view manager determines that the changed view is not in response to a suggestion by the process manager, then the view manager evaluates the user position and action in block 220 and determines the appropriate new view parameters in block 265 which then set the parameters for the view in block 270. The view manager or similar module therefore determines and subsequently provides the appropriate view parameters to create the appropriate representation of the desired view, including the integrated construct content, structure, linkages, and appropriate associated portion of the method and process to the display or display device. In one preferred embodiment of the present invention, the process manager or similar module may evaluate the user movements and provide suggestions to the user for next views to try, based on an evaluation of current user actions together with items such as the status of the content and structure of the integrated construct and project completion rules, as described elsewhere herein.

Referring to FIG. 3C-10, further detail of the logic of the view and representation manager for one embodiment is shown, in order to evaluate the user position and action (block 220) and determine new view parameters, block 260. The view manager in block 222 determines the current view parameters, based upon the set of specific view definitions provided by the present invention in block 224. In one embodiment, specific view definitions may include but not be limited to some or all of the following: (i) the component types included from the ITKC (such as topics, information constructs, etc.), (ii) the basis or central component on which the ITKC components are to be filtered for inclusion in the specific view, (iii) portions of method and process to be made available to the user in the specific view, (iv) subset or level of detail to be provided for included components in the specified view, (v) linkages that are to be made visible or available to the user in the specific view, and (vi) other views which are to be made most closely available or appear to be related to the user in the specified view, and others, Referring again to FIG. 3C-10, in one embodiment, the view and representation manager monitors whether the user has selected a next visible view (block 225) or used another means to select a different view, such as a drop down menu (block 226), or changed position within a view (block 227) which warrants a change in the filtering of components, linkages and portions of method and process (block 230) to be included in the specific view chosen by the user. Continuing with FIG. 3C-10, in one embodiment the view manager further evaluates whether the user has indicated a desired change of detail (block 234), which sets the filter parameters in block 240 for level of detail. Continuing with FIG. 3C-10, the view manager evaluates whether the user has indicated a change in representation type (for example, 3 dimensional, 2 dimensional, outline and matrix representational types) in block 244 or in representational type form (block 246) as the basis for determining display parameters to be used for the new view in block 250, from the display options provided by the present invention in block 242.

Referring still to FIG. 3C-10 block 242, in a preferred embodiment, the present invention may provide for the selection of representation types by the user. Representation types as used herein refer to different types of representation or means of visually depicting a view to a user or group of users, which provide for sets of views which are generally functionally the same, but whose appearance is different in the manner in which they are represented.

The present invention, through the view manager, may in one embodiment provide the user with a number of different representation types as options for representing and displaying the integrated construct and the associated method and process portions which are provided by the present invention. In one embodiment of the present invention, the user may be provided with the following options for representation types: (i) three-dimensional representation(s); (ii) an outline or tree-type representation; (iii) two-dimensional representation(s), and (iv) a matrix representation. In addition to personal preferences for representation by different users, it is also likely that the optimal representation type for the specific integrated construct may differ by the nature, size, and complexity of the integrated construct itself.

Figure 6C:
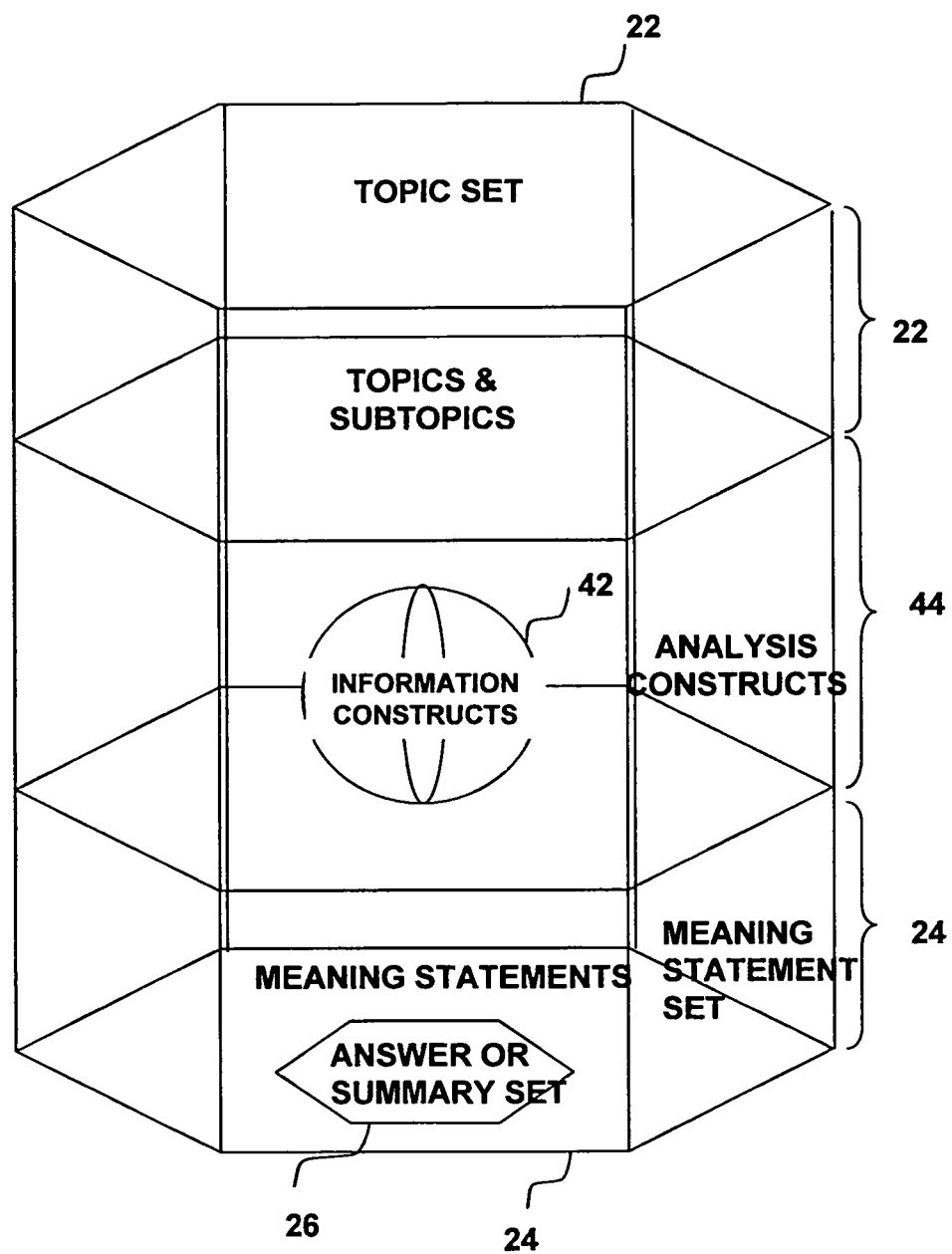
FIG. 6C is another schematic depiction of one example embodiment of regions as representational areas in one 3-D embodiment.
Figure 6E:
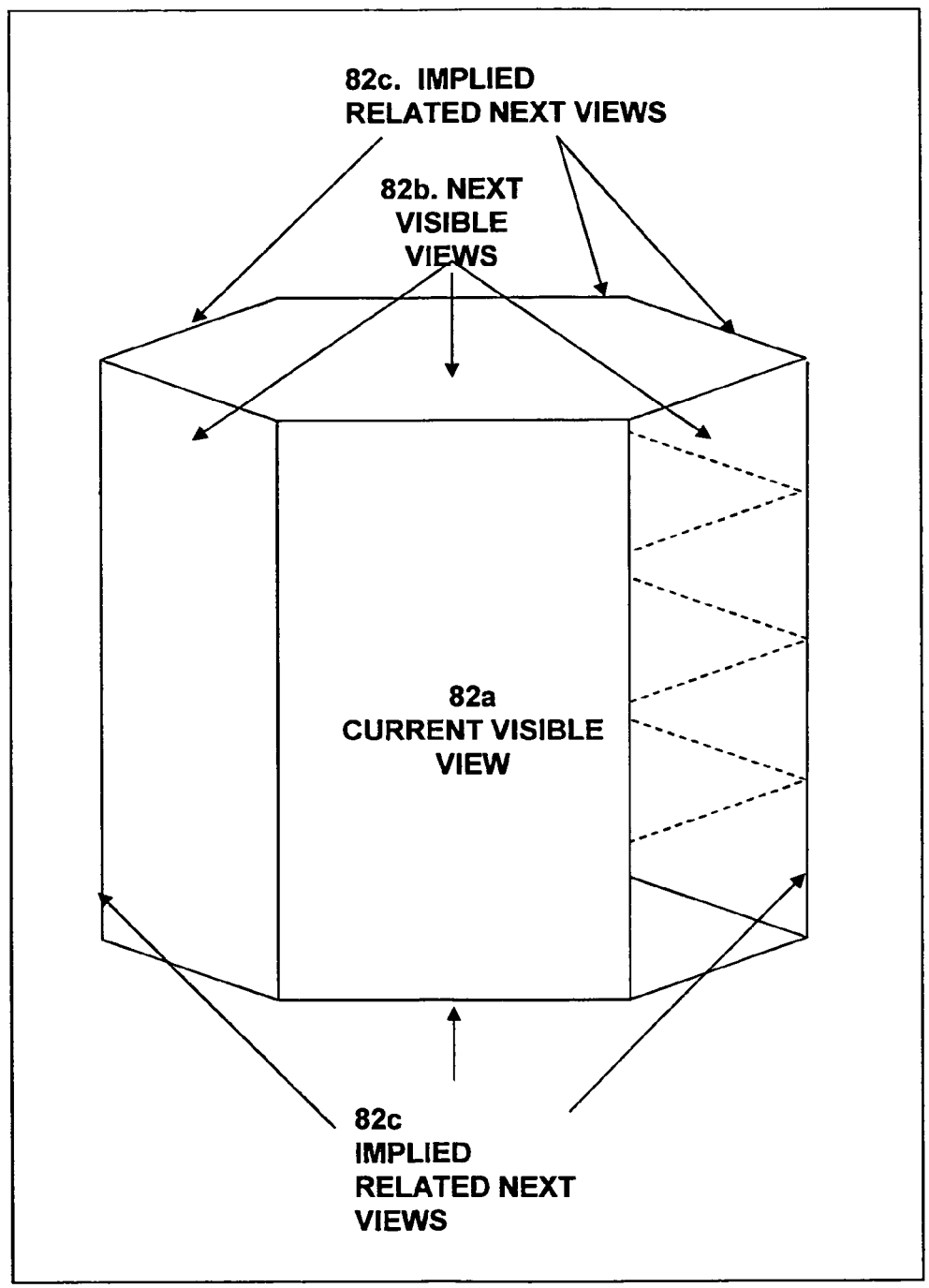
FIG. 6E shows a schematic depiction of the use of next visible views and implied next visible views in one 3-D embodiment.
Figure 6F:
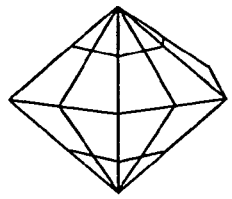
FIGS. 6F through 6S are alternative example shapes which may be used to represent the integrated construct of the present invention as a three dimensional object.
Figure 6G:
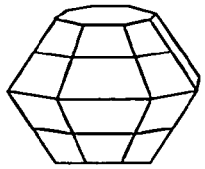
Figure 6H:
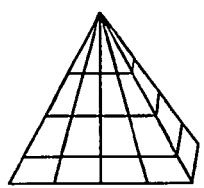
Figure 6I:
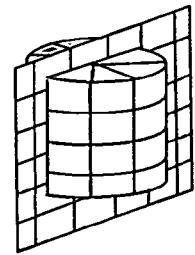
Figure 6J:
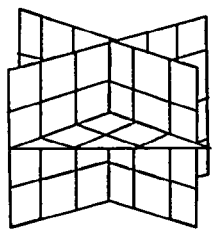
Figure 6K:
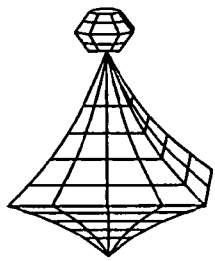
Figure 6L:
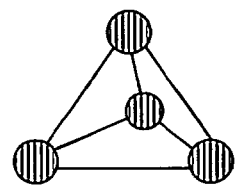
Figure 6M:
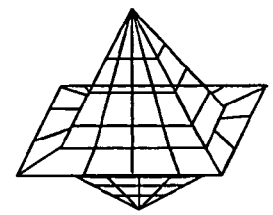
Figure 6N:
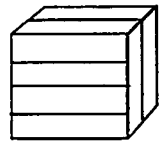
Figure 6O:
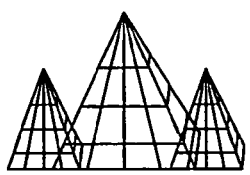
Figure 6P:
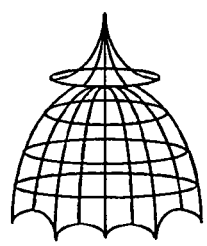
Figure 6Q:
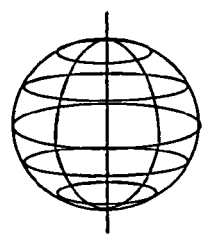
Figure 6R:
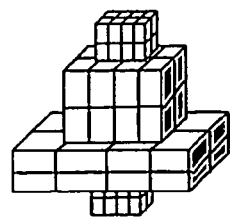
Figure 6S:
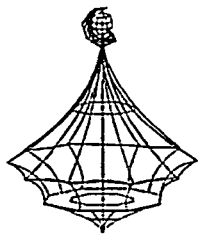

Referring again to FIG. 3C-10, the view and representation manager in one embodiment monitors selection by the user of representation form or shape in block 244. For each representation type provided by the present invention, there may be a plurality of specific forms or shapes provided for choice by the user. In one preferred embodiment, for example, the view manager may provide for the selection of the representation form associated with a three-dimensional representation, for example, the user may be provided with a plurality of specific three dimensional shapes from which to choose the manner in which their particular integrated construct and the associated method and process will be represented (examples of which are illustrated in FIGS. 6F-6S). It should be appreciated that a plurality of three-dimensional shapes and a plurality of degrees of visual detail in the depiction can be employed in accordance with the present invention. A more detailed explanation of the characteristics of shapes that may be optimal for use in a three-dimensional representation of the integrated construct is included in the description of the specific views set forth in the representation section below.

Continuing with FIG. 3C-10, the view and representation manager or similar module may monitor the specific view and representation being displayed at a particular point in time, as indicated in block 222. In one embodiment, the present invention generally provides the user with the ability to change the specific view and representation being displayed through a number of different interaction mechanisms, which may include but not be limited to the following: (i) user movement of an interaction device to send an input to the view manager or process manager indicating the selection of a different view which is visible for access in the representation of the current view which may be placed as an adjacent view (referred to hereafter as visible next view); (ii) user selection of a component of the integrated construct which is visible in the current view in order to obtain a more detailed view of the content, structure and/or linkages associated with the selected component; (iii) user selection of a link which is visible in the current representation view; (iv) user selection of an area or subset of the overall integrated construct representation, which is associated with a specific view; (v) user selection of a view provided through a conventional menu list, and others.

With regard to choice (i), in one embodiment, the availability of related views may be depicted as a part of the representation in current use, or indicated or implied by the placement orientation or the integrated construct, or indicated as available at the boundaries of the screen or other display device (in the case of more detailed views in which the outer boundaries of the integrated construct are not visible). These related views are termed "visible next views" for the purposes of clarification herein. Referring to FIG. 6D, an example of a visible next view available from a specific current view block 82a is shown in FIG. 6D block 82b. More specifically, the view manager may present to the user both "visible next views" those for which a portion of the view is actually available, as shown in FIG. 6E block 82a, and also views which while not immediately visible, are implied as available through their implied position, such as the implied related next views indicated by block 82c in FIG. 6E. Referring to FIG. 6E, examples of visible next views and implied next views are indicated for one embodiment of a 2 dimensional version of the representation structure.

Returning to the discussion of the 3 dimensional representation, specifically, user selection of such a visible next view may be accomplished as follows. In one embodiment, while a particular representation is being displayed, the present invention may generally monitor user actions and inputs. In this embodiment, if the user interaction device is moved in a way to place the user interaction marker within or upon an area of the representation view which represents a different, visible next view (or up to a screen boundary that implies a visible next view), the view manager generally replaces the current view with the new view so indicated. In one embodiment of the present invention, the movement may also be accompanied by an additional user interaction message, such as a click of the computer mouse or other device, in order to verify that the user does indeed wish to move and replace the existing representation view with a different view.

With regard to choice (ii) above, in one embodiment, within any specific representation, the present invention may generally monitor whether a user selects a specific component that is at that time available in the view. Specifically, in one embodiment, the component of the integrated construct may be being displayed as part of a view as an icon, name, title, summary field, or other suitable high level representation. In one embodiment, the user may select the specific integrated construct component through the use of a computer mouse and a standard double click interaction (for example, the user might select the icon for the person information construct "James Madison" while working in the individual subtopic view with which James Madison is associated, such as the subtopic "Who created the Constitution?". It should be appreciated that many approaches can be used to provide a message from the user to the view manager and process manager that the user has selected a component within a view in accordance with the present invention. In one embodiment, the view manager responds to the user event of selection of a component of the integrated construct to indicate a request for a more detailed view of that component as referenced above in (ii), and the present invention may display one, a plurality of or all of the contents, structure, and linkages associated with the selected component. In one embodiment of the present invention, this more detailed representation is provided in a pop-up like additional representation space or window on the computer screen, in the approximate position as the high level component that was selected. In one embodiment of the present invention, the detailed representation space for the selected component can also be moved and repositioned on the display area while it is open at any time. In one embodiment, more than one integrated construct component may be so visible and available to the user at the same time. Upon selection and displaying a more detailed representation of any integrated construct component, the contents and format of the selected component may be added to, changed, deleted, or reformatted as desired by the user, as described further in the method and process description of the present invention included herein.

With regard to choice (iii) above, in one embodiment, the user may also indicate the selection of a link represented as associated to a component of the integrated construct. In this embodiment, the present invention may display the component associated with the chosen link, which may not be visible in the current view, and provide the user with the ability to navigate by selecting the link to a view of the referenced or linked component, thus changing the component that is central to the view.

With regard to choice (iv) above, in one embodiment, the user may indicate the selection of an area or region of a representation, such as the topic set region as a whole from the viewpoint of working on one topic or question. In this embodiment, when the user selects such a region or other visually distinguishable area, the present invention may replace the current view with the view so selected.

With regard to choice (v) above, in one embodiment of the present invention, the options available for representation types and specific views are also made available to the user in one or a number of more conventional manners, such as through the use of a drop down menu, through the assignment of specific key combinations on the keyboard (a common convention which is typically targeted at allowing more expert users to interact with a software program more quickly and directly than pull down menus with multiple levels of options typically provide) and others.

The present invention uses a number of approaches to provide visual and process feedback to the user as they take actions. Again referring to FIG. 3A, in a preferred embodiment, when the user chooses to add or modify a component to their integrated construct (such as a new information construct) as shown in blocks 420 and 400, the process manager and update manager may add the components to the integrated construct through the update manager block 700, and the view manager may generally add the appropriate rendition of that new component to the representation view directly following the user action that initiated the action, by initiating a changed view, block 205.

Continuing with FIG. 3C-20, in one embodiment, logic modules to optimize and render the appropriate representation are shown. In FIG. 3C-20, block 283, the view and representation manager evaluates the intended view elements, including the number of various component types and/or the completeness of the components, that have been determined to be included in the intended new view. In one embodiment, each representation type has a set of "default" view designs or approaches that are preferred in most cases. Continuing with FIG. 3C-20, the view manager in one embodiment may, as shown in block 284, evaluate the appropriateness of the representation type chosen by the user for the complexity, structure, number of components and other factors as evaluated by the present invention in block 283. For example, a high number and complex set of topics and subtopics may be better shown in an outline form for working than in a web like depiction as part of the 3 dimensional representation, described in greater detail below. If the view and representation manager identifies a more optimal representation type, then the suggestion is provided to the view manager, in block 290, and may result in a different user event. Continuing with FIG. 3C-20, if the user does not wish to change their representation type, or if the representation type has not been identified by the present invention as suboptimal, then the view and representation manager in block 286 composes and optimizes the representation according to the requirements of the different representation types, such as 3 dimensional, outline, 2 dimensional matrix and more conventional approaches (described more fully elsewhere herein). Based on the representational type and the specific representation composition, in block 287, in one embodiment, the view manager determines both context graphics and content and functional elements for the new view and representation. For example, in one three dimensional embodiment which may be suitable for lower processing environments, the view manager may utilize images, such as PEG or GIF files, which depict a three dimensional like structure in various views, as a graphic backdrop against which other actionable elements are added, in order to achieve the appearance and functionality of a three dimensional representation approach without the processing overhead associated with a full 3 dimensional rendering, which is an alternative 3 dimensional representational approach.

Continuing with FIG. 3C-20, in one embodiment, as shown in block 288, the view manager then determines the optimal placement and size of elements and functions to be displayed in the representation. For example, in one embodiment of the 3 dimensional representation, a visual area is defined for the addition of information constructs to a specific subtopic view. In one embodiment, if less than 12 information constructs are associated with the specified subtopic, then the information constructs are shown as icons with labels, spread out evenly in the space. In another embodiment, the placement of the information constructs associated with the specific subtopic may be arranged according to their completeness and complexity of content elements and data, or according to a rating of importance as indicated by the user. In this same embodiment, if more than 12 information constructs, for example, are associated with a specific subtopic view, then the present invention in block 288 may instead display the information constructs as a scrollable list and potentially as a ranked list, with labels and reduced or non existence icons.

The present invention in one embodiment may use several different visual techniques to provide visual feedback to the user and thereby encourage appropriate thinking and knowledge behavior. For example, in one embodiment, if the new component is created and no additional information has been added to the component, the view manager may represent that new component in the appropriate view as present but empty (for example, through the depiction of an empty outline for an icon for an empty person information construct, with a title only), or otherwise lighter or less evident visually than a component with significant content. In a similar embodiment, if information is subsequently associated with the new component by the user, then the view manager may display the new component with a visual indication of no longer being empty. In one embodiment of the present invention, the distinction between empty (created but not yet used) components and those with which additional information has been associated is accomplished through the use of graphic elements which are empty or transparent and those which are later no longer transparent, or depicted in a darker and more opaque hue. It should be appreciated that a plurality of graphic and visual distinctions may be used to depict the relative completeness of a component or its links that have been added to the integrated construct in accordance with the present invention.

Continuing with FIG. 3C-20, in block 283, in one embodiment, the view manager may count the number of subtopics, secondary subtopics, meaning statements, secondary meaning statements, information constructs and analysis constructs associated with the integrated construct, and calculate the number of sides, facets, or areas and size and angles required to render and include an appropriately sided polygon in the representation. In FIG. 3C-20, block 287, on one embodiment, the view manager may then utilize these counts to provide representations in which visual depictions of the integrated construct correspond to the specific numbers of components in the specific integrated construct being represented. In this manner and in these embodiments, the geometry of the representation of any integrated construct in this embodiment will generally embody the number and levels of components that have been constructed by the user to date.

More specifically, in one embodiment of the three dimensional representation of the present invention, the number of visually evident sides, facets, surfaces, or areas provided visually for each region (such as the topic set region) defined by the view manager may correspond to the number of subtopics or secondary subtopics which the user has defined at that point in time. In another embodiment, the number of sides or visual areas shown for one type of the components may vary according to the number of higher level components (such as according to the number of topics as opposed to subtopics), and depict the subportions of the component as areas divided into or onto, for example, the side views, facets, surfaces or areas. In one embodiment, the view and representation manager may similarly provide visual differentiation regarding the use of different thinking and work process portions, and the underlying structure and specifically the number of components of an integrated construct if represented in the outline, two-dimensional or matrix form.

Returning to FIG. 3C-20, in one embodiment, following determination of the appropriate contextual graphics and capabilities in block 287, and the placement of elements and functions appropriately for the desired view in block 288, the view and representation manager renders the representation view accordingly.

Further details regarding specific views and additional details on representation approaches provided by the present invention are described below. It should also be appreciated that many representation forms can be used to create the functional advantages provided by this present invention, and therefore additional representation forms do not depart from the scope or intention of the present invention as described herein.

Views and Representations

The present invention provides a set of related views and a plurality of representation approaches which display portions or the totality of or the integrated construct (including content, structure and linkages) throughout its lifecycle and enable the associated method and process of the present invention to be accessed, viewed and worked upon by the user in appropriate combinations in association with the portions or the totality of the integrated construct. The present invention's definition of elements and functions that together comprise the capabilities of the views and representations, the visual combinations provided, the feedback provided by these combinations to the user, and their navigational relationships to one another, are one manner in which the present invention facilitates and guides the user according to exemplary thinking and knowledge approaches for an inquiry based project.

Additional specification of the manner in which views and representations are provided in accordance with the present invention is included elsewhere in this document above, such as in the descriptions of the view and representation manager and of user interaction. In one embodiment of the invention, the view manager provides for the user to have more than one view of displayed at the same time.

Figure 4E:
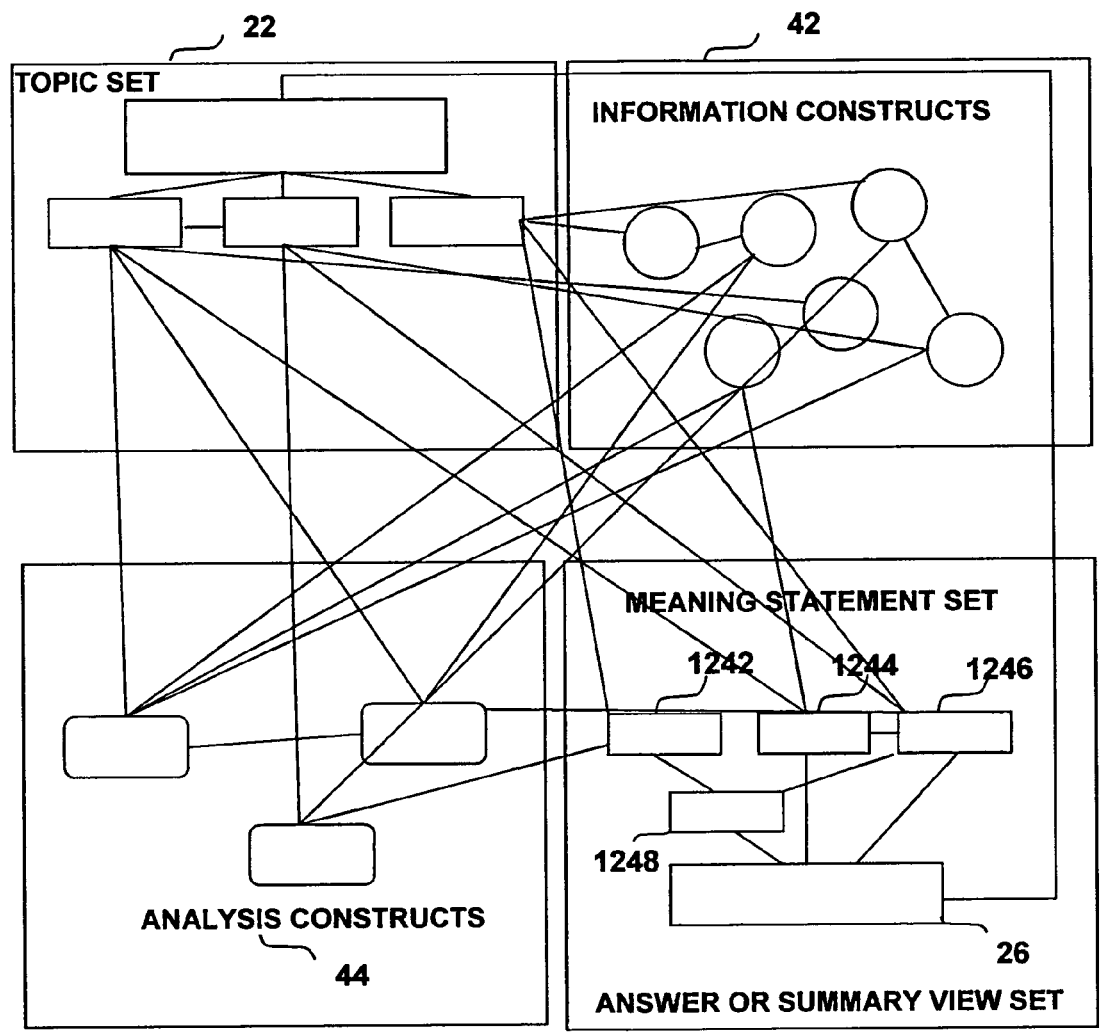
FIG. 4E is an example of linkages between components of an integrated construct of one embodiment.

The contents of the integrated construct may be varied, containing a plurality of components and of linkages between components, as shown in FIG. 4E. It should be appreciated that such linkages can become complex and numerous. The representations provided by the present invention provide meaningful overall and subset views of the plurality of components and relationships between components together with portions of method and process to be used by the user in the specific view which may exist at any point in the completion of a project and creation and development of an integrated thinking and knowledge construct.

Figure 1E:
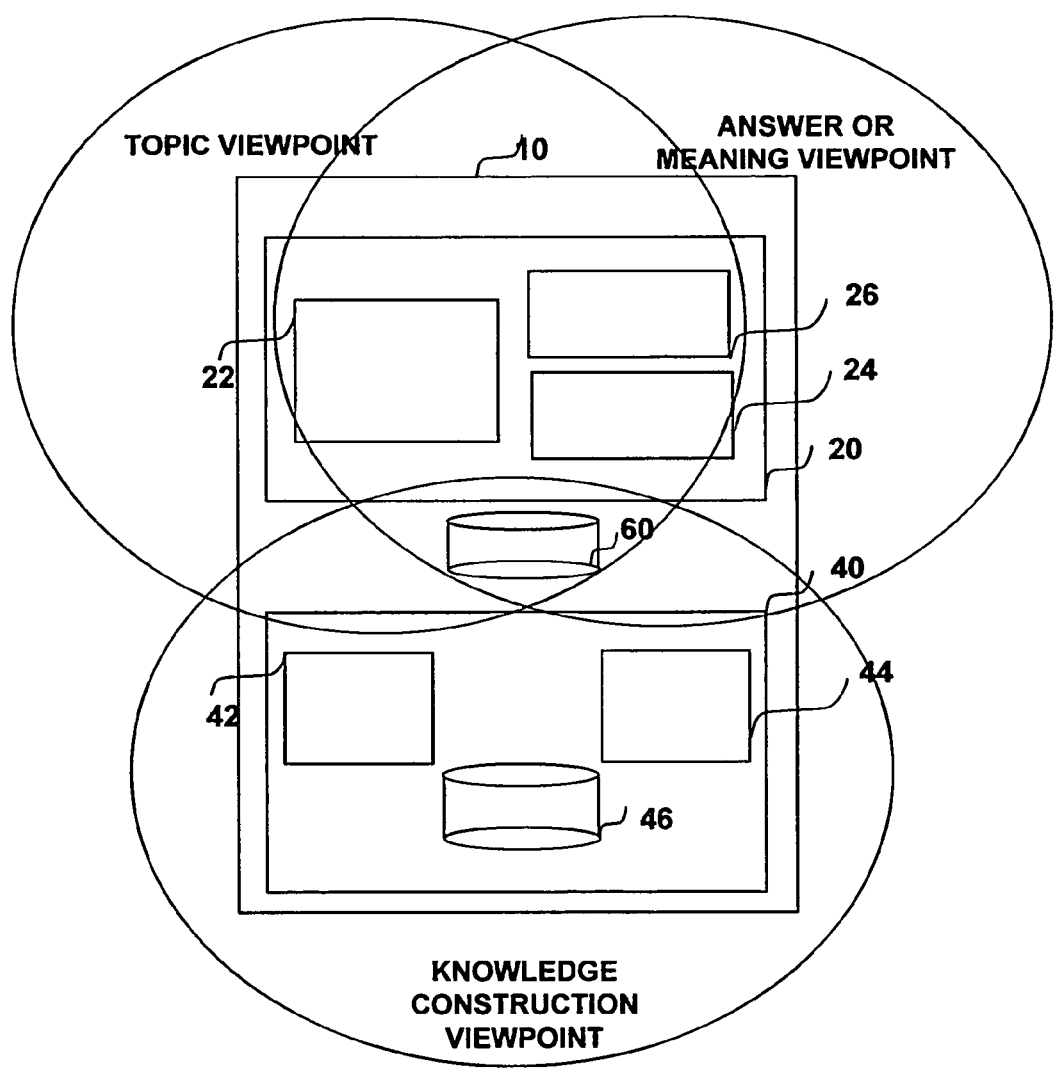
FIG. 1E is a schematic diagram of example alternative viewpoints that may be provided to the user by representations.

As illustrated generally in FIG. 1E, in one embodiment, the combination of views and representations provided by the present invention may enable a user to choose to work on the same integrated construct from a number of different angles or vantage points, generally without having to do additional work to edit, reconstitute, or reorganize the underlying information in order to do so.

In one embodiment, the views and representations provided by the view manager may be changed and depicted in order to provide visual representation according to changes in the integrated construct components, content, and linkages, as well as the user's or users' activity and actions in different thinking and knowledge process portions, thereby providing the user with an ongoing depiction of and guidance for the progress in developing the integrated construct for a project.

The views provided by the present invention generally provide a basis for stability and familiarity across projects and integrated constructs, as different integrated constructs will in one embodiment have similar view capabilities, which may include such common items as: method and process capabilities by general thinking and knowledge type of activity, common generally available method and process and tools, common general types of ITKC components that may be included in or associated with an integrated construct, and others. In addition, in one embodiment, the general characteristics of the views, regions and subset sections or slices provided by the present invention may be generally the same across integrated constructs, providing a familiar context for thinking and knowledge activities, even though the content provided in those views differ according to the content and structure of different integrated constructs and of an integrated construct at the point in which it is being represented.

Although general options for method and process, components and views available are in many embodiments of the present invention generally common across different occurrences of integrated constructs, representations of specific projects and integrated constructs are likely to differ in several key respects, as described in greater detail in other sections herein. For example, the views provided by the present invention of different projects and integrated constructs are likely to differ from one another in the number and complexity of the topic set being addressed, in the selection of the components for inclusion with the particular integrated construct or associated with any portion or specific component of the ITKC, in the number and completeness of components included in the integrated construct (such as information constructs and analysis constructs), in the number of thinking and work spaces created for various components, in the specific linkages, and others. In a preferred embodiment, the present invention may employ a number of different visual and design approaches in views and representations in order to depict and feedback to the user their progress so far against the exemplary and/or potential thinking and knowledge activities that may be or are intended to be done, as described elsewhere herein.

For example, in one preferred embodiment, the view and representation manager may create a representation of the ITKC and its associated thinking and working areas as a visual skeleton in the earliest steps of the user's development of their integrated construct. As the user then adds components and content to the integrated construct (as described above), the view and representation manager changes the representation accordingly. In one embodiment, for example, early portrayals of the integrated construct include representations of empty integrated construct regions or areas where no user activity has yet occurred, or where activity has occurred but no components of that region's or area's type have been created, or where the user has created "empty" components, and others. In this manner, the representations provided by the present invention are a visualization of the user's integrated construct as it develops as well as its potential for being the basis for the user to identify additional development that has not yet occurred. For example, in one embodiment, a topic or question which has been created but which has associated with it as yet no information or analysis constructs may be shown with empty working areas for the association of information constructs and analysis constructs and other related components. At a high level, such a subtopic in one embodiment would be depicted as existing but empty. In another example, the topic or question area which then had a small amount of information associated with its associated Information constructs or analysis constructs might be shown as translucent or pale in color, while the same topic or question with a significant amount of information associated with it may be shown as more opaque and brighter. The intent is to visually distinguish progress in the components and regions or areas of the integrated construct. It should be appreciated that such distinctions can be accomplished through a variety of mechanisms and not depart from the scope and intent of the present invention.

In one embodiment of the present invention, as indicated in FIG. 3C-10 block 244, the view manager may provide user with the ability to represent the integrated construct and its associated method and process in a plurality of forms, based on the display options provided in block 242, such as the following: (i) three-dimensional representation(s); (ii) outline or tree form for representation(s); (iii) two dimensional representation(s), and (iv) matrix representation(s). In other embodiments, the present invention may provide one, some, or all of these different representational forms as choices for the user or users. In one embodiment, the user can choose to work on and view the integrated construct through any of these representations, and the view elements and associated method and process available to the user behave in generally the same way across the different representation types. Changes in representation type may be triggered to the view manager by the user through a plurality of selection mechanisms, including but not limited to use of a conventional drop down menu and others.

Referring again to FIG. 3C-10, as shown in block 246, the present invention in one embodiment may also provide the user the ability to choose specific representation forms or shapes for a specific representation type. For example, in one 3-D embodiment of the representation provided by the present invention, the view manager also provides a choice of the specific shape in which their integrated construct will be represented, examples of which are shown for the three-dimensional representation in FIGS. 6F-6S.

In one embodiment, categories of views provided by the present invention include but are not limited to the following types, depicted schematically in FIG. 6A, each of which may provide feedback to the user on their progress relative to the scope of the view, guidance on related thinking and knowledge activities, and navigation access to the user: (i) overall or global views of the integrated construct, allowing the entirety of the integrated construct and/or the entirety of the method and process of the present invention to be represented (block 80; (ii) views which correspond to regions, thereby showing the set of like integrated construct components and method and process, associated with a common type of thinking or knowledge work (as in problem definition and topic sets, analysis and analysis constructs, etc) (blocks 70, 72, 74, 76, 78); (iii) slice or subset views, which provide a view of a collection of related components of an integrated construct and their associated method and process, and enable the user to work in meaningful subsets across the integrated construct (examples which include the individual topic view, the individual meaning statement view, and others) (block 82); and (iv) individual component views (block 85), and others. Specific examples of these view types for one embodiment of the present invention are described in the following section.

Referring to FIG. 3C in block 272, in one embodiment, the view and representation manager filters the total ITKC and its associated method and process based on parameters set for a new view, as indicated in block 270. The view manager may therefore create a plurality of views and subsets from such filtering. In one embodiment of the present invention, some of the views provided by the present invention may generally divide the integrated construct into distinctive regions, representative of different kinds of thinking and knowledge work, as shown schematically in FIG. 6A. As shown in FIG. 6, in one embodiment, these regions as represented to users of the present invention generally combine or relate different aspects of the present invention, such as these three different items: (i) the portion of the integrated construct content and its structure which is associated with a particular region, as representing a particular kind of thinking or knowledge activity (e.g., the region associated with the topics the user has defined); (ii) the portions of method and process of the present invention, which may be embedded in tools and guidance to assist the user in working on that portion of the integrated construct, and otherwise provided in the steps or portions of the method and process which that region is intended to enable; and (iii) the linkages between and among relevant components of the integrated construct content.

The present invention may use a number of different approaches to distinguish the different regions or types of thinking and knowledge work within the total representation to the user. For example, in one embodiment of the present invention, such as in one of the three-dimensional representations of the integrated construct, regions (types of thinking and knowledge work and their associated content) are distinguished by the visual distinction of different bounded areas within the integrated construct representation. Examples of general regions being distinguished in a 3-D representation of the present invention are shown in FIGS. 6B and 6C. The regions may be further distinguished by color and background depiction or other graphical distinctions. In another embodiment of the present invention, the outline or tree representation form of the integrated construct, the regions may be distinguished by the use of common color and graphic characteristics across the components within the region and through the proximity of like components to one another Referring again to FIG. 3C, filtering of the ITKC contents and structure in block 272 based on parameters for the new view, may also provide a view of subset or "slice" of related components of the integrated construct and associated methods and process required or desired to work on that slice. FIG. 6D shows schematically the general relationships between slice views and regions provided by the present invention. Specifically, referring to FIG. 3C, in one embodiment, the view manager uses the parameters for the new view (block 270) to filter the overall ITKC contents, structure, and linkages and available method and process portions, as indicated in block 272. For subset or slice views, in one embodiment, the view manager may utilize a specific subtopic as the basis for filtering (for example, the subtopic "Who created the Constitution?"). In this embodiment, the view manager may then filter the ITKC components, linkages, and structure to select only those that are associated or have been linked to the subtopic "Who created the Constitution?" (for example, the information constructs James Madison and George Washington, the analysis construct regarding a comparison of the beliefs of the framers, and any associated meaning statements). The view manager may create such combination subset or slice views for all other components related to the component which is the basis of the filtering (the subtopic above), and may create subset or slice views for partial subsets (such as a partial subset or slice view which includes the subtopic, information constructs, and analysis constructs but which does not make the associated meaning statements visible in the particular view).

FIG. 7B shows one embodiment of the use of regions and subset or slice views in a 2 dimensional embodiment. Referring to FIG. 7B, for example, in one embodiment, regions may be implemented as areas accessible by some structured or otherwise visible map, such as the tab like look shown in FIG. 7B, with regions indicated by blocks 70, 71, 72, 73, 74, 76, and 78, and a mechanism for accessing subsets or slice views shown through the use of a navigatable menu or other visible or accessible device, as shown in block 82. FIG. 7C shows a 2 dimensional approach with one embodiment of an individual subtopic view. Similarly, a 2 dimensional visual map of progress, associating components to regions and other indicators for preferred structure and/or process may not be as compelling as 3 dimensional visual feedback, but again could implement the same or nearly same functionality. It should be appreciated that although the 2 dimensional embodiment may not have the same advantages as the preferred 3 dimensional embodiment, it may well prove the preferred embodiment for some classes of users and/or projects.

The present invention therefore provides guidance generally enables the user to move freely between the representational views while utilizing the corresponding portions of the method and process of the present invention. FIG. 7 depicts one embodiment of links and navigational paths between views or representations provided by the invention. In addition, the present invention generally provides abilities to short cut navigational paths through physical manipulation of the representation, and instead navigate directly and quickly to the desired component or view. This short cut navigation may be accomplished through a plurality of mechanisms such as the use of conventional pull down menus or assigned keys or others in accordance with the present invention.

As illustrated in FIG. 7, in one embodiment, specific views provided by the present invention may include but are not limited to the following: (i) topic set overview 702 and if needed topic set drilldown view; (ii) individual topic view and detail views 706; (iii) individual information construct view 710; (iv) individual analysis construct view 720; (vi) information construct set view 715; (vi) analysis construct set view 725; (vii) linkage view 780; (viii) topic—meaning statement overlay view 770; (ix) meaning statement overview 750; (x) answer or summary view; (xi) integrated construct overall overview 700, and others In one embodiment of the present invention, the precise layout and appearance of views or representations can differ and still accomplish the desired workspace creation and relationships to other workspaces to embody the method and process of the present invention effectively for the user.

Preferably in all view types, the view manager provides the ability for the user to be shown high level and more detailed depictions of the integrated construct content, structure, linkages, and associated portions of method and process. This may be accomplished through a plurality of user interaction mechanisms, including but not limited to such mechanisms as clicking "down" into a specific component, in order to see the details within that components, as well as the ability to zoom in and zoom out on components of the integrated construct and the integrated construct as a whole. When a three-dimensional representation is being used, the integrated construct representation may also be manipulated such as rotated, turned, flipped, and otherwise maneuvered in a manner that has been seen to be used in the manipulation of three-dimensional renderings of physical objects. This facilitates further visualization of the user's work on the project and also enables the user to look at the user's work on the project from different angles that may facilitate different thought processes of the user.

In one embodiment, representations or views provided by the present invention may employ a combination of visual characteristics including a plurality of elements to provide visual distinction of the specific characteristics of an integrated construct and the associated thinking and knowledge processes, including but not limited to elements such as shape, structures, and color. Distinctions provided about the integrated construct may include but not be limited to the following: (i) distinction of types of thinking and/or knowledge work activities and their associated content portions; (ii) distinction between regions and sub-regions or portions of method and process that have been used in the integrated construct versus those that have not yet been used, at the point in which the integrated construct is being represented; (iii) distinction of integrated construct components which have been created or initiated in the particular integrated construct; (iv) distinction of integrated construct components which are available for use but have not yet been included or initiated in the particular integrated construct; (v) distinction between regions and integrated construct components which have information associated with them versus those which do not yet have any content or information associated with them (i.e., those which are empty); (vi) distinction of integrated construct components which have greater or lesser amounts of content associated with them at the point in which the integrated construct is being represented; (vii) distinction between components of the integrated construct which are linked to other components versus those which are associated with the integrated construct but are not linked to other components in the integrated construct; and (viii) distinction of components of an integrated construct which may be linked to components or the totality of other integrated constructs; and (ix) distinction of key aspects of components as being in existence or not, or being lightly completed versus comprehensive.

It should be appreciated that many specific forms or shapes of two and three-dimensional structures may be used to implement views of the integrated construct, and they are within the scope of the present invention. Examples of shapes which may be used for 3 dimensional representations in one embodiment are provided in FIGS. 6F through 6S. In one embodiment, shapes that can accommodate the following characteristics are generally likely to be among those with an optimal shape for representation of a 3-D shape for the conveyance of the integrated construct. For example, in one embodiment, shapes which generally have the following properties may be used most readily to implement a representation of the integrated construct in the manner described herein: (i) a manner of distinguishing levels or spaces which allow for the distinction of different types of thinking and/or knowledge activities; (ii) a way of subdividing or otherwise showing the existence of different entities within or associated with these levels or spaces in order to reflect the types and/or numbers of the various integrated construct components the user is creating or viewing; (iii) proximity or the ability to achieve proximity or visible linkage between components which are closely related or need to be visually related in order to accomplish work steps (and to facilitate a way to show and work with the plurality of components and links between components of the integrated construct, and to move between different combination views that are important to work steps in a meaningful way); (iv) proximity or the ability to otherwise achieve relationships between related views; and (v) a way of providing views and access into the individual components that comprise the content and content relationships of the thinking and knowledge activities.

In one preferred embodiment, referring to FIG. 3C-20 block 286, the view manager utilizes a visual depiction of a three dimensional, physical-like structure as a key representational mechanism, which may show both navigational and therefore thinking and working relationships between the views, providing navigational access, as well as providing feedback to the user regarding progress, as defined elsewhere herein. In a preferred embodiment, t the 3 dimensional visual structure assists in conveying the potential and already used thinking and knowledge portions of the method and process, as well as the components that have been built and their relationships. In one preferred embodiment, the three-dimensional representation generally uses areas, levels and facets of a three-dimensional representation structure to display the integrated construct and its associated method and process portions. For example, in one embodiment, the view manager may use the different levels of a physical-like structure to differentiate, show progress in, and provide navigation to thinking and knowledge activities and resulting components of a similar type (for example, problem definition through topics, analysis constructs, meaning statements, etc.). Similarly, in one embodiment, the view manager may use the sides, facets, or subareas of a physical like 3 dimensional representation to depict and convey the existence of different subset or slice views. In one preferred embodiment, the view manager may use the levels and sides of a 3 dimensional structure to define more specifically the basis for filtering a subset or slice view.

In one embodiment, the invention may utilize at least two different approaches to the 3 dimensional representation of the integrated construct: 1) a 3D representation that is essentially views mapped onto or associated with the facets, surface areas, or spaces of a 3 dimensional looking shape (as shown in FIG. 6E, and 2.) a 3D representation that employs a three dimensional linked structure made up of the ITKC components and its linkages, either alone or in combination with the use of the facets, surface areas, or spaces of a 3 dimensional looking shape. This latter embodiment may take on the look of a three dimensional molecule, with the various linked components of the ITKC arranged with visible links, and an emphasis on navigation through nodes and links as opposed to facets. Both of these as well as combination or additional three dimensional approaches to representing the ITKC are to be understood to be within the scope of this application. The use of 3 dimensional representations may assist the user in working on a project in an intuitive manner, and makes the totality of their project and the status of the user's use of method and process portions, as well as the relationships between components easily evident. It should be readily appreciated by those skilled in the art that additional forms of 3 dimensional representation of an integrated construct are included within the scope of this invention.

User navigation of 2 dimensional, outline or tree, and matrix representations provided by the present invention may be accomplished in a variety of mechanisms that are well understood by those skilled in the art, including but not limited to user selection of visible elements to initiate action or see further detail, use of drop down menus, drag and drop approaches, and others. In one embodiment, user navigation and use of the 3D representational views can occur in several ways. Two of these ways are described more fully herein. In one embodiment, the user may use an interaction device to select an area, facet, surface, or component that is visible to the user in the 3D representations.

In one embodiment, the 3D representations may include both the current visible central work view, and "next views" which are made visible or accessible in an adjacent or otherwise visible area on the representation. The proximity of "next views" to the current visible central work view is one way in which the present invention provides guidance to the user in thinking, as the "next views" represent natural next work steps the user may wish to chose next. Referring to FIG. 6E, one mechanism provided by the present invention to enable guided but flexible movement between the different thinking and work steps in an inquiry based project is the provisioning of current visible views (such as the slice view depicted by block 82*a* on FIG. 6E) and views which are also visible and therefore appear closely related (as depicted by block 82*h* on FIG. 6E), which may be referred to as "next visible views," And views which are implied to be available because of the edges or other logically available surfaces, areas, or structures that comprise the 3D structure that is being used, as in those noted as "implied related views" depicted by block 82*c* in FIG. 6E. The design and structure of the views, and their visible adjacency or placement in relation to one another, is one way in which the present invention provides guidance to the user in portions of method to consider next, while allowing significant freedom in addressing the problem. In this embodiment, the view manager may provide additional direct navigation to less related views through the use of mechanisms such as drop down menus and others. Other views (and corresponding work areas) may also be available to the user, and provided in a drop down menu or other fashion. This is in keeping with the design of the present invention that it provides some guidance to the user but also allows the user to move fairly freely throughout the method and process. The user therefore can choose to move from the current visible central work area to a "next view" being shown to them in the representation, by selecting the next view area (or other visible indicator for a next view) with an interactive device. Upon the user selecting such a "next view" (as shown in FIG. 3A, block 110), the user action is evaluated (FIG. 3A, block 302), and if a change in view is warranted, the View Manager (FIG. 3A block 200) changes the view being displayed to the chosen next visible view, including the current content and structure of the integrated construct (FIG. 3A). The View Manager (FIG. 3A, block 200) provides the appropriate representation to the user, in keeping with the specifics of the 3D format that is being used or has been chosen, in keeping with the above.

The definition of Next Visible Views as used herein includes views that are logically apparent to the user but which may not be fully visible or indeed visible from the current view. Referring to FIG. 6E, for example, the areas noted as 82*b*-1 and 82*b*-2 are indeed areas that represent access to views for additional subtopics, and are Next Visible Views. Continuing with FIG. 6E, areas notes as 82*b*-4 are also Next Visible Views, although only the edge of the facet belonging to that view and the label for the subtopic may be visible from the current view. Also in FIG. 6E, area 82*b*-5 is also a View which is available to the user, by moving an interactive device to the edge of the construct that is the boundary of the "bottom" facet or view, by using the interactive device to select just below the visible Current View, or by other interactive mechanisms including but not limited to a pull down menu.

Accordingly, user manipulation of the 3 dimensional representation is provided by the present invention is provided in a number of ways: 1.) the user may rotate, flip, zoom in and out or otherwise manipulate the 3 dimensional representation of the integrated construct through the use of a number of different mechanisms and thereby "move" to a different, selected view; 2.) the user may select an area, facet, or other component of the 3 dimensional representation by using an interactive device (such as a mouse and double clicking on the portion of the representation that indicates the presence of the next view), thereby causing the representation to be replaced by the selected next view; and/or 3.) the user may use a navigator icon or similar interface device to indicate directional movement. One embodiment of the use of a navigator icon or similar interface device is described further below.

Figure 7E:
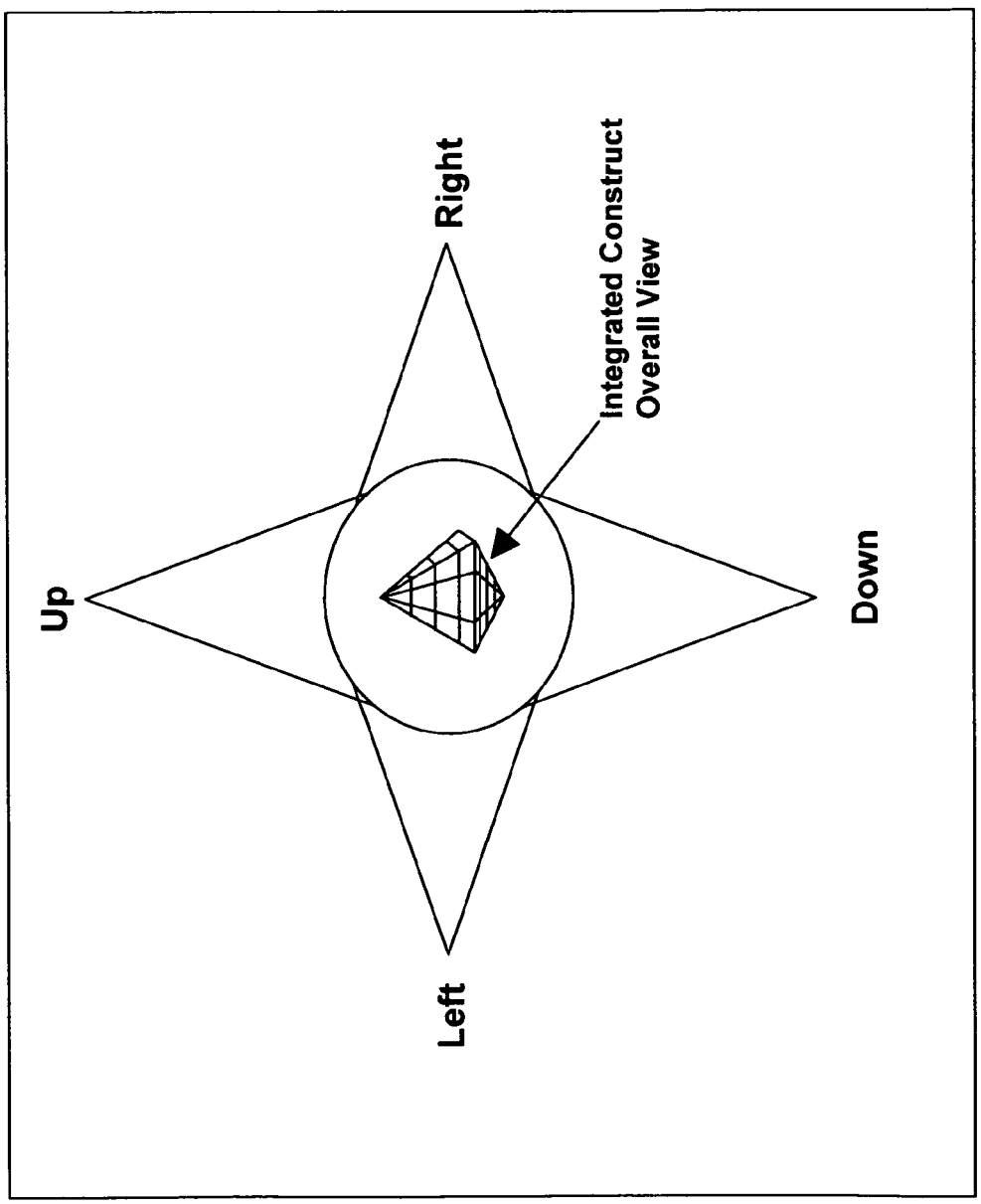
FIG. 7E is an example of a navigator device used in one embodiment
Figure 8:
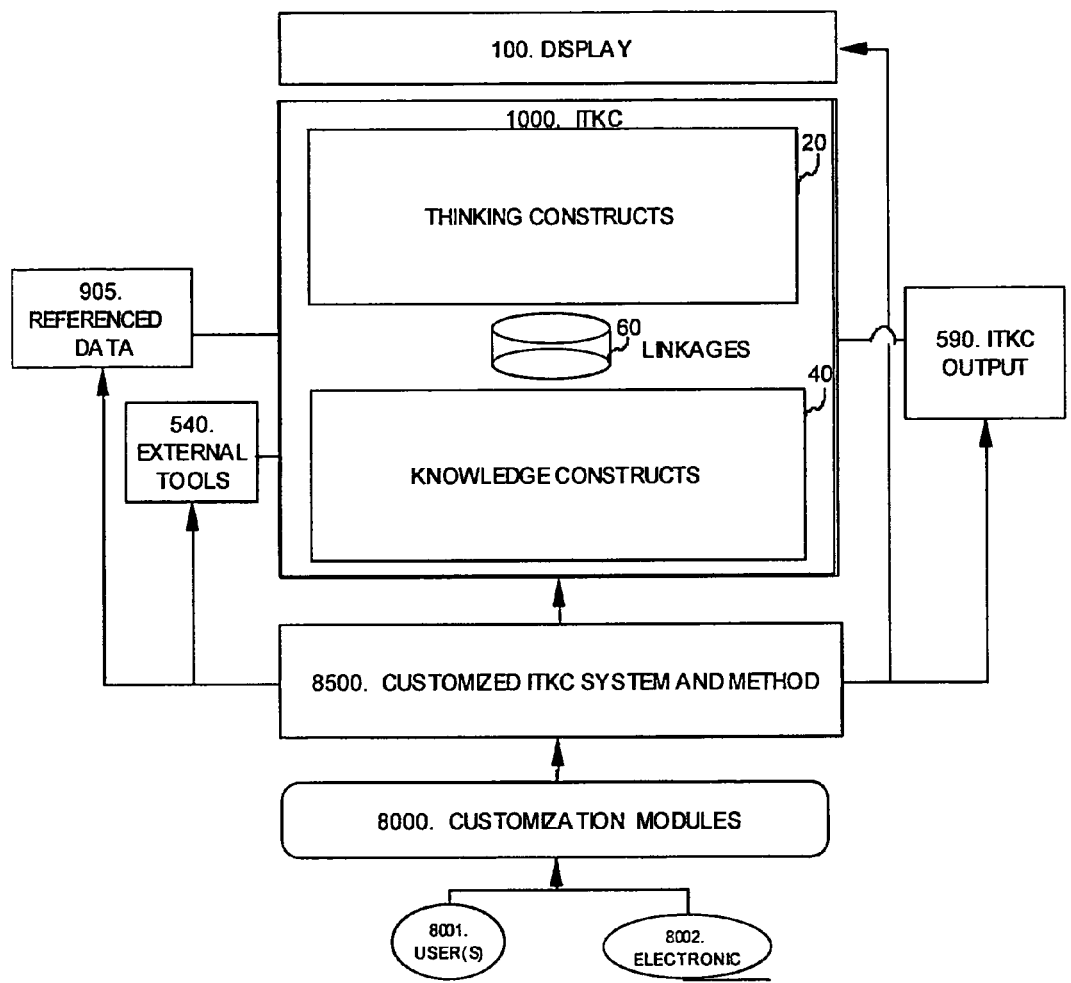

In one embodiment, user navigation from one "view" to another of the integrated construct—as associated with the different regions, facets, or other areas of a 3 dimensional looking structure—may be accomplished through the use of a directional navigator device (see FIG. 7E for one example of such an interface device). In this embodiment, a visual device with sections or other elements that indicate direction may be provided to the user on views. In this embodiment, if the user selects the component indicating the direction of "left" for example, the View Manager changes the current view to provide the representation that is associated with the next left most facet or area of the integrated construct. Specifically, for example, if the user is viewing a Question "side" View of the Construct, and selects or otherwise activates the "left" directional indicator in the navigator device, then the View Manager changes the view to correspond with the next left most view—in this case, the Question "side" View to the left of the previous view. Similarly, in one embodiment, if while viewing a Question "side" View of the Construct, the user selects or otherwise indicates the "up" directional indicator in the navigator device, the View Manager changes the view to correspond with the view which is "above" or "up" from the current view—in this example, the Topic Set or Topic Subset View. The use of significantly greater numbers or different forms of directional indicators for use in navigating a 3D or 2D representational view of an Integrated Construct are readily within the scope of this invention.

In one embodiment of such a navigator device, the central region shows a depiction of the overall shape of the integrated construct, selection of which central region of the navigator device results in the View Manager presenting the user with the Integrated Construct Overall View, as described in greater detail later in this document. It should be readily apparent that the use of other interaction approaches devices (such as the physical directional movement of a mouse, use of a gaming interactive device, use of a pen, touch screen or other interaction mechanism) to accomplish navigation and use of a 3 dimensional representation of an integrated construct does not depart from the scope of this invention.

In another embodiment of a navigator device, the view manager may provide the user with a miniaturized representation of the Integrated Construct as a navigational device. In this embodiment, while on any given representational view, the user may then use this miniaturized view or map of the overall Integrated Construct to select a specific view, portion or component of the Integrated Construct with some form of interactive device. Upon such selection, again, the View Manager then changes the representation of the Integrated Construct to the newly selected view or component. It should be readily appreciated that the use of any such visual or textual map of an overall inquiry based process and integrated construct as a navigational device would be readily within the scope of this invention.

The value and advantage of the views and representations of the integrated construct are not dependent upon the precise coloration, shape, or screen placement of the components being provided in each slice, region, component-specific, component set or overall integrated construct representation. It should be appreciated that the same functionality and same or similar advantage can be provided by somewhat different implementations of these representations. For example, changing the icons, coloration, sizing, or screen placement of the components, or in some cases even the selection of the specific components being provided on the view would not materially change the function provided by the invention. In one embodiment of the present invention, the user is provided with the ability to define the preferred placement of items to appear in the various views.

The integrated construct may also be implemented in a physical manner, as in a physical model to be used in a classroom or other learning situation to discuss and define the thinking and knowledge components of an archetype project and process. An additional physical embodiment of the integrated thinking and knowledge construct is in the use of the construct for a physical exhibit, as in a museum setting.

Referring again to FIG. 7, examples of representations that may be provided by the present invention are described below.

Topic Set Overview View

Referring to FIG. 7, block 702, the topic set overview representation 702 provides the user with the totality of their topic set (being the definition of the problem, issues, questions or other means of defining the focus of the inquiry based project), as it exists at the time the view is performed. In one embodiment of the present invention, the topic set is represented in the form of a web as illustrated in the partial example of FIG. 5A-42. An alternative embodiment may provide the topic set in the form of an outline as illustrated in FIG. 4A-10.

In one embodiment of the present invention, the following are included in the topic set overview: (i) main topic; (ii) sub-topics; (iii) secondary subtopics; (iv) any additional levels of subtopics; (v) linkages between all elements in the topic set; and (vi) method and process associated with the topic set, including the ability to create, change, edit, link, and rearrange topics, as well as problem definition or topic definition help or assistance. In one embodiment of the present invention, the top of the three-dimensional overview representation is designated for the topic set overview view In a preferred embodiment, as with all views of the integrated construct, the components that appear in this view are all generally actionable by the user (unless the components have been otherwise designated as unchangeable as discussed elsewhere herein). This means that the user may select any one of them to review, change, or add to any of the content or structure of the selected component, with the same range of functionality generally as when the user first created that component.

Topic Set Drill Down View

Similar to the topic set overview, the present invention may provide a view of the integrated construct which enables the user to review portions of the total topic set and its linkages and relationships in additional detail, indicated on FIG. 7 by block 704, for example to view a subset of a large or complex topic set This view may be most applicable in more complex integrated constructs. Capabilities for the subset of topics provided is similar to that provided for the Topic Set View.

Individual Topic View

Referring again to FIG. 7, block 706, in one embodiment, the view manager provides an individual topic (or subtopic or secondary subtopic as described elsewhere herein) view that generally enables the user to review and work on the subset of the total integrated construct which is associated with an individual topic (or subtopic), question, issue, problem or other means of defining the focus of an inquiry based project. In one embodiment of the present invention, the number of individual topic views available corresponds to the number of subtopics the user has defined within the integrated construct. In another embodiment of the present invention, the number of individual topic views available corresponds to the number of secondary subtopics, which can be accessed from either the topic set overview view, or a topic set drilldown view as appropriate, and others. Similar subsetting views may be provided to accommodate the nature and complexity of the specific integrated construct.

The individual topic (or subtopic or secondary or other subtopic) view 706 generally represents the totality of the integrated construct which is associated at any given point in the development of an inquiry based project with the individual topic, question, problem or issue of interest (or first type of thinking structure). In this manner, the present invention may then provide a meaningful subset of the potentially complex total integrated construct structure, and enable focus by the user on working on one meaningful slice. An example of one 3-D embodiment for the components and depiction of an individual topic (subtopic or secondary subtopic) view is shown in FIG. 7A and may generally include: (i) subtopic or secondary, or other subtopic which is the subject of the view; (ii) any associated data, information, information elements and/or information constructs which have thus far been linked to or associated with the subtopic or secondary subtopic; (iii) any associated analysis constructs which have thus far been linked to or associated with the subtopic or secondary or other subtopic; (iv) any meaning statements which have been linked to or associated with the subtopic or secondary subtopic; (v) any notes regarding what is to be done next, what additional information is needed or, relevant project plan items which have been linked to or associated with the subtopic or secondary subtopic; (vi) access to project plans, especially any planned research; (v) access to electronic information sources (as described elsewhere herein) and (vi) access to related portions of the method and process of the present invention for the assistance or guidance in each of the above associated component types, as well as the method and process associated with creating, editing, or otherwise modifying the associated component types above, and others. FIG. 7A depicts a three dimensional ITKC with a individual subtopic view which thus far has 2 information constructs associated with it (George Washington and James Madison) but has not yet developed meaning or analysis for this subtopic.

The present invention further provides for more detailed views of components associated with individual subtopics or secondary subtopics. It is to be appreciated that such additional detailed views follow from and are in accordance with the present invention on any or all of the additional views or representations provided.

Individual Meaning Statement View

Referring again to FIG. 7, the individual meaning statement view block 730 enables the user to view and work on the subset of the entire integrated construct that has been or is to be associated with an individual meaning statement. In one embodiment of the present invention, the number of individual highest level meaning statements views available correspond to the number of meaning statements created at the highest level as defined by the user within the integrated construct. In another embodiment of the present invention, the number of individual meaning statement views available correspond to the number of secondary meaning statements.

The individual meaning statement view generally represents the totality of the integrated construct, which is associated thus far with an individual meaning statement (or second type of thinking structure). In this manner, the present invention may provide a meaningful subset of the potentially complex total integrated construct structure, and enable focus by the user on working on one meaningful slice. The meaning statement view may generally provide a focus on working on what the information and analysis components mean to the user, building toward an answer or summary view. The meaning statement view is likely to be significantly different than the views that are provided based on the individual topics, as described above. An example of one embodiment of the individual meaning statement view generally may include any or all of the following: (i) a meaning statement or secondary meaning statement which is the focus of the view; (ii) any associated information, information elements or Information constructs which have thus far been linked to or associated with the meaning statement or secondary meaning statement, (iii) any associated analysis constructs which have been linked to or associated with the meaning statement or secondary meaning statement, (iv) any notes regarding what to do next, relevant project plan which have thus far been linked to or associated with the specific meaning statement or secondary meaning statement; and (v) access to any method or process associated with all of the above.

As with all representations provided by the present invention, the components represented on the meaning statement view are all generally actionable by the user. This means that the components can be: (i) selected to reveal their detailed contents; (ii) edited or changed; (iii) deleted; or (iv) replaced or enhanced with new or additional components.

Individual Information Construct View

Referring to FIG. 7, block 710, information constructs that have been created are indicated and made available in several representational views as icons, labels, or thumbnails of their contents. If the user selects a previously created Information construct, generally according to interactive mechanisms described herein or generally used in the art, the contents associated with the selected information construct are displayed via the individual information construct view.

As with all representations provided by the present invention, the components displayed in the individual information construct view are generally actionable, unless they have been protected from change by a previous author. This means they can generally be edited, changed, deleted, or added to readily from the individual information construct view. In one embodiment, the individual information construct view may generally include the following: (i) information construct label or title; (ii) information construct type (as chosen, or undefined); (iii) information construct unformatted information elements; (iv) information construct formatted information elements; (v) links to other information constructs; (vi) links to analysis constructs; (vii) links to available topics, subtopics, secondary topics; (viii) links to available meaning statements; and (ix) access to method and process associated with the creation and editing of the information construct and its linkages Individual Analysis Construct View Referring to FIG. 7, block 720, analysis constructs that have been created are similarly available in many representational views as icons, labels, or thumbnails of their contents. If the user selects a previously created analysis construct, according to interactive mechanisms described herein or those generally used in the art, the contents associated with the selected analysis construct are displayed via the individual analysis construct view.

As with the other representations provided by the present invention, the components displayed in the individual analysis construct view are generally actionable, unless they have been specifically protected from change by a previous author. This means they generally can be edited, changed, deleted, or added to readily from the individual analysis construct view. In addition, links that appear in the representational view are generally available as navigation means to access the detail associated with the linked component.

The individual analysis construct view 720 of FIG. 7 generally may include the following: (i) analysis construct label or title; (ii) analysis construct field for observational comment regarding the analysis construct; (iii) related information constructs; (iv) related information elements of information constructs; (v) related analysis constructs; (vi) related available subtopics, and secondary subtopics; (vii) related available meaning statements; (viii) other available information constructs in existence at the time of viewing; (ix) information construct formatted information elements; and (x) access to method and process associated with the analysis construct or related functions.

Collection of Information Constructs View

Referring again to FIG. 7, the collection of information constructs view block 715 generally may provide a representation of the totality of information constructs created for or associated with the integrated construct at the time the view is so created. Icons, thumbnails, lists, and/or labels of such items or other forms thereof may be used to depict this inventory of information constructs to date. Information constructs so displayed in such a representation are actionable (unless protected from change earlier) as in any other view: for viewing at a detailed level, for editing, for viewing or changing links, etc. In one embodiment, the representation of the collection of information constructs created may include a grouping of the information constructs according to type, and a visual distinction of how much data or information is contained in or otherwise associated with the particular Information construct. In anther embodiment, the representation of the collection of information constructs allows for grouping by category, theme, or other meaningful group, as discussed earlier herein.

Collection of Analysis Constructs View

Referring again to FIG. 7, the collection of analysis constructs view 725 may generally provide a representation of the totality of analysis constructs created for or associated with the integrated construct at the time the view is so created. Icons, thumbnails, lists, and/or labels of such items or other similar forms thereof may be used to depict this inventory of analysis constructs to date. Analysis constructs so displayed in such a representation are generally actionable as in any other view (except where otherwise protected): for viewing at a detailed level, for editing, for viewing or changing links, etc. In one embodiment, the representation of the collection of analysis constructs created may include a grouping of the analysis constructs according to type, and a visual distinction of how much data or information is contained in or otherwise associated with the particular analysis construct. In another embodiment, the collection of analysis constructs may be represented in groups or categories according to their linkage to subtopics or meaning statements, or other categories or groups.

Answer or Summary Set

Referring to FIG. 7, block 760, the preferred embodiment further provides for a view, which focuses on the answer or summary set, and a related view, block 750 that allows for the representation of both the answer or summary set and the meaning statements as a set.

Topic Meaning Statement Overlay View

Referring again to FIG. 7 block 770, the present invention may provide a view which represents the topic set and the meaning statement set of the respective integrated construct, and which depicts the relationships between these two thinking structures of the integrated construct.

Linkage View

Referring to FIG. 7, the linkage view 780 representation may be generally available at any time for any component associated with the integrated construct. In one embodiment, the linkage view is provided when the user selects any component, and the user activates the right click on the computer mouse. In another embodiment, the linkage view is provided when the user selects any component and a subsequent choice is made from a menu provided. There are any number of specific user actions that may be used to trigger the display of the linkage view representation, without departing from the scope or the intent of the present invention.

When the user invokes the linkage view, a representation is provided which shows all linkages from the chosen component to other components within the integrated construct at the time the representation is accessed. In one embodiment, the linkage view of a knowledge construct shows only links between knowledge constructs (being information constructs and analysis constructs), as opposed to links to all thinking constructs (topics, meaning statements, answers). In one embodiment, the integrated construct component, which is the focus of the linkage view, is shown as the component in the center of the representation. The integrated construct component, which is the focus of the linkage view, can be selected by the user in order to show the contents of the component, as described for example, in the individual information construct view or individual analysis construct view described above. FIG. 7D is an example of a linkage view of one embodiment.

Overall Integrated Construct Overview

Referring to FIG. 7, when the overall integrated construct overview 700 is invoked by the user, a representation is provided which shows a depiction of the overall integrated construct, as it exists at the time the representation is invoked. Regions and other views are generally available to the user to select from this overall integrated construct overview, by selecting the portion of the integrated construct visible which the user wishes to see in greater detail. Selection of a portion of the depiction of the overall integrated construct invokes the appropriate next representation, with its associated content and method and process then available to the user.

In one embodiment of the overall integrated construct overview, color and shapes may be used to distinguish and depict the boundaries of the various regions, slice or other views. In addition, the placement and shape of the facets and areas of the integrated construct as depicted in the overall integrated construct overview may be used to distinguish the views of combinations of components which are available to the user, and which thereby provide the user with the content, linkages of the integrated construct and the method and process portions relevant to creating, editing, and viewing the components of the integrated construct. As has been described elsewhere above, the overall integrated construct depiction is specifically designed to provide an overall view of the progress the structure and process of the user's ITKC is making, and uses a number of visual distinction mechanisms, as defined elsewhere herein, to depict this progress and imply the user where they might want to focus their energies next. Whether provided as a 3-D physical-like representation, an outline, a matrix or other visualization, the depiction of the integrated construct provides a visualization and map of the total project, its components, linkages and the steps that have been taken in its construction.

Additional Customization

One preferred embodiment of the system and method includes a set of Customization or similar Modules for provisioning of a customized system and method for facilitating and developing thinking, understanding or a solution about an arbitrary problem. Customization of the system and method may be useful in, for example, providing a specialized thinking and problem-solving environment for a user or set of users, as in a specific domain area and/or problem area. Such customization may be useful for a plurality of reasons, for example, such as: 1.) the customization of the problem solving environment may help guide the user(s) according to aspects that experts in a specialized domain or other assigners consider important; 2.) the customization of the archetype structure, archetype process, or initial or available content can help provide additional guidance for users increasing the quality and/or the productivity of the user(s) work; 3.) customized direction of the user through providing customized or new portions of archetype structure or process, or guidance to conduct portions of the archetype process in a more specific order or manner in order to help emphasize, for example, the building of some skills over others or again to focus user activities; 4.) customization of portions of archetype structure or process to provide additional specialized assistance or feedback to the user, and others.

The usefulness and practical applications of the invention are many, and the value of a customized system and method, described herein, is further understood through the consideration of a few examples. For example, a teacher may utilize the present invention to customize the system and method for facilitating thinking about an arbitrary problem, for example by utilizing the customization or similar modules to "turn on and off" portions of the system and method for certain students or groups of students. In this example, by so doing, the teacher can more reliably ensure that the student or students spend their project time only on the portions of the system that the teacher believes is important or wants the students to learn or use at that time. Such focus, in this example, increases the probability that the student or students do in fact spend their time on those portions, and as a result are more likely to acquire the skills, conduct the project portions, and produce project and ITKC results that meet the expectations and desires of the teacher. A further advantage of the customization abilities of the system and method is that, for example, such a teacher may provide customized learning environments through a customized system and method, to focus different students or groups of students on different portions of the system and method, thereby focusing them on the skills and areas the teacher believes is most appropriate or important for the student or students to do next. Such customization, for example, not only increases the teacher's productivity and ability to cope effectively with diverse learning needs, but increases the quality and the usefulness of the student's project experience because the system and method with which the student interacts is likely to be more closely aligned with the student's or students' abilities and needs. Research also shows that providing individualized instruction and particularly providing project-based learning experiences to large numbers of students is difficult if not impossible for teachers without such a tool. Another example of the value and usefulness of providing a customized system and method can be seen in professional applications, for example, in situations where an experienced specialist or problem solver may be trying to manage or lead less experienced problem solvers, perhaps for example, in some specific domain area. In such professional situations, for example, an expert may be charged with mentoring and overseeing the problem solving work of less experienced and knowledgeable team members. In this type of situation, for example, an expert may utilize the customization or similar modules to customize the system and method for the less experienced team members, for example, by providing suggested domain-specific question or topic sets, or customizing the order in which system and method portions and problem solving work should be done. In some domain-specific situations, for example, such an expert or team leader may also, for example, utilize the customization or similar modules to include a specialized tool as an analysis construct within the system and method, and archetype process for the less experienced team members. In this example, these and other example customization types help transfer the knowledge and learning from the expert to the novice team members more effectively than could be done without the customized system and method. Other advantages in these types of situations are likely to include faster maturing of the novice problem solvers, increased quality and productivity of the project team member's work relative to the expert or team leader's expectations, and others. Other advantages and applications of the present invention will also be evident through the further description of the customized system and method.

Referring to FIG. 8, one embodiment of the system and method utilizes a set of Customization or similar modules, indicated in block 8000, to customize the ITKC system and method (block 8500), and other factors (including but not limited to items such as display or representation, block 100, the output form of the ITKC, block 590, and access to external data and resources such as external tools, block 540, and others) in order to provide a customized or specialized ITKC environment for the building, reviewing or sharing of ITKC's, and ultimately for the creation of customized ITKC's, as indicated in block 1000 of FIG. 8, described also further herein.

Customization as used herein is intended to include a plurality of means which by items like the following are generally accomplished: 1.) the modification of the ITKC system and method to specialize, limit, or add to the ITKC building environment (including but not limited to the process, components, capabilities, resources, guidelines, rules and other elements associated with the ITKC system and method, as described more fully below) and 2.) the provisioning of customization options to users of any occurrence of the ITKC building environment regarding their own customization of their ITKC or ITKC environment, whether for ITKC building, viewing or sharing; 3.) the creation of a customized or specialized ITKC based on the specialized or customized ITKC building environment and resources provided, and others.

The preferred embodiment is preferably operable to enable one or more users creating one or more integrated constructs, which may be standalone or related to one another. It should also be appreciated that a user may include one person or a group of people. In the descriptions included herein, the term "user" is intended to mean an individual user, a team of people working together on a project, multiple users sharing and viewing parts of all of one or more integrated constructs, combinations of such and the like. The use of the term "user" furthermore is intended to include a person, a super user such as a teacher or expert, or other electronic or other form source.

Referring to FIG. 9, one embodiment of customization of the ITKC system and method utilizes a set of Customization or similar modules (for example, those indicated in blocks 8100, 8200, 8250, 8300, 8400 and 8450), described more fully below, to process input from such sources as users or electronic sources and direct the ITKC system and method to provide a customized ITKC system and method environment (block 9000) and to facilitate ultimately the creation of customized or specialized ITKC's, as indicated in block 1000. In one embodiment, a key enabler of customization of the ITKC system and method is a set of files that control any particular instance of customization, termed herein generally as a "customization profile" or "customized ITKC building environment profile." In one embodiment, such a "customization profile" may be comprised of at least two related sets of files: a "customization direction profile", which contains a structured set of parameters and instructions to define and control a customization session, indicated in block 8200, and one or more files associated with said customization direction profile, termed herein as "customization input files", indicated by block 8250, that provide associated information, content, and detail parameters, further utilized by the system and method in one embodiment to produce a custom ITKC building environment (block 9000) as discussed further below.

A representative architecture for one embodiment of the ITKC system and method and the customization modules with one or more related File I/O management or similar modules is shown in FIG. 10. The ITKC system and method and the customization approaches may be implemented in a number of different technical and processing formats. FIG. 10 depicts one such embodiment with one embodiment of the interface modules provided by the system and method as well. Referring to FIG. 10, the client shown in block 10010 is representative of a plurality of computer and other systems, including general-purpose computers (like desktops, laptops, etc.), network appliances (like set top boxes, game consoles, etc.) and wireless devices (like personal digital assistants, cellular phones, or other such devices). As is common, the client in this embodiment generally has volatile memory (such as RAM or other memory), non volatile memory (such as ROM or other memory and including hard disks, etc.), a processor, one or more input devices (such as keyboard, mouse, stylus, microphone, etc.) and one or more output devices (display of some sort, audio, printer, etc.), and an operating system. In the most likely embodiment, the client will have resident standard tools, such as office and browser tools. In this embodiment, the client will also house some portion of the ITKC system and method, and likely at least one of or a portion of the interface management modules as described herein. Similarly, in some embodiments, the system and method will incorporate a server, shown in block

10020, which in this embodiment has a processor, volatile memory (such as RAM), non volatile memory (such as ROM, hard disk, etc.), and an operating system. The server may be of many different environments, including a server for a local area network or wide area network, a backend for such a server, or a Web server, or others. The server in this embodiment may also have resident and process on its operating system some portion of the ITKC system and method and potentially some portion of the customization or similar modules. In this embodiment, the client submits queries to a server computer via a network, such as the Internet. In this embodiment, interfaces between the ITKC system and method and other tools, resources, or systems which are contained within the client environment as described below are conducted via the interface manager or similar modules resident on the client. Also in this embodiment, interfaces which occur between the ITKC system and method and other external resources or systems (as indicated in blocks 10030, 10032, 10034, 10036) may be managed via server based file I/O and interface manager, and potentially with various customization modules as described more fully below, which in turn then manage and control interfaces with external systems, resources (such as web services, web sites, and data bases) and others over a network. It should be appreciated, however, that the ITKC system architecture may be implemented with other network types, and with the modules or portions of the ITKC system and method resident on different types or placements of processors.

Referring again to FIG. 9, the system and method in one embodiment as part of the customization modules provide a customization profile builder or similar module, indicated in block 8100, which processes input from various sources (including users and electronic sources and others) in order to create the customization direction profile and potentially associated customization input files, indicated in blocks 8200 and 8250. It should be appreciated that these terms are intended to refer to a file or set of files that are stored and then later called upon by modules of the system and method in order to direct and generate the customized ITKC environment or customized version of the system and method. The customization direction profile (and when applicable, the associated customization input files) may direct the system and method in one, some, or all of its components and modules. It should be appreciated by those skilled in the art that the customization profile may be implemented in a number of technical formats and structures consistent with the present invention.

Referring to FIG. 9, one embodiment of the system and method support at least 2 types of customization events: 1) the building or editing of customization profiles or similar designating mechanisms, as begun in block 8100, that are the basis for creating a session or instance of a customized ITKC environment; and 2.) the generation of a customized ITKC building environment (block 9000) and potentially the generation of a starting ITKC, (indicated in FIG. 9 block 542 and also in FIG. 5A block 542), based on selection of a particular customization profile, blocks 8100 and 8200 and others.

In the preferred embodiment, customization of the ITKC building environment may be accomplished by at least the following: 1.) creation of the customized ITKC building environment via the customization modules or similar program modules, as discussed below, (chiefly either by direct user(s) intervention, such as by the actions of a super-user such as a teacher or expert, in one embodiment as enabled through a series of prompts, choices and entries by the super-user(s) in response to the method and system; or by electronic intervention (block 8002), as in by the direct reading of or incorporation of electronic files containing customization input and parameter specifications as expected by the system and method, whether as referenced by a user initiator, or in response to electronic communication and initiation by another system or other electronic source) or 2.) by incorporation of modular portions or components of the ITKC system and method in association with or within other development system or electronic environments, through commonly accepted largely object oriented methods and the provisioning of object-based components (using for example ColdFusion or Javascript based, web services via SOAP and XML web services, for example), and others. Examples of customization in one embodiment are described further below. In some portions of the method and system, an additional method of customization is developer or external system intervention through the provisioning of program modules or API's referenced to interact with the methods and expectations of the system and method. It should be appreciated by those skilled in the art that other methods or systems of providing modular access and customization of the ITKC system and method components may produce similar customization of the ITKC building environment and ultimately of ITKC's, and should also be considered within the scope of the present invention, particularly if they are based on widely used technical approaches to doing so.

As described elsewhere herein, the resulting customized or specialized ITKC building environment may as a result of such customization include, for example customization of the available components provided and rules governing those components for creation and also in some embodiments for evaluation and suggestioning (as in the archetype structure, also discussed herein), tools and resources provided or associated with the ITKC building environment (as indicated in FIG. 8 blocks 540 and others, the process provided and utilized in some embodiments to further develop the ITKC, evaluate the user process and provide suggestions (as in the archetype process, also discussed herein), and the options and choices made further available to users to conduct their own customization in creating, sharing or reviewing ITKC's, as indicated in block 9100 of FIG. 9), among others.

Figures 3, 3C, 4, 5, 6, 7, 8, 9, 10, 11, 12, 13, 14, 15, 16, 17, 18, 19, 20:
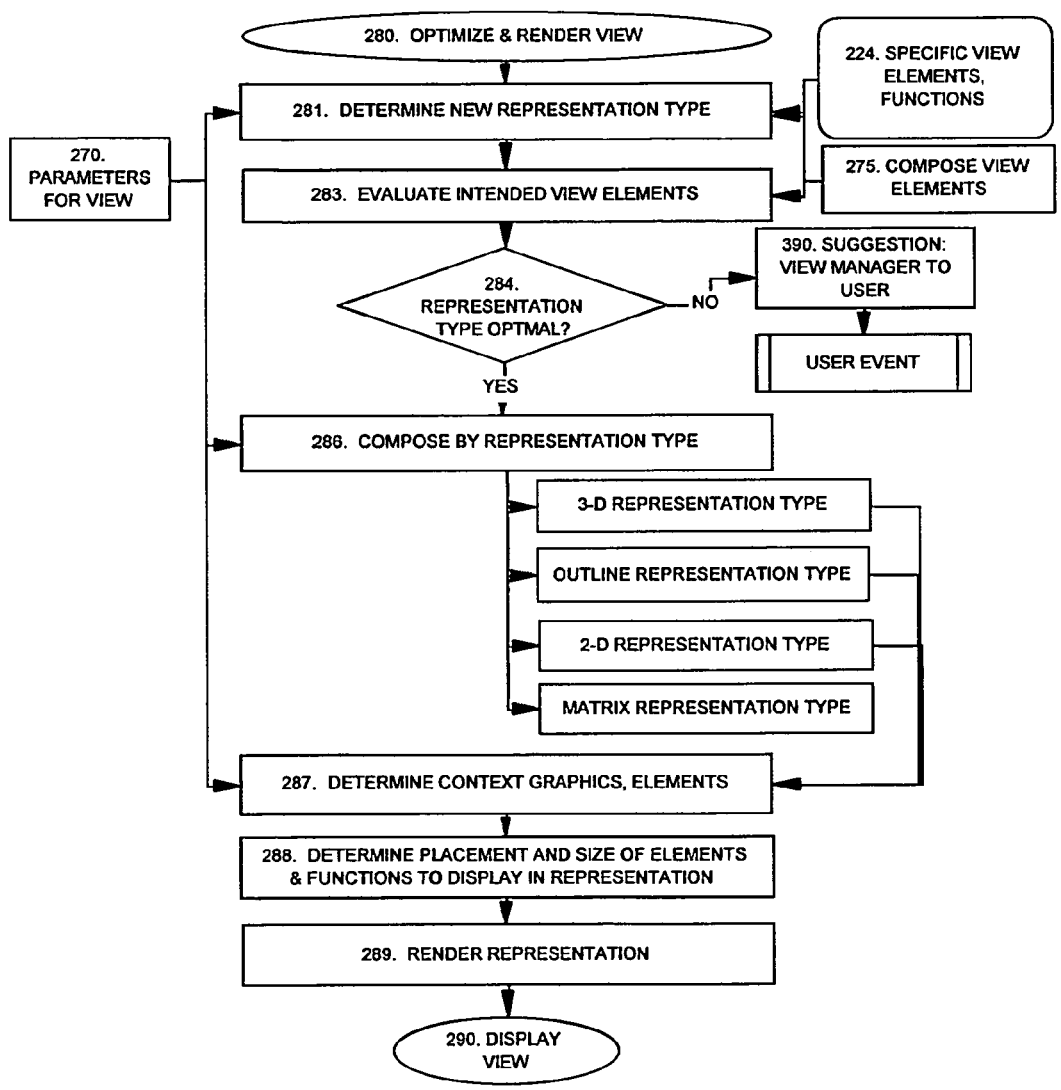

Referring to FIG. 12, one embodiment of some types of customization provided by the customization or similar modules associated with the ITKC system and method is shown, particularly in the context of a customization profile builder or similar module. Referring to FIG. 12, in one embodiment, submodules of the customization builder and other customization modules may be utilized to accommodate different types of customization, evaluate and process input for such customization requests based on input from initiators, test such input, and generate the requisite customization profile and customization input files, as described more fully below. Referring to FIG. 12, in one embodiment, modules for different types of customization may include one, some or all but not be limited to the following: 1.) customization of the archetype structure to be utilized by the present invention as a basis for creating ITKC's (as indicated in block 12021), which may for example include specialized or customized information constructs, specialized or customized analysis constructs, specialized thinking constructs, customized linkages, the addition or substitution of new components into the archetype structure and/or others; 2.) customization of the archetype process that is used in some embodiments to assist and guide the user(s) in their problem solving thinking and building of their ITKC (as indicated in block 12022); 3.) customization of the views that are utilized in the ITKC building environment (as indicated in block 12023); 4.) customization of the output form provided by the present invention (as indicated in block 12024); 5.) customization of tracking and reporting by the present invention, and others which may be as part of either the archetype structure (block 12021) or archetype process (block 12022); 6.) customization of the starting content and structure of the ITKC (as indicated in block 12025), which may also include goals and other user direction; 7.) provisioning of customized content (which may include the provisioning of other source ITKC's or portions of ITKC's) and potential references as readily available to the user(s) for potential inclusion or consideration for their ITKC(s) (block 12026); and others, discussed herein.

With regard to the first method of creating a customization profile, by a user or users: in one embodiment, the present invention may provide a customization initiator user(s) with a set of prompts regarding which types of customization they wish to include in their customized ITKC building environment profile. One example embodiment of one interactive screen to prompt these choices is shown in FIG. 16. Such a set of prompts might be provided, for example, in accordance with FIG. 11, block 11022.

Referring to FIG. 9, in one embodiment, modules that make up the customization or similar module set may include but not be limited to the following: 1.) the customization profile builder module, indicated in block 8100, which generates new or modified customization profiles based on processing input from users or sources such as electronic sources, systems, or others; 2.) the customization profile, which may be comprised of a customization direction profile, indicated in block 8200 and associated with one or more customization input files, indicated in block 8250, discussed further below and elsewhere herein; 3.) a customization profile selector module, indicated in block 8300, in one embodiment which provides for the selection and utilization of the different customization profiles in generating a customized ITKC building environment; 4.) a customization control module, block 8400, which in one embodiment is invoked by the customization profile builder in order to test and generate the customization profile, or by the customization profile selector in order to interpret and apply the selected customization profile to the ITKC system and method by extracting and processing the necessary parameters and information from the customization direction profile, block 8200, and any associated customization input files, block 8250, in one embodiment in association with the customization interface processors; and 4.) a set of customization interface processors, as indicated in block 8450, included within or otherwise associated with various modules of the ITKC system and method, which in one embodiment assist in testing and subsequently process the direction and input provided by the customization control module 8400 in order to generate the customization of the ITKC system and method, block 8500, as described more fully below, and others.

It should be appreciated by those skilled in the art that the customization program modules as shown in FIG. 9 and described herein may in different embodiments be implemented within somewhat different boundaries of processing or function, for example, or in somewhat different orders without departing from the scope of the present invention. For example, the placement of the processing which updates the files and other parameters in the ITKC system and method in order to generate an ITKC building environment may occur at the time the ITKC building environment is created (or at nm time, for example) or may be created and stored as accessible options or otherwise linked or appended to the ITKC system and method modules generally at the time the customization profile is generated. Other such examples of optional placement of processing or data storage location, and definition of program modules should be considered within the scope of the invention.

Continuing with FIG. 9, in one embodiment, the customization interface processors, block 8450, associated with portions of the ITKC system modules receive the input and direction from the customization control or similar module, block 8400, in order to test and subsequently to generate a customized or specialized instance of the ITKC building environment, as indicated in block 9000, and also described more fully below.

Referring again to FIG. 9, it should be appreciated that the ITKC building environment so created by the customization builder module may occur in different embodiments, including but not limited to: 1.) the provisioning of a customized ITKC building environment comprised completely of components provided by the ITKC system and method; 2.) the provisioning of an ITKC building environment comprised of a combination of components provided by the ITKC system and external method and external resources, tools or components, as might be provided through web services, API's or other modules based on various response and inquiry protocols and approaches. For example, as discussed further below, one embodiment of the ITKC system and method utilizes well understood object oriented approaches to make available components and methods of the ITKC system to, for example, external systems or agents. As discussed earlier and also below, the ITKC system and method also enable the inclusion of external or third party tools, for example, such as a spreadsheet, as one component of the ITKC tools, in this case particularly as an analysis construct. Similarly, in one embodiment, other external systems could provide portions of the ITKC system and method through invoking modules of the ITKC system and method through web services, API's or other similar approaches, consistent with the modularity and customization capabilities of the present invention, discussed previously and also further below.

In one preferred embodiment, the ITKC system and method is highly modular in its design. For example, preferred embodiments of the ITKC system and method may utilize both a modular archetype process and a modular archetype structure to facilitate the development of the inquiry based project. In a preferred embodiment, significant portions of the system and method are implemented within an object-oriented design, also providing significant modularity and flexibility. The modularity of the archetype structure and resulting structure of an ITKC, is shown, for example in FIG. 1A. The modularity of the archetype process is shown generally in FIG. 5 and further in the flexibility of process order and entry points, as indicated in FIGS. 1B, 1C and 1D. It should be appreciated that based on the modularity of the system and method, a customized user environment via the system and method may be provided for an entire ITKC, a subset of an ITKC, for a related set of ITKC's or subsets, and/or for the completion of a partially built ITKC. It should also be appreciated that a customized ITKC building environment via the system and method may be provided for one, some, or all of the portions of archetype process. As described earlier, it should further be appreciated that the modularity of the system and method, and interface capabilities, mean that the system and method of the present invention is well suited to receiving and processing customization input regarding a plurality of components or portions of the system and method and to doing so from potentially a plurality of sources (including but not limited to user(s), other systems, other electronic sources, and the like). It should be appreciated that the customization modules that allow for the customization of content, components used, process and/or other archetype structure or process aspects of the ITKC building environment may be used separately or in combination with one another, within the scope of the present invention. It should also be appreciated that a customized ITKC building environment may utilize one, some, or all of the archetype structure or archetype process portions, in keeping with the ITKC system and method's usefulness as a whole system and method, or as individual components or subsets of the same, as discussed also herein. This is consistent also with the fact that the ITKC may include one, some or all of the potential ITKC components, and similarly that the system and method may include one, some or all of the potential process portions. It should further be appreciated that the ability to customize and specialize the ITKC building environment can result in a plurality of such specialized combinations and environments, again within the scope of the present invention.

Continuing with FIG. 9, it should be appreciated that any occurrence of an ITKC building environment, block 9000 (including that driven by one of the system and method's standard or default customization profiles) may provide users various options and flexibility in building their ITKC in a customized fashion, as indicated in block 9100, within the options provided by the ITKC building environment, in order to meet the specific needs of their project. For example, one embodiment of the system and method's standard or default settings of the customization profile enable a plurality of ITKC building customization options for a user, users, or super user (such as a teacher or other resource), as indicated in FIG. 9, block 9100 and discussed previously, including but not limited to: 1.) setting up an initial or starting ITKC, which may include starting structures, goals, priorities, guidelines, and initial content as by, for example, a super user such as a teacher or other source, as indicated in FIG. 5A, blocks 5000, 521 and 522 and also shown in FIG. 5, blocks 510, 520, 535 and 540; 2.) construction and saving for future use of custom analysis construct types, referenced in FIG. 5G block 5667; 3.) construction and saving for future use of custom information construct types, referenced in FIG. 5D, block 5638 and block 5642; 4.) construction and saving for future use of thinking structures, such as topic sets or meaning statement sets or others; 5.) setting of the view types to be utilized in the ITKC building environment, such as the choice of outline view, matrix view, 2D view, 3D structural view, 3D molecular view, or subsets of such view choices as shown in FIG. 3C-20, block 286; 5.) entering and saving personalized guidelines or thought prompts for various components; 6.) referencing to external or other analysis constructs and information sources as part of the ITKC process and structure, and others. Such ITKC customization user options may be utilized whether created by a user for their own use or by a super user such as a teacher or other resource for use by others.

FIG. 9A shows a schematic of one embodiment of the customization modules in relation to the core ITKC system and method program modules, and indicates one embodiment of the customization interface processing relationships that may generally occur between the customization modules and the core ITKC system and method modules. Referring to FIG. 9A, the system and method in one embodiment provides for one or more customization interface processing or similar modules as a part of or associated with several program modules that make up the overall program modules of the ITKC system and method. For example, in one embodiment, the process manager or similar module includes or is otherwise associated with the function to invoke the customization profile builder (as in the case in which an initiator is requesting to create or modify a customization profile), indicated in block 8100, and may also include (or otherwise be associated with) the function to invoke the customization profile selector (as in the case in which an initiator invokes a particular customization profile and generate a customized ITKC system and method occurrence, or customized ITKC building environment), as indicated in block 8300.

It should be appreciated that there are alternative approaches to the placement and incorporation of such customization options and customization interface processors in relation to the total program modules of the ITKC system and method, and that these should be considered within the scope of the present invention.

In the embodiment shown in FIG. 9A, the customization control or similar module, as described more fully below, generally provides parameters, instructions, content, and the like to the appropriate modules of the ITKC system to subsequently incorporate and utilize the customization profile and customization input files via the appropriate customization interface processors or similar modules. In one embodiment, customization interface processors may include but not be limited to: 1.) a customization interface processor for the archetype structure, block 1500, which in turn may be processed by an archetype structure manager or similar module and may provide input to the process manager and other modules; 2.) a customization interface processor for the archetype process, as indicated in block 2000, which in turn is in this embodiment may be processed by the archetype process manager or similar module and may subsequently provide input to the process manager, and potentially other modules; 3.) a customization interface processor for the process manager suggestor and inference management module, block 300, which in one embodiment may in turn utilize rules provided in conjunction with the archetype structure and archetype process; 4.) a customization interface processor fpr the view manager, 5.) a customization interface processor for the output manager, and others.

One embodiment of the initiation and subsequent interaction of customization or other similar modules for the ITKC system is shown in. FIG. 11 and described below. Referring to FIG. 11, the process manager or similar module of the system and method in one embodiment upon initiation evaluates the initiation event, block 11015, (such evaluation may occur in multiple entry points and communication paths, as well understood by those skilled in the art), block 510 and determines the initiation type, for example in the context of customization, whether the initiation event is to initiate a session of the ITKC building environment, indicated in block 11022, or to develop or modify a customization profile, indicated in block 11024. In one embodiment, such indication is defined as a part of the project start process, as depicted in FIG. 5, block 500.

Continuing with FIG. 11, in one embodiment, if the initiation request is to initiate an ITKC building environment session, then the process manager or similar module of the system and method retrieves the specified customization profile from the stored library of customization profiles (block 8201), (see also the customization profile selector FIG. 9, block 8300) indicated in block 11030, which may either be a default or previously customized profile (as in set previously as the profile of choice). Following such selection, in block 11030, the customization profile selector or similar module sends the selected profile to the customization control module, block 8400, which generates or otherwise directs the session of the ITKC building environment to be generated in conjunction with the customization interface processors or similar modules, as directed by the designated customization profile, indicated in block 11035 and also described further herein. In a preferred embodiment, part of any ITKC building environment includes the designation of those aspects of customization of the ITKC system and method which are available to the specific user(s) or customization requestor, or the customization user or requestor's customization and modification rights. Continuing with FIG. 11, in one embodiment, the ITKC building environment evaluates whether the user or electronic or other requestor is invoking available options to change or create a new customization profile, as indicated in block 11040. If so, in one embodiment, the customization profile builder is invoked, as indicated in block 8100. In the case of initiation of the system and method in order to create or modify a customization profile, indicated in block 11024, the initiation request is passed to the customization profile builder as indicated also in block 11040 and processed accordingly, as described elsewhere herein. Continuing with FIG. 11, whether the customization request has occurred via an event within an ITKC building session or as an external transaction or other initiation for adding or modifying a customization profile, the customization builder module subsequently processes the customization input, indicated in block 8100, tests such input, in block 11050 via the customization control module, in block 8400, and also the customization interface processors or similar modules, as described further elsewhere herein, and if the test is valid, generates a customization profile, in block 11060, which is subsequently stored and made available in the libraries of customization profiles in block 8101 and customization input files or customization resources, in block 8201. In one embodiment, the system and method further evaluate whether the initiator wishes to either to modify the current session or initiate the newly created customized ITKC building environment, indicated in block 11055.

Figure 12:
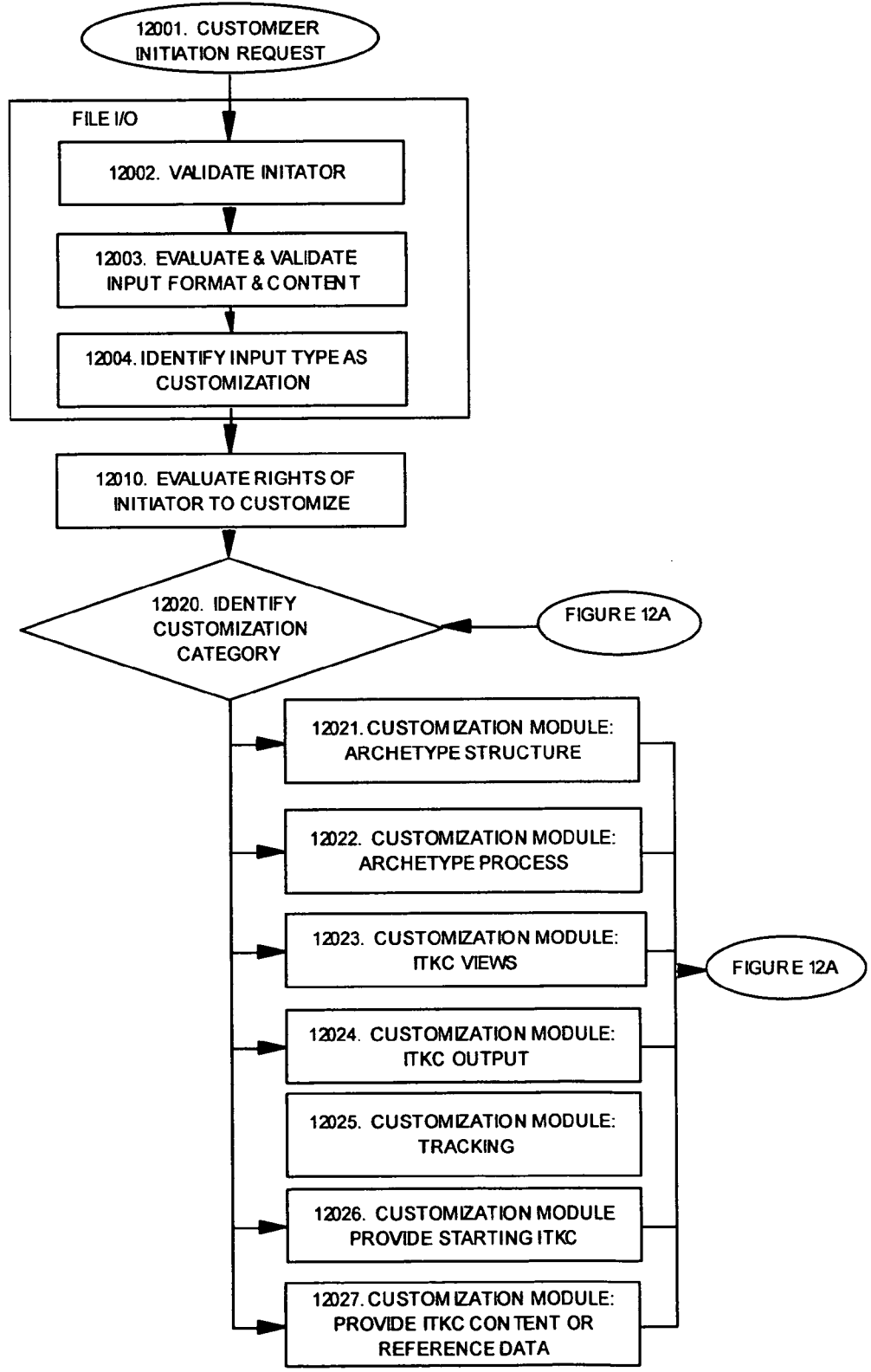
Figure 12B:
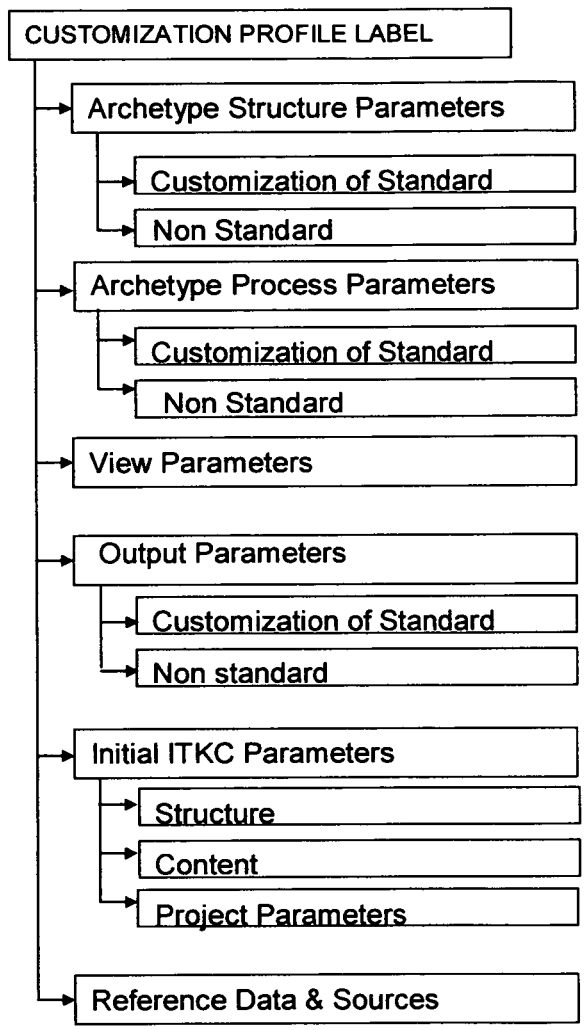
FIG. 12B is a schematic representation of one embodiment of a customization direction profile.
Figure 12:
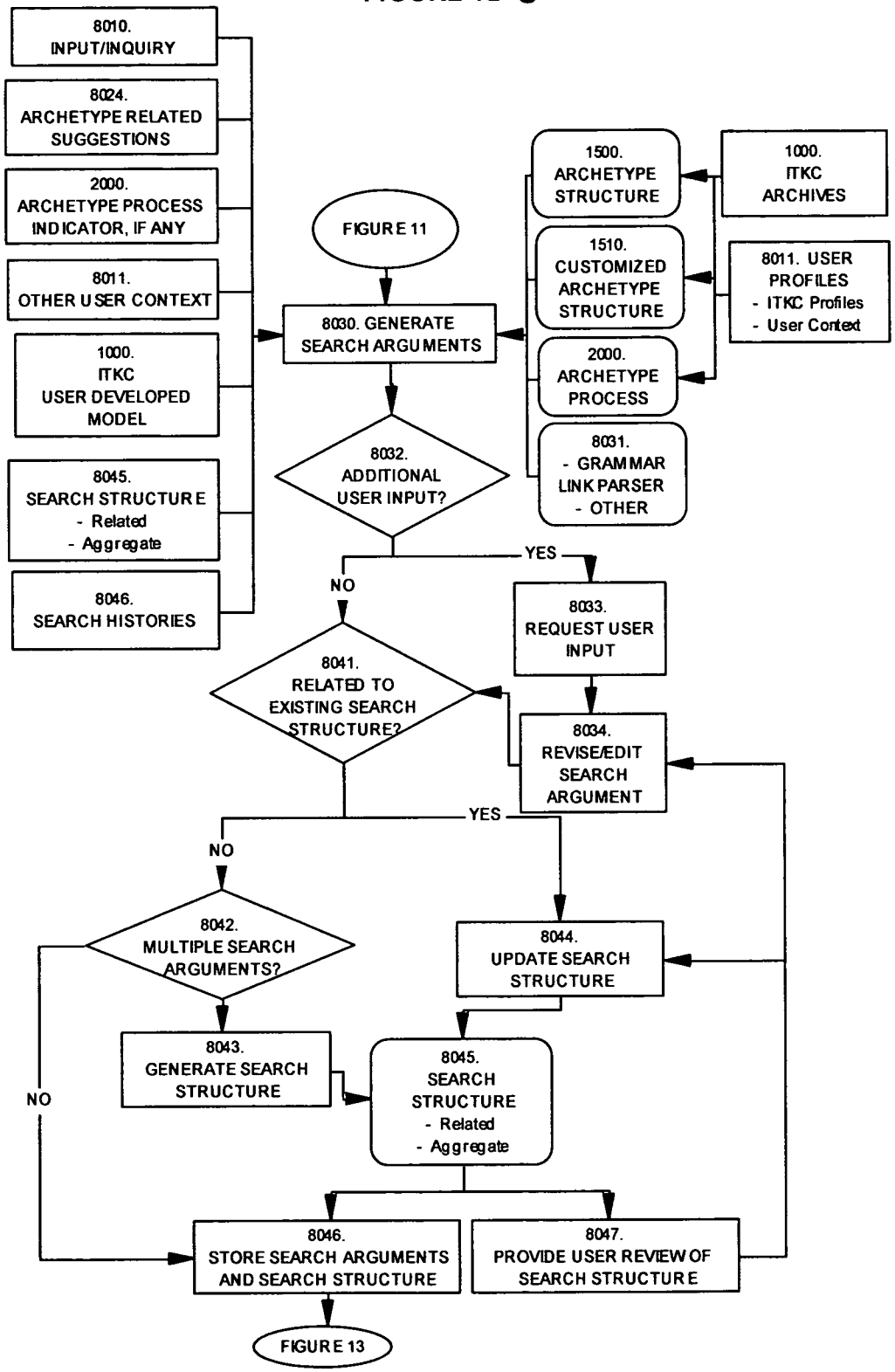
Figure 13:
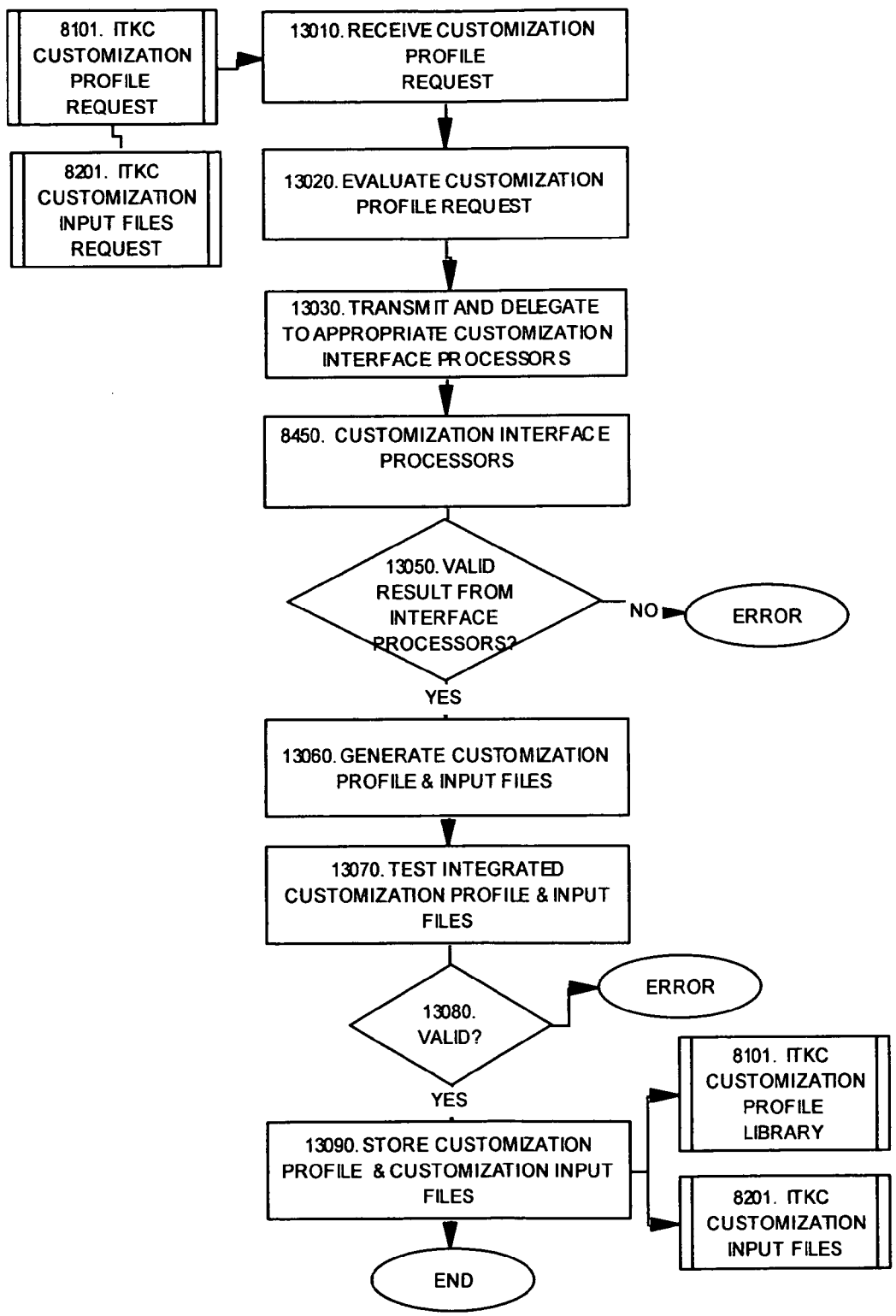
Figure 13:
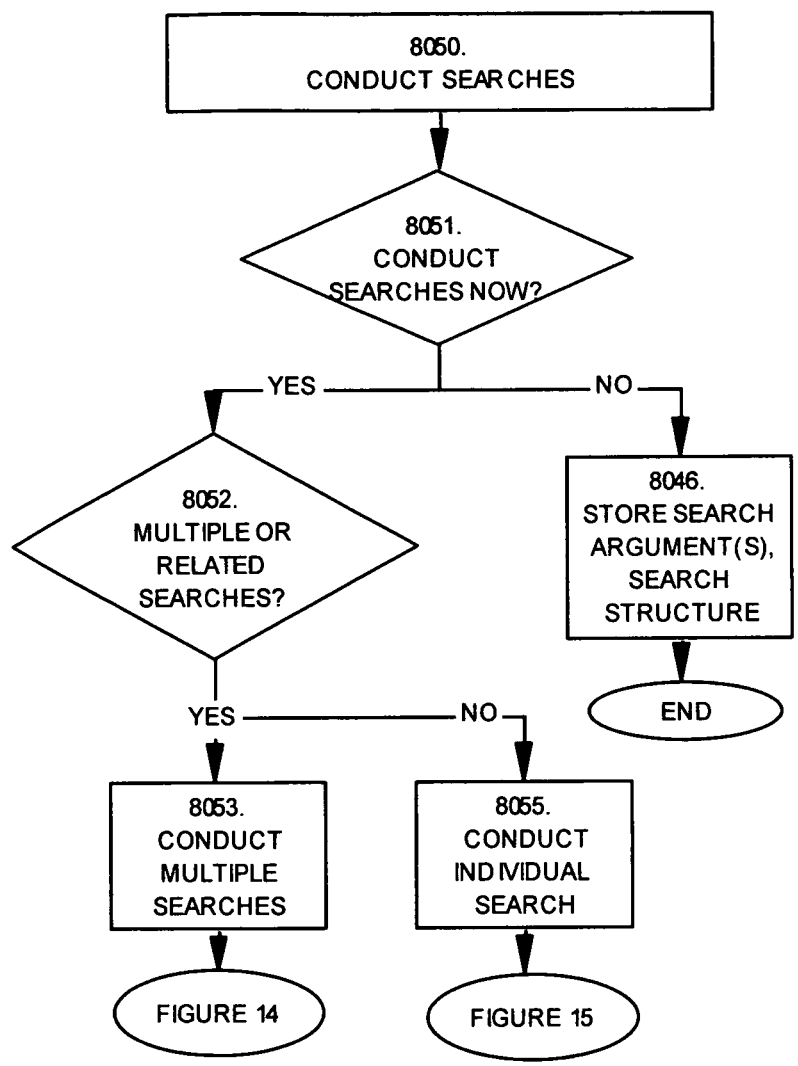
Figure 15:
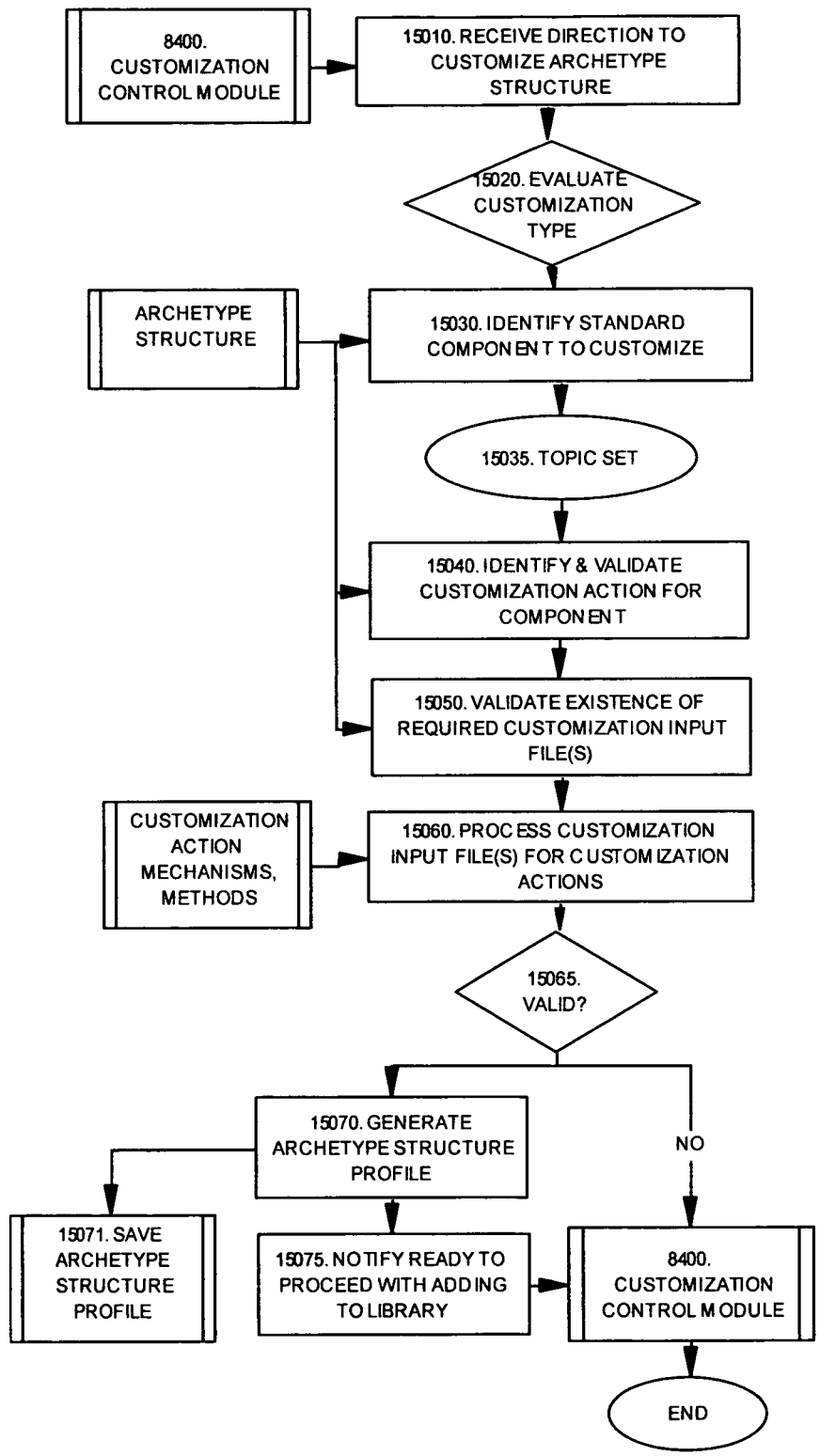
Figure 15:
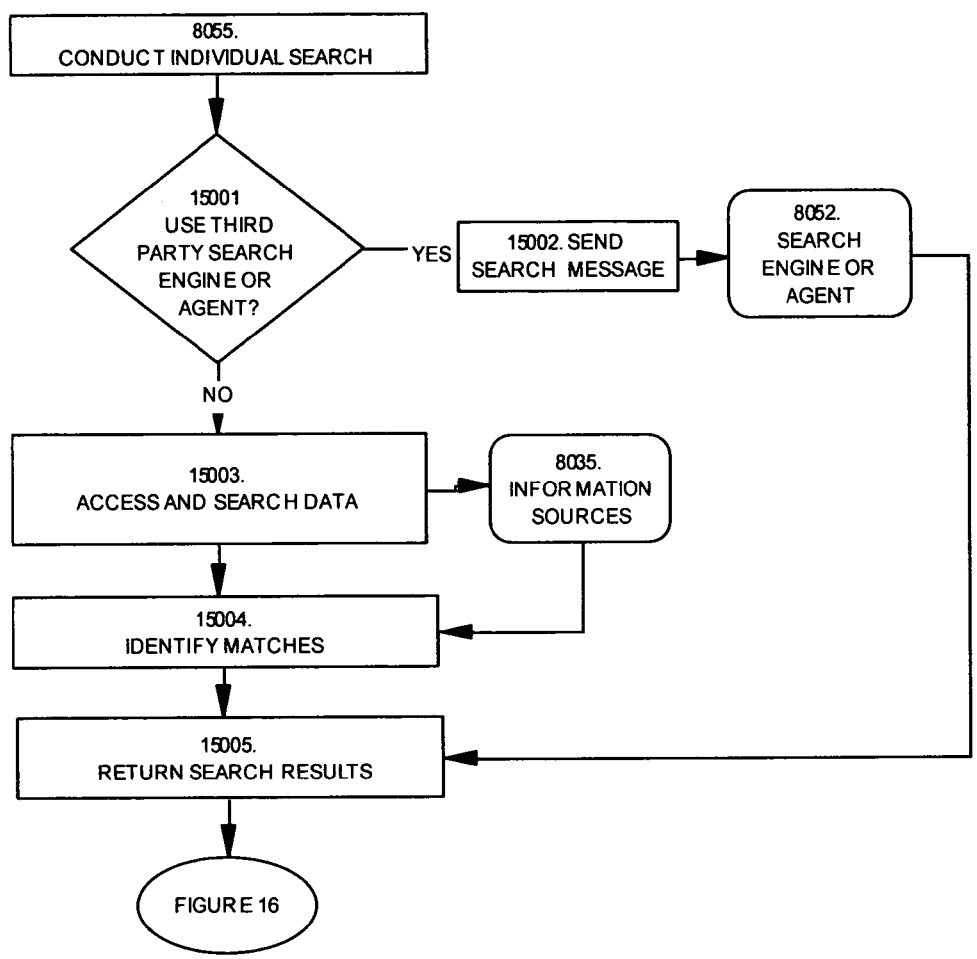
Figure 17:
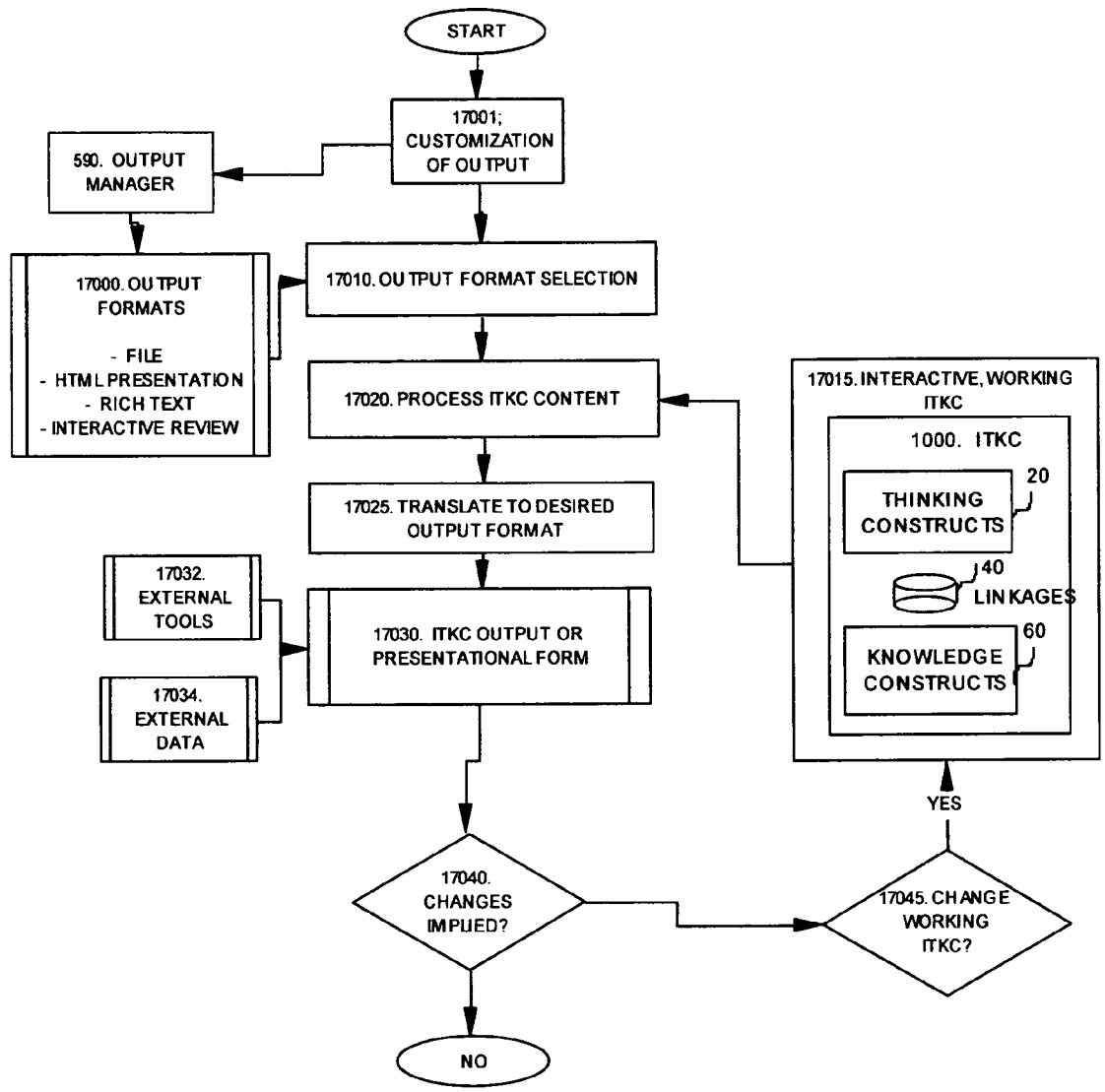
Figure 20:
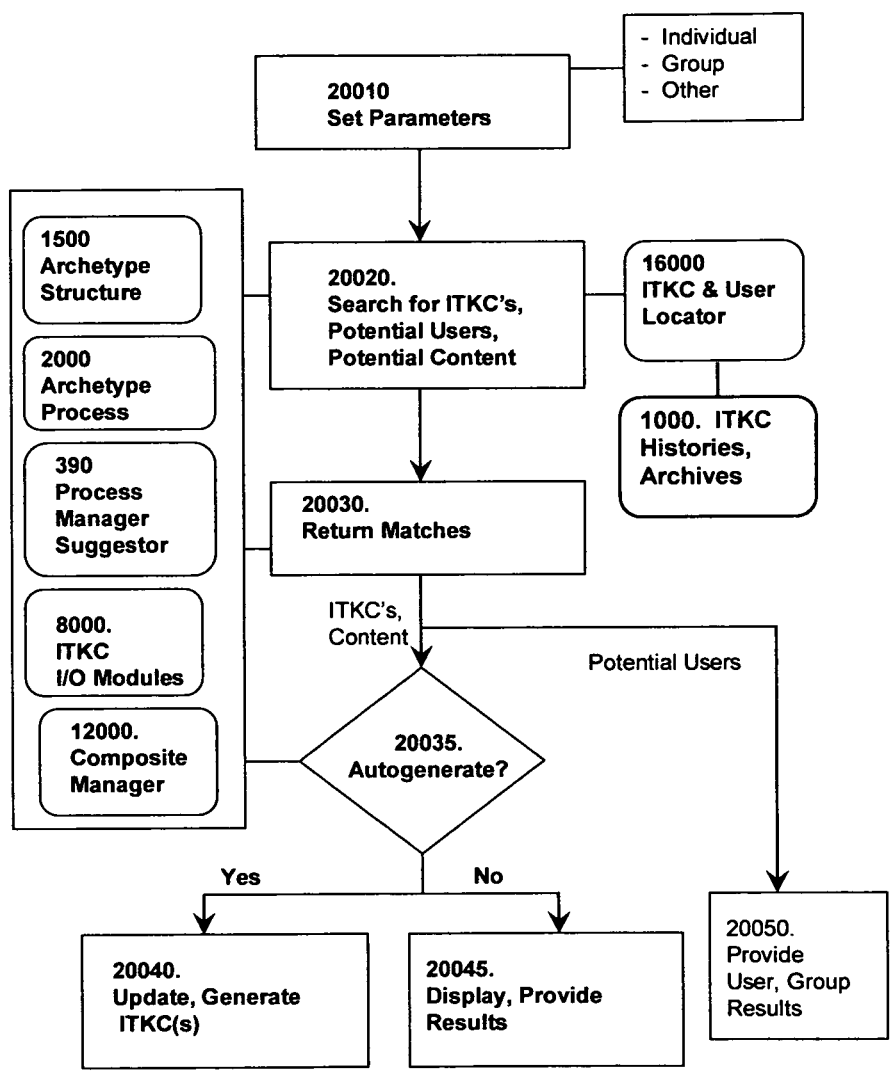

FIGS. 12, 12A and 12B provide a description of one embodiment of the processing flow for a Customization Builder or similar module. Referring to FIG. 12, in a preferred embodiment, the Customization Builder or similar module performs a set of actions that generally include but may not be limited to the following: 1.) identifying the initiator of the customization request, block 12001, whether it is a direct user, electronic source or other, as indicated by block 12002, and validating that the initiator has the right to proceed with creating or modifying a customization profile, with regard to access rights, security rights and others; 2.) evaluating the input from the initiator that such input is in a form that can be interpreted and used by the system and method, as indicated in block 12003; and 3.) identifying that the input being evaluated pertains to customization, as indicated in block 12004. In some embodiments, the functions associated with identifying and evaluating input from an electronic source in particular may be performed by a separate file I/O module of the system and method and the results then provided if applicable to the Customization Builder or similar module.

Continuing with FIG. 12, in one embodiment, the customization builder or similar module generally then 1.) evaluates the customization rights of the initiator, block 12010; 2.) identifies the category of customization attempting to be initiated, block 12020 (for example such as the archetype structure, block 12021, and others described previously and also elsewhere herein); 3.) for each category of customization so identified, the customization builder or similar module then in one embodiment provides the customization input to the appropriate submodule of the customization builder module processing for the category, for example as indicated in blocks 12021, 12022, 12023, 12024, 12025, and 12026 and discussed further below and elsewhere herein. Referring to FIG. 12A, in one embodiment, the appropriate category submodule of the customization builder generally then 1.) identifies the type(s) of customization and components or similar designation the initiator is attempting to customize and complete, as indicated in block 12035, by evaluating the tags or other indicators associated with the input being processed (for example such .xml tags that indicate the tags as a question or topic set); and may then, 2.) based on the processed input and parameters, identify the customization action area (block 12040) that is being addressed within the customization type (for example customization of the structure options allowed for the question/topic set, or providing a new required set of model topics or questions), and 3.) identify the appropriate customization mechanism for the customization action area, block 12050, as discussed further below, based either on accessing a table or otherwise stored match of customization mechanisms to customization types and customization action areas or by reading an input parameter from the initiating file that indicates the same. Continuing with FIG. 12A, the appropriate submodule of the customization builder or similar module may then in one embodiment utilize the specific evaluating and generating processing modules appropriate to the identified or matched customization mechanism (for example, for customizing a model topic or question set, reading and processing a structured file delineating the questions and their relationships) to validate the identified portion of customization input in block 12060. Continuing with FIG. 12A, in this example embodiment, the submodules for customization mechanisms and customization types repeat their processes until all input of the customization subportion (in this example, by type) has been processed and validated.

Validation and testing of the customization profile input may be accomplished at several or multiple points in the processing of customization input and generation of the customization profile, as well understood by those in the art. In one embodiment, the customization builder module, upon completion of processing a set of customization input by category, may generate that portion of the customization profile and subsequently initiate a test of the type-based customization profile via the customization control module, and the customization interface processors, as described elsewhere herein. In one embodiment, testing of the appropriate ordering and validity of the combination of customization actions included across customization categories and types in any customization request is also tested by the customization control or similar module.

Referring again to FIG. 12A, in one embodiment, the system and method includes and utilizes a file, table or other electronic matching mechanism that stores and provides access to designations of the appropriate customization mechanisms or similar methods to be allowed for specified customization types and action areas or similar designations, as indicated in block 12050 and 12055. In one embodiment, the system and method provides for at least the following customization and/or updating mechanisms as part of the standard allowed set and matched to the appropriate types of components and elements in the ITKC system and method, as will be apparent based on the descriptions herein and the requirements and generally accepted practices for each type of component and resource included as part of the ITKC system and method. For example, in one embodiment, the ITKC system and method incorporates one, some or all of the following mechanisms with regard to customization: 1.) the adding or modifying of tables or data bases, as indicated in block 12051 (and as is the most likely approach, for example, in incorporating the customization of model topic sets, for example) that are referenced by modules of the ITKC system and method; 2.) the setting or selection, through files or direct user input, of parameters or options allowed for any of the ITKC customizable elements, as indicated in block 12054 (as in the setting of structural choices for archetype structure choices, the setting of parameters for numbers of components required or numbers of levels or alternatives allowed); 3.) the provisioning through, for example, tagged or other files, or direct user input of content or parameters defined to match with requirements to be incorporated into structured options, 12056, or fields provided by the archetypes and other ITKC system and method options (as in the definition of content tags for inclusion in suggestion or autogeneration rules, timeframe parameter settings within a timeline, and the like); 4.) selection of mechanisms which commonly allow for the inclusion of external resources, 12058, as components within the ITKC system and method environment, and others. For example, one embodiment of the ITKC system and method allows a number of commonly accepted methods for including external resources and components as part of the ITKC system and method, including but not limited to, for example: 1.) for the designation of electronic resources as linked or referenced to an ITKC, (in one embodiment, through the identification of a web site or other access location), 2.) for the inclusion of third party tools as components via web services, object components, ActiveX components or other objects, and others. It should be apparent to those skilled in the art that the provisioning of a number of commonly accepted methods of introspecting and interacting with well structured available external resources or components that may be mapped to ITKC interface objects, particularly given again the modularity of the ITKC system and method, is within the scope of the invention.

In one embodiment, this or a similar matching device (block 12050) includes both matching of standard and allowed types and action areas, as well as the ability to store and later reference allowed customization mechanism matches to new actions or resources (as in provided by evaluating the customization input, identifying a custom mechanism tag or other identifier, and storing a reference between the new customized type or action area and a recognized or otherwise specified customization mechanism). In one embodiment, new mechanisms for access and updating or otherwise providing of resources and components may be provided through developer intervention according to standard object based interface and method mapping.

The appropriate or optimal selection of customization actions and types to customization mechanisms or methods is well understood by those skilled in the art, and will be readily determined according to the characteristics of the different customization types and action areas described or implied as part of or associated with the ITKC system and method (included herein and also discussed in previously). For example, the customization of a model topic or question set is most likely to be implemented through the provisioning and processing of a new table or data base of some kind, while the setting of parameters through structured response or inquiry will be most appropriate for directing the customization of some factors. In some embodiments, the precise customization mechanism or method that is optimal for the customization action being requested will depend upon considerations such as the amount of information and data being included in or associated with the ITKC and the ITKC environment. One of the advantages of the ITKC system and method is that the same thinking and problem solving processes and structures may be utilized in vastly different implementation environments, as in environments like education which may have far less rigorous data requirements than environments like professional settings. The utilization of different customization mechanisms that can be similarly included, either though table inclusion or through reference or delegation to an external module, is to be considered within the scope of the invention.

It will be appreciated by those skilled in the art that, the modularity of the design of the method and system, the ITKC, the archetype structure and archetype process lend themselves to these and similar forms of customization, alone or in combination with one or more types, and should be considered within the scope and intent of this invention.

In one embodiment, the customization modules of the ITKC system and method may call upon and utilize other modules of the ITKC system and method in creating portions of the customization input files. For example, in generating a custom model topic or question set, the customization control module or similar may via the customization interface processor of the archetype structure utilize modules of the invention which enable the construction of a question or topic set. In this embodiment, the customization control or similar module may then via the customization profile direct the system and method to store and reference the new model question or topic set as a specialized or customized part of the archetype structure, in this instance in particular as a model topic set.

One example embodiment of an architecture or schema for a customization profile is shown schematically in FIG. 12B, which may be structured schematically within the categories or similar designations as shown, with customization actions such as parameters, content, or methods delineated for one, some, all or any of the categories or similar designations. In one embodiment, the customization profile may be stored as a single file, for example in .xml; in other embodiments, the customization may be stored as a set of related or similarly tagged files. For example, the architecture or schema for a customization profile may in one embodiment include one, some, or all of but not be limited to the following: 1.) indicators for archetype structure, regarding for example which portions of the standard archetype structure are to be included in the customized ITKC building environment, along with any parameterization and/or content to customize the included standard portions of the archetype structure (for example, the creation of customized analysis or information constructs) as well as any new components and their associated parameterization, archetype structure relationships, archetype rules, sources, content, and the like; 2.) indicators for archetype process, for example, regarding both the inclusion and parameterization of the standard archetype process portions, setting of process starting points and ordering relationships, portions to emphasize, process suggestion rule and guideline modification, as well as the incorporation of any new process portions; 3.) indicators and parameters regarding the views to be included in the customized ITKC building environment; 4.) indicators and parameters regarding the output forms to be included in the customized ITKC building environment; 5.) indicators for starting ITKC content and structure, if applicable; 6.) indicators of any reference data and sources (such as Internet links or other electronic sources) to be provided as part of the customized ITKC building environment; and others.

In one embodiment, such categories or other designations of types of customization and their associated types (and by implication, the matching of the allowed customization actions and associated mechanisms) are generally key enablers for the effective coordination of the customization builder module, the customization control module, and the customization interface processors of various modules of the ITKC system and method.

Referring again to FIG. 11, in one embodiment, the customization control module is utilized in order to generally 1.) direct the generation of a particular occurrence of a custom ITKC building environment, as indicated in block 11035; and 2.) process customization profile requests from the customization builder module and validate, test and generate new customization profiles, as indicated in block 11060 and described more fully below. Referring again to FIG. 11, the customization control or similar module in one embodiment validates the customization profile selected from the customization profiles library (blocks 8201 and 11030), and parses or otherwise disaggregates and evaluates the customization profile, in order to determine the processing order requirements or interdependencies based on the combination of customization actions included in the customization profile. Based on that evaluation, in one embodiment, the customization control or similar module sends the appropriate subportion of the customization profile to the appropriate customization interface processor, indicated in FIG. 11 block 8450 (for example, the output customization actions to the output manager) for their verification and processing, in the order determined to be optimal. In that embodiment, the customization control or similar module evaluates whether each of the specified customization actions are verified that they may be completed accurately by each of the customization interface processors so called. In that embodiment, and continuing with FIG. 11, if the customization control manager received verification from each of the referenced customization interface processors, then the customization control manager directs the customization interface managers, in one embodiment through the process manager, to generate the requested customized ITKC environment.

Description of the roles of the customization control manager and the customization interface processors or similar modules in the testing and creation of a new customization profile follows, and will provide additional insight into the customization control manager and customization interface processors or similar modules.

One embodiment of the role of the customization control manager or similar module in creating a new customization profile is described in FIG. 13. Referring to FIG. 13, the customization control or similar module receives the request for a new customization profile to be created from the customization profile builder, in block 13010, and evaluates the customization profile request, block 13020, for validity, and any precedence in processing. In one embodiment, the customization control manager then transmits and delegates to the appropriate customization interface processor(s) (block 13030) the appropriate portion of the customization direction profile and any related customization input files, for testing, as indicated in block 13050, and further described below. Continuing with FIG. 13, if the component tests from the customization interface processors are returned validly, then the customization control module generates a test customization profile and input files, in block 13060, and performs an integrated test of the customization profile, in block 13070 in a similar manner. Continuing with FIG. 13, if the test is valid for the integrated test, then the customization control manager stores the customization direction profile and customization input files in the appropriate libraries, as indicated in blocks 8101 and 8201. It should be appreciated by those skilled in the art that the placement and structure of the storage and access approach for the customization input files and customization direction profile may be implemented in a number of different ways without departing from the scope and intent of the invention (for example, associating or storing the portions of the customization input files with the associated ITKC system modules as opposed to stored more closely with the customization direction profile itself).

FIGS. 14 and 15 provide additional description of one embodiment of the processing associated with the customization interface processors or similar modules, and include some examples specifically for one embodiment of the customization of the archetype structure. Referring to FIG. 14, a customization interface processor may in one embodiment receive the instructions and portion of the customization profile related to the interface module area, from the customization control manager, as indicated in block 14010. Continuing with FIG. 14, the customization interface processor or similar module in one embodiment processes the input to determine validity, in block 14015, and either notifies the customization control manager that the request is not valid, or proceeds to process the highest level of customization indicated in the customization category request, as indicated in block 14020 (being the most basic or far reaching changes in the request, as in for example, changes or modifications to the overall archetype structure, as indicated in block 14030, starting points or ordering requirements for the archetype process, and the like). Continuing with FIG. 14, upon completion or in the absence of overall category modifications, the customization interface process proceed to evaluate and process each of the component actions, as indicated in block 14040. Continuing with FIG. 14, in one embodiment, the customization interface or similar module evaluates whether the customization action is requesting to 1.) customize a standard component, in block 14042, (whether a standard archetype structure component, a standard portion of archetype process, a standard view or output option, or the like); 2.) utilize a standard proxy component, block 1404, generally as defined below; or 3.) either add or otherwise edit an external component, block 14046, as also described more fully below. It should be appreciated that while these categorizations of customization approaches for components of the ITKC system and method are in one embodiment preferred, other hybrid or easily implied options are to be considered within the scope of the invention.

Continuing with FIG. 14, the customization interface processor or similar module in one embodiment accesses the associated customization input files for each of the actions specified and tests the new customization profile action request, as indicated in block 14050. In this embodiment, if the tests of the actions by the customization interface or similar processor prove valid, then in one embodiment, the customization interface processor notifies the customization control manager that the portion of the customization profile has been tested and validated, as indicated in block 14060. As described earlier, the customization control module directs the integrated tests, and updates the profiles and libraries accordingly.

Referring again to FIG. 14, an additional and powerful customization method incorporated in a preferred embodiment of the ITKC system and method is the provisioning of proxy objects or components, based upon the relationships, methods, and expected inputs and outputs of standard ITKC system components, whether for archetype structure, archetype process, views, outputs, information resources, or others. A preferred embodiment of the system and method includes a set of preformatted standard proxy objects or components based on characteristics and expected relationships of key components of the ITKC system and method, and which enable the interaction of external components, objects or resources through providing standard objects that are based upon and act as proxies or "stand in's" for key ITKC system and method components. Such proxy objects may be built upon any of a number of commonly accepted technical formats without departing from the intent and scope of this invention, such as COM objects, Cold Fusion Components, and others. Again, the modularity of the archetype structure and archetype process and other parts of the ITKC system and method fit well with the provisioning of such standard proxy objects.

For example, in one embodiment, the ITKC system and method includes a standard proxy object for an analysis construct (in one embodiment, as part of the archetype structure), with methods defined to correspond with one, some or all of key archetype structural relationships, content expectations, and in actions of the ITKC system and method. Similarly, another embodiment of the ITKC system and method includes a standard proxy object for a research agent (in one embodiment, as part of the archetype process), which may be similarly defined, linked and referenced. In this manner, the ITKC system and method in a preferred embodiment can incorporate a wide range of external resources and components, with varying amounts of interactivity, passage of data, and the like.

Referring again to FIG. 13, the inclusion of other non standard components and resources is one type of customization action that in one embodiment is processed by the customization interface processor or similar module. Examples of allowed such inclusion in one embodiment include but are not limited to: 1.) the inclusion of links to external information sources, such as web links; 2.) the inclusion of any of a standard set of third party tools, such as spreadsheets or presentation tools as linked and accessible, and others. It should be appreciated by those skilled in the art that the inclusion of similar or additional external resources or external components through similar mechanisms should be considered within the scope of the invention.

Referring again to FIG. 14, an example of customization of a standard component follows below, and illustrates the significant flexibility and options provided through this form of customization in the ITKC system and method. The example used below is for the customization actions associated with the example of customization of a topic set, as processed by a customization interface processor or similar module. However, similar types of categories of actions can be inferred for the other ITKC customization categories and their associated allowable actions and preferred customization mechanisms. Such actions will also be evident to those skilled in the art based upon the descriptions provided for the ITKC system method.

FIG. 1A shows one example of standard components that may be used to comprise an ITKC, in one embodiment. Referring again to FIG. 1A, one embodiment of a standard ITKC may include one, some, or all of but not be limited to the following types of components, described herein and also previously: 1.) thinking constructs, indicated in FIG. 1A block 20, which may in one embodiment be primarily hierarchical structures of elements (although lateral and multiple hierarchical relationships may also be defined), and in some embodiments, linked at the highest hierarchical level to one or more top level elements (for example, in the Main Topic or Main Question with subtopics or subquestions, or the Answer or Summary Set with Meaning Statements); thinking construct standard options include creating thinking constructs which are labeled in a custom manner (for example, "hypothesis" instead of "answer"), with different numbers and types of elements, numbers of levels in the hierarchy, and others; 2.) knowledge constructs, indicated in FIG. 1A block 40, which may in one embodiment include analysis constructs (including standardized preformatted analyses, such as timelines, as well as the creation of customized analysis constructs, indicated in FIG. 5G block 5667, and externally linked or incorporated analysis tools and resources, as described elsewhere previously and also herein), information constructs (also both standardized performated, customized information constructs, indicated in. FIG. 5D, block 5638 and 5642, and externally linked or otherwise incorporated information constructs or resources, described elsewhere herein), and unstructured data; 3.) linkages, indicated in block 60 of FIG. 1A and archetype relationships among and between components and elements or subportions of components within the archetype structure and between the archetype structure and archetype process; and 4.) annotations, being text, drawings, graphics and other data portions which may be attached to or associated with portions of the ITKC without being directly otherwise incorporated into the components, or as implemented in a project journal and similar items; and others.

In a preferred embodiment, the customization or similar modules enable customization of the archetype structure in a number of ways and according to a number of customization actions and mechanisms Examples of embodiments of such customization are described below, and are intended to be illustrative as opposed to exhaustive. Other examples of customization actions and mechanisms by the present invention will be evident to those skilled in the art based on the description of the ITKC system and method provide, and within principles of commonly accepted modification practices.

Referring to FIG. 15, one embodiment of the processing by a customization interface processor or similar module relative to customizing a standard archetype component is described, through utilizing an example of a customization execution for one category of customization of the archetype structure: a customization of the topic set. Referring to FIG. 15, in one embodiment, the customization interface processor or similar module receives direction from the customization control or similar module regarding the customization of a standard component, as shown in block 15010, and evaluates the validity of the direction, that the input fits the requirements of the archetype structure options and can be processed accordingly, as indicated in block 15020. Continuing with FIG. 15, in this embodiment, the customization interface processor or similar module upon reading and evaluating the instruction received, uses the archetype structure to identify the type of customization being requested (as to level, for example, as described previously) and in this example, determines that the request is to customize a standard ITKC archetype component, FIG. 14, block 14042 (as opposed to create or edit a proxy, block 14044, or add or edit another external or non standard resource or component, block 14046), specifically a topic set, as indicated in block 12035. In this embodiment, the customization interface processor or similar module then identify and validates the various customization actions included in the request for the component as indicated in block 12040. In this example embodiment, the request is for a number of customization actions associated with the topic set customization, as indicated in block 12045 as a representative set. These examples are meant to be illustrative of a set of customization actions that might be requested and processed for a standard customization of an archetype structure component. They are not meant to be exhaustive or descriptive in their entirety. Other options for customizing the archetype structure may be inferred from the descriptions of the archetypes and ITKC system and method provided previously and also herein.

Returning to the topic set example, as indicated in block 12045 of FIG. 15, for example, in this embodiment, referring to block 12045, the first request action is to change the label of the topic set to "Issues", as opposed to using the standard labels.

Continuing with FIG. 15, a second example request action in one embodiment may be to define or select among structural options provided for the archetype component. Some examples of structural options provided by the standard archetypes are described below, and elsewhere herein, and provide a significant set of flexibility and ability to customize the archetype. For example, structural options associated with topic sets or thinking structures may include but not be limited to allowing or requiring multiple alternative main topics or answers, requiring only strict hierarchical relationships as opposed to allowing multiple or lateral relationships among elements of the thinking structure, setting of an expected number of levels or number of elements, and the like.

Another example of structural options and customization capabilities are those related to knowledge constructs in one embodiment of the ITKC system and method, and particularly to the more complex forms of said knowledge construct that a preferred embodiment of the system and method provide. For example, in one embodiment, structural options for information constructs and analysis constructs may include the allowance or disallowance of complex information constructs and analysis constructs, being constructs that are comprised of multiples of the construct type, sometimes called multidimensional. For example, allowing or requiring complex information constructs provides for the creation, autogeneration, and evaluation of one or more information constructs that are comprised or otherwise generated based on a group of related information constructs, as in might be used in a whole-parts relationship. Similarly, in one embodiment, the ITKC system and method enable the construction, autogeneration, and evaluation of complex as well as simple or stand alone analysis constructs, and may do so for several different types of relationships between multiple analysis constructs. For example, in one embodiment, a complex analysis construct is an analysis construct that is made up of or related to one or more other analysis constructs, as in the construction of a combinatorial timeline out of 2 or more timelines, or the inclusion of one or more analysis constructs as elements in a larger analysis construct. In one embodiment, a second type of complex analysis constructs may be created, autogenerated and/or evaluated, being at least one analysis contract contained within or otherwise referenced as an element within another analysis construct. In one embodiment, a third type off complex analysis construct that may be created, autogenerated and/or evaluated is a complex analysis construct that is comprised of at least two related analysis constructs, that may be so related by a number of different mechanisms, elements, relationships. In one embodiment, a simple analysis construct might allow the inclusion of information constructs and information elements or data portions, and the specification of relationships between different types of analysis constructs. In one embodiment, the ITKC system and method enables the building, reviewing and autogeneration of a complex analysis construct built and structured in a similar modular fashion, but allowing for the inclusion of analysis constructs as elements within other analysis constructs, as in two timelines making up a larger timeline, or one analysis construct including another analysis construct as a component. In one embodiment, such complex analysis or information constructs may be represented in three dimensions. The modularity of the ITKC system and design make such combinatorial constructs readily achievable. It is most likely, however, that some problems and some users will warrant or desire the more complex or robust capabilities of options like multiple answers, complex information constructs, complex or combinatorial constructs and the like, making structural options a useful category of customization action. Continuing with FIG. 15, in this example, the action request is to define an issue set which adheres only to strict hierarchical structure.

Continuing with FIG. 15 and the example, referring to block 12045, in this example the customization action request defines components as being issues that must be in the form of a question, and further defines that model content is desired, being the addition to the archetype of model examples of complete or partial archetype structures (in this case for a model topic or question set, an example of a portion of one embodiment of which is indicated in FIG. 5B-30).

Continuing with the embodiment example, in this example, a customization action request is also made to modify and in this case add archetype structure rules to be associated with the modified topic set. The ITKC system and method, in a preferred embodiment, incorporates a number of different types of rules (or in some discussions, termed algorithms) and evaluation mechanisms in order to evaluate user actions and the status of a developing ITKC against various criteria in order to accomplish one, some or all of the following: 1.) the suggestion to the user of next steps to take or try in the process; 2.) the identification of suggested next additions or modifications to make in the ITKC structure, content or linkages; 3.) the autogeneration of structure, content, or linkages in the ITKC based on such evaluations and rules, and others. This document provides discussion regarding the evaluation and suggesting functions of the system and method.

With regard to customization, in one embodiment, the customization interface processor provides for the processing and incorporation of customized rules related to the requested component target for customization. In one embodiment, such customization is provided at least through the customization mechanism of structured query and option selection, and parameter settings.

The system and method enable the inclusion of external software tools or information resources as part of the ITKC. Similarly, in a preferred embodiment, the Customization Builder or similar module allows for the incorporation of externally provided software tools or information resources in a plurality of ways, including but not limited to: (i) as referenced but not interactive tools or sources; (ii) as referenced and interactive tools or sources. The inclusion of such external or third party tools can be accomplished through a number of approaches well understood by those skilled in the art.

Referring again to FIG. 12, block 12022, the present invention enables the customization or specialization of the archetype process to be used in the relevant customized or specialized user environment. In the preferred embodiment, indicators, parameters, resources, components, and content related to customizing the archetype process may generally be read and processed in manners similar to those described for the archetype structure above.

As previously disclosed, the portions of the archetype process can be used individually, as a total set, or in any subset combination, depending upon the user's needs for a particular project. In one embodiment, the method and process provided by the archetype process generally may include but not be limited to the following thinking and working functions: (i) project initiation, (ii) definition of project goals and problem, (iii) definition, creation and revision of project structures, being structures for thinking and working, (iv) determining and revising a project plan and to do list, (v) evaluating progress and deciding what to do next, (vi) selecting the appropriate subset for thinking and working, (vii) conducting research and gathering information, (viii) organizing information, especially through constructing, and/or acquiring information constructs (which may be formatted or unstructured data), (ix) defining and associating analyses to the project, and defining and constructing analysis constructs to be included in or associated with the project, (x) developing conclusions and meaning, especially through defining and constructing the set of meaning statements, (xi) developing and constructing the overall answer or summary set, (xii) annotating the ITKC; (xiii) evaluating the completeness of the answer or summary set, (xiv) creating and formatting the presentational version of the project results, and others.

In the preferred embodiment, the customization interface processor or similar module related to archetype process may include but not be limited to: (i) providing customized direction to portions of the archetype process, which might for example include the hiding or "turning on" or "turning off" for a set of target users portions of the archetype process, as might be created in educational or professional development settings in order to allow user(s) to concentrate on only some portions of process (for example, as in beginning the user(s) with access only to the problem definition, research, information and analysis portions of the process), or the setting of parameters for the project work, indicated in FIG. 5A blocks 521, 523, and 542); (ii) providing customized directions or prompts for the user in relation to either standard or new archetype process portions; (iii) providing customized or specialized input to direct rules that guide the process manager suggestor, (iv) providing parameters to control whether the process suggestor is active in various portions of archetype process or not (v) providing customized portions or archetype process, as substitutes to the standard archetype process portions, or in addition to the archetype process portions, via mechanisms discussed above and others.

One important portion of the archetype process in one preferred embodiment is the research and gathering of information for the inquiry based project. Shown in FIG. 5 block 560 and also in FIG. 3A block 905, the process manager or similar module of the ITKC system and method in one embodiment facilitates the seeking and gathering of information and data as one important portion of the archetype process for facilitating user thinking about and working to solve an arbitrary problem. Many if not most instances of "inquiry based projects" include some aspect of seeking, locating, and retrieving new or additional information and data for the project (as in data or information that may not be previously known or acquired by the user(s)).

In one embodiment, customization of the search and information gathering capabilities include but are not limited to: the selection of the use of external or third party agents or ITKC only search; the extent to which autogeneration is applied to search results; the customization of autogeneration rules and others. In another embodiment, shown in FIG. 5E block 910, the ITKC system and method transmits archetype based autogeneration search rules directly to a third party search engine or agent.

Another aspect of customization enabled by the ITKC system and method and its customization modules is the customization of views or representational forms to the user(s) as one form of accessing, reviewing, and updating their ITKC and utilizing the system and method. Such representational or output forms may in one embodiment include but not be limited to the following, indicated in FIG. 3C-20, block 286: (i) outline or tree form; (ii) two dimensional; (iii) three dimensional structural or molecular forms; (iv) matrix form, and others. Previously discussed, preferred embodiments include a choice of multiples of these forms of output and representation. In a preferred embodiment, the Customization Builder or similar Module can define which representational and output forms are to be included in the custom ITKC building environment, again in a manner similar to those described above.

In one embodiment, the customization of output is provided within the standard or default options for users within a standard or default customization profile session for a number of output forms, including but not limited to: 1.) a working version of the ITKC for use or review by others, with potential restrictions on changing portions of the ITKC; 2.) an HTML or similar based output form, which translates the ITKC content into a presentational like format and produces the HTML code for presentation purposes in other standard tools; 3.) a file version of the ITKC content, structure and other items, as might be produced in an XML or other file format 4.) an outline based, primarily text based version, with the incorporation of visuals as .gifs or other images produced from the ITKC; 5.) a rich text format, and others. It should be appreciated by those skilled in the art that the translating of one media form into other standard forms is well understood and additional output formats should be considered within the scope of the invention.

Referring to FIG. 17, in one embodiment, the output manager, block 590, of the ITKC system and method provides a plurality of output formats, examples of which are indicated in block 17000. In one embodiment, the customization interface processor for the output manager may direct the output manager to incorporate a new output form, within the options allowed by the ITKC system and method. Continuing with FIG. 17, based on selection or definition of an output format, block 17010, the output manager or other similar module retrieves the selected format specifications, and subsequently retrieves or receives specification to select the portion or portions of ITKC content and structure to be included in the output format, in block 17015, and processes the ITKC content, in block 17020, in order to generate an electronic output or presentational form of the ITKC, block 17030. In one preferred embodiment, indicated in block 17030, the electronic output or presentation form that is created (whether a set of references or cloned or otherwise duplicated ITKC data base and structure), generally includes the selected ITKC content (and associated structure, links and other chosen items), an organizing structure for the output or presentational form (such as an outline, a set of page layouts, a file layout, etc.), and the potential inclusion of content and media incorporated in or referenced to the ITKC output form without being added to the working version of the ITKC. In one embodiment, if the user or requestor requests a change to the content or structure of the ITKC output form that implies a potential change to the data, structure, linkages, or other items of the working ITKC, in block 17040, then the user or requestor is so notified, in block 17050 and asked whether the working ITKC is to be changed as well. In this manner, the ITKC system and method facilitate the independent but linked development of a presentational, output or communication form of an ITKC as well as the working ITKC. Consistent with other approaches discussed herein, the ITKC output or presentation form may also include references to external information or external tools.

In this manner, the customization or similar modules associated with the ITKC system and the associated ITKC system and method modules provide a significant range of modifiability to the creation of customized ITKC building, viewing and sharing environments, and the consequent creation of specialized or customized ITKC's.

Additional Search Related Capabilities

The present invention provides significant improvements to several aspects of search systems as currently understood. As context for the present invention, general aspects of search systems are described generally now but not in detail as they include several elements well understood by those familiar with or skilled in the art. Specific descriptions of the present invention and the manner in which archetype enabled search systems and methods are embodied are described more fully below.

According to embodiments of search systems generally, a query originator seeks information and in particular the information most relevant to an information need. Such a query originator may be a person, a team or group, or an electronic source or system seeking such information. At a high level, in one embodiment, the search methods and system act upon the input received from a query originator, and through a series of modules, return a set of results. In generally known search systems, results are often referred to as a set of "hits" of information (and are usually references to documents, sometimes with abstracts, summary or other high level information about the reference, but may also be content or data types), which are determined by the overall search system to be most relevant to the query originator's information needs.

In many embodiments and use cases, the search system searches among a set of documents or corpus of documents in order to determine the "hits" or selected documents that are determined to best meet the search query criteria. It should be understood by those skilled in the art that the term "document" is intended to refer to an item within the corpus being searched. It should be further understood that a "document" may therefore refer to a file, a written text set, a combination of text and graphics and other electronic media considered an item. A "document" may also refer to a part of what would be considered a document in other situations, such as a subset or text (sentence, snippet, paragraph, portion, etc.) or subset of other electronic media content, program code, or a portion of a stored file, and others.

In some search systems, search results or "hits" may be further ranked or prioritized in some fashion before the results are presented. Many search systems accept and process queries and return search "hits" or results in real time or near real time.

Figure 9S:
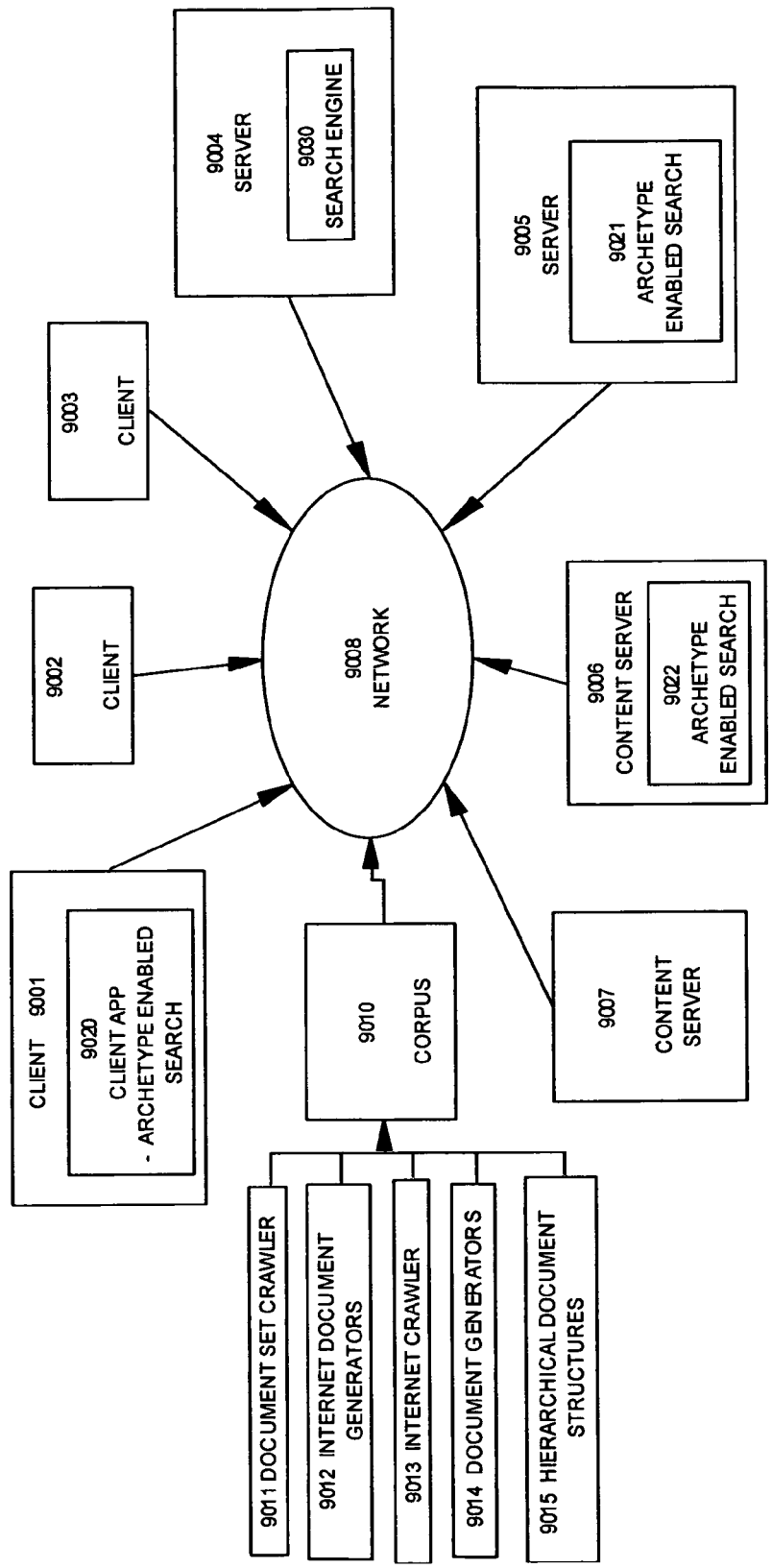
FIG. 9S is a schematic of one embodiment of a technical architecture for additional search related capabilities.

Preferred embodiments of the present invention enhance typical search systems through the application of one or more archetypes which may in different embodiments be applied or employed at a plurality of points and in a plurality of ways in the overall search process, described more fully below. Preferred embodiments of the present invention may also be implemented from several different placements within a search system environment. Referring to FIG. 9S, for example, the methods and systems that comprise the archetype-enabled search invention may be provided on or from a client system (shown in block 9001), one or more server systems (shown schematically in block 9005), and/or one or more content server systems (shown in block 9006). Also as shown in FIG. 9, block 9010, for example, the present invention is intended for use in searches involving a plurality of documents and information types, and may utilize various well understood mechanisms for locating documents or information, included but not limited to an internet crawler (block 9013), a document set crawler (block 9011), internet document generator (block 9012), hierarchical document structures (9015), document generators (block 9014) and others that provide access to some corpus of documents (represented in block 9010).

Preferred embodiments of the present invention provide archetype enabled search methods and system functionality in at least two different cases: first, in the case in which the user or user related context (via, for example, the client system) provides input in the form of a query to the archetype enabled search system and methods which is related to an Integrated Thinking and Knowledge Construct (ITKC) or similarly structured construct (as for example, constructed by a System and Method for Facilitating and Evaluating User Thinking About an Arbitrary Problem); secondly, in the case in which the user, users or electronic source provides input to the archetype search system in the absence of an existing ITKC, or with a very minimal ITKC, as, for example, in the user or other electronic source providing only a main question or topic as input to the archetype-enabled search methods and system, as described more fully below and elsewhere herein.

It should be appreciated that programming code for implementing aspects of the invention can be produced in any suitable language, scripting, or coding mechanism, such as C, C++, Java, Javascript, HTML, XML, VBScript, or any other that can be caused to be executed on a suitable processor, such as a client system or a server system or be compiled to execute on a client system or a server system or other processor.

FIG. 9S is a block diagram of one example embodiment of a search system environment in which methods and systems, consistent with some embodiments of the invention, may be implemented. The system may be implemented in an environment that includes one or multiple clients connected to one or multiple servers, via a network (block 9008) which may be any type of suitable network, including but not limited to LANS and intranets which may be connected over WANS including for example the Internet. For illustrative purposes, FIG. 9S shows 3 clients (blocks 9001, 9002, and 9003) and 4 servers (2 as search servers in blocks 9004 and 9005, and 2 as content servers, in blocks 9006 and 9007). In some embodiments, the present invention will conduct searches through interacting with available search engines (shown in block 9030). In implementations of the present invention, there may be more or fewer clients or servers, and (as well understood by those familiar with the art), a client apparatus may act to perform the functions of a server apparatus and a server apparatus may act to perform the functions of a client. Several components in the system illustrated in FIG. 9S include well understood elements that are not explained in detail here, as they are well understood by those familiar with the art.

Client system may include a number of suitable elements, such as but not limited to a desktop personal computer, a workstation, a PDA, a laptop, a cell phone, a set top or any other suitable element. Client system will typically incorporate one or more suitable user interface devices, which may include for example, a keyboard, a mouse, a pen or stylus, a touch screen, or others configured in some embodiments to interact with a graphical user interface such as a LCD display, monitor, screen or other display mechanism. In some embodiments of the present invention, the methods and systems of the present invention interact with electronic input in the absence of any specific display mechanism. Client system often includes or operates other programs such as a browser program (such as Explorer, Netscape, or other browser programs), and in some embodiments is likely to include other commonly used software tools, such as office tools (a word processor, a spreadsheet processor, presentation development tools, web site publishing tools, and the like), as well as access to electronic mail and other common communications related programs (such as Outlook, email, and other communications programs). In some embodiments, the client system will also include an application module providing the functionality associated with the System and Method for Facilitating and Evaluating User Thinking About an Arbitrary Problem, and may also include the storage or access to one or more resultant thinking and knowledge structures (or ITKC's). However, as described more fully below and elsewhere herein, the presence of or access or relationship to an existing ITKC is not a prerequisite for the utilization of or advantages provided by the archetype enabled search invention discussed herein.

Continuing with FIG. 9S, according to one embodiment, a client application module for executing on a client system typically includes instructions for directing the client system and its components and may also include instructions for communicating with server systems and to process and receive and in some cases to display content or data received from the server systems or content server systems of other portions of the network, as discussed below and elsewhere herein and well understood by those familiar with the art. The client application module may be transmitted and downloaded to client system from a source such as a server, remotely or locally located, or may be provided on any suitable storage medium, such as a CD, DVD, floppy disk or any other suitable medium, or may be provided resident on the client or other suitable processor. In some embodiments, the functionality associated with the client application may be provided remotely via web services or other suitable remote processing and provisioning techniques well understood by those familiar with the art, and suitable for providing functionality and data and content access to the user, users, or electronic requesting source. For example, in one embodiment, a client module may be provided via the Internet or other network to the client system in an HTML wrapper, with various controls such as embedded Active X or JavaScript controls, or via the use of SOAP envelopes, or other remote provisioning mechanisms, methods, or systems.

Continuing with FIG. 9S, which illustrates a typical search system environment for some embodiments of the present invention, one or many server systems (blocks 9004, 9005, 9006, and 9007) may be operable to communicate with and provide search result data and media content to one or more client system(s) (blocks 9001, 9002, 9003). According to one embodiment of the invention, a server application module may execute on one or more server systems that may house one, some, a combination or all of the methods and system modules in an embodiment of the present invention, discussed elsewhere herein.

Continuing with FIG. 9S, a typical search system environment for some embodiments of the present invention may also include one or more content server systems (blocks 9006 and 9007) configured to provide data and/or other media or content. In some embodiments of the present invention, and in keeping with practices and approaches well understood by those skilled in the art, one or more content server systems may include one, some, a combination of, or all of the methods and systems modules of the present invention, discussed elsewhere herein. In some embodiments, a content server centric implementation of the present invention also includes a customized archetype structure, as for instance, related to a specific specialization or domain area.

According to one embodiment, the present invention's archetype enabled search methods and systems are configured to provide search result data or other content to a query originator via a combination of search modules that may be resident or provided or otherwise process on one or more client systems, search server systems, content server systems, or other processing locales. Referring to FIG. 9S for illustration purposes, the modules for accomplishing the methods and systems of the present invention, may be resident or located or otherwise provided through one or more client systems (block 9001, via 9020), search server systems (block 9005, via block 9021), and/or content server systems (block 9006, via block 9022). The optimal implementation of the archetype enabled search invention's system modules and methods will depend upon factors such as but not limited to: the number and location of users being served, whether the user is initiating a query that is related to an ITKC or other similar structure (described also more below), the scope and depth of content and data being included or incorporate in the search process, the costs and availability of processing at the local and remote levels, and others. Although examples of exemplary placement of archetype search modules are discussed herein, it should be understood that the exact delineation of placement or provisioning of the portions of the methods and systems associated with the archetype search invention is not limited to these examples, but may be implemented in a variety of ways and provisioned via a number of processing locations and approaches, well understood by those skilled in the art.

Figure 10S:
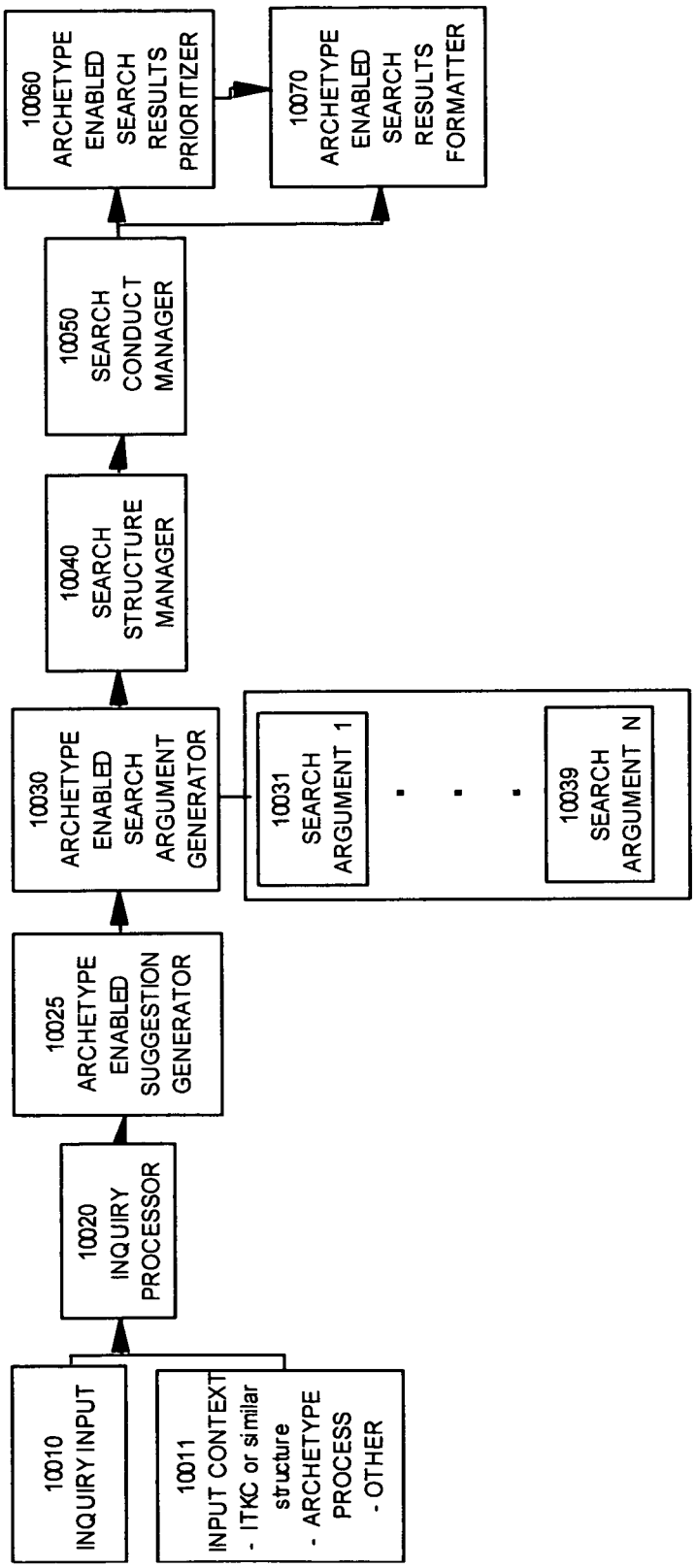
FIG. 10S is a schematic of one embodiment of system and method modules utilized to provide additional ITKC search related capabilities.
Figure 11:
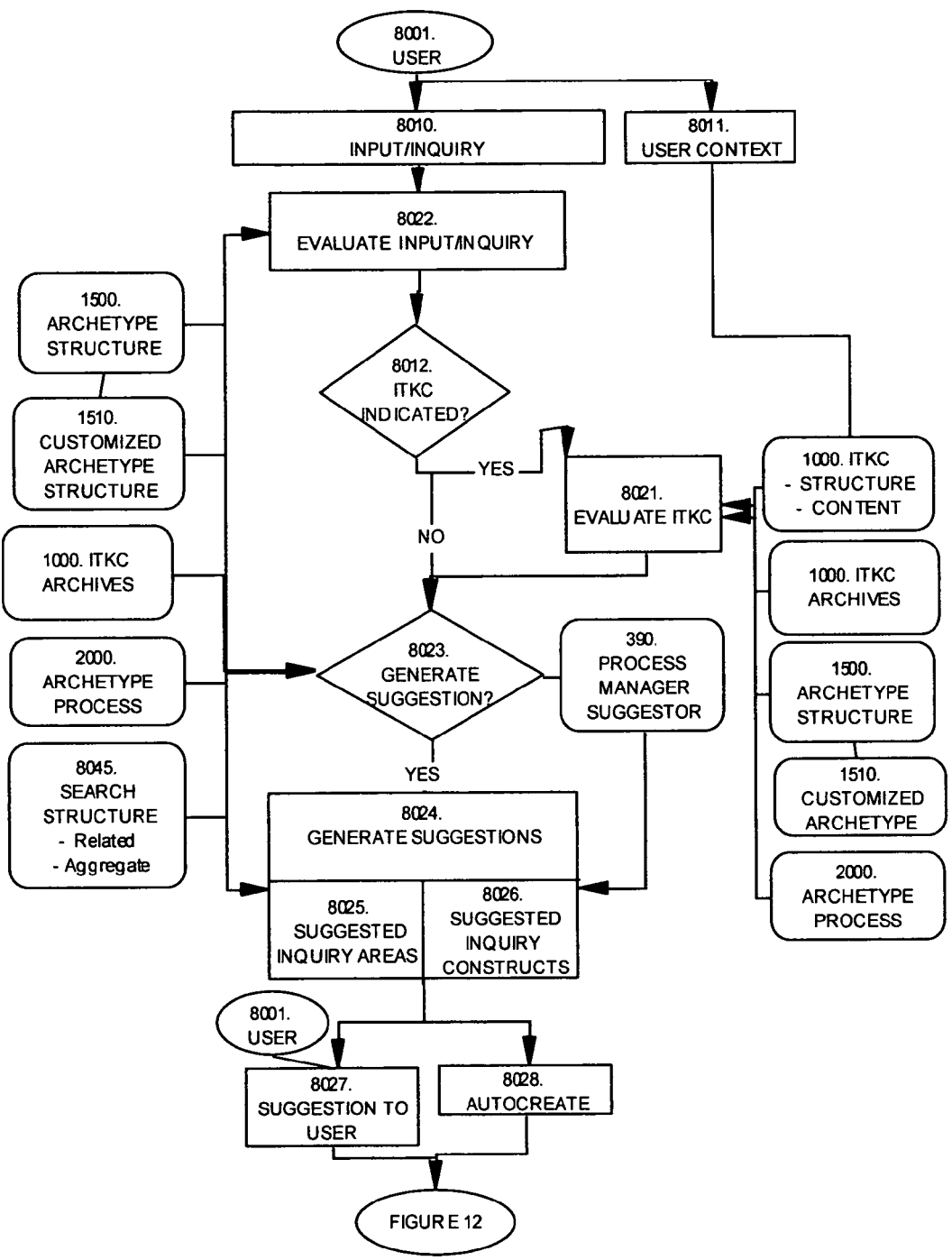

FIG. 10S shows illustrative or example method and system modules that may in one embodiment be utilized to accomplish the archetype-enabled search methods and systems that in some embodiments make up the present invention.

Referring to FIG. 10S, one embodiment of method and systems modules used to accomplish the archetype search system and methods may include, for example, one or more of the following: 1.) a query processor or similar module, shown in block 10020, that generally accepts and evaluates the input or query being processed, block 10010, and may include the evaluation of input context, block 10011, such as the existence of a related ITKC to the input/query, or indication of an archetype process step, or others, indicated in block 10011; 2.) an archetype enabled search argument generator or similar module, shown in block 10030, that generally generates search arguments (for example, in blocks 10031 through 10039) through a combination of factors including but not limited to the application of one or more archetypes discussed more fully herein; 3.) a search structure manager or similar module, shown in block 10040, that generally relates and manages search arguments; 4.) a search conduction manager or similar module, shown in block 10050, that generally ensures that the searches are conducted and at the time that is desired or indicated; 5.) an archetype enabled search results prioritization manager or similar module, shown in block 10060, that may in some embodiments include the application of archetypes to the filtering and ranking of search results; 6.) an archetype enabled search results formatter, block 10070, that may in some embodiments utilize the application of archetypes to format results, and may include others. It should be appreciated that the boundaries and names for the modules that may be used to accomplish the methods and systems of the present invention may not be configured precisely as described here, but rather may be combined or bounded or scoped or named in ways that differ from the modules used for illustrative purposed here without departing from the present invention. Moreover, it should be appreciated that the present invention continues with a modular approach and may therefore be implemented in subsets of functionality that are other than those specifically described and illustrated herein.

FIG. 10S and the modules it shows are intended to be illustrative, and it should be understood that the precise boundaries or configuration of the methods and systems of the present invention may be divided, combined, or configured in different combinations or boundaries without departing from the scope and the intent of the invention. It should further be understood that some embodiments and implementations of the archetype search system will include subsets of the total modules illustrated in FIG. 10. For example, in one embodiment, archetype-enabled search includes the generation of enhanced or additional search arguments through the application of one or more archetype model structures and might be accomplished with modules such as a query processor (block 10010) or similar module, and an archetype enabled search argument generator (block 10030) or similar module, with or without a search structure manager (block 10040) or similar module. In other embodiments, archetype-enabled search systems and methods include the application of one or more archetype model structure(s) to filtering, and/or ranking or prioritizing the results for the search, via, for example, a module such as an archetype enabled search results prioritizer (block 10060) or similar module. In another embodiment, archetype-enabled search methods and systems include the application of archetype-enabled search to format and present search results to a user (a person, a group, or an electronic source), via a module such as an archetype enabled search results formatter (block 10070) or similar module. In one preferred embodiment, archetype-enabled search methods and systems include a combination of two, more, or all of these portions of methods and systems related to archetype enabled search.

One embodiment of flows for an exemplary archetype enabled search system to actualize the methods and systems of the present invention will now be described. It should be understood that the following description is intended to be illustrative, and that other precise flows or flow related modules that accomplish the same or similar function to those described below should be considered within the scope of the present invention.

The flow descriptions are provided in several Figures, with a high level flow description shown in FIG. 8S, and additional more detailed flows depicted in FIGS. 11S, 12S, 13S, 14S, 15S and 16S.

Referring to FIG. 8S (which provides a high level description of one embodiment of flows related to the present invention) in one embodiment of the present invention, a query processor or similar module (indicated in FIG. 10S, block 10010 which describes representative modules), in one example resident on one or more client systems, receives and processes input (shown in block 8010) from a user or other query originator, indicated in FIG. 8S block 8001. It should be understood that a query originator may be an individual user (block 8002), a group or team or users (block 8003), or any electronic or other source (block 8004) capable of producing an input that may be interpreted and processed in accordance with the methods and systems consistent with the present invention. The input (block 8001) may be provided via one or more fields or input spaces provided via one or more interface modules to the user, users, or electronic source, or may be accepted by the present invention's methods and systems via electronic input without any visual or other interface provided to the user(s) or other source (for example in the case in which the query input is being provided by a system such as the System and Method for Facilitating and Evaluating User Thinking About an Arbitrary Problem or another electronic source).

FIG. 8S is a high level representation of flows that in some embodiments may be used to accomplish the present invention, and is intended only to serve as a useful overview, and to show illustratively some of the points at which the present invention provides unique and useful advantages.

Referring then to the high level flow description in FIG. 8S, in one embodiment, the present invention evaluates the input or query (shown in block 8020), utilizing the rules, definitions, and other components and structure analysis logic and content analysis logic from the archetype structure (block 1500), which may in some embodiments also include or utilize a customized archetype structure (block 1510, as for example appropriate in situations when a domain or problem specific or other specialized or customized archetype structure is determined to be appropriate) and in some cases and embodiments, the archetype process (block 2000), as described more fully elsewhere herein. Based on the evaluation of the input or query, in block 8020, and utilizing the relevant archetypes, the present invention in one embodiment then generates search arguments (shown in block 8030) which are determined to be relevant to the input or query being processed, and in the relevant cases, also to the additional input context, such as the related ITKC or archetype process in those cases in which the query or input is related to an ITKC or to the use of a system such as the system and method for facilitating and evaluating user thinking about an arbitrary problem. Continuing with 8S, in one embodiment, the present invention may map the generated search arguments into a search structure, as shown in block 8040 and discussed more fully elsewhere herein, again at times utilizing particularly the archetype structure, block 1500 and potentially any customized archetype structures determined to be relevant.

Continuing with FIG. 8S, in one embodiment, the present invention then conducts or causes to have conducted the searches implied by the search arguments, shown in block 8050, upon some set of information sources, shown in block 8055, which may in some embodiments be accomplished through the reference to or use of additional search engines or agents, shown in block 8052. In some embodiments, continuing with FIG. 8S, the present invention may filter and/or rank and/or otherwise prioritize search results, again utilizing the archetypes and/or other factors discussed elsewhere herein, shown in block 8060, to provide more on-target and useful search results. Preferred embodiments of the present invention also format search results, shown in block 8070, and may present or otherwise output search results in formatted forms, block 8080, based again in some embodiments upon the archetype structure (block 1500) and any associated customized archetype structure(s) (block 1510).

Referring now to FIG. 11S, the query processor or similar module in one embodiment, evaluates the query or input (block 8010) provided, along with any available user context (block 8011) and determines whether or not an ITKC (block 1000) or similar construct is indicated as being related to the query (block 8012), or whether an archetype process portion is the context for the input or query being processed through for example checking for the existence of a tag or other related marker that indicates an ITKC or similar construct is related to the input or query being processed (shown in block 8012). In one embodiment, as shown in FIG. 11S Block 8021, if an ITKC (or similar structure) or archetype process portion is determined to be related to the input to be processed, then the present invention may evaluate additional input provided by, for example, the ITKC (block 1000) and the provided query input (block 8010) against archetype structure and/or archetype process and other factors discussed elsewhere herein, in order to determine whether any suggestions may or should be made (block 8025 and block 8026) regarding new or additional constructs or data or modifications to constructs or data to be further associated with the ITKC (see also descriptions of process manager suggestor module and examples provided elsewhere herein). Alternatively, in some embodiments, as shown in blocks 8022, 8025 and 8026, the present invention evaluates factors such as the input or query (block 8010), any user context (block 8011) and applies the archetype structure (block 1500), customized archetype structure if any (block 1510) and/or other factors as discussed to generate suggestions in the absence of any related ITKC. In these embodiments, such suggestions are in a sense representative of knowledge needs, and are then utilized for further or modified search argument development. In some embodiments, such suggestions may be provided to the user(s) for review and approval (shown in block 8027), and for example, may be provided in the form of specific prompts to the user (for example, the visual or other display or notification of possible or suggested next steps or additional or modified constructs or data). In other embodiments, such suggestions (whether based in part upon a related ITKC or not) may instead be automatically generated (shown in block 8028) as a construct that may be subsequently used to generate search arguments, without first prompting the user(s) to evaluate the suggestion. Such autogeneration may, for example, in some embodiments, be set as a user preference or may be warranted by the specific suggestion case.

In some embodiments, the present invention may provide controls to enact options for user(s) (or teacher or super user or other source) defined choices regarding the extent to which actions that are identified and suggested by the process manager are executed automatically, vs. the invention prompting the user with the suggestion before completing all information processing actions that could logically be completed for the suggestion. One embodiment of the invention may provide for the user(s) or definer for the project (such as a teacher, super user, or other source) to select whether suggested items are automatically generated before prompting the user for their approval, or whether approval is required before the new or adjusted recommended components are generated and shown either as suggested search arguments, as suggested constructs, or only as constructed constructs following the completion of a search.

In some embodiments, also discussed further herein, the present invention's identification or development of suggestions for new or modified constructs or data or other items based on for example, evaluating the input query, and/or the archetype structure, may be treated as an interim step on the way to developing the most appropriate search arguments. In these embodiments, such suggestions for new or modified constructs or data or other items that give rise to new or modified or additional search arguments may not be made visible to the user. Rather, in these embodiments, for example, the present invention may only make the search arguments and/or search results that are the result of such archetype search generation logic visible or available to the user(s) or other electronic query originator. In these embodiments, such suggestions (for example, additional questions or topics related to the input or query, additional or modified analysis or information constructs, and other knowledge or data items) may be treated as "interim" suggestions, potentially invisible to the user. In some of these embodiments, the visible result to the user of such analysis and suggestioning logic may only be visible as suggested search arguments and/or search results, or only in search results, discussed further elsewhere herein.

In preferred embodiments, a core capability is the ability of the methods and system to evaluate the query input and various factors discussed herein, such as but not limited to the input or query, the archetypes, the content and/or structure of any related Integrated Thinking and Knowledge Construct (or ITKC) or other similar structure, process status, and available data) and to generate suggestions for users as a result. In one embodiment, such suggestions may be in the form of a prompt with user intervention for approval, editing, or deletion or the present invention may automatically generate the new or revised structure or content for review by the user and deletion if desired.

In one embodiment (discussed also elsewhere herein in the discussions of the applications of archetypes to suggestioning), suggestions may be based on the evaluation of a plurality of items and result in a plurality of suggestion types, including but not limited to the following: 1.) the suggestion of specific subtopics based on evaluation of the input or query, an archetype or customized archetype structure, and/or any topics or questions in any related ITKC, if any; 2.) the suggestion of analysis constructs based on evaluation of the input or query, an archetype or customized archetype structure, and potentially on any suggested subtopics or subquestions; 3.) the suggestion of information constructs based on evaluation of the input or query, and/or any topics or questions in a related ITKC, if any, with or without the archetypes; 4.) the suggestion of analysis constructs based on prior developed or other suggested analysis constructs; 5.) the suggestion of analysis constructs based on information constructs suggested or available in any related ITKC if any; 6.) the suggestion of analysis constructs based on evaluation of content; 7.) the suggestion of information constructs based on evaluation of content, and others.

In addition, it should be obvious to those skilled in the art that such suggestions and suggestion (or automatic action) logic may build upon one another, and cause additional suggestions to be made (or automatic actions taken). For example, the invention's evaluation of the main topic "What caused the Constitution?" might result in invention's suggestion of a subtopic, and subsequent suggestion of an analysis construct such as a timeline. Subsequently, in one preferred embodiment, and as discussed elsewhere herein, the present invention may generate the automatic creation of an empty timeline, which may be followed by the automatic search, retrieval and presentation of relevant search information, consistent with the present invention and discussed herein.

It should be understood that chaining or combining of analysis and suggestioning logic may be performed through a plurality of approaches and with a plurality of factors, discussed elsewhere herein and also in ways well understood by those skilled in the art. It should further be understood that such suggestions may be made more or less visible and apparent to a user, users or other electronic source, consistent with the present invention. Thus, in one embodiment, for example, the evaluation of a question such as "What caused the Constitution" may result in the provisioning of the suggestion of one or more additional subtopics, such as for example, "What events led up to the Constitution?", while another embodiment may result in the provisioning of a subtopic and empty timeline, while yet another embodiment may result in the direct provisioning of search data results relevant to a timeline without the visible or otherwise apparent indication of the intervening logical steps or suggestions or constructs themselves.

It should be apparent that various approaches may be utilized to generate such suggestions from a user input or query, whether or not an ITKC is determined to be related to the input or query, without departing from the scope and intent of the present invention. For example, such approaches may include those described in various aspects of the process suggestor manager, included and implied through the examples discussed herein, and the evaluation and suggestioning approaches described as a part of the System and Method for Facilitating User Thinking About an Arbitrary Problem, in addition to the use of widely available tools such as a Grammar Link Parser or others (shown in FIG. 12S block 8031).

In this manner, one area of the present invention that gives rise to new and improved search methods and systems is that in preferred embodiments, the present invention includes the suggestion and creation of thinking and knowledge structures, based on the application by the invention of an archetype structure and/or other factors, potentially also a customized archetype structure, and when relevant, a related ITKC. Whether created automatically by the method and/or system or selected at will by the user or other input, preferred embodiments of the present invention create "empty" thinking and knowledge structures (whether visible to the user or not) that may then be used to generate search algorithms and ultimately provide completed search results. Such suggested knowledge and thinking structures represent additional or enhanced knowledge needs that may be relevant to the input or query. It should be appreciated by those skilled in the art that these and similar types of suggestioning are intended to be within the scope of the invention.

For example, in one embodiment, the invention includes the definition, construction, development and use of analysis constructs and information constructs as some of the types of knowledge constructs that are among the structures that are in preferred embodiments included in the archetype structure. Also in some embodiments, the specific analysis construct and/or information construct may include the definition of expected or in some sense exemplary information types or specific data. The automatic generation capability of the present invention therefore means that the invention may search, find, and ultimately generate such constructs for the user(s).

In some embodiments, an additional area of the present invention that gives rise to new and improved search methods and systems is the present invention's ability to generate suggestions based on the content of various portions of the ITKC. For example, the invention in some embodiments may suggest sub-questions based on the evaluation of the main topic or question entered. Content is evaluated and the method and system may suggest to the user both structure and content. This newly suggested content then may also form the basis for search of information or data.

Continuing now with FIG. 12S, in one embodiment, the methods and systems of the present invention generate search arguments, shown in block 8030, based on any one, a combination, or all of a number of factors, including but not limited to: 1.) in some embodiments, consistent with or based on the suggestions, if any, regarding additional constructs, data, or modifications to constructs and/or data suggested or generated by archetype structure analysis and suggestioning logic, block 8025 and the input or query and/or other factors discussed elsewhere herein; 2.) in some embodiments, such as when an ITKC is indicated as related to the specific query being processed, based on the existing structure and content of the ITKC, shown in block 1000; 3.) in some embodiments, based on the query input (block 8010) being evaluated by the invention and one or more archetype structures (blocks 1500 and 1510); 4.) in some embodiments, based on the query input (block 8010) being evaluated by the invention, and one or more customized or domain or problem specific archetype structures (which may include for example, additional or domain specific model topics, analytical or informational or other ITKC related constructs and recommended content) shown in block 1510; 5.) in some embodiments, utilizing the capabilities of tools and resources that are widely available such as the Grammar Link Parser or other tools, shown in block 8031; and others. In a preferred embodiment, the present invention may utilize all of the potential factors for generating search arguments that are available, depending upon an evaluation of the situation surrounding and associated with the query input being evaluated. For example, the present invention in one preferred embodiment applies archetype search generation logic associated with evaluating and suggestioning regarding an ITKC or similar structure when one or more ITKC's (block 1000) or similar structures are determined to be associated with or related to the input being processed, as well as the logic associated with an archetype structure (block 1500 and/or block 1510). Another embodiment of the present invention applies archetype search generation logic based on the input/query being processed, in the absence of the indication of a related ITKC or similar structure. Another preferred embodiment of the present invention applies customized archetype structure logic (block 1510) to the input query being processed when such a customized archetype is available or determined to be available or otherwise relevant to the input/query being processed, whether or not a significant ITKC is determined to be related to the input. It should be understood that the evaluation of the specific search situation together with user preferences indicated may generate a plurality of such combinations of factors that are appropriate to be used by the archetype-enabled search argument generator module. These and other aspects are discussed further below and elsewhere herein.

Referring again to FIG. 11S, in one embodiment, if the present invention evaluates the query input, in block 8022 (or the related ITKC in those cases where a significant ITKC exists and is related to the input, shown in block 8021) and determines suggestions are warranted to the user, block 8025, then said suggestion(s) may be generated displayed or otherwise conveyed to the user(s) for their review and approval, shown in block 8027. In other embodiments, suggestions determined by the present invention may not be visibly conveyed, but may instead be acted upon, as in the automatic generation of any new or modified suggested constructs or content or data, shown in block 8028, and discussed elsewhere herein.

Continuing with FIG. 12S, following the generation of any suggestions or automatic generation of any suggested constructs, one embodiment of the present invention provides methods and systems which continue to process the query or input provided by the query originator and generate search arguments, block 8030. In one embodiment, if any suggestions have been warranted, the search argument generator module evaluates said suggestions and utilizes such suggestions (block 8026) as one factor in generating search arguments, shown in block 8030. In one embodiment, the present invention uses such evaluation and the archetype structure (and potentially other factors, discussed elsewhere herein) in order to generate the related search argument structure, algorithms, rules and format, and in some cases content for terms used to makeup the one or more resulting search argument, shown in block 8030. Continuing with FIG. 12S, if an ITKC is present in the query context or otherwise associated with the input or query, the search argument generator module or similar module utilizes additional evaluation and input provided by the evaluation of the ITKC to further denote search arguments associated with the query, the query context, and the associated ITKC, shown in block 1000.

In one embodiment, continuing with FIG. 12S, the search argument generator or similar module evaluates the input or query and utilizes other factors to generate one or more search arguments, which may include one, a combination or all of factors such as including but not limited to 1.) any relationships of the current input query to any other search arguments indicated by a related search structure, if indicated in block 8041 (such search structure shown in block 8045 and discussed further below); 2.) the archetype structure (block 1500), and/or potentially a customized archetype structure (block 1510); 3.) other available user context; 4.) widely available tools such as a Grammar Link Parser or other tools; and others in order to generate one or more search arguments.

Continuing with FIG. 12S, in some embodiments, the search generator module or similar module may determine that additional user input is needed (block 8032) or would advantageously enhance the development of more relevant or additional search arguments, shown in blocks 8032 and 8033. For example, if the prior suggestioning and search argument generation logic result in a timeline suggestion and related search, the present invention may prompt the user for additional input regarding likely parameters (such as for example an initial start and end date), shown in block 8033. In this example and this embodiment, if the user is able to or chooses to provide such additional input, then present invention may process the additional input and enhance or edit the search argument. In other embodiments, the present invention may allow for the retention and later execution of both the more general search argument (as would be utilized in the absence of additional user input) as well as the edited, and usually more specific search argument generated with the additional user input.

In this manner, in some embodiments, the present invention's methods and systems may generate search algorithms at successive levels of specificity, commensurate with the level of thinking and work being conducted by the user or desired for the search at the time.

It should be appreciated that the archetype search logic associated with the search argument generator module will, in some embodiments and in many use situations, result in the creation of more than one search argument. It is an advantage of the present invention that the archetype search system in a preferred embodiment allows for advantageously generating and subsequently managing, relating and queuing multiple search arguments that may related, for example, to the same problem, ITKC, user session or query input. For purposes of explanation and description, such related multiple search arguments are herein termed a "search structure", indicated by block 8045 in FIG. 12S. Referring to FIG. 10S, in one embodiment, the portion of the present invention's methods and systems that create and manage such a search structure is herein termed a search structure manager, and indicated in FIG. 10S block 10040.

Continuing with FIG. 12S, in one embodiment, following the generation of a search argument (block 8030, and the prompting for additional user input, if any (block 8032), the present invention determines whether the current query or input being processed is related to an existing search structure, in block 8041. In this embodiment, if the generated search argument is related to an existing search structure, then the present invention updates the search structure (block 8045) with the new or additional or edited search argument (block 8044), and in a preferred embodiment will store the search arguments and search structure (block 8046) and may provide the structure and/or the search argument to the user for their review (block 8047) and potential editing or updating of the search arguments and/or search structure (block 8044).

Continuing with FIG. 12S, in one embodiment, if the generated or edited search argument is determined in block 8041 to not be related to an existing search structure, then the present invention determines whether multiple search arguments have been generated from one query or input processed, in block 8042. In this embodiment, if the present invention determines, as shown in block 8042, that multiple search arguments have been generated, then the present invention generates, shown in block 8043, a search structure, in block 8045, that in preferred embodiments is subsequently stores, block 8046, and again may be provided or presented to the user for review, and potential editing of the search argument(s) and/or search structure, in block 8047. Search structures may be generated utilizing a number of factors, including but not limited to the archetype structure, block 1500, any customized archetype structure (block 1510), any related ITKC (block 1000), content relationships and other factors discussed herein. It should be understood that a plurality of approaches for relating multiple search arguments may be used without departing from the scope and the intent of the invention.

The relationships of search arguments within a search structure enabled by the present invention may take a plurality of forms and incorporate a plurality of relationships. In one embodiment, such relationships may include that of more general to more specific, in a hierarchically related fashion. In other embodiments, such relationships may include that of subgroups of related searches, related to one another by content or by structure or desired information type, for example. In other embodiments, such relationships may take the form of relationships based on relationships between the implied or suggested constructs and/or data items, block 8025 and previously described. In some embodiments, in the presence of a related ITKC for example, the creation of a search structure of related multiple search arguments made be based upon the structure and links present or implied in the related ITKC. In other embodiments, for example in the case of an ITKC not determined to be related to the query, the present invention may generate a related, multiple search structure based upon queries submitted by the same user or source in a contiguous use session. In other embodiments, the present invention may generate a related, multiple search structure based upon perceived similarities in the wordings or content submitted in queries. In other embodiments, the present invention may generate a related, multiple search structure based upon the archetype structure, block 1500, and/or any related customized archetype structure, block 1510, if any. It should be appreciated that there are a plurality of approaches that may be used to relate search arguments to one another that utilize approaches well understood by those familiar with the art, and that these approaches should also be considered within the scope of the present invention in the creation or management of search argument structures.

In some embodiments, such potential sub groupings or relationships of search arguments may be generated and presented to the user for their review and edit, as shown in FIG. 12S block 8047. In this manner, in some embodiments, therefore, the present invention allows for and enables users to manage sets of searches in a search group and/or search related structure. This may be advantageous, for example, in providing a mechanism for users to submit and manage the results of multiple searches likely to be required for many inquiry based projects or threads of inquiry pursued by users.

Continuing with FIG. 12S, in some embodiments, as indicated in block PP, search arguments defined by the combination of input factors and the search argument generator module in conjunction with an archetype structure may therefore be stored (block 8046) and may be related to one another in a search structure or similar structure, block 8045 as discussed above and otherwise herein. It should be appreciated that the existence of multiple generated search arguments and the relatedness or not of such search arguments will vary. In some embodiments and use situations, the query and the user context may indicate a single query and single generated search argument, unrelated to other search arguments. In other embodiments and other use situations, the query and the user context may indicate many generated search arguments with many relationships. The determination of the number of search arguments generated from a query, and the relatedness of those search arguments within a query and across queries will depend upon a number of factors, including but not limited to: 1.) the complexity of the query provided by the user or electronic source; 2.) the relation or lack of relation of the query to an ITKC; 3.) the relation or lack of relation of the query to other queries posed by the same user, or within the same use session; 4.) the relation of lack of relation of one query to other queries as indicated by content relatedness or similarity of type of the queries to other queries; 5.) the relatedness or lack of relatedness of one query to other queries as indicated, related, or grouped by the user, 6.) the relatedness or lack of relatedness of one query to other queries as indicated by analysis conducted according to an archetype structure block 1500 and/or customized archetype structure, block 1510, employed by the search argument generator module; and others. It is to be understood that the present invention provides for and manages the creation and in some embodiments the execution of a related structure of multiple search arguments, without regard to the number, complexity or type of those relationships or the number, type or complexity of the search arguments provided for in the search argument structure.

Returning to FIG. 8S block 8050 and further described in FIG. 13S, one embodiment of the present invention provides for a search conduction manager or similar module that manages the execution of the generated search argument(s) to produce search results, as shown in Block 8050. In some embodiments and in some use situations, the conduction of searches to produce results is initiated by the present invention to occur at or near the time that the search arguments are generated and determined ready to be processed, as determined in block 8051. In other embodiments or other use situations, continuing with FIG. 13S and shown for example in block 8046, the search arguments included with and generated by the present invention may be stored and conducted at a later time. Such storing and delaying of search conduction based on generated search arguments may be advantageous, for example, in use situations in which the user, group, or electronic source is continuing with other project or information work and does not wish to proceed with search conduction at the time the search arguments are determined. Other situations in which the delaying of search conduction may be advantageous include, for example, situations in which a user(s) are working offline or the search generator module is otherwise not within easy access of search processing or access to, for example, the Internet. It should be understood that the decoupling in time or work process of the conduction of search arguments from the identification and/or generation of search gaps and/or generation of search arguments is within the scope of the present invention, and may be desirable for a number of reasons.

In many embodiments, the invention stores searches that are completed along with their result parameters, and may display such history in relation to archetype components (such as relating search parameters to questions used at the time, etc.). Successful searches may also be stored and applied in later applications of the archetypes.

Continuing with FIG. 13S, one embodiment of the present invention includes the determination of whether the search(es) are to be conducted at or near the time of generation or delayed (shown in block 8051). Continuing with FIG. 13S, one embodiment of the present invention then determines whether the particular search conduction session involves multiple search arguments, indicated in block 8052, and discussed elsewhere herein. If multiple search arguments are indicated, then the search conduct module or similar module invokes processing related to the conduct of multiple searches, as indicated in block 8052 and described in greater detail in FIG. 14S

One embodiment of the present invention includes a search conduction manager or similar module (FIG. 10S block XX), which may prioritize, sequence and manage any generated or stored multiple search arguments for their conduction as searches. In the simplest case of one embodiment of the present invention, there is no prioritization or sequencing necessary because the search argument generated from the query is a single search argument, and as such is conducted according to the flow indicated by block 8-55, conduct individual search and further delineated in FIG. 15S. However, in many embodiments and use situations, further discussed herein, the application of archetypes to generate search arguments is likely to result in multiple search arguments being generated. In addition, even in the absence of the generation of multiple search arguments from a single input/query, the present invention, in preferred embodiments, provides for a plurality of mechanisms for prioritizing and in some cases sequencing or queuing the desired search arguments that may, for example, be related to the same use session or to a project or other grouping of searches determined, for example by the user or other factors described elsewhere herein.

Referring now to FIG. 14S, one embodiment of the conduction of multiple searches (block 8053) as for example provided by a search conductor manager or similar module (FIG. 10S block 10050) is discussed. Referring to FIG. 14S, a search conductor manager or similar module may first prioritize searches within a related search structure, shown in block 14001, based on one, some or all of a number of factors that may include but not be limited to the following: 1.) based on the generated related search structure, shown in block 8045; 2.) based on the relationships and rules from the archetype structure, block 1500, and/or any identified or related customized archetype structure, block 1510; 3.) based on any identified or related ITKC, block 1000; 4,) based on user set priorities, block 13004; and others, block 13005. Continuing with FIG. 14S, the present invention in some embodiments may then utilize some combination of these and other factors to sequence the multiple searches, block 14002, so that they may be conducted. Such sequencing may in some embodiments include the conduction of a search against the result of a previously conducted search, indicated in block 14005, for example. In other embodiments and cases, the present invention in conducting multiple searches may combine or otherwise integrate the results from multiple searches into a single or different related subsets of results, also indicated in block 14005. Continuing with FIG. 14S, in some embodiments, the present invention may also queue and then manage the execution of the individual search arguments block 14003, according to the flow generally described further in FIG. 15S, block 8055 conduct individual search.

Referring to FIG. 15S, in some embodiments, following the appropriate sequencing, prioritizing, and queuing of multiple search arguments discussed previously above (or in embodiments and cases in which only a single search argument is to be conducted), the present invention may, through the search conductor or similar module, conduct or cause to be conducted a specific search based on a search argument, block 8055. Referring to FIG. 15S, the present invention in some embodiments will determine whether a third party search engine or agent is to be utilized in the search, as shown in block 15001. Such determination may be made based on a number of factors, including but not limited to items such as designated user preference and the type and characteristics of the search argument being executed, as well as others. If a third party search engine or agent is to be utilized, then the present invention in some embodiments through the search conductor or similar module sends a message to or otherwise invokes a third party search engine or agent, as indicated in blocks 15002 and 8052. Approaches to sending search arguments to third party search engines or agents and receiving results are well understood by those skilled in the art and need not be described in detail herein. For example, conventional forms of search arguments may be transmitted to web services forms of search engines utilizing SOAP envelopes or other approaches. It should be appreciated that a plurality of approaches may be utilized to send search arguments to search engines or agents and receive search results, and that these are to be considered within the scope of the invention.

Continuing with FIG. 15S, in some embodiments, if a third party search engine or other agent is not determined to be utilized for the search to be conducted, then the present invention accesses and searches, block 15003, various information sources, block 8035, which may include a plurality of source and information types, described elsewhere herein. Various mechanisms may be utilized by the present invention to assist in the location of information and sources relevant to any search, including but not limited to, for example, those shown in FIG. 9S, blocks 9011-9015, as mechanisms to access a corpus of documents or information. In some embodiments, the present invention identifies matches (block 15004) and otherwise selects documents or portions of documents and returns or identifies search results, block 15005.

In these manners, then the present invention generates and manages likely multiple search arguments that enhance any single input or query, and searches or causes to be searched a variety of information sources to produce search results.

It should be understood that in some embodiments and in some use or search argument situations, it may be desirable for the sequencing of multiple searches to include the feeding of results from one search into another search, and that such progressive use of search arguments is to be understood to be within the scope of the invention.

Referring now to FIG. 16S, one embodiment of the present invention's additional processing of search results is described. Such additional processing of search results may be accomplished, for example and in some embodiments, by an archetype enabled search results prioritizer (FIG. 10S, block 10060) and/or an archetype enabled search results formatter (FIG. 10S, block 10070) or similar modules. It should be understood that the methods, systems, functions and processing associated with the flows described in FIG. 16S, as with other Figures included herein that describe representative flows, may be accomplished in a number of different orders and a plurality of combinations or subsets without departing from the present invention.

Referring to FIG. 16S in one embodiment, the present invention receives and processes search results in order to improve the relevancy of results to the user or originator of the input or query. In FIG. 16S a set of search results is represented schematically for discussion purposes as Res 1, 2, 3, 4 and 5 (shown in blocks 16001, 16002, 16003, 16004 and 16005 respectively). Continuing with FIG. 16S, the present invention in some embodiments may filter or otherwise subset a set of search results, shown in block 8061, to produce a reduced or subsetted set of search results, represented schematically in blocks 16002, 16004, and 16005(*a*) following block 8061. In one preferred embodiment, such filtering may be done based on a number of factors that may include any one, a combination or all but not be limited to the following: 1.) for example, the application of an archetype structure (block 1500) and/or 2.) a customized archetype structure, if any, (block 1510); 3.) the related search structure, block 8045, if any; 4.) any related or identified ITKC, block 1000, if any; 5.) the use of widely available tools such as a Grammar Link Parser or other tools, block 8031, and others. For example, continuing with the example in which a query may be "What caused the Constitution?", the present invention might employ search results filtering logic based on the above and/or other well understood factors to eliminate those records or references that do not contain archetype indicators for causation. As another example, if the search argument being conducted is related to a timeline, in some embodiments, the present invention may similarly filter or eliminate records or references or information that do not appear to contain dates. These and other filtering approaches will be apparent to those skilled in the art and should be considered within the scope and intent of the present invention.

Continuing with FIG. 16S in one embodiment, the present invention may then rank or prioritize remaining search results, shown in block 8065, and resulting in a re-ranked set of search results, shown schematically in FIG. 16S as Res 1 (block 16005(*a*) and formerly Res 5), Res 2 (block 16002 and formerly Res 2 by ordered first prior to ranking), and Res 3 (block 16004 and formerly Res 4). Factors that may be used by the present invention in some embodiments to accomplish such ranking or prioritizing of results may include by not be limited to any one, a combination or all of the following: 1.) for example, the application of an archetype structure (block 1500) and/or 2.) a customized archetype structure, if any, (block 1510); 3.) the related search structure, block 8045, if any; 4.) any related or identified ITKC, block 1000, if any; and others. In this manner, the present invention in preferred embodiments provides additional filtering, ranking and prioritizing logic to enhance search results.

Continuing with FIG. 16S, one embodiment of the present invention may employ an archetype enabled search results formatter or similar module (shown in FIG. 10S block 10070), which in one embodiment may utilize factors such as but not limited to the archetype structure (block 1500), any customized archetype structure (block 1510), any related ITKC (block 1000), any related search structure (block 8045) and/or archetype process information or other factors in order to format the search results in the most relevant and advantageous manner for the user, shown in block 8070. As indicated in block 8070, such formatting and presenting may include but not be limited to 1.) the creation of a constructed or partial knowledge or information construct based on search arguments; 2.) a prioritized or annotated list of references or information results or subsets or snippets of information results, 3.) a combination of these with or without the presentation of additional suggested search arguments or constructs, and others. In some embodiments, the present invention may provide suggestions for additional searches, search arguments, topics, or potential constructs to be constructed at the same time or in conjunction with providing one or more sets of search results. In preferred embodiments, the present invention provides for either presenting formatted search results to a user(s), block 8081, or may instead or in addition output the formatted search results in electronic or printed form, block 8082. In some embodiments, and in cases in which an ITKC is related to the query or input being processed, the search results and suggestions may be returned to the ITKC system and method and the ITKC may be automatically updated accordingly, shown in block 16005, as discussed also elsewhere herein.

Referring now to FIG. 20, in some embodiments, the system and method provide for the ability to utilize the ITKC & User Locator, block 16000 or similar module (and in some embodiments in conjunction with or through alternatively the autogeneration and automatic suggestioning and search capabilities discussed elsewhere herein for example in FIGS. 3B, 3B-10, 10, 10A, 14 and others) on an ongoing or periodic basis, as opposed to requested directly by a user or group of users at a specific instance in time. Referring again to FIG. 20 and related to the other figures previously described, such capability may in some embodiments be termed a Personalized ITKC Automatic Locator or Personalized ITKC Automatic Updater or the like. In preferred embodiments, the Personalized ITKC Automatic Locator and/or Updater Referring to FIG. 20, in block 20010 for example, Personalized ITKC Automatic Updater or similar module, in one embodiment provide for the ability to set up and save parameters associated with the ITKC related areas, topics, structures, and the like (discussed elsewhere herein) to be used by the ITKC & User Locator or similar module (block 16000) and/or in combination with Archetype Structure (block 1500), Archetype Process (block 2000), Process Manager Suggestor (block 390), I/O Modules, and potentially the Composite Manager (block 13040), discussed elsewhere herein, to search for potentially related ITKC's, potential users, and potentially related content, shown in block 20020. In some embodiments and in some use situations, the target for such locating and potential updating may be limited according to the parameters set in block 20010 to, for example, a specific group that has agreed to work collaboratively on an ongoing basis, as in a Reciprocal Group shown in FIG. 18 block 18007 and described elsewhere herein. Continuing with FIG. 20, in preferred embodiments, the Personalized ITKC Updater or other similar module may provide for the setting of parameters regarding the desired scope and target of the location and retrieval, including but not limited to, for example, the source for the ITKC's and/or related content (as for example set only to a particular Reciprocal Group vs. public access, or others), a specific problem or topic or content area, a type of archetype structure or structures, a portion of the archetype process, or others. Continuing with FIG. 20, then based on the setting of parameters in block 20010, the Personalized ITKC Updater or similar module in block 20020 searches for potentially related ITKC's and/or users or groups of users. Such processing may, for example, in some embodiments, follow processing similar to that shown in FIGS. 10, 10A and 13A and others described elsewhere herein. It should be appreciated that other processing flows and modifications to the use of such capabilities as the archetype process, archetype structure, process manager and other modules of the ITKC system and method will be evident as alternatives to achieving such location and retrieval, and are to be considered within the scope of the present invention.

Continuing with FIG. 18, and again in block 18007, in preferred embodiments, groups with regard to the ITKC system and method may further be specifically created with access rights, or may be inferred from the participation by various individuals through their joint authoring, access or other participation in one or more ITKC's, groups, or other commonality and inference associated with the system and method and described elsewhere herein. It should further be appreciated in preferred embodiments, that the specified or inferred membership of any ITKC related group may also overlap, as indicated schematically in the overlap of Groups A (block 18002) and B (block 18003). It should further be appreciated that the means by which an individual is identified as having membership or participation or other activity with regard to any group may be determined by the present invention by one, some or a combination of a plurality of means, indicated in block 18010, which may include for example but not be limited by, 1.) through the implied or collaborative relationships of individuals working on or accessing one or more common or related ITKC's or their associated output and related files (indicated in FIG. 18 schematically in block 18010 as ITKC related); 2.) through monitoring or otherwise tracking and/or evaluating direct membership or direct contact of an individual with or in a group or with another individual; 3.) through the application of archetypes described elsewhere herein in evaluating commonalities and potential relationships; 4.) through a combination of relationships analysis, for example, combining links or relationships analysis across or between individuals, ITKC's, groups, and categories, whether directly created by users or groups, or automatically created by the system and method, via use of the archetypes and other actions described elsewhere herein. It should be understood that other means for inferring ITKC related groups implied or extrapolated from these and other described ITKC capabilities and processes herein are to be considered within the scope of this invention. It should further be understood that such examples are illustrative and not exhaustive, as the analysis of patterns associated with the archetypes and other information tracked and provided by the ITKC system and method provide a rich basis for such inferences, and that other such inferences as well understood by those skilled in the art should be considered within the scope of the invention.

Referring again to FIG. 18, it should be appreciated that in some embodiments, connections or relationships between individuals, as shown for example between individual 1 (block 18001), Individual 2 (block 18004) and Individual 3 (block 18005) can be similarly determined directly or inferred from aspects such as the direct contact and subsequent inference of relationships between individuals, or groups (such as Group A shown in block 18002, Group B shown in block 18003, Group C shown in block 18006, Group D shown in block 18007) and individuals, or groups and groups, through direct relationships or through additional ITKC related connections and inferences. It should be appreciated that the elements and relationships shown in FIG. 18 are intended to be illustrative and that the present invention supports and is able to track and identify a plurality of relationships between users, ITKC's, their associated output and content and other files, individuals and contacts, categories (both user created and inferred) and informal and formal groups, and utilize such analysis and relationships to determine potentially related groups of individuals and of ITKC's.

Continuing with FIG. 20, the system and method in one embodiment return potential matches in block 20030. Referring to FIG. 20, block 20035, for matches or potentially relevant ITKC's, portions or ITKC's, related output or presentation, some embodiments of the present invention may then provide for the option to autogenerate or automatically format and include the results in the target ITKC or ITKC's, defined by the user or through system preferences described also elsewhere herein. If the option is to autoformat or autogenerate or otherwise update the target ITKC's or presentation and output files, the system and method in some embodiments do so, as shown in block 20040 and discussed elsewhere herein. In some embodiments and based on some system preference settings or user defined options, the system and method may alternatively display and provide results for the user or group of users to review and decide upon incorporation, as shown in block 20045. Referring also to FIG. 20, block 20050, the system and method in some embodiments will also display or otherwise provide potential matches or contacts regarding potentially related individuals or groups of interest, also described elsewhere herein.

As used herein the term arbitrary problem includes qualitative expressions of problems, quantitative problems, and combinations thereof.

When referring to the term "archetype" as in archetype process or archetype structure, the intent is to cover exemplary, though not necessarily optimal, processes or structures.

In the foregoing detailed description of the present invention, and its preferred and example embodiments discussed herein, reference is made in part to the accompanying drawings that form a part thereof. The drawings in conjunction with the following description and explanation show by way of illustration specific embodiments in which the invention may be practiced. It is to be understood that other embodiments may be utilized and structural and functional changes may be made without departing from the scope of the present invention.

It will be appreciated that the scope of the present invention is not limited to the above described embodiments but rather is defined by the appended claims, and that these claims will encompass modifications of and improvements to what has been described.

The invention claimed is:

1. A system for facilitating exemplary problem solving in a customized or domain-specific setting, said system comprising:
   A process manager system operable to execute on one or more processors, to accomplish activities comprising:
   Facilitating the development of at least one user model or specification regarding an arbitrary problem or inquiry based project or both, said facilitating accomplished using an archetype process or archetype structure for exemplary problem solving or both, or using at least one of a customized or domain-specific archetype process or customized or domain-specific archetype structure or a combination thereof;
   Outputting or displaying or both at least one of the archetype process portions, archetype structure portions, customized archetype process portions, customized archetype structure portions, or a portion of a user model or a combination thereof.

2. The system of claim 1 further comprising determining or providing, or both, at least one suggestion, comprising at least one of a suggested next step, suggested next interaction, suggested model or specification component, suggested type of model or specification component, suggested template, suggested model, suggested edit, suggested linkage, suggested reclustering or regrouping of component, suggested content, suggested view, suggested workspace, automatically provided linkage, automatically provided specification, automatically provided model component, automatically provided analysis construct, automatically provided information construct, automatic retrieval of related content, automatic providing of content, automatically edited specification, automatically edited model component, automatically edited linkage, automatic compositing of model, compositing of model component, automatic subdividing of model, subdividing of model component, entry to an additional target information source, or input to a search source, or a combination thereof.

3. The system of claim 1 further comprising at least one of an analysis construct component, information construct component, knowledge component, analysis construct, information construct, question, topic, answer, summary view, meaning statement, model structure characteristic, linkage, timeline, sequence, comparison analysis, comparison and contrast analysis, contrast analysis, linkage analysis, outline, matrix, storyline, categorization analysis, tree analysis, causation analysis, customized or domain-specific analysis, customized or domain-specific information construct, or a combination thereof.

4. The system of claim 1 further comprising use, monitoring, recording, tracking or output, or a combination thereof, of at least one item, comprising at least one of user interaction, user action, model, model component, specification, system event, user event, linkage, related content, model or stage or specification snapshot, documented stage of understanding, model archive, specification archive, linkage archive, user event archive, system event archive, content archive, linked or associated resource, linked or associated tool, suggestion history, criteria use, ranking, rating, comment, workspace history, display history, output history, or a combination thereof.

5. The system of claim 1 further comprising use of, input to or output from or a combination thereof, at least one external or additional electronic item, comprising at least one of a processor enabled system, computer system, electronic system, electronic resource, electronic tool, web service, web linkage, applet, widget, electronic application, messaging system, electronic device, information resource, information source, email system, communication system, social networking system, publishing system, search engine, agent, or tool or a combination thereof.

6. The system of claim 1 further comprising that a specification, model component, suggestion, workspace, display, or output, or a combination thereof, comprises at least one of text, drawing, video, audio, picture, image, 3D depiction, 2D depiction, outline, matrix, graphic, interactive graphic, or a combination thereof.

7. The system of claim 1 further comprising at least one processor, local processor, remote processor, web service, web linkage, client system, server system, client and server system, computer readable device, memory, electronic device, applet, widget, processor readable instruction, processor readable medium, display device, projection device, or storage device or a combination thereof.

8. A processor implemented method for facilitating exemplary problem solving in a customized or domain-specific setting, said processor implemented method comprising:
   processor implemented activities comprising:
   facilitating the development of at least one user model or specification regarding an arbitrary problem or inquiry based project or both, said facilitating accomplished using an archetype process or an archetype structure for exemplary problem solving or both, or using at least one of a customized or domain-specific archetype process or a customized or domain-specific archetype structure or a combination thereof;
   Outputting or displaying or both at least one of the archetype process portions, archetype structure portions, customized archetype process portions, customized archetype structure portions, or a portion of at least one user model or a combination thereof.

9. The processor implemented method of claim 8 further comprising determining or providing, or both, at least one suggestion, comprising at least one of a suggested next step, suggested next interaction, suggested model or specification component, suggested type of model or specification component, suggested template, suggested model, suggested edit, suggested linkage, suggested reclustering or regrouping of component, suggested content, suggested view, suggested workspace, automatically provided linkage, automatically provided specification, automatically provided model component, automatically provided analysis construct, automatically provided information construct, automatic retrieval of related content, automatically provided content, automatically edited specification, automatically edited model component, automatically edited linkage, automatic compositing of model, compositing of model component, automatic subdividing of model, subdividing of model component, entry to an additional target information source, or input to a search source, or a combination thereof.

10. The processor implemented method of claim 8 further comprising use, monitoring, recording, tracking or output, or a Combination thereof, of at least one item, comprising at least one of user interaction, user action, model, specification, system event, user event, linkage, related content, model or stage or specification snapshot, documented stage of understanding, model archive, specification archive, linkage archive, user event archive, system event archive, content archive, linked or associated resource, linked or associated tool, suggestion history, criteria use, ranking, rating, comment, workspace history, filtering, display history, output history, or a combination thereof.

11. The processor implemented method of claim 8 further comprising use of, input to or ouput from or a combination thereof, at least one external or additional electronic item, comprising at least one of a processor enabled system, computer system, electronic system, electronic resource, electronic tool, web service, web linkage, applet, widget, electronic application, messaging system, electronic device, information resource, information source, email system, communication system, social networking system, publishing system, search engine, agent, or tool or a combination thereof.

12. The processor implemented method of claim 8 further comprising that a specification, model component, suggestion, workspace, display, or output, or a combination thereof, comprises at least one of text, drawing, video, audio, picture, image, 3D depiction, 2D depiction, outline, matrix, projection, graphic, interactive graphic, or a combination thereof.

13. The processor implemented method of claim 8 further comprising at least one processor, local processor, remote processor, web service, web linkage, client system, server system, client and server system, computer readable device, memory, electronic device, applet, widget, processor readable instruction, processor readable medium, display device, projection device, or storage device or a combination thereof.

14. A system for facilitating exemplary problem solving in a customized or domain-specific setting, said system comprising:
    a process manager system operable to execute on one or more processors, to accomplish activities comprising:
    accepting at least one problem, topic, question, input or inquiry, or a combination thereof;
    applying at least one of a customized or domain-specific archetype structure for exemplary problem solving, a customized or domain-specific archetype process for exemplary problem solving, or archives of user models, or a combination thereof;
    determining or providing, or both, at least one suggestion;
    outputting or displaying or both at least one of the archetype process portions, archetype structure portions, customized archetype process portions, customized archetype structure portions, suggestion, or a portion of at least one user model or a combination thereof.

15. The system of claim 14 further comprising determining or providing, or both, at least one suggestion, comprising at least one of a suggested next step, suggested interaction, suggested model or specification component, suggested type of model or specification component, suggested template, suggested model, suggested edit, suggested linkage, suggested reclustering or regrouping of component, suggested content, suggested view, suggested workspace, automatically provided linkage, automatically provided specification, automatically provided model component, automatically provided analysis construct, automatically provided information construct, automatic retrieval of related content, automatic providing of content, automatically edited specification, automatically edited model component, automatically edited linkage, automatic compositing of model, compositing of model component, automatic subdividing of model, subdividing of model component, entry to an additional target information source, or input to a search source, or a combination thereof.

16. The system of claim 14 further comprising at least one of an analysis construct component, information construct component, knowledge component, question, topic, answer, summary view, meaning statement, model structure characteristic, linkage, timeline, sequence, comparison analysis, comparison and contrast analysis, contrast analysis, linkage analysis, outline, matrix, storyline, categorization analysis, tree analysis, causation analysis, customized or domain-specific analysis, customized or domain-specific information construct, or a combination thereof.

17. The system of claim 14 further comprising use, monitoring, recording, tracking or output, or a combination thereof, of at least one item, comprising at least one of user interaction, model, specification, system event, user event, linkage, related content, model or stage or specification snapshot, documented stage of understanding, model archive, specification archive, linkage archive, user event archive, system event archive, content archive, linked or associated resource, linked or associated tool, suggestion history, criteria use, ranking, rating, comment, workspace history, filtering display history, output history, or a combination thereof.

18. The system of claim 14 further comprising use of, input to or output from or a combination thereof, at least one external or additional electronic item, comprising at least one of a processor enabled system, computer system, electronic system, electronic resource, electronic tool, web service, web linkage, applet, widget, electronic application, messaging system, electronic device, information resource, information source, email system, communication system, social networking system, publishing system, search engine, agent, or tool or a combination thereof.

19. The system of claim 14 further comprising at least one processor, local processor, remote processor, web service, web linkage, client system, server system, client and server system, computer readable device, memory, electronic device, applet, widget, processor readable instruction, processor readable medium, display device, projection device, or storage device or a combination thereof.

20. The system claim 14 further comprising the facilitation or application, or both, of commenting, rating, ranking, compositing, subdividing, filtering, or a combination thereof.

* * * * *